US012658774B2

(12) United States Patent
Pomerantz et al.

(10) Patent No.: US 12,658,774 B2
(45) Date of Patent: Jun. 16, 2026

(54) LIDAR WITH A BIAXIAL MIRROR ASSEMBLY

(71) Applicant: Innoviz Technologies Ltd., Rosh Haayin (IL)

(72) Inventors: Uri Pomerantz, Tel Aviv (IL); Nir Goren, Herut (IL)

(73) Assignee: Innoviz Technologies Ltd., Rosh HaAyin (IL)

( * ) Notice: Subject to any disclaimer, the term of this patent is extended or adjusted under 35 U.S.C. 154(b) by 811 days.

(21) Appl. No.: 17/945,366

(22) Filed: Sep. 15, 2022

(65) Prior Publication Data
US 2023/0006531 A1 Jan. 5, 2023

Related U.S. Application Data

(63) Continuation of application No. PCT/IB2022/000220, filed on Apr. 11, 2022.
(Continued)

(51) Int. Cl.
*H02K 41/035* (2006.01)
*G01S 7/481* (2006.01)
(Continued)

(52) U.S. Cl.
CPC ........ *H02K 41/0354* (2013.01); *G01S 7/4817* (2013.01); *G01S 17/89* (2013.01);
(Continued)

(58) Field of Classification Search
CPC ... H02K 41/0354; G01S 7/4817; G01S 17/88; G01S 17/89; G02B 7/182; G02B 7/1821
See application file for complete search history.

(56) References Cited

U.S. PATENT DOCUMENTS 6,856,437 B2 2/2005 Witt et al.
9,063,549 B1 * 6/2015 Pennecot ................ G01S 17/93
(Continued)

FOREIGN PATENT DOCUMENTS

WO WO-2022/219410 A2 10/2022
WO WO-2022/219410 A3 1/2023

OTHER PUBLICATIONS

International Search Report and Written Opinion for International Application No. PCT/IB2022/000220 dated Dec. 20, 2022.
(Continued)

*Primary Examiner* — Christopher M Koehler
*Assistant Examiner* — Ahmed F Seck
(74) *Attorney, Agent, or Firm* — Meitar Patents LTD.; Daniel Kligler

(57) ABSTRACT

A yoke assembly of an oscillatory system is described herein. The yoke assembly includes a yoke structure. The yoke structure includes a first sidewall and a second sidewall, the second sidewall spaced apart from the first sidewall, the first and second sidewalls having a gap therebetween. The yoke structure includes at least one member extending between the first and second sidewalls, a first flange extending laterally from the first sidewall and a second flange extending laterally from the second sidewall. The yoke structure is a unitary structure having the first and second sidewalls and the first and second flanges integrally connected.

22 Claims, 107 Drawing Sheets

Related U.S. Application Data

(60) Provisional application No. 63/283,227, filed on Nov. 25, 2021, provisional application No. 63/236,695, filed on Aug. 25, 2021, provisional application No. 63/174,100, filed on Apr. 13, 2021, provisional application No. 63/173,426, filed on Apr. 11, 2021.

(51) Int. Cl.

| | | |
|---|---|---|
| *G01S 17/89* | (2020.01) | |
| *G02B 7/182* | (2021.01) | |
| *G02B 26/08* | (2006.01) | |
| *G02B 26/10* | (2006.01) | |

(52) U.S. Cl.
CPC ......... *G02B 7/182* (2013.01); *G02B 26/0833* (2013.01); *G02B 26/105* (2013.01)

(56) References Cited

U.S. PATENT DOCUMENTS

| | | | | |
|---|---|---|---|---|
| 10,479,018 | B2 | 11/2019 | Brown et al. | |
| 2002/0114237 | A1* | 8/2002 | Kunimatsu | ............ G11B 7/005 |
| 2016/0182892 | A1 | 6/2016 | Ko et al. | |
| 2018/0196257 | A1* | 7/2018 | Ostaszewski | ...... F16M 11/2021 |
| 2020/0355803 | A1 | 11/2020 | Gao et al. | |
| 2023/0006531 | A1 | 1/2023 | Pomerantz et al. | |

OTHER PUBLICATIONS

Invitation to Pay Additional Fees for International Application No. PCT/IB2022/000220 dated Oct. 5, 2022.

LaunchPoint TechBlog; "Magnetic Spring Technology Enables High-Speed Rotary and Linear Actuators," retrieved online <https://web.archive.org/web/20180712014435/https:/www.launchpnt.com/techblog/bid/63869/Magnetic-Spring-Technology-Enables-High-Speed-Rotary-and-Linear-Actuators>: 4 pages (May 10, 2011).

Mrak et al., "Optimal Magnetic Spring for Compliant Actuation-Validated Torque Density Benchmark," Actuators, 8:18 (2019).

International Search Report and Written Opinion for Application No. PCT/IB23/00648 dated Mar. 11, 2024.

* cited by examiner

A

B

C

500

No light flux
Low light flux
Default light flux
High light flux

Spring

Horizontal Motor

Flex PCB

Vertical Motor

Coil

Coil Holder

Mirror

3400

3611

3680

3613

2201

2214

2218

2218

2201

2204

2241

6600

16

12

14

18

22

6

4

20

LIDAR WITH A BIAXIAL MIRROR ASSEMBLY

RELATED APPLICATIONS

This application is a Continuation of PCT/IB2022/000220, filed on Apr. 11, 2022, which claims the benefit of U.S. Provisional Application No. 63/173,426, filed on Apr. 11, 2021, U.S. Provisional Application No. 63/174,100, filed on Apr. 13, 2021, U.S. Provisional Application No. 63/236, 695, filed on Aug. 25, 2021 and U.S. Provisional Application No. 63/283,227, filed on Nov. 25, 2021. The entire teachings of each of the above applications are incorporated herein by reference.

FIELD OF THE INVENTION

Embodiments of the present disclosure generally relate to the use of magnets for controlling motion of a single-degree-of-freedom oscillator.

BACKGROUND

There exists a need for assemblies, systems, and methods to control the motion (e.g., maintain uniform velocity of the movable components) of a single-degree-of-freedom mechanical oscillatory system.

SUMMARY OF THE INVENTION

Provided herein are oscillatory assemblies, systems, and methods for controlling oscillatory motion. In various embodiments, an assembly includes a stator, a rotor configured to move with one degree of freedom relative to the stator, and at least one rotor magnet mounted on the rotor. The at least one rotor magnet is configured to move with the rotor between a first terminal point and a second terminal point. The assembly further includes at least a first stator magnet and a second stator magnet. The first stator magnet is mounted at the first terminal point, and the second stator magnet is mounted at the second terminal point. Each stator magnet is configured to repel the at least one rotor magnet.

In various embodiments, a system includes an oscillatory assembly as described herein and an actuator configured to move the rotor. The rotor is configured to be coupled to a payload.

In various embodiments, a method of oscillating a rotor at a resonant frequency is provided. A system is provided having an assembly and an actuator configured to move the rotor. The assembly is an oscillator having a resonant frequency. The actuator is configured to drive motion of the rotor at the resonant frequency. The actuator is energized, thereby causing the at least one rotor magnet to oscillate between the first and second terminal points at the resonant frequency.

In accordance with an aspect of the present disclosure, a biaxial assembly is provided comprising: a payload; a first voice coil actuator coupled to the light deflector and adapted to rotate the payload about a first axis; and a second voice coil actuator coupled to the first voice coil actuator and adapted to rotate the first voice coil actuator and the payload around a second axis perpendicular to the first axis. In some embodiments, a resonant oscillator is also provided and configured to oscillate the first voice coil actuator about the second axis at a resonant frequency. In some embodiments, the resonant oscillator comprises: a stator; a rotor configured to move with one degree of freedom relative to the stator, wherein motion of the rotor is rotational; at least one rotor magnet mounted on the rotor, wherein the at least one rotor magnet is configured to move with the rotor between a first terminal point and a second terminal point; at least a first stator magnet and a second stator magnet, the first stator magnet mounted at the first terminal point; and the second stator magnet mounted at the second terminal point, each of the at least the first stator magnet and second stator magnet configured to repel the at least one rotor magnet.

In some embodiments, the resonant oscillator further comprises at least a second rotor magnet mounted on the rotor, wherein the second rotor magnet is configured to move with the rotor between a third terminal point and a fourth terminal point.

In some embodiments, the resonant oscillator further comprises at least a third stator magnet mounted at the third terminal point. In some embodiments, each rotor magnet is a permanent magnet, or an electromagnet; and each stator magnet is a permanent magnet or an electromagnet.

In some embodiments, the rotor is rotatably coupled to the stator via one or more flexures. In some embodiments, the stator comprises a housing, wherein the at least the first and the second stator magnets are affixed to the housing.

In some embodiments, the first voice coil actuator comprises a first yoke; and the second voice coil actuator comprises a second yoke, wherein the second yoke is coupled to the housing.

In some embodiments, the resonant oscillator is a hairspring oscillator.

In some embodiments, a shaft is also included and extends from a first terminal end to a second terminal end along the second axis, wherein the first voice coil actuator and the second voice coil actuator are each coupled to the shaft, wherein the second voice coil actuator is configured to rotate the shaft about the second axis.

In some embodiments, the first voice coil actuator is coupled to the first terminal end; and the resonant oscillator is coupled to the second terminal end. In some embodiments, the rotor is coupled to the first yoke.

In some embodiments, the first voice coil actuator further comprises a first voice coil disposed on a first arm, wherein the payload is coupled to the first arm and the first arm is configured to move the payload about the first axis; wherein the second voice coil actuator further comprises a second voice coil disposed on a second arm, wherein the second arm is coupled to the first yoke and configured to oscillate the first voice coil actuator about the second axis. In some embodiments, the second axis is tilted.

The present disclosure also includes a system comprising: the assembly above with a light source configured to emit a beam towards the payload.

In some embodiments, a controller is also included and configured to receive a feedback signal and provide a control signal to the second voice coil actuator to thereby control an angular velocity of the payload.

In some embodiments, a feedback sensor is also included, wherein the feedback signal is received from the feedback sensor. In some embodiments, the feedback sensor is selected from the group consisting of: an optical encoder, a magnetic encoder, and a capacitive encoder.

In accordance with another aspect of the disclosure, a biaxial assembly is provided comprising: a payload; a first actuator coupled to the payload and adapted to rotate the payload about a first axis, wherein the first actuator is a voice coil actuator; a resonant oscillator comprising: a stator comprising a housing; a rotor configured to move with one degree of freedom relative to the stator, wherein motion of the rotor is rotational; at least one rotor magnet mounted on the rotor, wherein the at least one rotor magnet is configured to move with the rotor between a first terminal point and a second terminal point; and at least a first stator magnet and a second stator magnet, the first stator magnet mounted at the first terminal point wherein the at least the first and the second stator magnets are affixed to the housing; wherein the second stator magnet is mounted at the second terminal point, and each of the at least the first stator magnet and second stator magnet are configured to repel the at least one rotor magnet; and a second actuator adapted to rotate the first actuator and the payload around a second axis perpendicular to the first axis, the second actuator comprising at least one magnet positioned within the housing and external to a path travelled by each of the at least one rotor magnet, wherein the at least one magnet is electromagnetically coupled to the at least one rotor magnet and is configured to generate a magnetic field that causes the rotor to rotate.

In some embodiments, the resonant oscillator further comprises at least a second rotor magnet mounted on the rotor, wherein the second rotor magnet is configured to move with the rotor between a third terminal point and a fourth terminal point. In some embodiments, the resonant oscillator further comprises at least a third stator magnet mounted at the third terminal point.

In some embodiments, each rotor magnet is a permanent magnet or an electromagnet; and each stator magnet is a permanent magnet or an electromagnet. In some embodiments, the rotor is rotatably coupled to the stator via one or more flexures. In some embodiments, at least one H-bridge circuit is configured to provide a voltage signal to energize the at least one booster magnet. In some embodiments, the first actuator comprises a yoke, wherein the rotor is coupled to the yoke. In some embodiments, the second axis is tilted.

In some embodiments, the system includes a light source configured to emit a beam towards the payload. In some embodiments, a controller is configured to receive a feedback signal and provide a control signal to the second actuator to thereby control an angular velocity of the payload. In some embodiments, a feedback sensor is also provided, wherein the feedback signal is received from the feedback sensor. In some embodiments, the feedback sensor is selected from the group consisting of: an optical encoder, a magnetic encoder, and a capacitive encoder.

In some embodiments, a method of scanning a field of view is provided using the above system, wherein the second voice coil actuator has a resonant frequency and is configured to oscillate the payload at the resonant frequency; and the method includes energizing the light source to thereby cause light from the light source to deflect off of the payload; and energizing the second voice coil actuator, thereby causing the payload to oscillate at the resonant frequency about the second axis. In some embodiments, the method includes energizing the first voice coil actuator to thereby adjust an angle of the payload about the first axis.

In some embodiments, a controller is also provided, wherein the method further comprises receiving a feedback signal at the controller; and providing a control signal to the second voice coil actuator to thereby control a velocity of the payload. In some embodiments, the feedback signal is received from the second voice coil actuator. In some embodiments, an encoder is also provided, wherein the feedback signal is received from the encoder.

In some embodiments the method also comprises determining whether the second voice coil actuator is oscillating the payload at the resonant frequency; when the payload is not oscillating at the resonant frequency, providing the control signal to the second voice coil actuator to thereby reduce or increase the velocity of the payload such that the payload oscillates at the resonant frequency.

In some embodiments, the second actuator has a resonant frequency and is configured to oscillate the payload at the resonant frequency; energizing the light source to thereby cause light from the light source to deflect off of the payload; and energizing the second actuator, thereby causing the payload to oscillate at the resonant frequency about the second axis.

In some embodiments, the method includes energizing the first actuator to thereby adjust an angle of the payload about the first axis.

In some embodiments, the system further comprises a controller, wherein the method further comprises receiving a feedback signal at the controller; and providing a control signal to the second actuator to thereby control a velocity of the payload. In some embodiments, the feedback signal is received from the second actuator. In some embodiments, the system further comprises an encoder, wherein the feedback signal is received from the encoder.

In some embodiments, the method comprises determining whether the second actuator is oscillating the payload at the resonant frequency; when the payload is not oscillating at the resonant frequency, providing the control signal to the second actuator to thereby reduce or increase the velocity of the payload such that the payload oscillates at the resonant frequency.

In some embodiments, the second voice coil actuator further comprises at least one flexure extending from the first terminal point to the fourth terminal point. In some embodiments, the at least one magnet of the second actuator is a permanent magnet. In some embodiments, the second actuator further comprises a booster magnet, the booster magnet disposed in the housing at a location radially outward of the at least one magnet. In some embodiments, the booster magnet is an electromagnet, or includes an air core. In some embodiments, the rotor is rotatably coupled to the first yoke via one or more bearings.

In accordance with another aspect of the disclosure, a yoke of an oscillatory system, is provided and comprises: a first sidewall; a second sidewall, the second sidewall spaced from the first sidewall to define a gap therebetween; at least one member extending between the first and second sidewalls; a first flange extending laterally from the first sidewall; a second flange extending laterally from the second sidewall; wherein the yoke structure is a unitary structure with first and second sidewalls, top and bottom portions, and first and second flanges integrally connected.

In some embodiments, at least one magnet disposed within the gap between the first and second sidewalls. In some embodiments, the at least one magnet includes a first magnet disposed against the first sidewall and a second magnet disposed against the second sidewall, with a portion of the gap remaining between the first and second magnets. In some embodiments, a voice coil is at least partially disposed within the gap between the first and second magnets. In some embodiments, the first flange is disposed at a midpoint of the first sidewall. In some embodiments, the second flange is aligned horizontally with the first flange. In some embodiments, a holder is provided and configured to receive a mirror, the holder coupled to at least one of the first and second flanges. In some embodiments, the holder is coupled to the first flange and the second flange via at least one flexure. In some embodiments, the holder is coupled to the first flange and the second flange via at least one flexure, the at least one flexure coupled to the first flange at a plurality of locations. In some embodiments, a first coupling location is oriented laterally and a second coupling location is oriented vertically, the first and second coupling locations spaced from each other. In some embodiments, the at least one member extending between the first and second sidewalls includes a top portion extending between the first and second sidewalls and a bottom portion extending between the first and second sidewalls. In some embodiments, at least one of the first flange or second flange is a flexure bearing stator. In some embodiments, the voice coil is coupled to the holder.

In accordance with another aspect of the disclosure, an oscillatory assembly is provided, comprising: a stator; a rotor configured to move with one degree of freedom relative to the stator; at least one rotor magnet mounted on the rotor, wherein the at least one rotor magnet is configured to move with the rotor between a first terminal point and a second terminal point; at least a first stator magnet and a second stator magnet, the first stator magnet mounted at the first terminal point; and the second stator magnet mounted at the second terminal point, each of the at least the first stator magnet and second stator magnet configured to repel the at least one rotor magnet.

In some embodiments, the motion of the rotor is rotational; in some embodiments the motion of the rotor is linear. In some embodiments, further comprising at least a second rotor magnet mounted on the rotor, wherein the second rotor magnet is configured to move with the rotor between a third terminal point and a fourth terminal point. In some embodiments, at least a third stator magnet mounted at the third terminal point.

In some embodiments, the first stator magnet has a first surface having an area; the at least one rotor magnet has a first surface having an area, said first surface corresponding to the first surface of the first stator magnet; the second stator magnet has a second surface having an area; and the at least one rotor magnet has a second surface having an area, said second surface corresponding to the second surface of the second stator magnet, and further wherein: the first surface of the first stator magnet is configured to repel the first surface of the at least one rotor magnet; the second surface of the second stator magnet is configured to repel the second surface of the at least one rotor magnet; and the area of the first surface of the first stator magnet is greater than the area of the first surface of the at least one rotor magnet, and the area of the second surface of the second stator magnet is greater than the second surface of the at least one rotor magnet.

In some embodiments, the first stator magnet comprises two or more stacked magnets having alternating poles; the second stator magnet comprises two or more stacked magnets having alternating poles; and each rotor magnet comprises two or more stacked magnets having alternating poles, wherein the poles of the rotor magnets are oriented to repel the poles of the stator magnets. In some embodiments, at least one of the first stator magnet and second stator magnet comprises at least one end magnet. In some embodiments, each of the first and second stator magnets comprises two end magnets, and the two or more stacked magnets being disposed between the two end magnets. In some embodiments, at least two adjacent stacked magnets of any one or more of the first stator magnet, second stator magnet, and each rotor magnet are separated by a gap.

In some embodiments, each rotor magnet is a permanent magnet. In some embodiments, each rotor magnet is an electromagnet. In some embodiments, each stator magnet is a permanent magnet. In some embodiments, each stator magnet is an electromagnet. In some embodiments, one or more flexible connectors coupling the rotor to the stator. In some embodiments, each of the first stator magnet and the second stator magnet is affixed to a yoke configured to conduct magnetic flux.

In some embodiments, an actuator is configured to move the rotor, wherein the rotor is configured to be coupled to a payload. In some embodiments, the actuator is an electric motor. In some embodiments, the stator comprises a housing, wherein the at least the first and the second stator magnets are affixed to the housing. In some embodiments, the actuator comprises at least one booster electromagnet positioned within the housing and external to a path travelled by each of the at least one rotor magnet, wherein the at least one booster electromagnet is electromagnetically coupled to the at least one rotor magnet and is configured to, upon energizing, generate a magnetic field that causes the rotor to move. In some embodiments, the actuator is mechanically coupled to the rotor. In some embodiments, the actuator is disposed external to the housing. In some embodiments, the actuator is a voice-coil motor. In some embodiments, the actuator is coupled to the rotor via an axle. In some embodiments, the actuator is configured to move the payload between the first terminal point and the second terminal point.

In some embodiments, a controller is provided and configured to receive a feedback signal and provide a control signal to the actuator to thereby control a velocity of the rotor. In some embodiments, the feedback signal is received from the actuator. In some embodiments, a feedback sensor, wherein the feedback signal is received from the feedback sensor. In some embodiments, the feedback sensor is an encoder. In some embodiments, the encoder is an optical encoder. In some embodiments, the encoder is a magnetic encoder. In some embodiments, the encoder is a capacitive encoder. In some embodiments, a payload is included, wherein the payload comprises a mirror.

In some embodiments, a method of oscillating a rotor at a resonant frequency is provided and includes: providing a system as described above, wherein the assembly is an oscillator having a resonant frequency, and wherein the actuator is configured to drive motion of the rotor at the resonant frequency; and energizing the actuator, thereby causing the at least one rotor magnet to oscillate between the first and second terminal points at the resonant frequency.

In some embodiments, a controller is provided, wherein the method further comprises receiving a feedback signal at the controller; and providing a control signal to the actuator to thereby control a velocity of the rotor. In some embodiments, the feedback signal is received from the actuator. In some embodiments, the system further comprises an encoder, wherein the feedback signal is received from the encoder.

In some embodiments, the method includes determining whether the rotor is oscillating at the resonant frequency; when the rotor is not oscillating at the resonant frequency, providing the control signal to the actuator to thereby reduce or increase the velocity of the rotor such that the rotor oscillates at the resonant frequency.

In some embodiments, the booster magnet includes an air core. In some embodiments, the rotor is rotatably coupled to the yoke via one or more bearings.

In an example embodiment, the present invention is a scanning system, comprising a light source configured to generate at least one light beam; at least one deflector; a first actuator configured to rotate the at least one deflector about a first scan axis and a second actuator configured to rotate the at least one deflector about a second scan axis, the at least one deflector configured to deflect the at least one light beam to a field of view; and at least one processor configured to control the light source, the first actuator and the second actuator to cause the at least one deflector to scan the field of view, wherein during scanning of at least a portion of the field of view, the at least one processor causes the first actuator and the second actuator to simultaneously rotate the at least one deflector about the first scanning axis and the second scanning axis according to a compensated scan pattern, wherein the compensated scan pattern at least partially compensates for one or more distortions associated with a varying incidence angle of the at least one light beam onto the at least one deflector.

In another example embodiment, the present invention is a method of scanning a field of view, comprising: generating at least one light beam; directing the at least one light beam to at least one deflector configured to rotate about a first scanning axis and to rotate about a second scanning axis and to deflect the at least one light beam towards the field of view; causing at least one processor configured to control the light source, a first actuator, and a second actuator to rotate the at least one deflector to scan the field of view, wherein during scanning of at least a portion of the field of view, the first and the second actuators simultaneously rotate the at least one deflector to about the first scanning axis and the second scanning axis according to a compensated scan pattern, wherein the compensated scan pattern at least partially compensates for one or more optical distortions associated with varying angle of incidence of the at least one light beam onto the at least one deflector.

DETAILED DESCRIPTION

Part I: Biaxial Scanner

Figure 1A:
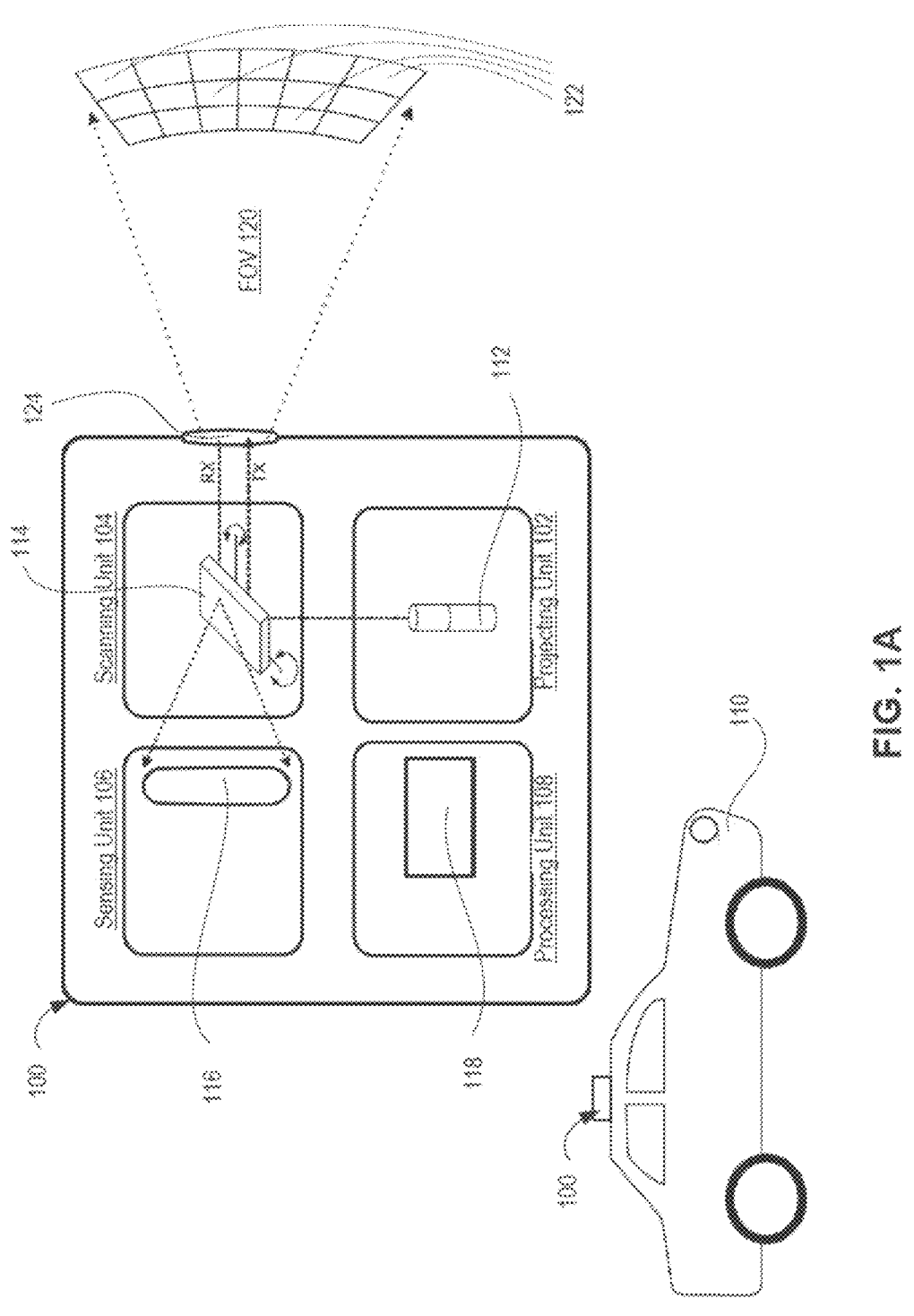
FIG. 1A is a diagram illustrating an exemplary LIDAR system consistent with disclosed embodiments.

Disclosed embodiments may involve an optical system. As used herein, the term "optical system" broadly includes any system that is used for the generation, detection and/or manipulation of light. By way of example only, an optical system may include one or more optical components for generating, detecting and/or manipulating light. For example, light sources, lenses, mirrors, prisms, beam splitters, collimators, polarizing optics, optical modulators, optical switches, optical amplifiers, optical detectors, optical sensors, fiber optics, semiconductor optic components, while each not necessarily required, may each be part of an optical system. In addition to the one or more optical components, an optical system may also include other non-optical components such as electrical components, mechanical components, chemical reaction components, and semiconductor components. The non-optical components may cooperate with optical components of the optical system. For example, the optical system may include at least one processor for analyzing detected light.

Consistent with the present disclosure, the optical system may be a LIDAR system. As used herein, the term "LIDAR system" broadly includes any system which can determine values of parameters indicative of a distance between a pair of tangible objects based on reflected light. In one embodiment, the LIDAR system may determine a distance between a pair of tangible objects based on reflections of light emitted by the LIDAR system. As used herein, the term "determine distances" broadly includes generating outputs which are indicative of distances between pairs of tangible objects. The determined distance may represent the physical dimension between a pair of tangible objects. By way of example only, the determined distance may include a line of flight distance between the LIDAR system and another tangible object in a field of view of the LIDAR system. In another embodiment, the LIDAR system may determine the relative velocity between a pair of tangible objects based on reflections of light emitted by the LIDAR system. Examples of outputs indicative of the distance between a pair of tangible objects include: a number of standard length units between the tangible objects (e.g. number of meters, number of inches, number of kilometers, number of millimeters), a number of arbitrary length units (e.g. number of LIDAR system lengths), a ratio between the distance to another length (e.g. a ratio to a length of an object detected in a field of view of the LIDAR system), an amount of time (e.g. given as standard unit, arbitrary units or ratio, for example, the time it takes light to travel between the tangible objects), one or more locations (e.g. specified using an agreed coordinate system, specified in relation to a known location), and more.

The LIDAR system may determine the distance between a pair of tangible objects based on reflected light. In one embodiment, the LIDAR system may process detection results of a sensor which creates temporal information indicative of a period of time between the emission of a light signal and the time of its detection by the sensor. The period of time is occasionally referred to as "time of flight" of the light signal. In one example, the light signal may be a short pulse, whose rise and/or fall time may be detected in reception. Using known information about the speed of light in the relevant medium (usually air), the information regarding the time of flight of the light signal can be processed to provide the distance the light signal traveled between emission and detection. In another embodiment, the LIDAR system may determine the distance based on frequency phase-shift (or multiple frequency phase-shift). Specifically, the LIDAR system may process information indicative of one or more modulation phase shifts (e.g. by solving some simultaneous equations to give a final measure) of the light signal. For example, the emitted optical signal may be modulated with one or more constant frequencies. The at least one phase shift of the modulation between the emitted signal and the detected reflection may be indicative of the distance the light traveled between emission and detection. The modulation may be applied to a continuous wave light signal, to a quasi-continuous wave light signal, or to another type of emitted light signal. It is noted that additional information may be used by the LIDAR system for determining the distance, e.g. location information (e.g. relative positions) between the projection location, the detection location of the signal (especially if distanced from one another), and more.

In some embodiments, the LIDAR$_{system}$ may be used for detecting a plurality of objects in an environment of the LIDAR system. The term "detecting an object in an environment of the LIDAR system" broadly includes generating information which is indicative of an object that reflected light toward a detector associated with the LIDAR system. If more than one object is detected by the LIDAR system, the generated information pertaining to different objects may be interconnected, for example a car is driving on a road, a bird is sitting on the tree, a man touches a bicycle, a van moves towards a building. The dimensions of the environment in which the LIDAR system detects objects may vary with respect to implementation. For example, the LIDAR system may be used for detecting a plurality of objects in an environment of a vehicle on which the LIDAR system is installed, up to a horizontal distance of 100 m (or 200 m, 300 m, etc.), and up to a vertical distance of 10 m (or 25 m, 50 m, etc.). In another example, the LIDAR system may be used for detecting a plurality of objects in an environment of a vehicle or within a predefined horizontal range (e.g., 25θ, 50°, 100°, 180°, etc.), and up to a predefined vertical elevation (e.g., ±10°, ±20°, +40°-20°, ±90° or 0°-90°).

As used herein, the term "detecting an object" may broadly refer to determining an existence of the object (e.g., an object may exist in a certain direction with respect to the LIDAR system and/or to another reference location, or an object may exist in a certain spatial volume). Additionally or alternatively, the term "detecting an object" may refer to determining a distance between the object and another location (e.g. a location of the LIDAR system, a location on earth, or a location of another object). Additionally or alternatively, the term "detecting an object" may refer to identifying the object (e.g. classifying a type of object such as car, plant, tree, road; recognizing a specific object (e.g., the Washington Monument); determining a license plate number; determining a composition of an object (e.g., solid, liquid, transparent, semitransparent); determining a kinematic parameter of an object (e.g., whether it is moving, its velocity, its movement direction, expansion of the object). Additionally or alternatively, the term "detecting an object" may refer to generating a point cloud map in which every point of one or more points of the point cloud map correspond to a location in the object or a location on a face thereof. In one embodiment, the data resolution associated with the point cloud map representation of the field of view may be associated with 0.1°×0.1° or 0.3°×0.3° of the field of view.

Consistent with the present disclosure, the term "object" broadly includes a finite composition of matter that may reflect light from at least a portion thereof. For example, an object may be at least partially solid (e.g. cars, trees); at least partially liquid (e.g. puddles on the road, rain); at least partly gaseous (e.g. fumes, clouds); made from a multitude of distinct particles (e.g. sand storm, fog, spray); and its size may be of one or more scales of magnitude, such as ~1 millimeter (mm), ~5 mm, ~10 mm, ~50 mm, ~100 mm, ~500 mm, ~1 meter (m), ~5 m, ~10 m, ~50 m, ~100 m, and so on. Smaller or larger objects, as well as any size in between those examples, may also be detected. It is noted that for various reasons, the LIDAR system may detect only part of the object. For example, in some cases, light may be reflected from only some sides of the object (e.g., only the side facing the LIDAR system will be detected); in other cases, light may be projected on only part of the object (e.g. laser beam projected onto a road or a building); in other cases, the object may be partly blocked by another object between the LIDAR system and the detected object; in other cases, the LIDAR's sensor may only detect light reflected from a portion of the object, e.g., because ambient light or other interferences interfere with detection of some portions of the object.

Consistent with the present disclosure, a LIDAR system may be configured to detect objects by scanning the environment of the LIDAR system. The term "scanning the environment of the LIDAR system" broadly includes illuminating the field of view or a portion of the field of view of the LIDAR system. In one example, scanning the environment of the LIDAR system may be achieved by moving or pivoting a light deflector to deflect light in differing directions toward different parts of the field of view. In another example, scanning the environment of the LIDAR system may be achieved by changing a positioning (i.e. location and/or orientation) of a sensor with respect to the field of view. In another example, scanning the environment of the LIDAR system may be achieved by changing a positioning (i.e. location and/or orientation) of a light source with respect to the field of view. In yet another example, scanning the environment of the LIDAR system may be achieved by changing the positions of at least one light source and of at least one sensor to move rigidly with respect to the field of view (i.e. the relative distance and orientation of the at least one sensor and of the at least one light source remains).

As used herein the term "field of view of the LIDAR system" may broadly include an extent of the observable environment of LIDAR system in which objects may be detected. It is noted that the field of view (FOV) of the LIDAR system may be affected by various conditions such as but not limited to: an orientation of the LIDAR system (e.g. is the direction of an optical axis of the LIDAR system); a position of the LIDAR system with respect to the environment (e.g. distance above ground and adjacent topography and obstacles); operational parameters of the LIDAR system (e.g. emission power, computational settings, defined angles of operation), etc. The field of view of LIDAR system may be defined, for example, by a solid angle (e.g. defined using $\phi$, $\theta$ angles, in which $\phi$ and $\theta$ are angles defined in perpendicular planes, e.g. with respect to symmetry axes of the LIDAR system and/or its FOV). In one example, the field of view may also be defined within a certain range (e.g. up to 200 m).

Similarly, the term "instantaneous field of view" may broadly include an extent of the observable environment in which objects may be detected by the LIDAR system at any given moment. For example, for a scanning the LIDAR system, the instantaneous field of view is narrower than the entire FOV of the LIDAR system, and it can be moved within the FOV of the LIDAR system in order to enable detection in other parts of the FOV of the LIDAR system. The movement of the instantaneous field of view within the FOV of the LIDAR system may be achieved by moving a light deflector of the LIDAR system (or external to the LIDAR system), so as to deflect beams of light to and/or from the LIDAR system in differing directions. In one embodiment, the LIDAR system may be configured to scan scene in the environment in which the LIDAR system is operating. As used herein the term "scene" may broadly include some or all of the objects within the field of view of the LIDAR system, in their relative positions and in their current states, within an operational duration of the LIDAR system. For example, the scene may include ground elements (e.g. earth, roads, grass, sidewalks, road surface marking), sky, man-made objects (e.g. vehicles, buildings, signs), vegetation, people, animals, light projecting elements (e.g. flashlights, sun, other LIDAR systems), and so on.

Disclosed embodiments may involve obtaining information for use in generating reconstructed three-dimensional models. Examples of types of reconstructed three-dimensional models which may be used include point cloud models, and Polygon Mesh (e.g. a triangle mesh). The terms "point cloud" and "point cloud model" are widely known in the art, and should be construed to include a set of data points located spatially in some coordinate system (i.e., having an identifiable location in a space described by a respective coordinate system). The term "point cloud point" refer to a point in space (which may be dimensionless, or a miniature cellular space, e.g. 1 cm$^3$), and whose location may be described by the point cloud model using a set of coordinates (e.g. (X,Y,Z), (r,$\phi$,$\theta$)). By way of example only, the point cloud model may store additional information for some or all of its points (e.g. color information for points generated from camera images). Likewise, any other type of reconstructed three-dimensional model may store additional information for some or all of its objects. Similarly, the terms "polygon mesh" and "triangle mesh" are widely known in the art, and are to be construed to include, among other things, a set of vertices, edges and faces that define the shape of one or more 3D objects (such as a polyhedral object). The faces may include one or more of the following: triangles (triangle mesh), quadrilaterals, or other simple convex polygons, since this may simplify rendering. The faces may also include more general concave polygons, or polygons with holes. Polygon meshes may be represented using differing techniques, such as: Vertex-vertex meshes, Face-vertex meshes, Winged-edge meshes and Render dynamic meshes. Different portions of the polygon mesh (e.g., vertex, face, edge) are located spatially in some coordinate system (i.e., having an identifiable location in a space described by the respective coordinate system), either directly and/or relative to one another. The generation of the reconstructed three-dimensional model may be implemented using any standard, dedicated and/or novel photogrammetry technique, many of which are known in the art. It is noted that other types of models of the environment may be generated by the LIDAR system.

Consistent with disclosed embodiments, the LIDAR$_{system}$ may include at least one projecting unit with a light source configured to project light. As used herein the term "light source" broadly refers to any device configured to emit light. In one embodiment, the light source may be a laser such as a solid-state laser, laser diode, a high power laser, or an alternative light source such as, a light emitting diode (LED)-based light source. In addition, light source 112 as illustrated throughout the figures, may emit light in differing formats, such as light pulses, continuous wave (CW), quasi-CW, and so on. For example, one type of light source that may be used is a vertical-cavity surface-emitting laser (VCSEL). Another type of light source that may be used is an external cavity diode laser (ECDL). In some examples, the light source may include a laser diode configured to emit light at a wavelength between about 650 nm and 1150 nm. Alternatively, the light source may include a laser diode configured to emit light at a wavelength between about 800 nm and about 1000 nm, between about 850 nm and about 950 nm, or between about 1300 nm and about 1600 nm. Unless indicated otherwise, the term "about" with regards to a numeric value is defined as a variance of up to 5% with respect to the stated value. Additional details on the projecting unit and the at least one light source are described below with reference to FIGS. 2A-2C.

Consistent with disclosed embodiments, the LIDAR$_{system}$ may include at least one scanning unit with at least one light deflector configured to deflect light from the light source in order to scan the field of view. The term "light deflector" broadly includes any mechanism or module which is configured to make light deviate from its original path; for example, a mirror, a prism, controllable lens, a mechanical mirror, mechanical scanning polygons, active diffraction (e.g. controllable LCD), Risley prisms, non-mechanical-electro-optical beam steering (such as made by Vscent), polarization grating (such as offered by Boulder Non-Linear Systems), optical phased array (OPA), and more. In one embodiment, a light deflector may include a plurality of optical components, such as at least one reflecting element (e.g. a mirror), at least one refracting element (e.g. a prism, a lens), and so on. In one example, the light deflector may be movable, to cause light deviate to differing degrees (e.g. discrete degrees, or over a continuous span of degrees). The light deflector may optionally be controllable in different ways (e.g. deflect to a degree a, change deflection angle by $\Delta\alpha$, move a component of the light deflector by M millimeters, change speed in which the deflection angle changes). In addition, the light deflector may optionally be operable to change an angle of deflection within a single plane (e.g., $\theta$ coordinate). The light deflector may optionally be operable to change an angle of deflection within two non-parallel planes (e.g., $\theta$ and $\phi$ coordinates). Alternatively or in addition, the light deflector may optionally be operable to change an angle of deflection between predetermined settings (e.g. along a predefined scanning route) or otherwise. With respect the use of light deflectors in LIDAR systems, it is noted that a light deflector may be used in the outbound direction (also referred to as transmission direction, or TX) to deflect light from the light source to at least a part of the field of view. However, a light deflector may also be used in the inbound direction (also referred to as reception direction, or RX) to deflect light from at least a part of the field of view to one or more light sensors. Additional details on the scanning unit and the at least one light deflector are described below with reference to FIGS. 3A-3C.

Disclosed embodiments may involve pivoting the light deflector in order to scan the field of view. As used herein the term "pivoting" broadly includes rotating of an object (especially a solid object) about one or more axis of rotation, while substantially maintaining a center of rotation fixed. In one embodiment, the pivoting of the light deflector may include rotation of the light deflector about a fixed axis (e.g., a shaft), but this is not necessarily so. For example, in some MEMS mirror implementation, the MEMS mirror may move by actuation of a plurality of benders connected to the mirror, the mirror may experience some spatial translation in addition to rotation. Nevertheless, such mirror may be designed to rotate about a substantially fixed axis, and therefore consistent with the present disclosure it considered to be pivoted. In other embodiments, some types of light deflectors (e.g. non-mechanical-electro-optical beam steering, OPA) do not require any moving components or internal movements in order to change the deflection angles of deflected light. It is noted that any discussion relating to moving or pivoting a light deflector is also mutatis mutandis applicable to controlling the light deflector such that it changes a deflection behavior of the light deflector. For example, controlling the light deflector may cause a change in a deflection angle of beams of light arriving from at least one direction.

Disclosed embodiments may involve receiving reflections associated with a portion of the field of view corresponding to a single instantaneous position of the light deflector. As used herein, the term "instantaneous position of the light deflector" (also referred to as "state of the light deflector") broadly refers to the location or position in space where at least one controlled component of the light deflector is situated at an instantaneous point in time, or over a short span of time. In one embodiment, the instantaneous position of light deflector may be gauged with respect to a frame of reference. The frame of reference may pertain to at least one fixed point in the LIDAR system. Or, for example, the frame of reference may pertain to at least one fixed point in the scene. In some embodiments, the instantaneous position of the light deflector may include some movement of one or more components of the light deflector (e.g. mirror, prism), usually to a limited degree with respect to the maximal degree of change during a scanning of the field of view. For example, a scanning of the entire the field of view of the LIDAR system may include changing deflection of light over a span of 30°, and the instantaneous position of the at least one light deflector may include angular shifts of the light deflector within 0.05°. In other embodiments, the term "instantaneous position of the light deflector" may refer to the positions of the light deflector during acquisition of light which is processed to provide data for a single point of a point cloud (or another type of 3D model) generated by the LIDAR system. In some embodiments, an instantaneous position of the light deflector may correspond with a fixed position or orientation in which the deflector pauses for a short time during illumination of a particular sub-region of the LIDAR field of view. In other cases, an instantaneous position of the light deflector may correspond with a certain position/orientation along a scanned range of positions/orientations of the light deflector that the light deflector passes through as part of a continuous or semi-continuous scan of the LIDAR field of view. In some embodiments, the light deflector may be moved such that during a scanning cycle of the LIDAR FOV the light deflector is located at a plurality of different instantaneous positions. In other words, during the period of time in which a scanning cycle occurs, the deflector may be moved through a series of different instantaneous positions/orientations, and the deflector may reach each different instantaneous position/orientation at a different time during the scanning cycle.

Consistent with disclosed embodiments, the LIDAR$_{system}$ may include at least one sensing unit with at least one sensor configured to detect reflections from objects in the field of view. The term "sensor" broadly includes any device, element, or system capable of measuring properties (e.g., power, frequency, phase, pulse timing, pulse duration) of electromagnetic waves and to generate an output relating to the measured properties. In some embodiments, the at least one sensor may include a plurality of detectors constructed from a plurality of detecting elements. The at least one sensor may include light sensors of one or more types. It is noted that the at least one sensor may include multiple sensors of the same type which may differ in other characteristics (e.g., sensitivity, size). Other types of sensors may also be used. Combinations of several types of sensors can be used for different reasons, such as improving detection over a span of ranges (especially in close range); improving the dynamic range of the sensor; improving the temporal response of the sensor; and improving detection in varying environmental conditions (e.g. atmospheric temperature, rain, etc.). In one embodiment, the at least one sensor includes a SiPM (Silicon photomultipliers) which is a solid-state single-photon-sensitive device built from an array of avalanche photodiode (APD), single photon avalanche diode (SPAD), serving as detection elements on a common silicon substrate. In one example, a typical distance between SPADs may be between about 10 m and about 50 m, wherein each SPAD may have a recovery time of between about 20 ns and about 100 ns. Similar photomultipliers from other, non-silicon materials may also be used. Although a SiPM device works in digital/switching mode, the SiPM is an analog device because all the microcells may be read in parallel, making it possible to generate signals within a dynamic range from a single photon to hundreds and thousands of photons detected by the different SPADs. It is noted that outputs from different types of sensors (e.g., SPAD, APD, SiPM, PIN diode, Photodetector) may be combined together to a single output which may be processed by a processor of the LIDAR system. Additional details on the sensing unit and the at least one sensor are described below with reference to FIGS. 4A-4C.

Consistent with disclosed embodiments, the LIDAR$_{system}$ may include or communicate with at least one processor configured to execute differing functions. The at least one processor may constitute any physical device having an electric circuit that performs a logic operation on input or inputs. For example, the at least one processor may include one or more integrated circuits (IC), including Application-specific integrated circuit (ASIC), microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by at least one processor may, for example, be pre-loaded into a memory integrated with or embedded into the controller or may be stored in a separate memory. The memory may comprise a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the memory is configured to store information representative data about objects in the environment of the LIDAR system. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact. Additional details on the processing unit and the at least one processor are described below with reference to FIGS. 5A-5C.

System Overview

FIG. 1A illustrates a LIDAR system 100 including a projecting unit 102, a scanning unit 104, a sensing unit 106, and a processing unit 108. LIDAR system 100 may be mountable on a vehicle 110. Consistent with embodiments of the present disclosure, projecting unit 102 may include at least one light source 112, scanning unit 104 may include at least one light deflector 114, sensing unit 106 may include at least one sensor 116, and processing unit 108 may include at least one processor 118. In one embodiment, at least one processor 118 may be configured to coordinate operation of the at least one light source 112 with the movement of at least one light deflector 114 in order to scan a field of view 120. During a scanning cycle, each instantaneous position of at least one light deflector 114 may be associated with a particular portion 122 of field of view 120. In addition, LIDAR system 100 may include at least one optional optical window 124 for directing light projected towards field of view 120 and/or receiving light reflected from objects in field of view 120. Optional optical window 124 may serve different purposes, such as collimation of the projected light and focusing of the reflected light. In one embodiment, optional optical window 124 may be an opening, a flat window, a lens, or any other type of optical window.

Consistent with the present disclosure, LIDAR system 100 may be used in autonomous or semi-autonomous road-vehicles (for example, cars, buses, vans, trucks and any other terrestrial vehicle). Autonomous road-vehicles with LIDAR system 100 may scan their environment and drive to a destination without human input. Similarly, LIDAR system 100 may also be used in autonomous/semi-autonomous aerial-vehicles (for example, UAV, drones, quadcopters, and any other airborne vehicle or device); or in an autonomous or semi-autonomous water vessel (e.g., boat, ship, submarine, or any other watercraft). Autonomous aerial-vehicles and water craft with LIDAR system 100 may scan their environment and navigate to a destination autonomously or using a remote human operator. According to one embodiment, vehicle 110 (either a road-vehicle, aerial-vehicle, or watercraft) may use LIDAR system 100 to aid in detecting and scanning the environment in which vehicle 110 is operating.

It should be noted that LIDAR system 100 or any of its components may be used together with any of the example embodiments and methods disclosed herein. Further, while some aspects of LIDAR system 100 are described relative to an exemplary vehicle-based LIDAR platform, LIDAR system 100, any of its components, or any of the processes described herein may be applicable to LIDAR systems of other platform types.

In some embodiments, LIDAR system 100 may include one or more scanning units 104 to scan the environment around vehicle 110. LIDAR system 100 may be attached or mounted to any part of vehicle 110. Sensing unit 106 may receive reflections from the surroundings of vehicle 110, and transfer reflection signals indicative of light reflected from objects in field of view 120 to processing unit 108. Consistent with the present disclosure, scanning units 104 may be mounted to or incorporated into a bumper, a fender, a side panel, a spoiler, a roof, a headlight assembly, a taillight assembly, a rear-view mirror assembly, a hood, a trunk or any other suitable part of vehicle 110 capable of housing at least a portion of the LIDAR system. In some cases, LIDAR system 100 may capture a complete surround view of the environment of vehicle 110. Thus, LIDAR system 100 may have a 360-degree horizontal field of view. In one example, as shown in FIG. 1A, LIDAR system 100 may include a single scanning unit 104 mounted on a roof of vehicle 110. Alternatively, LIDAR system 100 may include multiple scanning units (e.g., two, three, four, or more scanning units 104) each with a field of few such that in the aggregate the horizontal field of view is covered by a 360-degree scan around vehicle 110. One skilled in the art will appreciate that LIDAR system 100 may include any number of scanning units 104 arranged in any manner, each with an 80° to 120° field of view or less, depending on the number of units employed. Moreover, a 360-degree horizontal field of view may be also obtained by mounting a multiple LIDAR systems 100 on vehicle 110, each with a single scanning unit 104. It is nevertheless noted, that the one or more LIDAR systems 100 do not have to provide a complete 360° field of view, and that narrower fields of view may be useful in some situations. For example, vehicle 110 may require a first LIDAR system 100 having an field of view of 75° looking ahead of the vehicle, and possibly a second LIDAR system 100 with a similar FOV looking backward (optionally with a lower detection range). It is also noted that different vertical field of view angles may also be implemented.

Figure 1B:
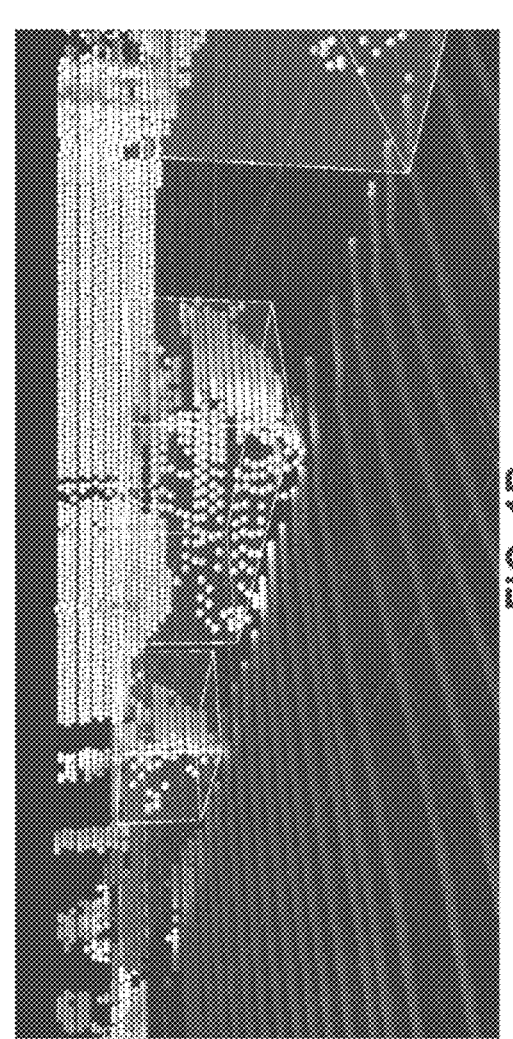
FIG. 1B is an image showing an exemplary output of a single scanning cycle of a LIDAR system mounted on a vehicle consistent with disclosed embodiments.

FIG. 1B is an image showing an exemplary output from a single scanning cycle of LIDAR system 100 mounted on vehicle 110 consistent with disclosed embodiments. In this example, scanning unit 104 is incorporated into a right headlight assembly of vehicle 110. Every gray dot in the image corresponds to a location in the environment around vehicle 110 determined from reflections detected by sensing unit 106. In addition to location, each gray dot may also be associated with different types of information, for example, intensity (e.g., how much light returns back from that location), reflectivity, proximity to other dots, and more. In one embodiment, LIDAR system 100 may generate a plurality of point-cloud data entries from detected reflections of multiple scanning cycles of the field of view to enable, for example, determining a point cloud model of the environment around vehicle 110.

Figure 1C:
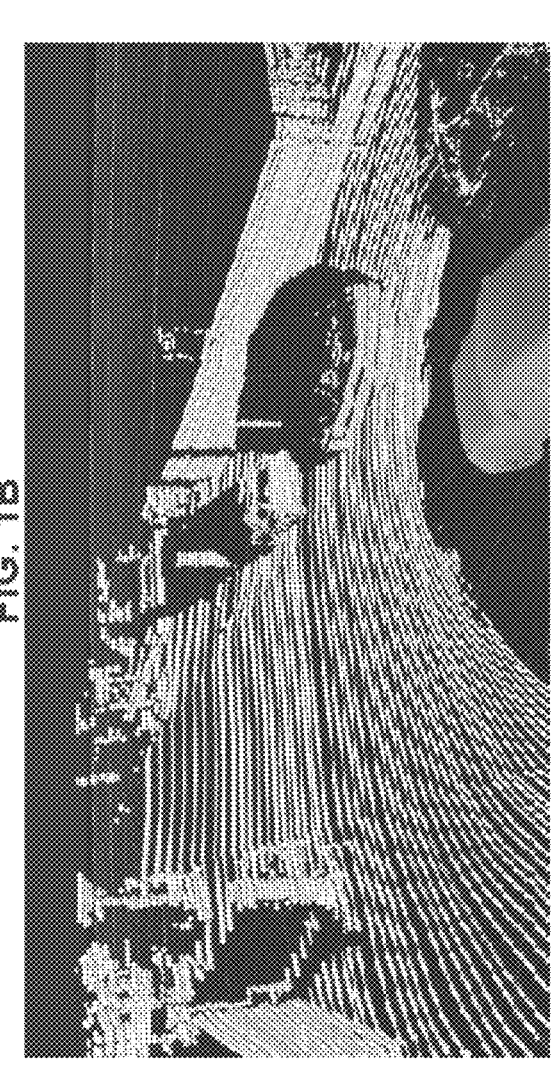
FIG. 1C is another image showing a representation of a point cloud model determined from output of a LIDAR system consistent with disclosed embodiments.

FIG. 1C is an image showing a representation of the point cloud model determined from the output of LIDAR system 100. Consistent with disclosed embodiments, by processing the generated point-cloud data entries of the environment around vehicle 110, a surround-view image may be produced from the point cloud model. In one embodiment, the point cloud model may be provided to a feature extraction module, which processes the point cloud information to identify a plurality of features. Each feature may include data about different aspects of the point cloud and/or of objects in the environment around vehicle 110 (e.g. cars, trees, people, and roads). Features may have the same resolution of the point cloud model (i.e. having the same number of data points, optionally arranged into similar sized 2D arrays), or may have different resolutions. The features may be stored in any kind of data structure (e.g. raster, vector, 2D array, 1D array). In addition, virtual features, such as a representation of vehicle 110, border lines, or bounding boxes separating regions or objects in the image (e.g., as depicted in FIG. 1), and icons representing one or more identified objects, may be overlaid on the representation of the point cloud model to form the final surround-view image. For example, a symbol of vehicle 110 may be overlaid at a center of the surround-view image.

The Projecting Unit

Figure 2A:
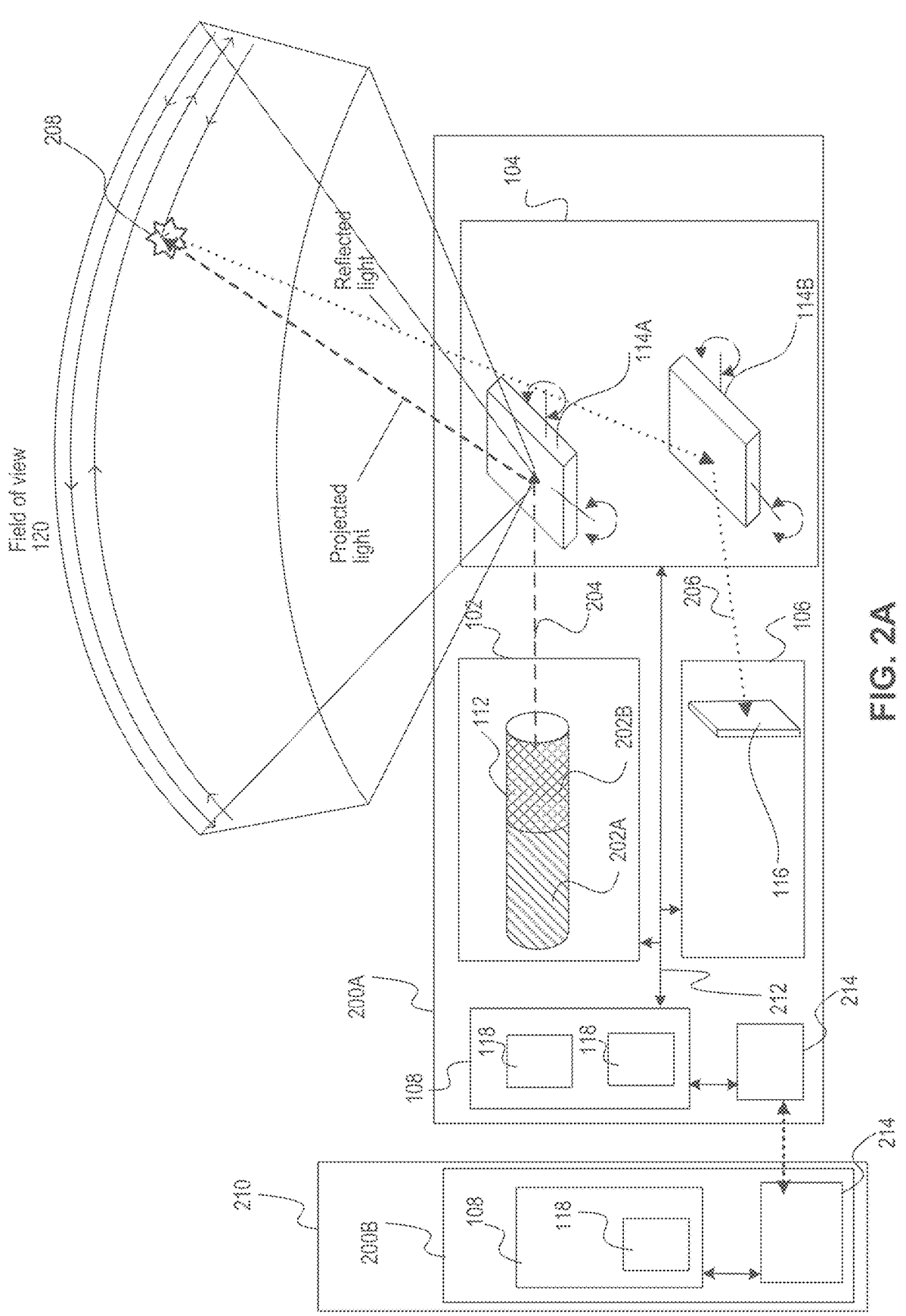
FIGS. 2A, 2B, 2C, 2D, 2E, 2F, and 2G are diagrams illustrating different configurations of projecting units in accordance with some embodiments of the present disclosure.
Figure 2B:
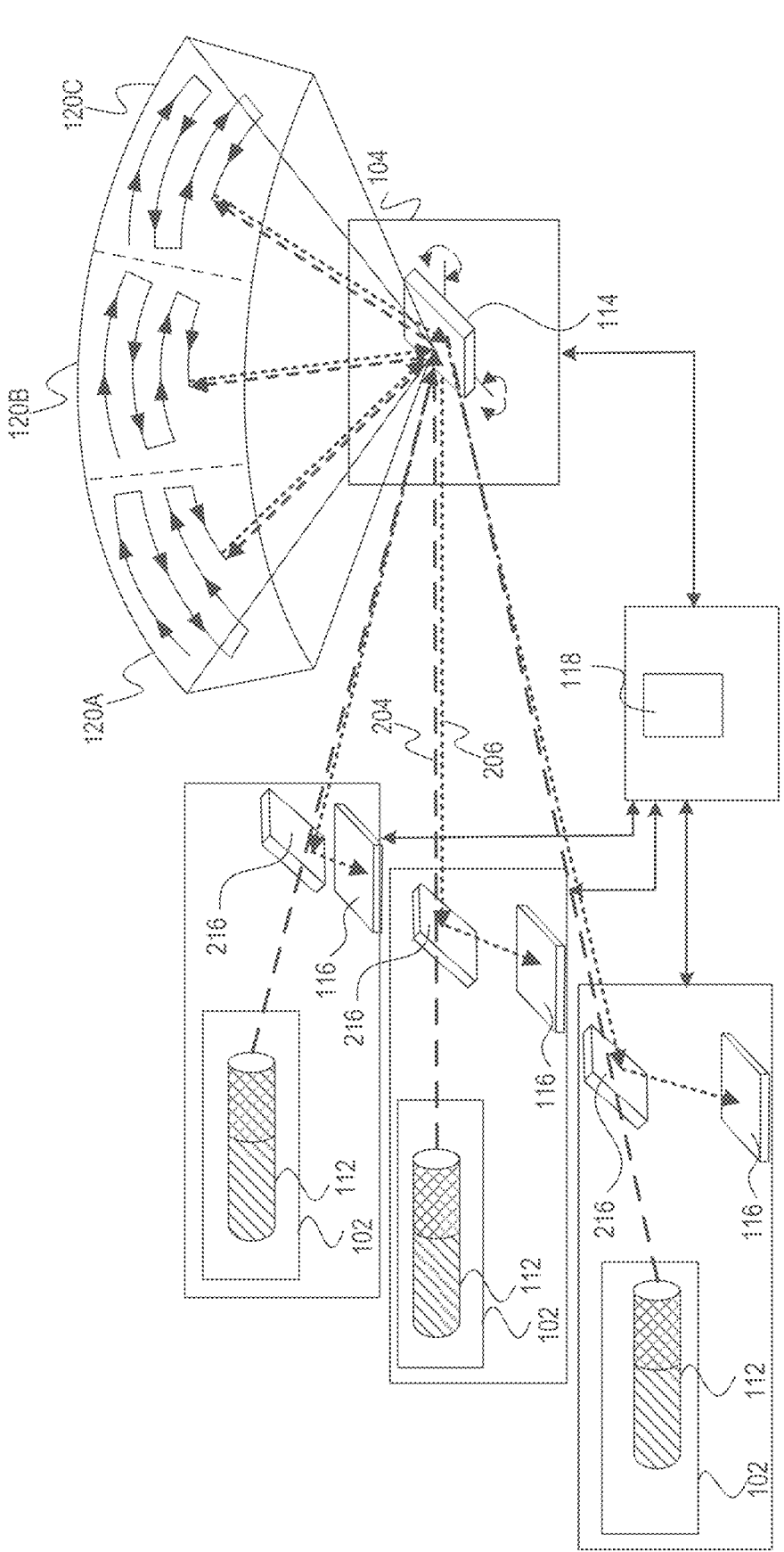
Figure 2C:
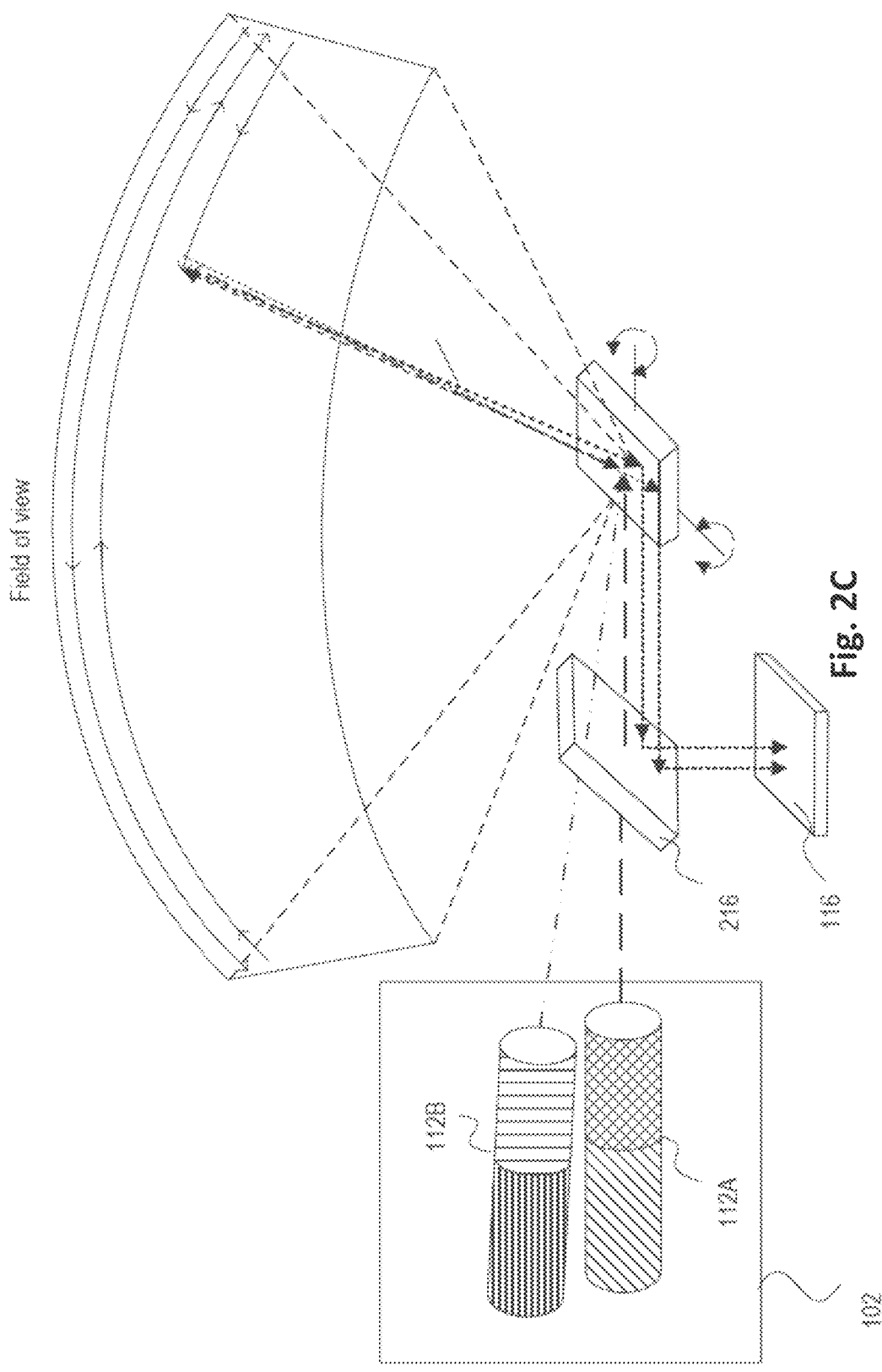
Figure 2D:
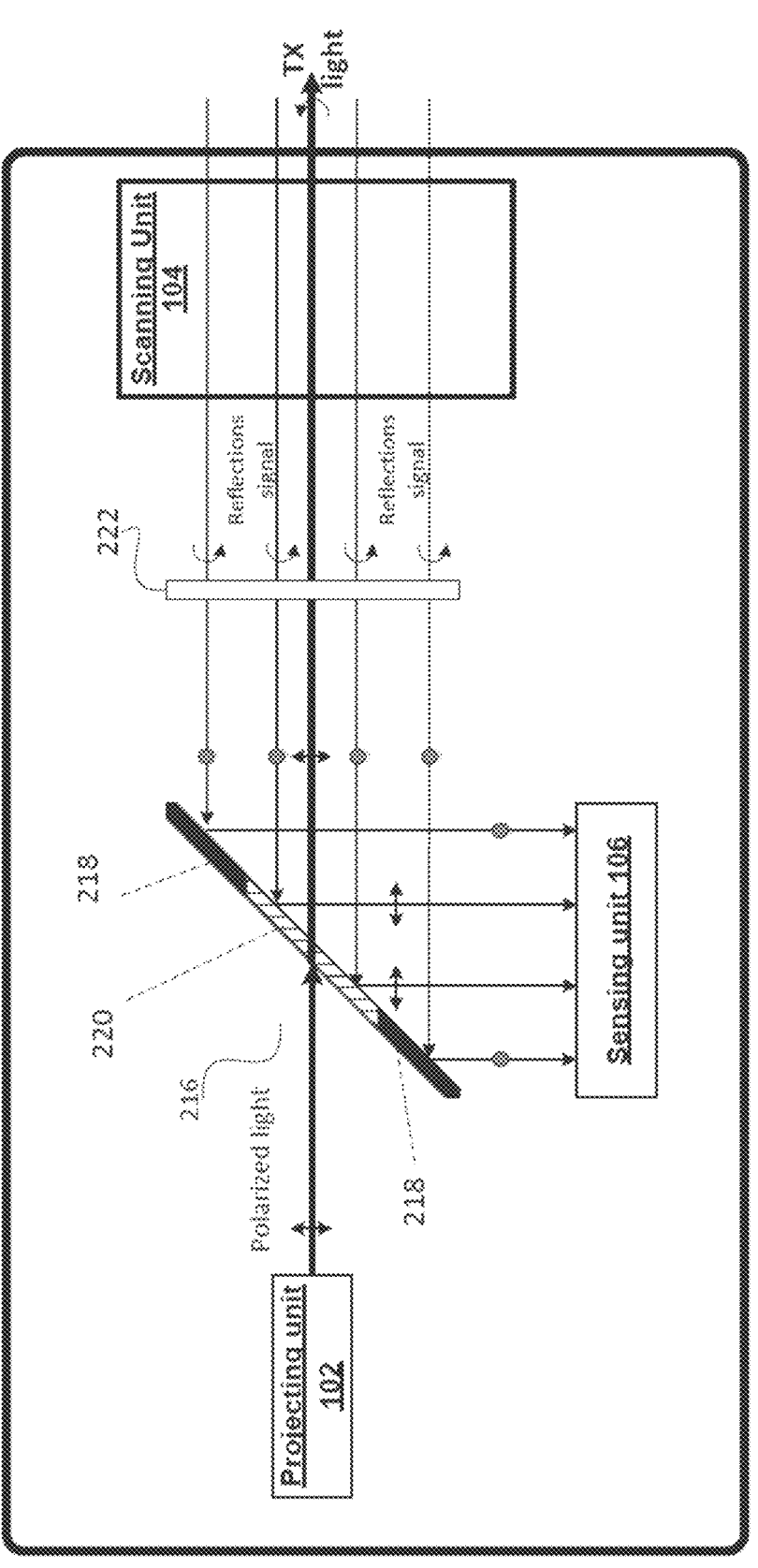
Figure 2E:
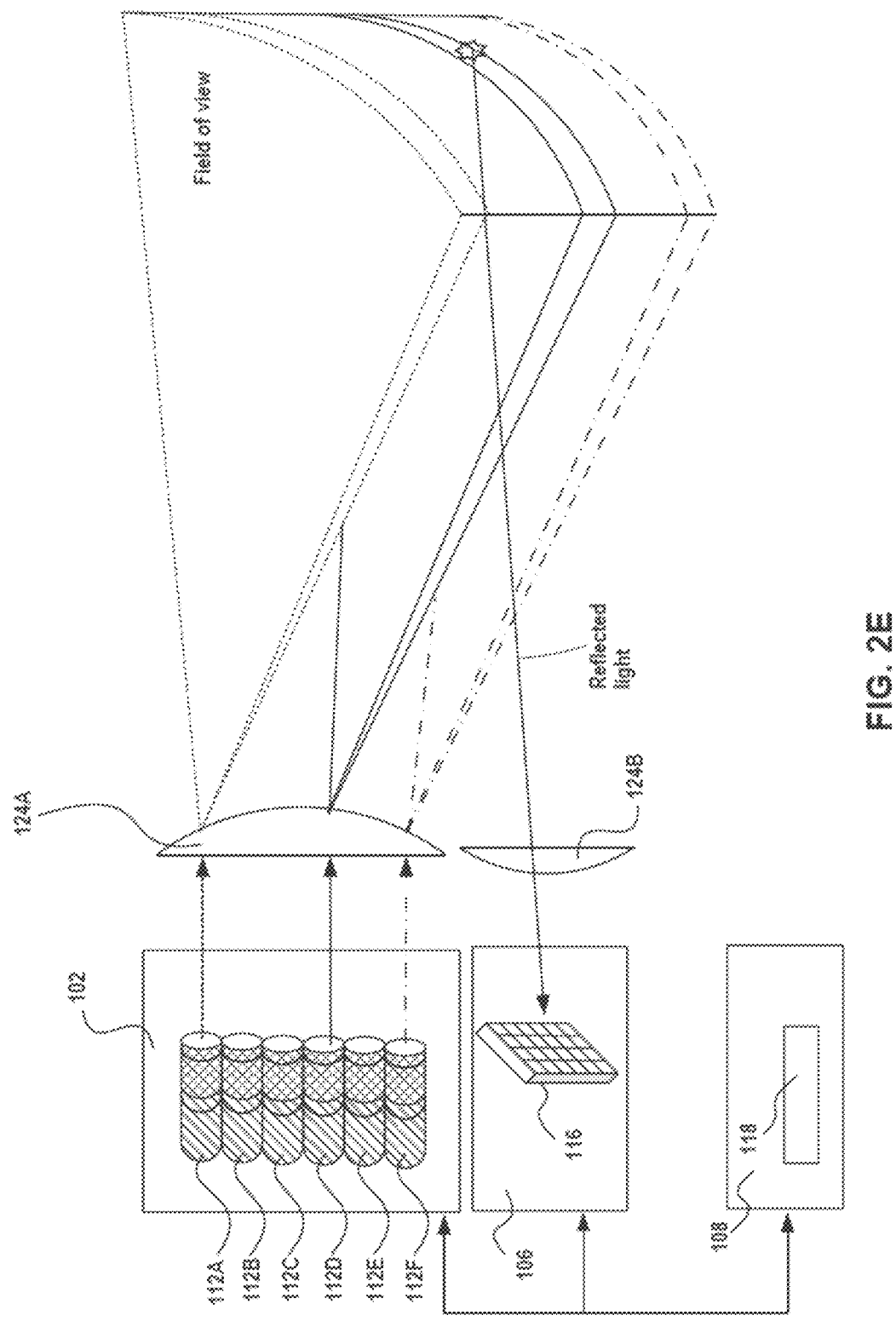
Figure 2F:
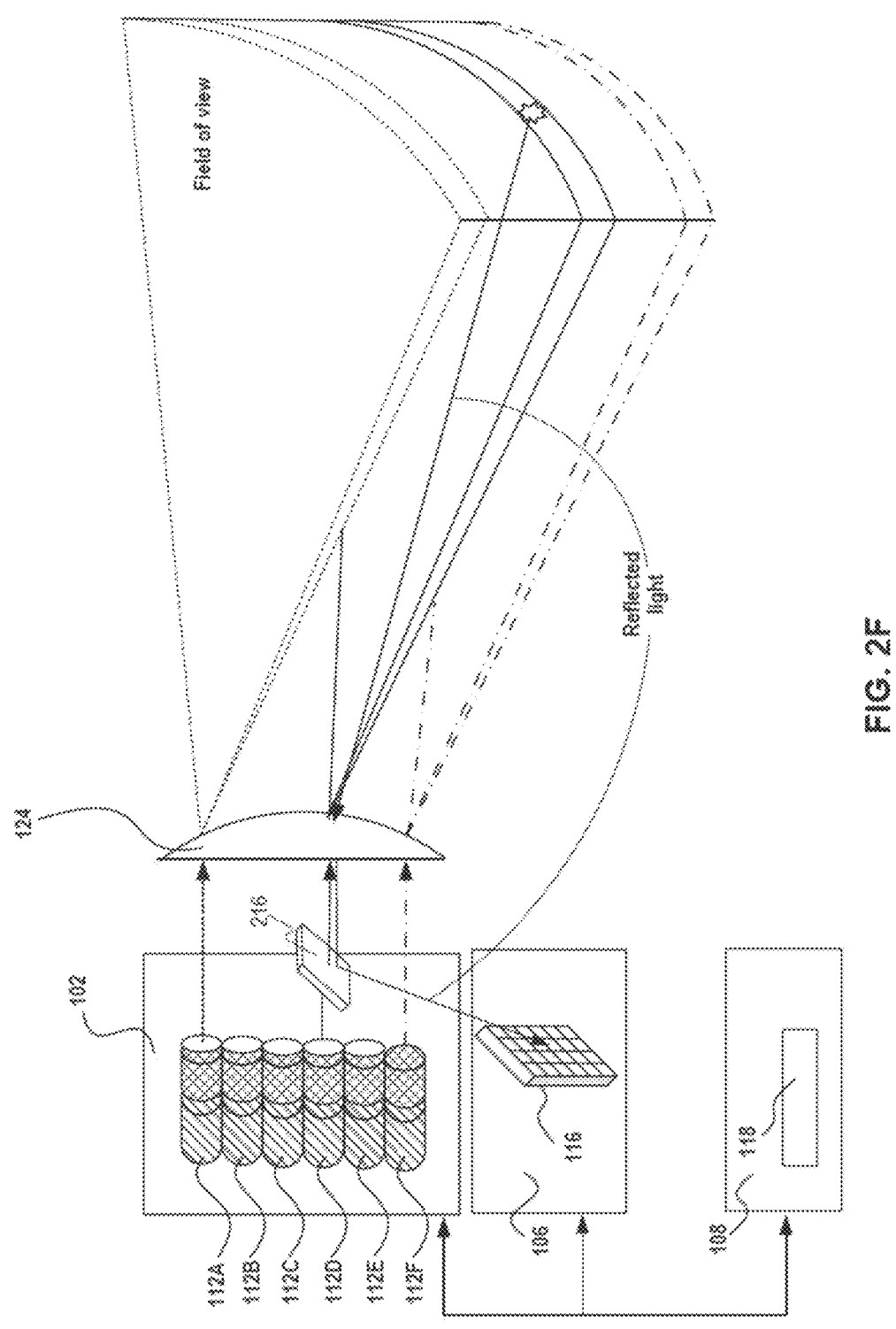
Figure 2G:
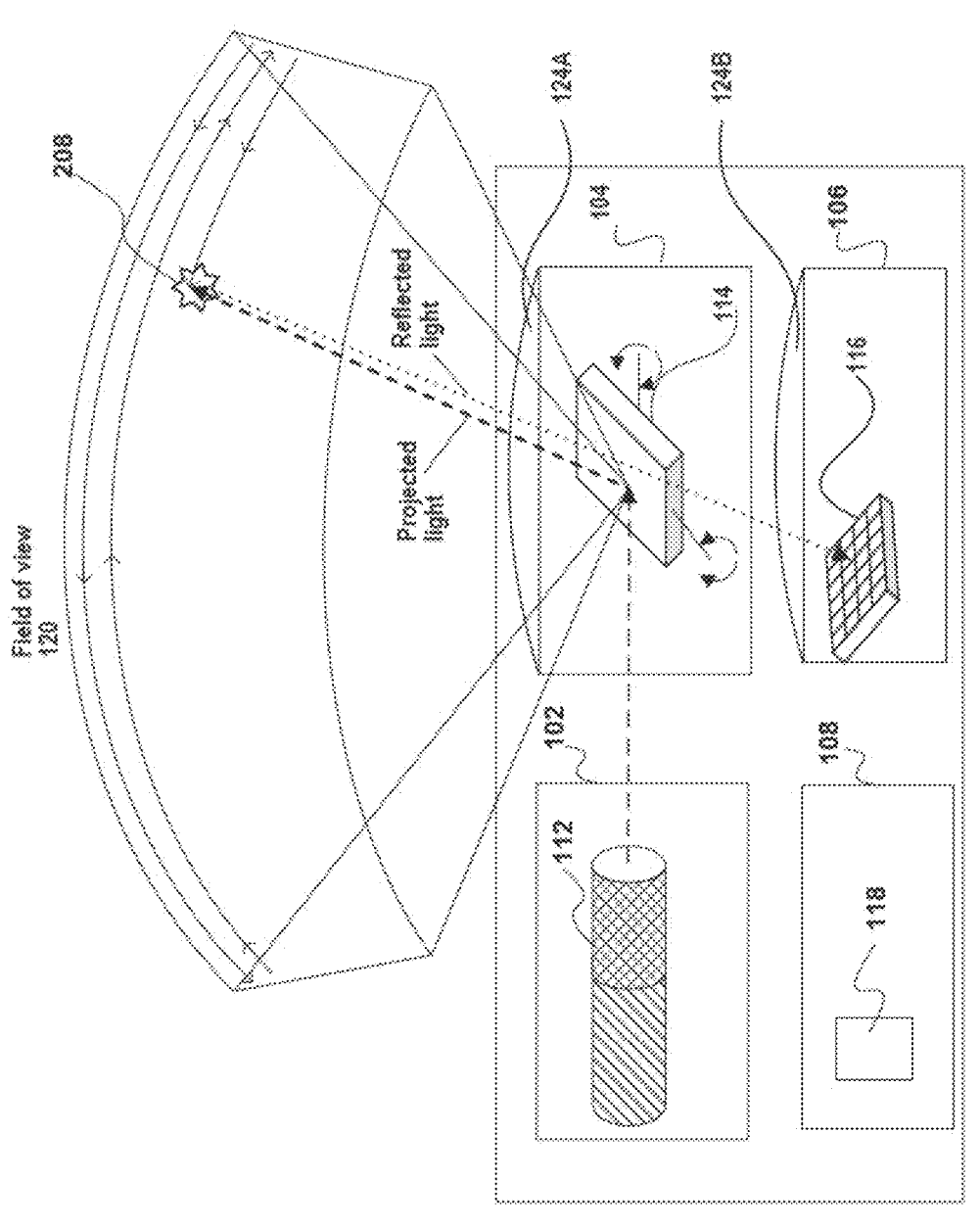

FIGS. 2A-2G depict various configurations of projecting unit 102 and its role in LIDAR system 100. Specifically, FIG. 2A is a diagram illustrating projecting unit 102 with a single light source; FIG. 2B is a diagram illustrating a plurality of projecting units 102 with a plurality of light sources aimed at a common light deflector 114; FIG. 2C is a diagram illustrating projecting unit 102 with a primary and a secondary light sources 112; FIG. 2D is a diagram illustrating an asymmetrical deflector used in some configurations of projecting unit 102; FIG. 2E is a diagram illustrating a first configuration of a non-scanning LIDAR system; FIG. 2F is a diagram illustrating a second configuration of a non-scanning LIDAR system; and FIG. 2G is a diagram illustrating a LIDAR system that scans in the outbound direction and does not scan in the inbound direction. One skilled in the art will appreciate that the depicted configurations of projecting unit 102 may have numerous variations and modifications.

FIG. 2A illustrates an example of a bi-static configuration of LIDAR system 100 in which projecting unit 102 includes a single light source 112. The term "bi-static configuration" broadly refers to LIDAR systems configurations in which the projected light exiting the LIDAR system and the reflected light entering the LIDAR system pass through substantially different optical paths. In some embodiments, a bi-static configuration of LIDAR system 100 may include a separation of the optical paths by using completely different optical components, by using parallel but not fully separated optical components, or by using the same optical components for only part of the of the optical paths (optical components may include, for example, windows, lenses, mirrors, beam splitters, etc.). In the example depicted in FIG. 2A, the bi-static configuration includes a configuration where the outbound light and the inbound light pass through a single optical window 124 but scanning unit 104 includes two light deflectors, a first light deflector 114A for outbound light and a second light deflector 114B for inbound light (the inbound light in LIDAR system includes emitted light reflected from objects in the scene, and may also include ambient light arriving from other sources). In the examples depicted in FIGS. 2E and 2G, the bi-static configuration includes a configuration where the outbound light passes through a first optical window 124A, and the inbound light passes through a second optical window 124B. In all the example configurations above, the inbound and outbound optical paths differ from one another.

In this embodiment, all the components of LIDAR system 100 may be contained within a single housing 200, or may be divided among a plurality of housings. As shown, projecting unit 102 is associated with a single light source 112 that includes a laser diode 202A (or two or more laser diodes coupled together) configured to emit light (projected light 204). In one non-limiting example, the light projected by light source 112 may be at a wavelength between about 800 nm and 950 nm, have an average power between about 50 mW and about 500 mW, have a peak power between about 50 W and about 200 W, and a pulse width of between about 2 ns and about 100 ns. In addition, light source 112 may optionally be associated with optical assembly 202B used for manipulation of the light emitted by laser diode 202A (e.g. for collimation, focusing, etc.). It is noted that other types of light sources 112 may be used, and that the disclosure is not restricted to laser diodes. In addition, light source 112 may emit its light in different formats, such as light pulses, frequency modulated, continuous wave (CW), quasi-CW, or any other form corresponding to the particular light source employed. The projection format and other parameters may be changed by the light source from time to time based on different factors, such as instructions from processing unit 108. The projected light is projected towards an outbound deflector 114A that functions as a steering element for directing the projected light in field of view 120. In this example, scanning unit 104 may also include a pivotable return deflector 114B that directs photons (reflected light 206) reflected back from an object 208 within field of view 120 toward sensor 116. The reflected light is detected by sensor 116 and information about the object (e.g., the distance to object 212) is determined by processing unit 108.

In this figure, LIDAR system 100 is connected to a host 210. Consistent with the present disclosure, the term "host" refers to any computing environment that may interface with LIDAR system 100, it may be a vehicle system (e.g., part of vehicle 110), a testing system, a security system, a surveillance system, a traffic control system, an urban modelling system, or any system that monitors its surroundings. Such a computing environment may include at least one processor and/or may be connected to LIDAR system 100 via the cloud. In some embodiments, host 210 may also include interfaces to external devices such as a camera and sensors configured to measure different characteristics of host 210

(e.g., acceleration, steering wheel deflection, reverse drive, etc.). Consistent with the present disclosure, LIDAR system 100 may be fixed to a stationary object associated with host 210 (e.g. a building, a tripod) or to a portable system associated with host 210 (e.g., a portable computer, a movie camera). Consistent with the present disclosure, LIDAR system 100 may be connected to host 210, to provide outputs of LIDAR system 100 (e.g., a 3D model, a reflectivity image) to host 210. Specifically, host 210 may use LIDAR system 100 to aid in detecting and scanning the environment of host 210 or any other environment. In addition, host 210 may integrate, synchronize or otherwise use together the outputs of LIDAR system 100 with outputs of other sensing systems (e.g. cameras, microphones, radar systems). In one example, LIDAR system 100 may be used by a security system.

LIDAR system 100 may also include a bus 212 (or other communication mechanisms) that interconnect subsystems and components for transferring information within LIDAR system 100. Optionally, bus 212 (or another communication mechanism) may be used for interconnecting LIDAR system 100 with host 210. In the example of FIG. 2A, processing unit 108 includes two processors 118 to regulate the operation of projecting unit 102, scanning unit 104, and sensing unit 106 in a coordinated manner based, at least partially, on information received from internal feedback of LIDAR system 100. In other words, processing unit 108 may be configured to dynamically operate LIDAR system 100 in a closed loop. A closed loop system is characterized by having feedback from at least one of the elements and updating one or more parameters based on the received feedback. Moreover, a closed loop system may receive feedback and update its own operation, at least partially, based on that feedback. A dynamic system or element is one that may be updated during operation.

According to some embodiments, scanning the environment around LIDAR system 100 may include illuminating field of view 120 with light pulses. The light pulses may have parameters such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. Scanning the environment around LIDAR system 100 may also include detecting and characterizing various aspects of the reflected light. Characteristics of the reflected light may include, for example: time-of-flight (i.e., time from emission until detection), instantaneous power (e.g., power signature), average power across entire return pulse, and photon distribution/signal over return pulse period. By comparing characteristics of a light pulse with characteristics of corresponding reflections, a distance and possibly a physical characteristic, such as reflected intensity of object 212 may be estimated. By repeating this process across multiple adjacent portions 122, in a predefined pattern (e.g., raster, Lissajous or other patterns) an entire scan of field of view 120 may be achieved. As discussed below in greater detail, in some situations LIDAR system 100 may direct light to only some of the portions 122 in field of view 120 at every scanning cycle. These portions may be adjacent to each other, but not necessarily so.

In another embodiment, LIDAR system 100 may include network interface 214 for communicating with host 210 (e.g., a vehicle controller). The communication between LIDAR system 100 and host 210 is represented by a dashed arrow. In one embodiment, network interface 214 may include an integrated service digital network (ISDN) card, cable modem, satellite modem, or a modem to provide a data communication connection to a corresponding type of telephone line. As another example, network interface 214 may include a local area network (LAN) card to provide a data communication connection to a compatible LAN. In another embodiment, network interface 214 may include an Ethernet port connected to radio frequency receivers and transmitters and/or optical (e.g., infrared) receivers and transmitters. The specific design and implementation of network interface 214 depends on the communications network(s) over which LIDAR system 100 and host 210 are intended to operate. For example, network interface 214 may be used, for example, to provide outputs of LIDAR system 100 to the external system, such as a 3D model, operational parameters of LIDAR system 100, and so on. In other embodiment, the communication unit may be used, for example, to receive instructions from the external system, to receive information regarding the inspected environment, to receive information from another sensor, etc.

FIG. 2B illustrates an example of a monostatic configuration of LIDAR system 100 including a plurality projecting units 102. The term "monostatic configuration" broadly refers to LIDAR system configurations in which the projected light exiting from the LIDAR system and the reflected light entering the LIDAR system pass through substantially similar optical paths. In one example, the outbound light beam and the inbound light beam may share at least one optical assembly through which both outbound and inbound light beams pass. In another example, the outbound light may pass through an optical window (not shown) and the inbound light radiation may pass through the same optical window. A monostatic configuration may include a configuration where the scanning unit 104 includes a single light deflector 114 that directs the projected light towards field of view 120 and directs the reflected light towards a sensor 116. As shown, both projected light 204 and reflected light 206 hits an asymmetrical deflector 216. The term "asymmetrical deflector" refers to any optical device having two sides capable of deflecting a beam of light hitting it from one side in a different direction than it deflects a beam of light hitting it from the second side. In one example, the asymmetrical deflector does not deflect projected light 204 and deflects reflected light 206 towards sensor 116. One example of an asymmetrical deflector may include a polarization beam splitter. In another example, asymmetrical deflector 216 may include an optical isolator that allows the passage of light in only one direction. A diagrammatic representation of asymmetrical deflector 216 is illustrated in FIG. 2D. Consistent with the present disclosure, a monostatic configuration of LIDAR system 100 may include an asymmetrical deflector to prevent reflected light from hitting light source 112, and to direct all the reflected light toward sensor 116, thereby increasing detection sensitivity.

In the embodiment of FIG. 2B, LIDAR system 100 includes three projecting units 102 each with a single light source 112 aimed at a common light deflector 114. In one embodiment, the plurality of light sources 112 (including two or more light sources) may project light with substantially the same wavelength and each light source 112 is generally associated with a differing area of the field of view (denoted in the figure as 120A, 120B, and 120C). This enables scanning of a broader field of view than can be achieved with a light source 112. In another embodiment, the plurality of light sources 112 may project light with differing wavelengths, and all the light sources 112 may be directed to the same portion (or overlapping portions) of field of view 120.

FIG. 2C illustrates an example of LIDAR system 100 in which projecting unit 102 includes a primary light source 112A and a secondary light source 112B. Primary light source 112A may project light with a longer wavelength to which to the human eye is not sensitive in order to optimize SNR and detection range. For example, primary light source 112A may project light with a wavelength between about 750 nm and 1100 nm. In contrast, secondary light source 112B may project light with a wavelength visible to the human eye. For example, secondary light source 112B may project light with a wavelength between about 400 nm and 700 nm. In one embodiment, secondary light source 112B may project light along substantially the same optical path as the light projected by primary light source 112A. Both light sources may be time-synchronized and may project light emission together or in interleaved pattern. An interleave pattern means that the light sources are not active at the same time which may mitigate mutual interference. A person who is of skill in the art would readily see that other combinations of wavelength ranges and activation schedules may also be implemented.

Consistent with some embodiments, secondary light source 112B may cause human eyes to blink when it is too close to the LIDAR optical output port. This may ensure an eye safety mechanism not feasible with typical laser sources that utilize the near-infrared light spectrum. In another embodiment, secondary light source 112B may be used for calibration and reliability at a point of service, in a manner somewhat similar to the calibration of headlights with a special reflector/pattern at a certain height from the ground with respect to vehicle 110. An operator at a point of service could examine the calibration of the LIDAR by simple visual inspection of the scanned pattern over a featured target such as a test pattern board at a designated distance from LIDAR system 100. In addition, secondary light source 112B may provide means for operational confidence that the LIDAR is working for the end-user. For example, the system may be configured to permit a human to place a hand in front of light deflector 114 to test its operation.

Secondary light source 112B may also have a non-visible element that can double as a backup system in case primary light source 112A fails. This feature may be useful for fail-safe devices with elevated functional safety ratings. Given that secondary light source 112B may be visible and also due to reasons of cost and complexity, secondary light source 112B may be associated with a smaller power compared to primary light source 112A. Therefore, in case of a failure of primary light source 112A, the system functionality will rely on the functionalities and capabilities of the secondary light source 112B set of functionalities and capabilities. While the capabilities of secondary light source 112B may be inferior to the capabilities of primary light source 112A, LIDAR system 100 system may be designed in such a fashion to enable vehicle 110 to safely arrive at its destination.

FIG. 2D illustrates asymmetrical deflector 216 that may be part of LIDAR system 100. In the illustrated example, asymmetrical deflector 216 includes a reflective surface 218 (such as a mirror) and a one-way deflector 220. While not necessarily so, asymmetrical deflector 216 may optionally be a static deflector. Asymmetrical deflector 216 may be used in a monostatic configuration of LIDAR system 100, in order to allow a common optical path for transmission and for reception of light via the at least one deflector 114, e.g.

as illustrated in FIGS. 2B and 2C. However, typical asymmetrical deflectors such as beam splitters are characterized by energy losses, especially in the reception path, which may be more sensitive to power loses than the transmission path.

As depicted in FIG. 2D, LIDAR system 100 may include asymmetrical deflector 216 positioned in the transmission path, which includes one-way deflector 220 for separating between the transmitted and received light signals. Optionally, one-way deflector 220 may be substantially transparent to the transmission light and substantially reflective to the received light. The transmitted light is generated by projecting unit 102 and may travel through one-way deflector 220 to scanning unit 104 which deflects it towards the optical outlet. The received light arrives through the optical inlet, to the at least one deflecting element 114, which deflects the reflection signal into a separate path away from the light source and towards sensing unit 106. Optionally, asymmetrical deflector 216 may be combined with a polarized light source 112 which is linearly polarized with the same polarization axis as one-way deflector 220. Notably, the cross-section of the outbound light beam is much smaller than that of the reflection signals. Accordingly, LIDAR system 100 may include one or more optical components (e.g. lens, collimator) for focusing or otherwise manipulating the emitted polarized light beam to the dimensions of the asymmetrical deflector 216. In one embodiment, one-way deflector 220 may be a polarizing beam splitter that is virtually transparent to the polarized light beam.

Consistent with some embodiments, LIDAR system 100 may further include optics 222 (e.g., a quarter wave plate retarder) for modifying a polarization of the emitted light. For example, optics 222 may modify a linear polarization of the emitted light beam to circular polarization. Light reflected back to system 100 from the field of view would arrive back through deflector 114 to optics 222, bearing a circular polarization with a reversed handedness with respect to the transmitted light. Optics 222 would then convert the received reversed handedness polarization light to a linear polarization that is not on the same axis as that of the polarized beam splitter 216. As noted above, the received light-patch is larger than the transmitted light-patch, due to optical dispersion of the beam traversing through the distance to the target.

Some of the received light will impinge on one-way deflector 220 that will reflect the light towards sensing unit 106 with some power loss. However, another part of the received patch of light will fall on a reflective surface 218 which surrounds one-way deflector 220 (e.g., polarizing beam splitter slit). Reflective surface 218 will reflect the light towards sensing unit 106 with substantially zero power loss. One-way deflector 220 would reflect light that is composed of various polarization axes and directions that will eventually arrive at the detector. Optionally, sensing unit 106 may include sensor 116 that is agnostic to the laser polarization, and is primarily sensitive to the amount of impinging photons at a certain wavelength range.

It is noted that the proposed asymmetrical deflector 216 provides far superior performances when compared to a simple mirror with a passage hole in it. In a mirror with a hole, all of the reflected light which reaches the hole is lost to the detector. However, in deflector 216, one-way deflector 220 deflects a significant portion of that light (e.g., about 50%) toward the respective sensor 116. In LIDAR systems, the number photons reaching the LIDAR from remote distances is very limited, and therefore the improvement in photon capture rate is important.

According to some embodiments, a device for beam splitting and steering is described. A polarized beam may be emitted from a light source having a first polarization. The emitted beam may be directed to pass through a polarized beam splitter assembly. The polarized beam splitter assembly includes on a first side a one-directional slit and on an opposing side a mirror. The one-directional slit enables the polarized emitted beam to travel toward a quarter-wave-plate/wave-retarder which changes the emitted signal from a polarized signal to a linear signal (or vice versa) so that subsequently reflected beams cannot travel through the one-directional slit.

FIG. 2E shows an example of a bi-static configuration of LIDAR system 100 without scanning unit 104. In order to illuminate an entire field of view (or substantially the entire field of view) without deflector 114, projecting unit 102 may optionally include an array of light sources (e.g., 112A-112F). In one embodiment, the array of light sources may include a linear array of light sources controlled by processor 118. For example, processor 118 may cause the linear array of light sources to sequentially project collimated laser beams towards first optional optical window 124A. First optional optical window 124A may include a diffuser lens for spreading the projected light and sequentially forming wide horizontal and narrow vertical beams. Optionally, some or all of the at least one light source 112 of system 100 may project light concurrently. For example, processor 118 may cause the array of light sources to simultaneously project light beams from a plurality of non-adjacent light sources 112. In the depicted example, light source 112A, light source 112D, and light source 112F simultaneously project laser beams towards first optional optical window 124A thereby illuminating the field of view with three narrow vertical beams. The light beam from fourth light source 112D may reach an object in the field of view. The light reflected from the object may be captured by second optical window 124B and may be redirected to sensor 116. The configuration depicted in FIG. 2E is considered to be a bi-static configuration because the optical paths of the projected light and the reflected light are substantially different. It is noted that projecting unit 102 may also include a plurality of light sources 112 arranged in non-linear configurations, such as a two dimensional array, in hexagonal tiling, or in any other way.

FIG. 2F illustrates an example of a monostatic configuration of LIDAR system 100 without scanning unit 104. Similar to the example embodiment represented in FIG. 2E, in order to illuminate an entire field of view without deflector 114, projecting unit 102 may include an array of light sources (e.g., 112A-112F). But, in contrast to FIG. 2E, this configuration of LIDAR system 100 may include a single optical window 124 for both the projected light and for the reflected light. Using asymmetrical deflector 216, the reflected light may be redirected to sensor 116. The configuration depicted in FIG. 2E is considered to be a monostatic configuration because the optical paths of the projected light and the reflected light are substantially similar to one another. The term "substantially similar" in the context of the optical paths of the projected light and the reflected light means that the overlap between the two optical paths may be more than 80%, more than 85%, more than 90%, or more than 95%.

FIG. 2G illustrates an example of a bi-static configuration of LIDAR system 100. The configuration of LIDAR system 100 in this figure is similar to the configuration shown in FIG. 2A. For example, both configurations include a scanning unit 104 for directing projected light in the outbound direction toward the field of view. But, in contrast to the embodiment of FIG. 2A, in this configuration, scanning unit 104 does not redirect the reflected light in the inbound direction. Instead the reflected light passes through second optical window 124B and enters sensor 116. The configuration depicted in FIG. 2G is considered to be a bi-static configuration because the optical paths of the projected light and the reflected light are substantially different from one another. The term "substantially different" in the context of the optical paths of the projected light and the reflected light means that the overlap between the two optical paths may be less than 10%, less than 5%, less than 1%, or less than 0.25%.

The Scanning Unit

Figure 3A:
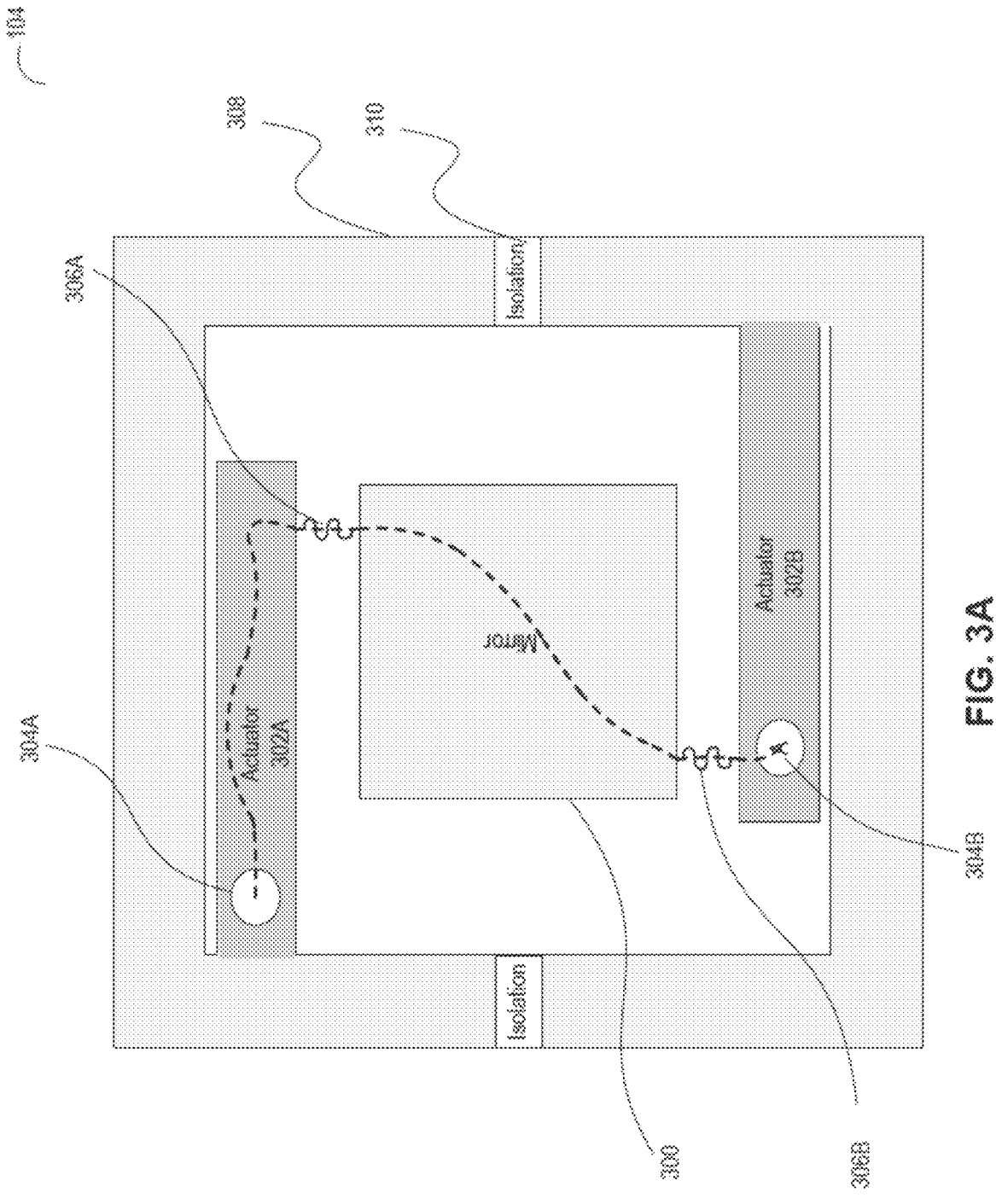
FIGS. 3A, 3B, 3C, and 3D are diagrams illustrating different configurations of scanning units in accordance with some embodiments of the present disclosure.
Figure 3B:
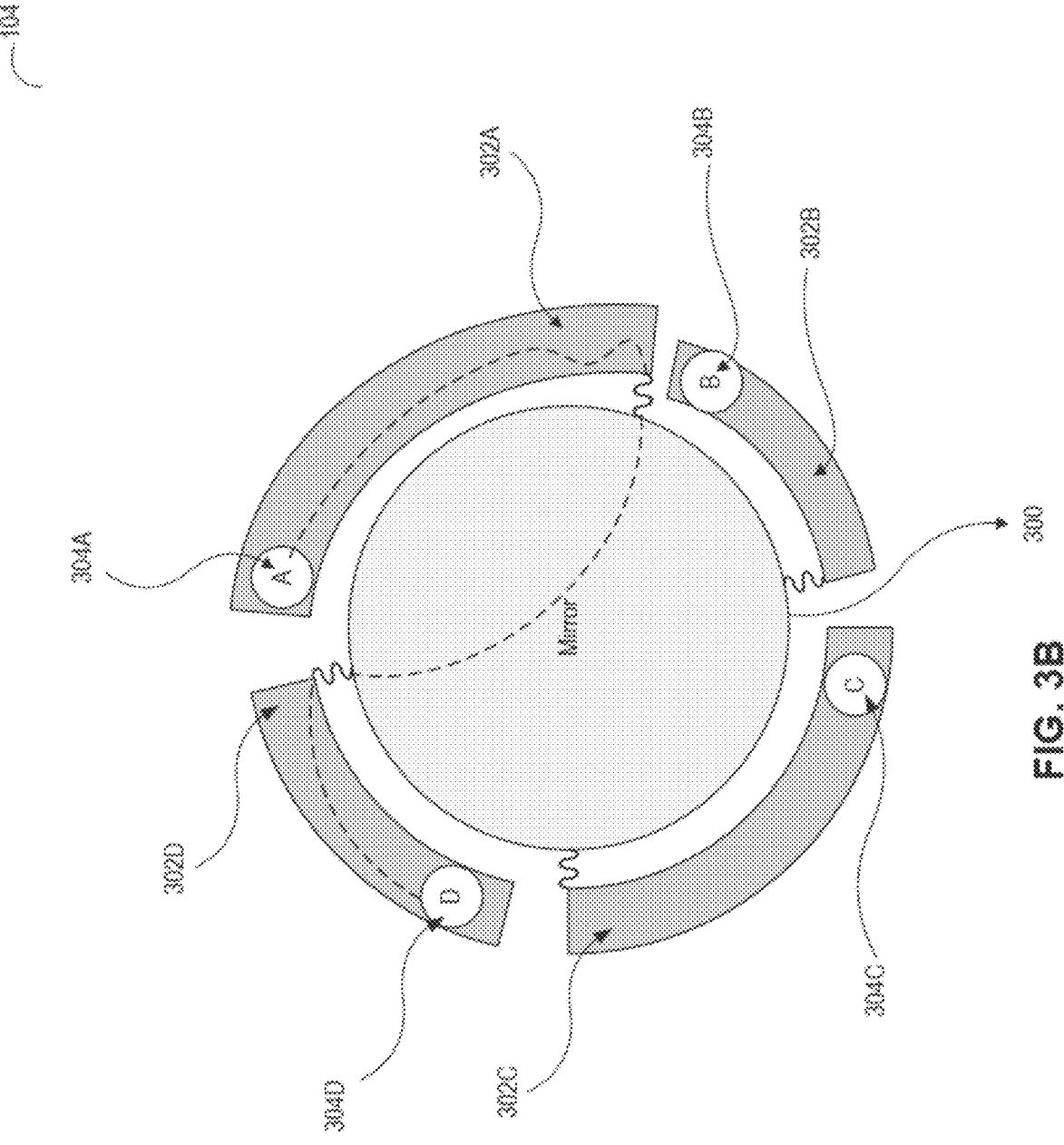
Figure 3C:
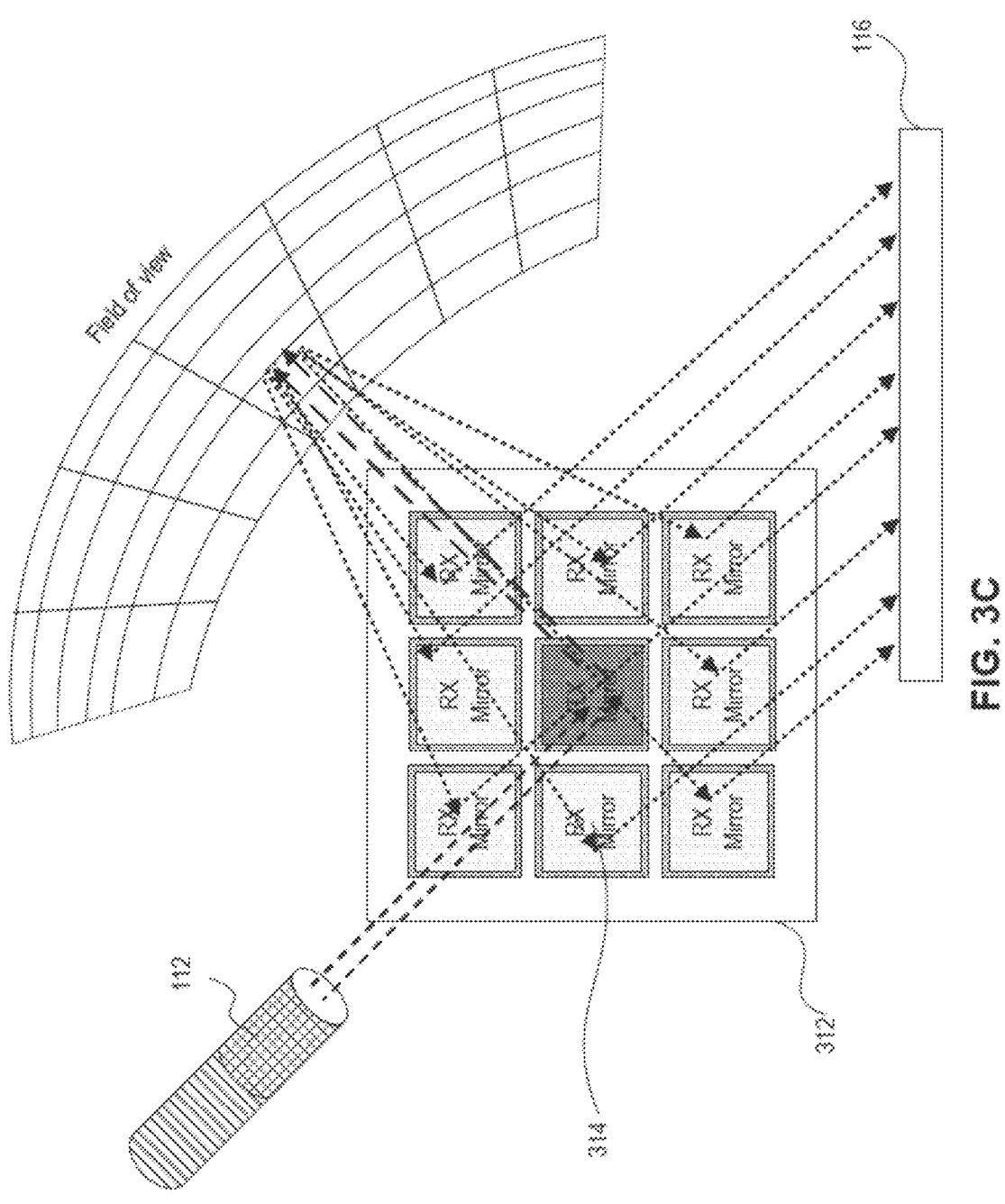
Figure 3D:
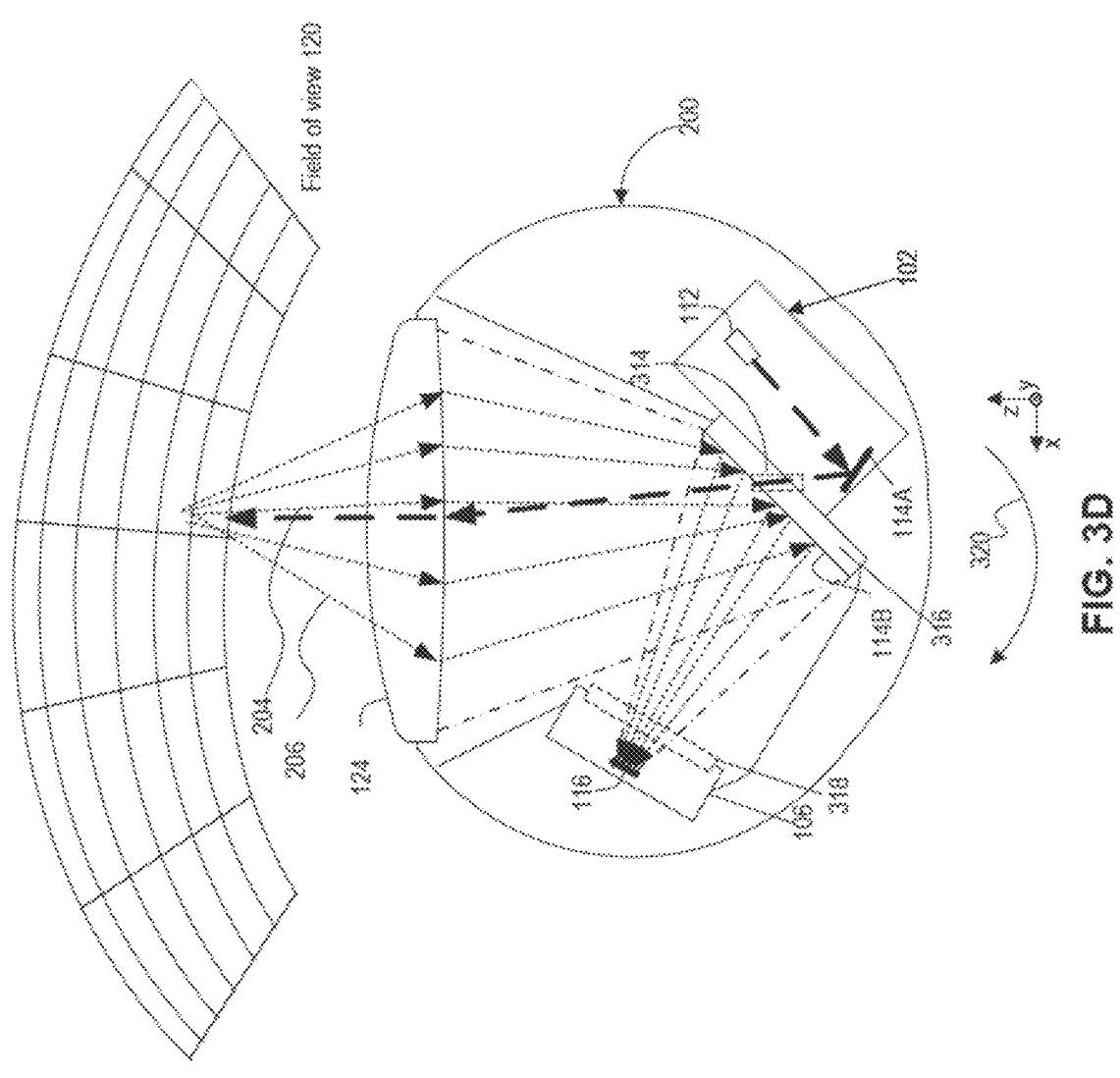

FIG. 3A-3D depict various configurations of scanning unit 104 and its role in LIDAR system 100. Specifically, FIG. 3A is a diagram illustrating scanning unit 104 with a MEMS mirror (e.g., square shaped), FIG. 3B is a diagram illustrating another scanning unit 104 with a MEMS mirror (e.g., round shaped), FIG. 3C is a diagram illustrating scanning unit 104 with an array of reflectors used for monostatic scanning LIDAR system, and FIG. 3D is a diagram illustrating an example LIDAR system 100 that mechanically scans the environment around LIDAR system 100. One skilled in the art will appreciate that the depicted configurations of scanning unit 104 are exemplary only, and may have numerous variations and modifications within the scope of this disclosure.

FIG. 3A illustrates an example scanning unit 104 with a single axis square MEMS mirror 300. In this example MEMS mirror 300 functions as at least one deflector 114. As shown, scanning unit 104 may include one or more actuators 302 (specifically, 302A and 302B). In one embodiment, actuator 302 may be made of semiconductor (e.g., silicon) and includes a piezoelectric layer (e.g. PZT, Lead zirconate titanate, aluminum nitride), which changes its dimension in response to electric signals applied by an actuation controller, a semi conductive layer, and a base layer. In one embodiment, the physical properties of actuator 302 may determine the mechanical stresses that actuator 302 experiences when electrical current passes through it. When the piezoelectric material is activated it exerts force on actuator 302 and causes it to bend. In one embodiment, the resistivity of one or more actuators 302 may be measured in an active state (Ractive) when mirror 300 is deflected at a certain angular position and compared to the resistivity at a resting state (Rrest). Feedback including Ractive may provide information to determine the actual mirror deflection angle compared to an expected angle, and, if needed, mirror 300 deflection may be corrected. The difference between Rrest and Ractive may be correlated by a mirror drive into an angular deflection value that may serve to close the loop. This embodiment may be used for dynamic tracking of the actual mirror position and may optimize response, amplitude, deflection efficiency, and frequency for both linear mode and resonant mode MEMS mirror schemes. This embodiment is described in greater detail below with reference to FIGS. 49-51.

FIG. 3B illustrates another example scanning unit 104 with a dual axis round MEMS mirror 300. In this example MEMS mirror 300 functions as at least one deflector 114. In one embodiment, MEMS mirror 300 may have a diameter of between about 1 mm to about 5 mm. As shown, scanning unit 104 may include four actuators 302 (302A, 302B, 302C, and 302D) each may be at a differing length. Consistent with some embodiments, a dual axis MEMS mirror may be configured to deflect light in a horizontal direction and in a vertical direction. For example, the angles of deflection of a dual axis MEMS mirror may be between about 0° to 30° in the vertical direction and between about 0° to 50° in the horizontal direction. One skilled in the art will appreciate that the depicted configuration of mirror 300 may have numerous variations and modifications. In one example, at least one deflector 114 may have a dual axis square-shaped mirror or single axis round-shaped mirror. Examples of round and square mirror are depicted in FIGS. 3A and 3B as examples only. Any shape may be employed depending on system specifications. In one embodiment, actuators 302 may be incorporated as an integral part of at least one deflector 114, such that power to move MEMS mirror 300 is applied directly towards it. In addition, MEMS mirror 300 may be connected to frame 308 by one or more rigid supporting elements. In another embodiment, at least one deflector 114 may include an electrostatic or electromagnetic MEMS mirror.

As described above, a monostatic scanning LIDAR system utilizes at least a portion of the same optical path for emitting projected light 204 and for receiving reflected light 206. The light beam in the outbound path may be collimated and focused into a narrow beam while the reflections in the return path spread into a larger patch of light, due to dispersion. In one embodiment, scanning unit 104 may have a large reflection area in the return path and asymmetrical deflector 216 that redirects the reflections (i.e., reflected light 206) to sensor 116. In one embodiment, scanning unit 104 may include a MEMS mirror with a large reflection area and negligible impact on the field of view and the frame rate performance. Additional details about the asymmetrical deflector 216 are provided below with reference to FIG. 2D.

In some embodiments (e.g. as exemplified in FIG. 3C), scanning unit 104 may include a deflector array (e.g. a reflector array) with small light deflectors (e.g. mirrors). In one embodiment, implementing light deflector 114 as a group of smaller individual light deflectors working in synchronization may allow light deflector 114 to perform at a high scan rate with larger angles of deflection. The deflector array may essentially act as a large light deflector (e.g. a large mirror) in terms of effective area. The deflector array may be operated using a shared steering assembly configuration that allows sensor 116 to collect reflected photons from substantially the same portion of field of view 120 being concurrently illuminated by light source 112. The term "concurrently" means that the two selected functions occur during coincident or overlapping time periods, either where one begins and ends during the duration of the other, or where a later one starts before the completion of the other.

FIG. 3C illustrates an example of scanning unit 104 with a reflector array 312 having small mirrors. In this embodiment, reflector array 312 functions as at least one deflector 114. Reflector array 312 may include a plurality of reflector units 314 configured to pivot (individually or together) and steer light pulses toward field of view 120. For example, reflector array 312 may be a part of an outbound path of light projected from light source 112. Specifically, reflector array 312 may direct projected light 204 towards a portion of field of view 120. Reflector array 312 may also be part of a return path for light reflected from a surface of an object located within an illumined portion of field of view 120. Specifically, reflector array 312 may direct reflected light 206 towards sensor 116 or towards asymmetrical deflector 216. In one example, the area of reflector array 312 may be between about 75 to about 150 mm², where each reflector units 314 may have a width of about 10 μm and the supporting structure may be lower than 100 μm.

According to some embodiments, reflector array 312 may include one or more sub-groups of steerable deflectors. Each sub-group of electrically steerable deflectors may include one or more deflector units, such as reflector unit 314. For example, each steerable deflector unit 314 may include at least one of a MEMS mirror, a reflective surface assembly, and an electromechanical actuator. In one embodiment, each reflector unit 314 may be individually controlled by an individual processor (not shown), such that it may tilt towards a specific angle along each of one or two separate axes. Alternatively, reflector array 312 may be associated with a common controller (e.g., processor 118) configured to synchronously manage the movement of reflector units 314 such that at least part of them will pivot concurrently and point in approximately the same direction.

In addition, at least one processor 118 may select at least one reflector unit 314 for the outbound path (referred to hereinafter as "TX Mirror") and a group of reflector units 314 for the return path (referred to hereinafter as "RX Mirror"). Consistent with the present disclosure, increasing the number of TX Mirrors may increase a reflected photons beam spread. Additionally, decreasing the number of RX Mirrors may narrow the reception field and compensate for ambient light conditions (such as clouds, rain, fog, extreme heat, and other environmental conditions) and improve the signal to noise ratio. Also, as indicated above, the emitted light beam is typically narrower than the patch of reflected light, and therefore can be fully deflected by a small portion of the deflection array. Moreover, it is possible to block light reflected from the portion of the deflection array used for transmission (e.g. the TX mirror) from reaching sensor 116, thereby reducing an effect of internal reflections of the LIDAR system 100 on system operation. In addition, at least one processor 118 may pivot one or more reflector units 314 to overcome mechanical impairments and drifts due, for example, to thermal and gain effects. In an example, one or more reflector units 314 may move differently than intended (frequency, rate, speed etc.) and their movement may be compensated for by electrically controlling the deflectors appropriately.

FIG. 3D illustrates an exemplary LIDAR system 100 that mechanically scans the environment of LIDAR system 100. In this example, LIDAR system 100 may include a motor or other mechanisms for rotating housing 200 about the axis of the LIDAR system 100. Alternatively, the motor (or other mechanism) may mechanically rotate a rigid structure of LIDAR system 100 on which one or more light sources 112 and one or more sensors 116 are installed, thereby scanning the environment. As described above, projecting unit 102 may include at least one light source 112 configured to project light emission. The projected light emission may travel along an outbound path towards field of view 120. Specifically, the projected light emission may be reflected by deflector 114A through an exit aperture 314 when projected light 204 travels towards optional optical window 124. The reflected light emission may travel along a return path from object 208 towards sensing unit 106. For example, the reflected light 206 may be reflected by deflector 114B when reflected light 206 travels towards sensing unit 106. A person skilled in the art would appreciate that a LIDAR system with a rotation mechanism for synchronically rotating one or more light sources or one or more sensors, may use this synchronized rotation instead of (or in addition to) steering an internal light deflector.

In embodiments in which the scanning of field of view 120 is mechanical, the projected light emission may be directed to exit aperture 314 that is part of a wall 316 separating projecting unit 102 from other parts of LIDAR system 100. In some examples, wall 316 can be formed from a transparent material (e.g., glass) coated with a reflective material to form deflector 114B. In this example, exit aperture 314 may correspond to the portion of wall 316 that is not coated by the reflective material. Additionally or alternatively, exit aperture 314 may include a hole or cut-away in the wall 316. Reflected light 206 may be reflected by deflector 114B and directed towards an entrance aperture 318 of sensing unit 106. In some examples, an entrance aperture 318 may include a filtering window configured to allow wavelengths in a certain wavelength range to enter sensing unit 106 and attenuate other wavelengths. The reflections of object 208 from field of view 120 may be reflected by deflector 114B and hit sensor 116. By comparing several properties of reflected light 206 with projected light 204, at least one aspect of object 208 may be determined. For example, by comparing a time when projected light 204 was emitted by light source 112 and a time when sensor 116 received reflected light 206, a distance between object 208 and LIDAR system 100 may be determined. In some examples, other aspects of object 208, such as shape, color, material, etc. may also be determined.

In some examples, the LIDAR system 100 (or part thereof, including at least one light source 112 and at least one sensor 116) may be rotated about at least one axis to determine a three-dimensional map of the surroundings of the LIDAR system 100. For example, the LIDAR system 100 may be rotated about a substantially vertical axis as illustrated by arrow 320 in order to scan field of view 120. Although FIG. 3D illustrates that the LIDAR system 100 is rotated clockwise about the axis as illustrated by the arrow 320, additionally or alternatively, the LIDAR system 100 may be rotated in a counter clockwise direction. In some examples, the LIDAR system 100 may be rotated 360 degrees about the vertical axis. In other examples, the LIDAR system 100 may be rotated back and forth along a sector smaller than 360-degree of the LIDAR system 100. For example, the LIDAR system 100 may be mounted on a platform that wobbles back and forth about the axis without making a complete rotation.

The Sensing Unit

Figure 4A:
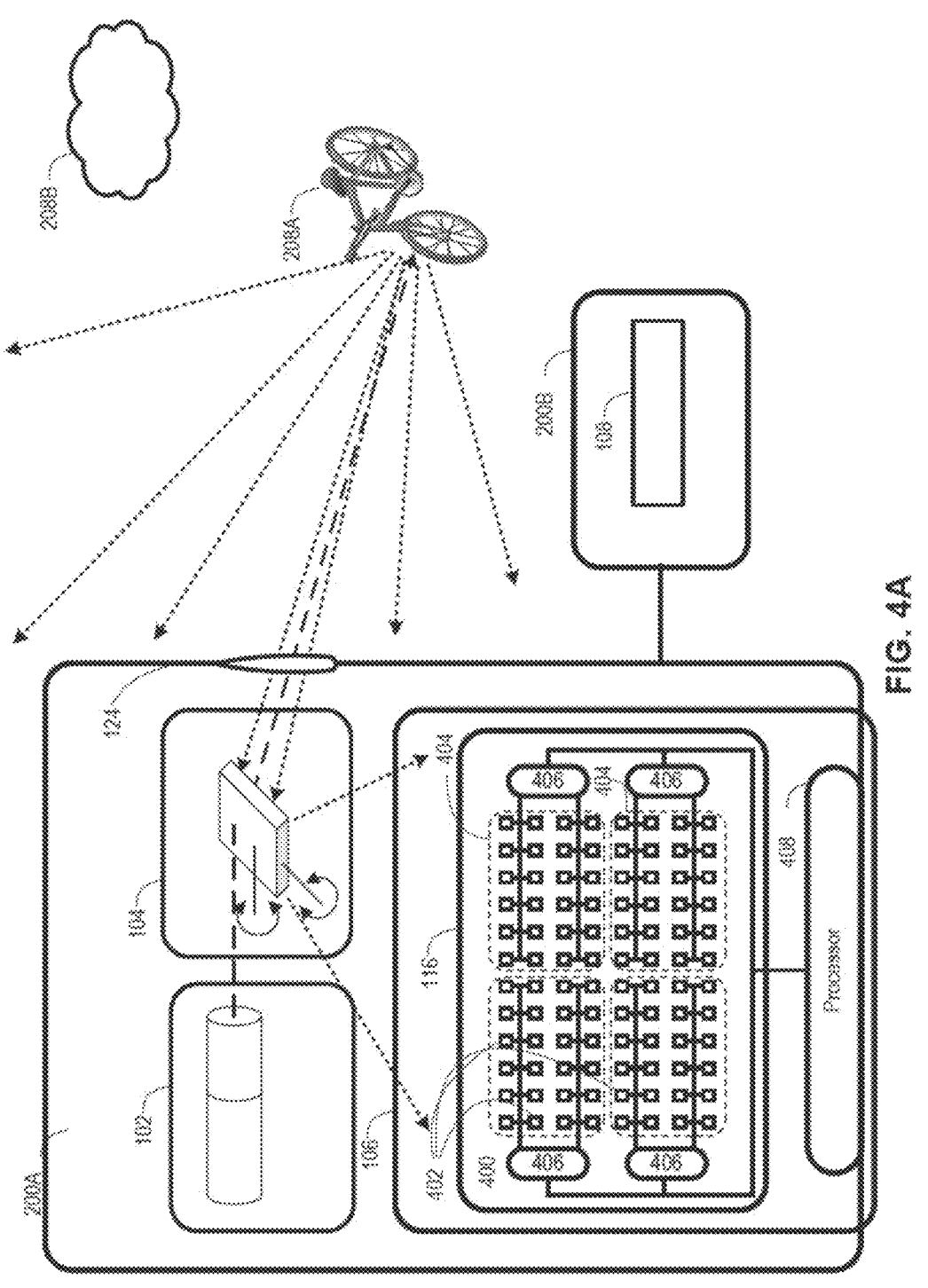
FIGS. 4A, 4B, 4C, 4D, and 4E are diagrams illustrating different configurations of sensing units in accordance with some embodiments of the present disclosure.
Figure 4B:
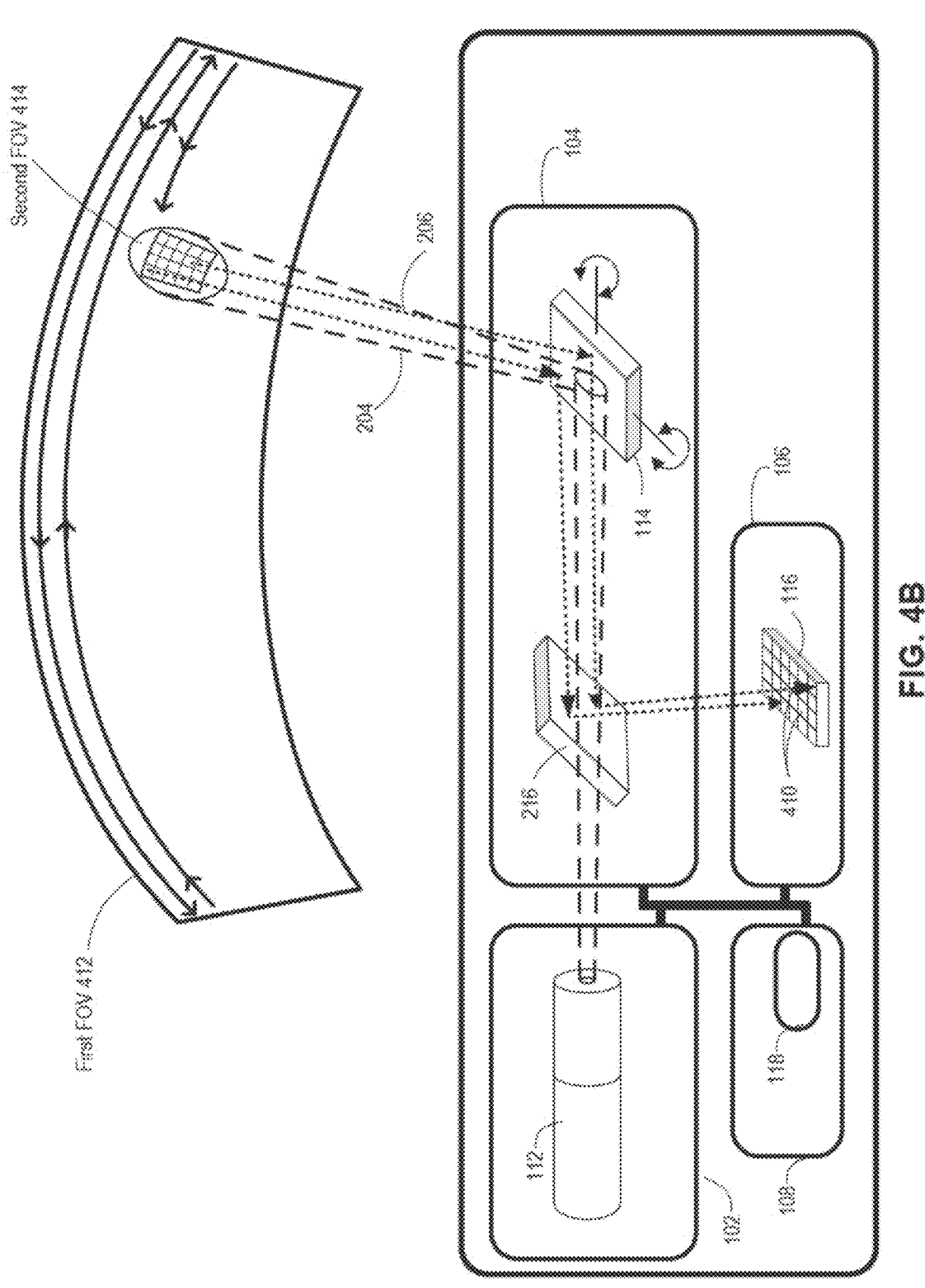
Figure 4C:
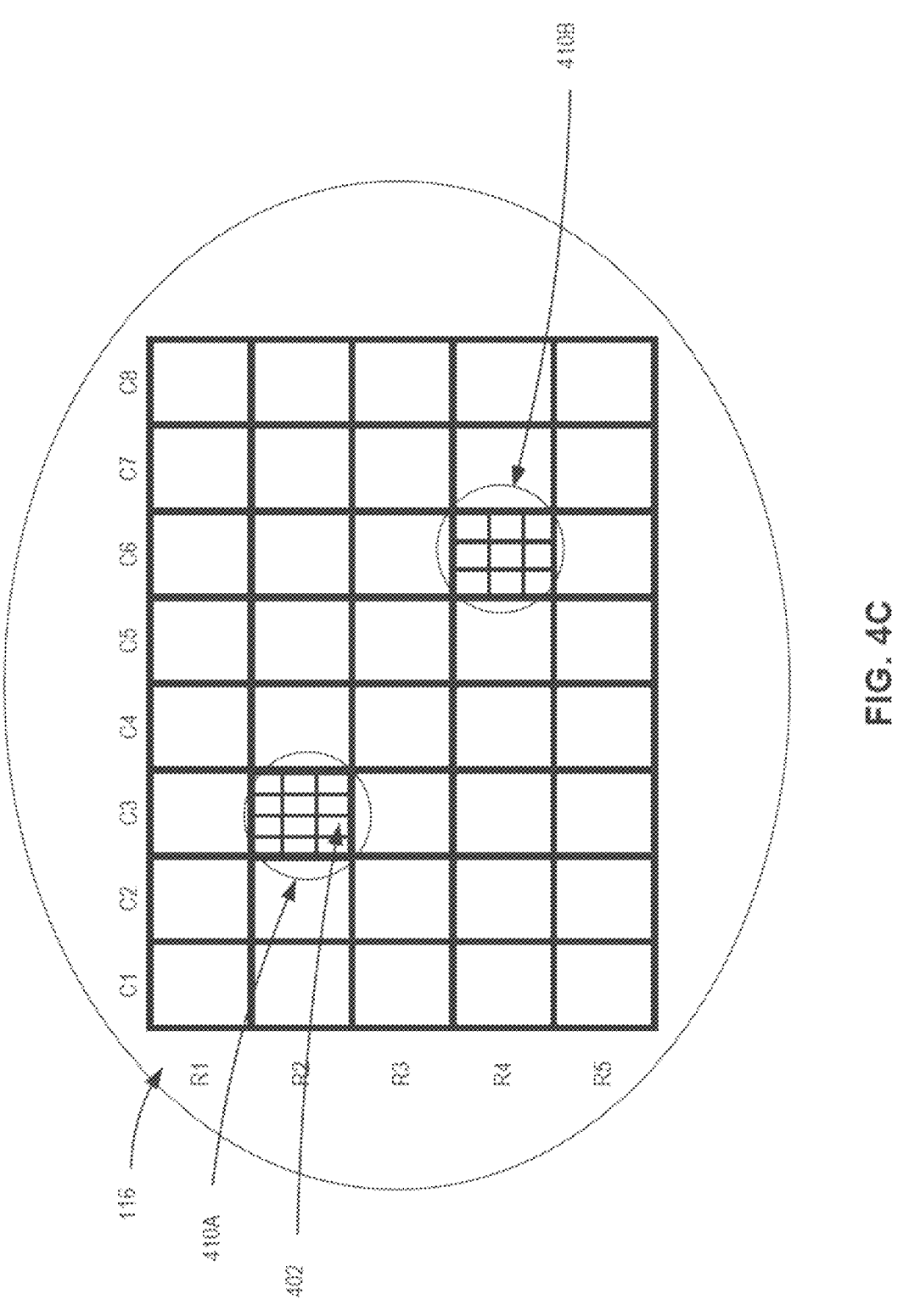
Figure 4D:
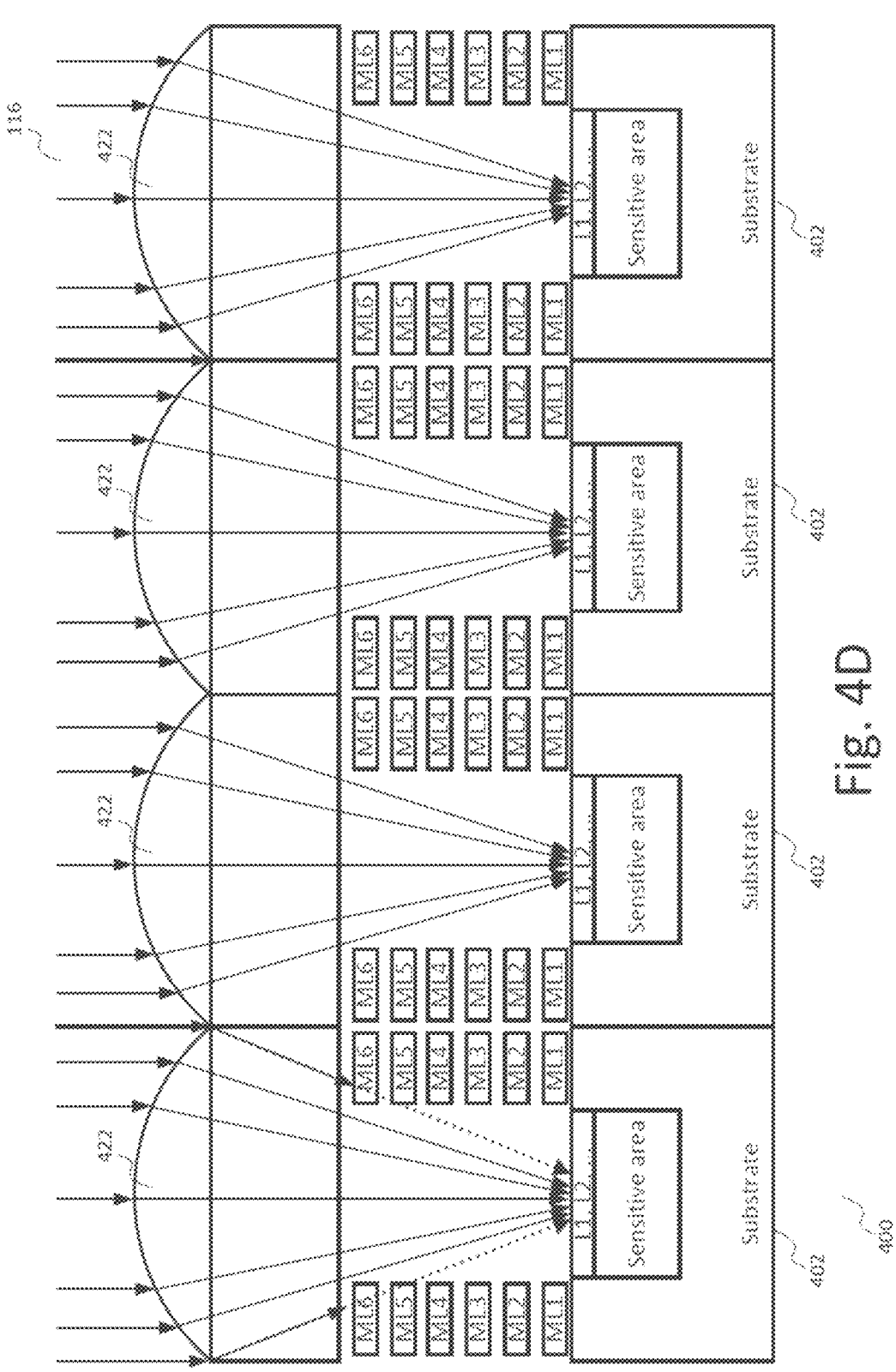

FIGS. 4A-4E depict various configurations of sensing unit 106 and its role in LIDAR system 100. Specifically, FIG. 4A is a diagram illustrating an example sensing unit 106 with a detector array, FIG. 4B is a diagram illustrating monostatic scanning using a two-dimensional sensor, FIG. 4C is a diagram illustrating an example of a two-dimensional sensor 116, FIG. 4D is a diagram illustrating a lens array associated with sensor 116, and FIG. 4E includes three diagram illustrating the lens structure. One skilled in the art will appreciate that the depicted configurations of sensing unit 106 are exemplary only and may have numerous alternative variations and modifications consistent with the principles of this disclosure.

FIG. 4A illustrates an example of sensing unit 106 with detector array 400. In this example, at least one sensor 116 includes detector array 400. LIDAR system 100 is configured to detect objects (e.g., bicycle 208A and cloud 208) in field of view 120 located at different distances from LIDAR system 100 (could be meters or more). Objects 208 may be a solid object (e.g. a road, a tree, a car, a person), fluid object (e.g. fog, water, atmosphere particles), or object of another type (e.g. dust or a powdery illuminated object). When the photons emitted from light source 112 hit object 208 they either reflect, refract, or get absorbed. Typically, as shown in the figure, only a portion of the photons reflected from object

208A enters optional optical window 124. As each ~15 cm change in distance results in a travel time difference of 1 ns (since the photons travel at the speed of light to and from object 208), the time differences between the travel times of different photons hitting the different objects may be detectable by a time-of-flight sensor with sufficiently quick response.

Sensor 116 includes a plurality of detection elements 402 for detecting photons of a photonic pulse reflected back from field of view 120. The detection elements may all be included in detector array 400, which may have a rectangular arrangement (e.g. as shown) or any other arrangement. Detection elements 402 may operate concurrently or partially concurrently with each other. Specifically, each detection element 402 may issue detection information for every sampling duration (e.g. every 1 nanosecond). In one example, detector array 400 may be a SiPM (Silicon photomultipliers) which is a solid-state single-photon-sensitive device built from an array of single photon avalanche diodes (SPADs, serving as detection elements 402) on a common silicon substrate. Similar photomultipliers from other, non-silicon materials may also be used. Although a SiPM device works in digital/switching mode, the SiPM is an analog device because all the microcells are read in parallel, making it possible to generate signals within a dynamic range from a single photon to hundreds and thousands of photons detected by the different SPADs. As mentioned above, more than one type of sensor may be implemented (e.g. SiPM and APD). Possibly, sensing unit 106 may include at least one APD integrated into an SiPM array and/or at least one APD detector located next to a SiPM on a separate or common silicon substrate.

In one embodiment, detection elements 402 may be grouped into a plurality of regions 404. The regions are geometrical locations or environments within sensor 116 (e.g. within detector array 400)—and may be shaped in different shapes (e.g. rectangular as shown, squares, rings, and so on, or in any other shape). While not all of the individual detectors, which are included within the geometrical area of a region 404, necessarily belong to that region, in most cases they will not belong to other regions 404 covering other areas of the sensor 310 —unless some overlap is desired in the seams between regions. As illustrated in FIG. 4A, the regions may be non-overlapping regions 404, but alternatively, they may overlap. Every region may be associated with a regional output circuitry 406 associated with that region. The regional output circuitry 406 may provide a region output signal of a corresponding group of detection elements 402. For example, the regional output circuitry 406 may be a summing circuit, but other forms of combined output of the individual detector into a unitary output (whether scalar, vector, or any other format) may be employed. Optionally, each region 404 is a single SiPM, but this is not necessarily so, and a region may be a sub-portion of a single SiPM, a group of several SiPMs, or even a combination of different types of detectors.

In the illustrated example, processing unit 108 is located at a separated housing 200B (within or outside) host 210 (e.g. within vehicle 110), and sensing unit 106 may include a dedicated processor 408 for analyzing the reflected light. Alternatively, processing unit 108 may be used for analyzing reflected light 206. It is noted that LIDAR system 100 may be implemented multiple housings in other ways than the illustrated example. For example, light deflector 114 may be located in a different housing than projecting unit 102 and/or sensing module 106. In one embodiment, LIDAR system 100 may include multiple housings connected to each other in different ways, such as: electric wire connection, wireless connection (e.g., RF connection), fiber optics cable, and any combination of the above.

In one embodiment, analyzing reflected light 206 may include determining a time of flight for reflected light 206, based on outputs of individual detectors of different regions. Optionally, processor 408 may be configured to determine the time of flight for reflected light 206 based on the plurality of regions of output signals. In addition to the time of flight, processing unit 108 may analyze reflected light 206 to determine the average power across an entire return pulse, and the photon distribution/signal may be determined over the return pulse period ("pulse shape"). In the illustrated example, the outputs of any detection elements 402 may not be transmitted directly to processor 408, but rather combined (e.g. summed) with signals of other detectors of the region 404 before being passed to processor 408. However, this is only an example and the circuitry of sensor 116 may transmit information from a detection element 402 to processor 408 via other routes (not via a regional output circuitry 406).

FIG. 4B is a diagram illustrating LIDAR system 100 configured to scan the environment of LIDAR system 100 using a two-dimensional sensor 116. In the example of FIG. 4B, sensor 116 is a matrix of 4×6 detectors 410 (also referred to as "pixels"). In one embodiment, a pixel size may be about 1×1 mm. Sensor 116 is two-dimensional in the sense that it has more than one set (e.g. row, column) of detectors 410 in two non-parallel axes (e.g. orthogonal axes, as exemplified in the illustrated examples). The number of detectors 410 in sensor 116 may vary between differing implementations, e.g. depending on the desired resolution, signal to noise ratio (SNR), desired detection distance, and so on. For example, sensor 116 may have anywhere between 5 and 5,000 pixels. In another example (not shown in the figure) sensor 116 may be a one-dimensional matrix (e.g. 1×8 pixels).

It is noted that each detector 410 may include a plurality of detection elements 402, such as Avalanche Photo Diodes (APD), Single Photon Avalanche Diodes (SPADs), combination of Avalanche Photo Diodes (APD) and Single Photon Avalanche Diodes (SPADs) or detecting elements that measure both the time of flight from a laser pulse transmission event to the reception event and the intensity of the received photons. For example, each detector 410 may include anywhere between 20 and 5,000 SPADs. The outputs of detection elements 402 in each detector 410 may be summed, averaged, or otherwise combined to provide a unified pixel output.

In the illustrated example, sensing unit 106 may include a two-dimensional sensor 116 (or a plurality of two-dimensional sensors 116), whose field of view is smaller than field of view 120 of LIDAR system 100. In this discussion, field of view 120 (the overall field of view which can be scanned by LIDAR system 100 without moving, rotating or rolling in any direction) is denoted "first FOV 412", and the smaller FOV of sensor 116 is denoted "second FOV 414" (interchangeably "instantaneous FOV"). The coverage area of second FOV 414 relative to the first FOV 412 may differ, depending on the specific use of LIDAR system 100, and may be, for example, between 0.5% and 50%. In one example, second FOV 414 may be between about 0.050 and 1° elongated in the vertical dimension. Even if LIDAR system 100 includes more than one two-dimensional sensor 116, the combined field of view of the sensors array may still be smaller than the first FOV 412, e.g. by a factor of at least 5, by a factor of at least 10, by a factor of at least 20, or by a factor of at least 50, for example.

In order to cover first FOV 412, scanning unit 106 may direct photons arriving from different parts of the environment to sensor 116 at different times. In the illustrated monostatic configuration, together with directing projected light 204 towards field of view 120 and when at least one light deflector 114 is located in an instantaneous position, scanning unit 106 may also direct reflected light 206 to sensor 116. Typically, at every moment during the scanning of first FOV 412, the light beam emitted by LIDAR system 100 covers part of the environment which is larger than the second FOV 414 (in angular opening) and includes the part of the environment from which light is collected by scanning unit 104 and sensor 116.

FIG. 4C is a diagram illustrating an example of a two-dimensional sensor 116. In this embodiment, sensor 116 is a matrix of 8×5 detectors 410 and each detector 410 includes a plurality of detection elements 402. In one example, detector 410A is located in the second row (denoted "R2") and third column (denoted "C3") of sensor 116, which includes a matrix of 4×3 detection elements 402. In another example, detector 410B located in the fourth row (denoted "R4") and sixth column (denoted "C6") of sensor 116 includes a matrix of 3×3 detection elements 402. Accordingly, the number of detection elements 402 in each detector 410 may be constant, or may vary, and differing detectors 410 in a common array may have a different number of detection elements 402. The outputs of all detection elements 402 in each detector 410 may be summed, averaged, or otherwise combined to provide a single pixel-output value. It is noted that while detectors 410 in the example of FIG. 4C are arranged in a rectangular matrix (straight rows and straight columns), other arrangements may also be used, e.g. a circular arrangement or a honeycomb arrangement.

According to some embodiments, measurements from each detector 410 may enable determination of the time of flight from a light pulse emission event to the reception event and the intensity of the received photons. The reception event may be the result of the light pulse being reflected from object 208. The time of flight may be a timestamp value that represents the distance of the reflecting object to optional optical window 124. Time of flight values may be realized by photon detection and counting methods, such as Time Correlated Single Photon Counters (TCSPC), analog methods for photon detection such as signal integration and qualification (via analog to digital converters or plain comparators) or otherwise.

In some embodiments and with reference to FIG. 4B, during a scanning cycle, each instantaneous position of at least one light deflector 114 may be associated with a particular portion 122 of field of view 120. The design of sensor 116 enables an association between the reflected light from a single portion of field of view 120 and multiple detectors 410. Therefore, the scanning resolution of LIDAR system may be represented by the number of instantaneous positions (per scanning cycle) times the number of detectors 410 in sensor 116. The information from each detector 410 (i.e., each pixel) represents the basic data element from which the captured field of view in the three-dimensional space is built. This may include, for example, the basic element of a point cloud representation, with a spatial position and an associated reflected intensity value. In one embodiment, the reflections from a single portion of field of view 120 that are detected by multiple detectors 410 may be returning from different objects located in the single portion of field of view 120. For example, the single portion of field of view 120 may be greater than 50×50 cm at the far field, which can easily include two, three, or more objects partly covered by each other.

FIG. 4D is a cross cut diagram of a part of sensor 116, in accordance with examples of the presently disclosed subject matter. The illustrated part of sensor 116 includes a part of a detector array 400 which includes four detection elements 402 (e.g., four SPADs, four APDs). Detector array 400 may be a photodetector sensor realized in complementary metal-oxide-semiconductor (CMOS). Each of the detection elements 402 has a sensitive area, which is positioned within a substrate surrounding. While not necessarily so, sensor 116 may be used in a monostatic LiDAR system having a narrow field of view (e.g., because scanning unit 104 scans different parts of the field of view at different times). The narrow field of view for the incoming light beam—if implemented— eliminates the problem of out-of-focus imaging. As exemplified in FIG. 4D, sensor 116 may include a plurality of lenses 422 (e.g., microlenses), each lens 422 may direct incident light toward a different detection element 402 (e.g., toward an active area of detection element 402), which may be usable when out-of-focus imaging is not an issue. Lenses 422 may be used for increasing an optical fill factor and sensitivity of detector array 400, because most of the light that reaches sensor 116 may be deflected toward the active areas of detection elements 402.

Detector array 400, as exemplified in FIG. 4D, may include several layers built into the silicon substrate by various methods (e.g., implant) resulting in a sensitive area, contact elements to the metal layers and isolation elements (e.g., shallow trench implant STI, guard rings, optical trenches, etc.). The sensitive area may be a volumetric element in the CMOS detector that enables the optical conversion of incoming photons into a current flow given an adequate voltage bias is applied to the device. In the case of a APD/SPAD, the sensitive area would be a combination of an electrical field that pulls electrons created by photon absorption towards a multiplication area where a photon induced electron is amplified creating a breakdown avalanche of multiplied electrons.

A front side illuminated detector (e.g., as illustrated in FIG. 4D) has the input optical port at the same side as the metal layers residing on top of the semiconductor (Silicon). The metal layers are required to realize the electrical connections of each individual photodetector element (e.g., anode and cathode) with various elements such as: bias voltage, quenching/ballast elements, and other photodetectors in a common array. The optical port through which the photons impinge upon the detector sensitive area is comprised of a passage through the metal layer. It is noted that passage of light from some directions through this passage may be blocked by one or more metal layers (e.g., metal layer ML6, as illustrated for the leftmost detector elements 402 in FIG. 4D). Such blockage reduces the total optical light absorbing efficiency of the detector.

Figure 4E:
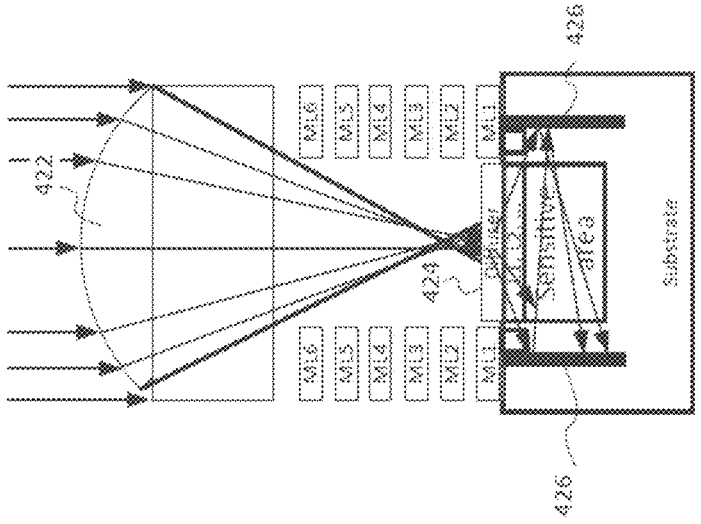
Figure 4E:
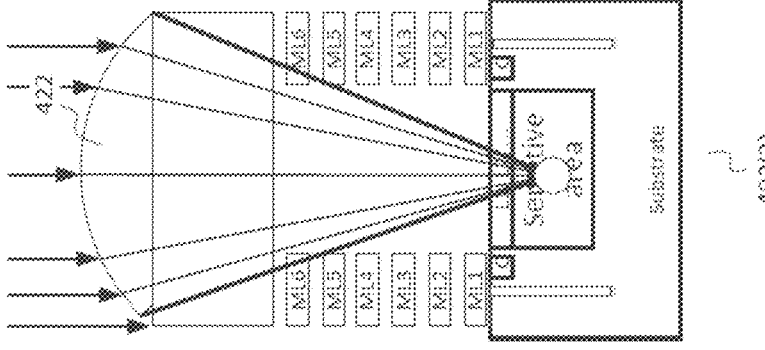
Figure 4E:
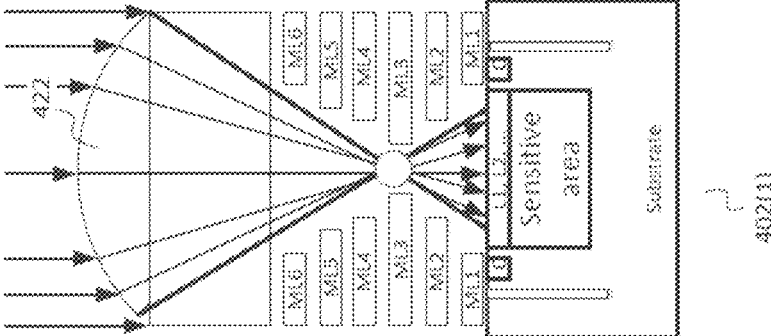

FIG. 4E illustrates three detection elements 402, each with an associated lens 422, in accordance with examples of the presently disclosed subject matter. Each of the three detection elements of FIG. 4E, denoted 402(1), 402(2), and 402(3), illustrates a lens configuration which may be implemented in associated with one or more of the detecting elements 402 of sensor 116. It is noted that combinations of these lens configurations may also be implemented.

In the lens configuration illustrated with regards to detection element 402(1), a focal point of the associated lens 422 may be located above the semiconductor surface. Optionally, openings in different metal layers of the detection element may have different sizes aligned with the cone of focusing light generated by the associated lens 422. Such a structure may improve the signal-to-noise and resolution of the array 400 as a whole device. Large metal layers may be important for delivery of power and ground shielding. This approach may be useful, e.g., with a monostatic LiDAR design with a narrow field of view where the incoming light beam is comprised of parallel rays and the imaging focus does not have any consequence to the detected signal.

In the lens configuration illustrated with regards to detection element 402(2), an efficiency of photon detection by the detection elements 402 may be improved by identifying a sweet spot. Specifically, a photodetector implemented in CMOS may have a sweet spot in the sensitive volume area where the probability of a photon creating an avalanche effect is the highest. Therefore, a focal point of lens 422 may be positioned inside the sensitive volume area at the sweet spot location, as demonstrated by detection elements 402(2). The lens shape and distance from the focal point may take into account the refractive indices of all the elements the laser beam is passing along the way from the lens to the sensitive sweet spot location buried in the semiconductor material.

In the lens configuration illustrated with regards to the detection element on the right of FIG. 4E, an efficiency of photon absorption in the semiconductor material may be improved using a diffuser and reflective elements. Specifically, a near IR wavelength requires a significantly long path of silicon material in order to achieve a high probability of absorbing a photon that travels through. In a typical lens configuration, a photon may traverse the sensitive area and may not be absorbed into a detectable electron. A long absorption path that improves the probability for a photon to create an electron renders the size of the sensitive area towards less practical dimensions (tens of um for example) for a CMOS device fabricated with typical foundry processes. The rightmost detector element in FIG. 4E demonstrates a technique for processing incoming photons. The associated lens 422 focuses the incoming light onto a diffuser element 424. In one embodiment, light sensor 116 may further include a diffuser located in the gap distant from the outer surface of at least some of the detectors. For example, diffuser 424 may steer the light beam sideways (e.g., as perpendicular as possible) towards the sensitive area and the reflective optical trenches 426. The diffuser is located at the focal point, above the focal point, or below the focal point. In this embodiment, the incoming light may be focused on a specific location where a diffuser element is located. Optionally, detector element 422 is designed to optically avoid the inactive areas where a photon induced electron may get lost and reduce the effective detection efficiency. Reflective optical trenches 426 (or other forms of optically reflective structures) cause the photons to bounce back and forth across the sensitive area, thus increasing the likelihood of detection. Ideally, the photons will get trapped in a cavity consisting of the sensitive area and the reflective trenches indefinitely until the photon is absorbed and creates an electron/hole pair.

Consistent with the present disclosure, a long path is created for the impinging photons to be absorbed and contribute to a higher probability of detection. Optical trenches may also be implemented in detecting element 422 for reducing cross talk effects of parasitic photons created during an avalanche that may leak to other detectors and cause false detection events. According to some embodiments, a photo detector array may be optimized so that a higher yield of the received signal is utilized, meaning, that as much of the received signal is received and less of the signal is lost to internal degradation of the signal. The photo detector array may be improved by: (a) moving the focal point at a location above the semiconductor surface, optionally by designing the metal layers above the substrate appropriately; (b) steering the focal point to the most responsive/sensitive area (or "sweet spot") of the substrate and (c) adding a diffuser above the substrate to steer the signal toward the "sweet spot" and/or adding reflective material to the trenches so that deflected signals are reflected back to the "sweet spot."

While in some lens configurations, lens 422 may be positioned so that its focal point is above a center of the corresponding detection element 402, it is noted that this is not necessarily so. In other lens configuration, a position of the focal point of the lens 422 with respect to a center of the corresponding detection element 402 is shifted based on a distance of the respective detection element 402 from a center of the detection array 400. This may be useful in relatively larger detection arrays 400, in which detector elements further from the center receive light in angles which are increasingly off-axis. Shifting the location of the focal points (e.g., toward the center of detection array 400) allows correcting for the incidence angles. Specifically, shifting the location of the focal points (e.g., toward the center of detection array 400) allows correcting for the incidence angles while using substantially identical lenses 422 for all detection elements, which are positioned at the same angle with respect to a surface of the detector.

Adding an array of lenses 422 to an array of detection elements 402 may be useful when using a relatively small sensor 116 which covers only a small part of the field of view because in such a case, the reflection signals from the scene reach the detectors array 400 from substantially the same angle, and it is, therefore, easy to focus all the light onto individual detectors. It is also noted, that in one embodiment, lenses 422 may be used in LIDAR system 100 to prioritize the overall probability of detection of the entire array 400 (preventing photons from being "wasted" in the dead area between detectors/sub-detectors) at the expense of spatial distinctiveness. This embodiment is in contrast to prior art implementations such as a CMOS RGB camera, which prioritize spatial distinctiveness (i.e., light that propagates in the direction of detection element A is not allowed to be directed by the lens toward detection element B, that is, to "bleed" to another detection element of the array). Optionally, sensor 116 includes an array of lenses 422, each being correlated to a corresponding detection element 402, while at least one of the lenses 422 deflects light which propagates to a first detection element 402 toward a second detection element 402 (thereby it may increase the overall probability of detection of the entire array).

Specifically, consistent with some embodiments of the present disclosure, light sensor 116 may include an array of light detectors (e.g., detector array 400), each light detector (e.g., detector 410) being configured to cause an electric current to flow when light passes through an outer surface of a respective detector. In addition, light sensor 116 may include at least one micro-lens configured to direct light toward the array of light detectors, the at least one micro-lens having a focal point. Light sensor 116 may further include at least one layer of conductive material interposed between the at least one micro-lens and the array of light detectors and having a gap therein to permit light to pass from the at least one micro-lens to the array, the at least one layer being sized to maintain a space between the at least one micro-lens and the array to cause the focal plane to be located in the gap, at a location spaced from the detecting surfaces of the array of light detectors.

In related embodiments, each detector may include a plurality of Single Photon Avalanche Diodes (SPADs) or a plurality of Avalanche Photo Diodes (APD). The conductive material may be a multi-layer metal constriction, and the at least one layer of conductive material may be electrically connected to detectors in the array. In one example, the at least one layer of conductive material includes a plurality of layers. In addition, the gap may be shaped to converge from the at least one micro-lens toward the focal point, and to diverge from a region of the focal point toward the array. In other embodiments, light sensor 116 may further include at least one reflector adjacent each photo detector. In one embodiment, a plurality of micro-lenses may be arranged in a lens array and the plurality of detectors may be arranged in a detector array. In another embodiment, the plurality of micro-lenses may include a single lens configured to project light to a plurality of detectors in the array.

Referring by way of a nonlimiting example to FIGS. 2E, 2F and 2G, it is noted that the one or more sensors 116 of system 100 may receive light from a scanning deflector 114 or directly from the FOV without scanning. Even if light from the entire FOV arrives to the at least one sensor 116 at the same time, in some implementations the one or more sensors 116 may sample only parts of the FOV for detection output at any given time. For example, if the illumination of projection unit 102 illuminates different parts of the FOV at different times (whether using a deflector 114 and/or by activating different light sources 112 at different times), light may arrive at all of the pixels or sensors 116 of sensing unit 106, and only pixels/sensors which are expected to detect the LIDAR illumination may be actively collecting data for detection outputs. This way, the rest of the pixels/sensors do not unnecessarily collect ambient noise. Referring to the scanning—in the outbound or in the inbound directions—it is noted that substantially different scales of scanning may be implemented. For example, in some implementations the scanned area may cover 1‰ or 0.10‰ of the FOV, while in other implementations the scanned area may cover 10% or 25% of the FOV. All other relative portions of the FOV values may also be implemented, of course.

The Processing Unit

Figure 5A:
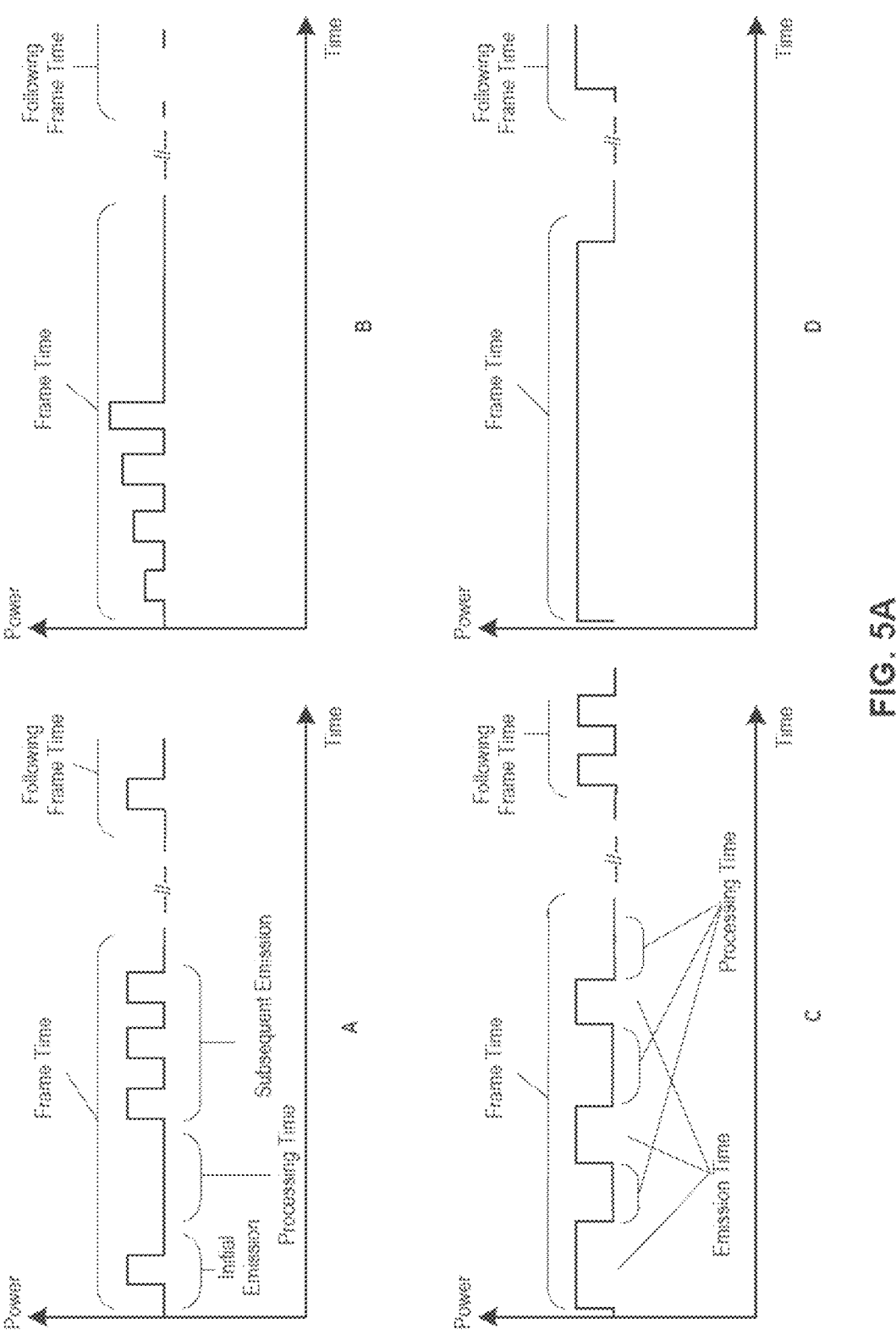
FIG. 5A includes four example diagrams illustrating emission patterns in a single frame-time for a single portion of the field of view.
Figure 5B:
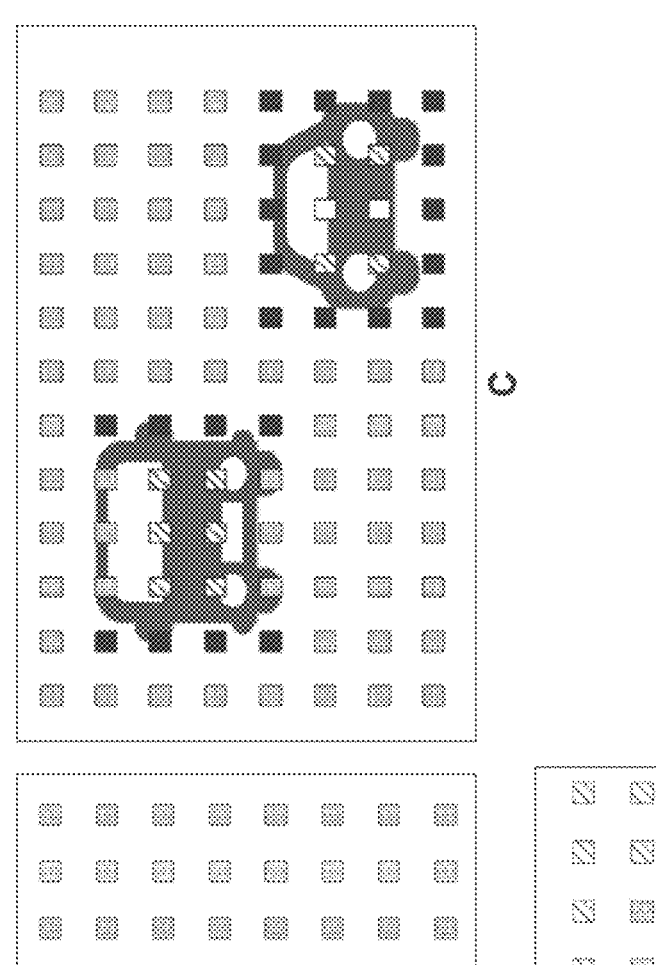
FIG. 5B includes three example diagrams illustrating emission scheme in a single frame-time for the whole field of view.
Figure 5B:
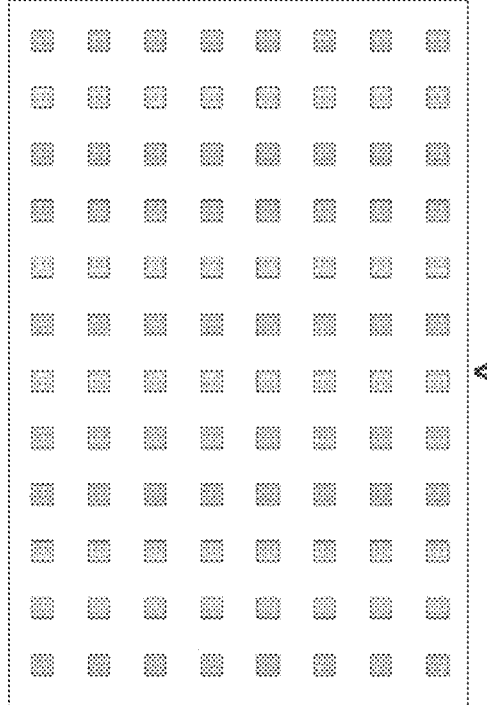
Figure 5B:
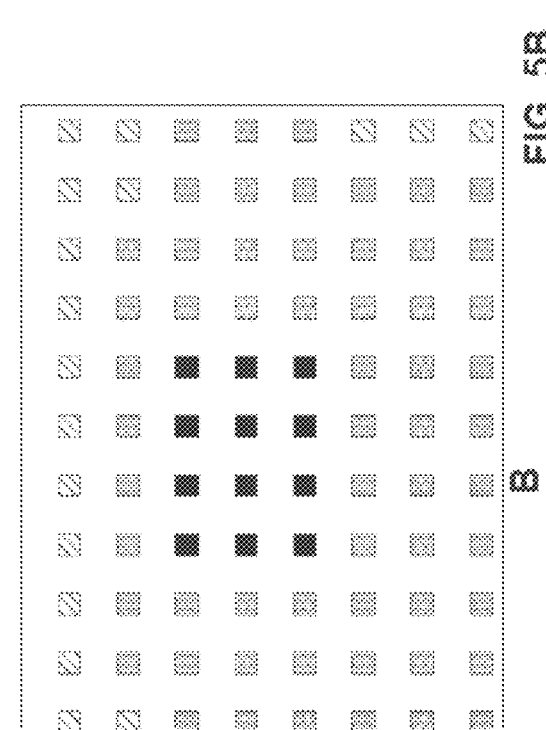
Figure 5C:
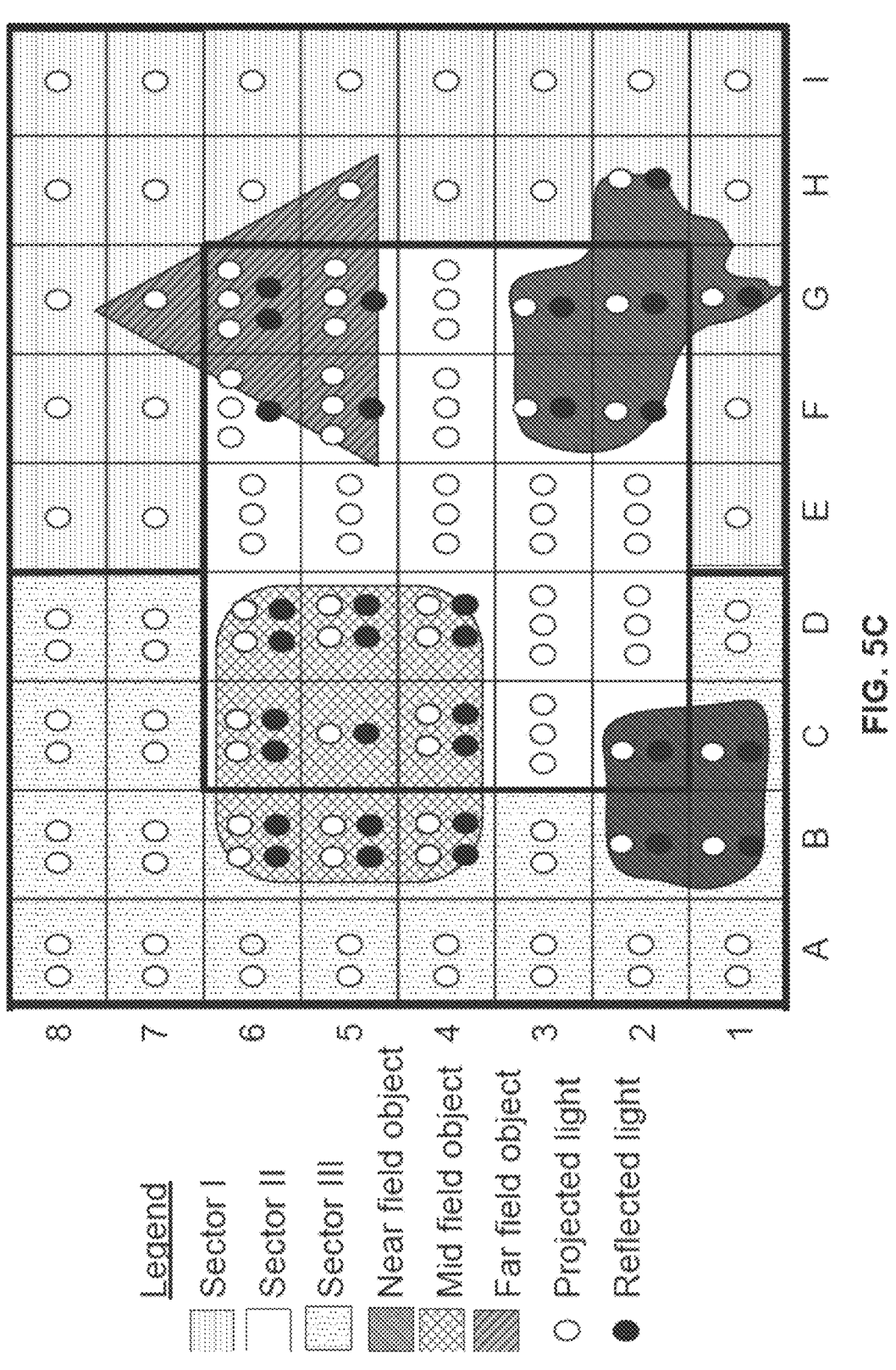
FIG. 5C is a diagram illustrating the actual light emission projected towards and reflections received during a single frame-time for the whole field of view.

FIGS. 5A-5C depict different functionalities of processing units 108 in accordance with some embodiments of the present disclosure. Specifically, FIG. 5A is a diagram illustrating emission patterns in a single frame-time for a single portion of the field of view, FIG. 5B is a diagram illustrating emission scheme in a single frame-time for the whole field of view, and FIG. 5C is a diagram illustrating the actual light emission projected towards a field of view during a single scanning cycle.

FIG. 5A illustrates four examples of emission patterns in a single frame-time for a single portion 122 of field of view 120 associated with an instantaneous position of at least one light deflector 114. Consistent with embodiments of the present disclosure, processing unit 108 may control at least one light source 112 and light deflector 114 (or coordinate the operation of at least one light source 112 and at least one light deflector 114) in a manner enabling light flux to vary over a scan of field of view 120. Consistent with other embodiments, processing unit 108 may control only at least one light source 112 and light deflector 114 may be moved or pivoted in a fixed predefined pattern.

Diagrams A-D in FIG. 5A depict the power of light emitted towards a single portion 122 of field of view 120 over time. In Diagram A, processor 118 may control the operation of light source 112 in a manner such that during scanning of field of view 120 an initial light emission is projected toward portion 122 of field of view 120. When projecting unit 102 includes a pulsed-light light source, the initial light emission may include one or more initial pulses (also referred to as "pilot pulses"). Processing unit 108 may receive from sensor 116 pilot information about reflections associated with the initial light emission. In one embodiment, the pilot information may be represented as a single signal based on the outputs of one or more detectors (e.g. one or more SPADs, one or more APDs, one or more SiPMs, etc.) or as a plurality of signals based on the outputs of multiple detectors. In one example, the pilot information may include analog and/or digital information. In another example, the pilot information may include a single value and/or a plurality of values (e.g. for different times and/or parts of the segment).

Based on information about reflections associated with the initial light emission, processing unit 108 may be configured to determine the type of subsequent light emission to be projected towards portion 122 of field of view 120. The determined subsequent light emission for the particular portion of field of view 120 may be made during the same scanning cycle (i.e., in the same frame) or in a subsequent scanning cycle (i.e., in a subsequent frame).

In Diagram B, processor 118 may control the operation of light source 112 in a manner such that during scanning of field of view 120 light pulses in different intensities are projected towards a single portion 122 of field of view 120. In one embodiment, LIDAR system 100 may be operable to generate depth maps of one or more different types, such as any one or more of the following types: point cloud model, polygon mesh, depth image (holding depth information for each pixel of an image or of a 2D array), or any other type of 3D model of a scene. The sequence of depth maps may be a temporal sequence, in which different depth maps are generated at a different time. Each depth map of the sequence associated with a scanning cycle (interchangeably "frame") may be generated within the duration of a corresponding subsequent frame-time. In one example, a typical frame-time may last less than a second. In some embodiments, LIDAR system 100 may have a fixed frame rate (e.g. 10 frames per second, 25 frames per second, 50 frames per second) or the frame rate may be dynamic. In other embodiments, the frame-times of different frames may not be identical across the sequence. For example, LIDAR system 100 may implement a 10 frames-per-second rate that includes generating a first depth map in 100 milliseconds (the average), a second frame in 92 milliseconds, a third frame at 142 milliseconds, and so on.

In Diagram C, processor 118 may control the operation of light source 112 in a manner such that during scanning of field of view 120 light pulses associated with different durations are projected towards a single portion 122 of field of view 120. In one embodiment, LIDAR system 100 may be operable to generate a different number of pulses in each frame. The number of pulses may vary between 0 to 32 pulses (e.g., 1, 5, 12, 28, or more pulses) and may be based on information derived from previous emissions. The time between light pulses may depend on desired detection range and can be between 500 ns and 5000 ns. In one example, processing unit 108 may receive from sensor 116 information about reflections associated with each light-pulse. Based on the information (or the lack of information), processing unit 108 may determine if additional light pulses are needed. It is noted that the durations of the processing times and the emission times in diagrams A-D are not in-scale. Specifically, the processing time may be substantially longer than the emission time. In diagram D, projecting unit 102 may include a continuous-wave light source. In one embodiment, the initial light emission may include a period of time where light is emitted and the subsequent emission may be a continuation of the initial emission, or there may be a discontinuity. In one embodiment, the intensity of the continuous emission may change over time.

Consistent with some embodiments of the present disclosure, the emission pattern may be determined per each portion of field of view 120. In other words, processor 118 may control the emission of light to allow differentiation in the illumination of different portions of field of view 120. In one example, processor 118 may determine the emission pattern for a single portion 122 of field of view 120, based on detection of reflected light from the same scanning cycle (e.g., the initial emission), which makes LIDAR system 100 extremely dynamic. In another example, processor 118 may determine the emission pattern for a single portion 122 of field of view 120, based on detection of reflected light from a previous scanning cycle. The differences in the patterns of the subsequent emissions may result from determining different values for light-source parameters for the subsequent emission, such as any one of the following:

a. Overall energy of the subsequent emission.

b. Energy profile of the subsequent emission.

c. A number of light-pulse-repetition per frame.

d. Light modulation characteristics such as duration, rate, peak, average power, and pulse shape.

e. Wave properties of the subsequent emission, such as polarization, wavelength, etc.

Consistent with the present disclosure, the differentiation in the subsequent emissions may be put to different uses. In one example, it is possible to limit emitted power levels in one portion of field of view 120 where safety is a consideration, while emitting higher power levels (thus improving signal-to-noise ratio and detection range) for other portions of field of view 120. This is relevant for eye safety, but may also be relevant for skin safety, safety of optical systems, safety of sensitive materials, and more. In another example, it is possible to direct more energy towards portions of field of view 120 where it will be of greater use (e.g. regions of interest, further distanced targets, low reflection targets, etc.) while limiting the lighting energy to other portions of field of view 120 based on detection results from the same frame or previous frame. It is noted that processing unit 108 may process detected signals from a single instantaneous field of view several times within a single scanning frame time; for example, subsequent emission may be determined after each pulse emission, or after a number of pulse emissions.

FIG. 5B illustrates three examples of emission schemes in a single frame-time for field of view 120. Consistent with embodiments of the present disclosure, at least on processing unit 108 may use obtained information to dynamically adjust the operational mode of LIDAR system 100 and/or determine values of parameters of specific components of LIDAR system 100. The obtained information may be determined from processing data captured in field of view 120, or received (directly or indirectly) from host 210. Processing unit 108 may use the obtained information to determine a scanning scheme for scanning the different portions of field of view 120. The obtained information may include a current light condition, a current weather condition, a current driving environment of the host vehicle, a current location of the host vehicle, a current trajectory of the host vehicle, a current topography of road surrounding the host vehicle, or any other condition or object detectable through light reflection. In some embodiments, the determined scanning scheme may include at least one of the following: (a) a designation of portions within field of view 120 to be actively scanned as part of a scanning cycle, (b) a projecting plan for projecting unit 102 that defines the light emission profile at different portions of field of view 120; (c) a deflecting plan for scanning unit 104 that defines, for example, a deflection direction, frequency, and designating idle elements within a reflector array; and (d) a detection plan for sensing unit 106 that defines the detectors sensitivity or responsivity pattern.

In addition, processing unit 108 may determine the scanning scheme at least partially by obtaining an identification of at least one region of interest within the field of view 120 and at least one region of non-interest within the field of view 120. In some embodiments, processing unit 108 may determine the scanning scheme at least partially by obtaining an identification of at least one region of high interest within the field of view 120 and at least one region of lower-interest within the field of view 120. The identification of the at least one region of interest within the field of view 120 may be determined, for example, from processing data captured in field of view 120, based on data of another sensor (e.g. camera, GPS), received (directly or indirectly) from host 210, or any combination of the above. In some embodiments, the identification of at least one region of interest may include identification of portions, areas, sections, pixels, or objects within field of view 120 that are important to monitor. Examples of areas that may be identified as regions of interest may include crosswalks, moving objects, people, nearby vehicles or any other environmental condition or object that may be helpful in vehicle navigation. Examples of areas that may be identified as regions of non-interest (or lower-interest) may be static (non-moving) far-away buildings, a skyline, an area above the horizon and objects in the field of view. Upon obtaining the identification of at least one region of interest within the field of view 120, processing unit 108 may determine the scanning scheme or change an existing scanning scheme. Further to determining or changing the light-source parameters (as described above), processing unit 108 may allocate detector resources based on the identification of the at least one region of interest. In one example, to reduce noise, processing unit 108 may activate detectors 410 where a region of interest is expected and disable detectors 410 where regions of non-interest are expected. In another example, processing unit 108 may change the detector sensitivity, e.g., increasing sensor sensitivity for long range detection where the reflected power is low.

Diagrams A-C in FIG. 5B depict examples of different scanning schemes for scanning field of view 120. Each square in field of view 120 represents a different portion 122 associated with an instantaneous position of at least one light deflector 114. Legend 500 details the level of light flux represented by the filling pattern of the squares. Diagram A depicts a first scanning scheme in which all of the portions have the same importance/priority and a default light flux is allocated to them. The first scanning scheme may be utilized in a start-up phase or periodically interleaved with another scanning scheme to monitor the whole field of view for unexpected/new objects. In one example, the light source parameters in the first scanning scheme may be configured to generate light pulses at constant amplitudes. Diagram B depicts a second scanning scheme in which a portion of field of view 120 is allocated with high light flux while the rest of field of view 120 is allocated with default light flux and low light flux. The portions of field of view 120 that are the least interesting may be allocated with low light flux. Diagram C depicts a third scanning scheme in which a compact vehicle and a bus (see silhouettes) are identified in field of view 120. In this scanning scheme, the edges of the vehicle and bus may be tracked with high power and the central mass of the vehicle and bus may be allocated with less light flux (or no light flux). Such light flux allocation enables concentration of more of the optical budget on the edges of the identified objects and less on their center which have less importance.

FIG. 5C illustrating the emission of light towards field of view 120 during a single scanning cycle. In the depicted example, field of view 120 is represented by an 8×9 matrix, where each of the 72 cells corresponds to a separate portion 122 associated with a different instantaneous position of at least one light deflector 114. In this exemplary scanning cycle, each portion includes one or more white dots that represent the number of light pulses projected toward that portion, and some portions include black dots that represent reflected light from that portion detected by sensor 116. As shown, field of view 120 is divided into three sectors: sector I on the right side of field of view 120, sector II in the middle of field of view 120, and sector III on the left side of field of view 120. In this exemplary scanning cycle, sector I was initially allocated with a single light pulse per portion; sector II, previously identified as a region of interest, was initially allocated with three light pulses per portion; and sector III was initially allocated with two light pulses per portion. Also as shown, scanning of field of view 120 reveals four objects 208: two free-form objects in the near field (e.g., between 5 and 50 meters), a rounded-square object in the mid field (e.g., between 50 and 150 meters), and a triangle object in the far field (e.g., between 150 and 500 meters). While the discussion of FIG. 5C uses number of pulses as an example of light flux allocation, it is noted that light flux allocation to different parts of the field of view may also be implemented in other ways such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. The illustration of the light emission as a single scanning cycle in FIG. 5C demonstrates different capabilities of LIDAR system 100. In a first embodiment, processor 118 is configured to use two light pulses to detect a first object (e.g., the rounded-square object) at a first distance, and to use three light pulses to detect a second object (e.g., the triangle object) at a second distance greater than the first distance. In a second embodiment, processor 118 is configured to allocate more light to portions of the field of view where a region of interest is identified. Specifically, in the present example, sector II was identified as a region of interest and accordingly it was allocated with three light pulses while the rest of field of view 120 was allocated with two or less light pulses. In a third embodiment, processor 118 is configured to control light source 112 in a manner such that only a single light pulse is projected toward to portions B1, B2, and C1 in FIG. 5C, although they are part of sector III that was initially allocated with two light pulses per portion. This occurs because the processing unit 108 detected an object in the near field based on the first light pulse. Allocation of less than maximal amount of pulses may also be a result of other considerations. For example, in at least some regions, detection of object at a first distance (e.g. a near field object) may result in reducing an overall amount of light emitted to this portion of field of view 120.

Additional details and examples on different components of LIDAR system 100 and their associated functionalities are included in Applicant's U.S. patent application Ser. No. 15/391,916 filed Dec. 28, 2016; Applicant's U.S. patent application Ser. No. 15/393,749 filed Dec. 29, 2016; Applicant's U.S. patent application Ser. No. 15/393,285 filed Dec. 29, 2016; and Applicant's U.S. patent application Ser. No. 15/393,593 filed Dec. 29, 2016, which are incorporated herein by reference in their entirety.

Bi-Axial Mechanical Scanner

As described in the sections above, scanning LIDAR systems according to the disclosed embodiments may include a biaxial scanner for scanning laser light over a horizontal and vertical scan range to provide the LIDAR FOV. In some cases, as discussed, the scanner may include one or more MEMs mirrors. MEMs scanners offer many desirable properties, especially with respect to certain applications. In some cases, however, MEMs scanners may be associated with challenges. For example, in some applications, it may be desirable to increase an aperture size (e.g., to enable scanning over a larger FOV) by increasing the size of the MEMs scanning mirror(s). Increasing the MEMs mirror size, however, increases the mass and inertia of the mirror system and, in many cases, may overwhelm the capabilities of the MEMs actuators (e.g., bender arms, couplers, etc.). Rather than increasing the size of a MEMs scanning mirror to increase the LIDAR aperture/FOV, the number of MEMs scanning mirrors in the scanning system may also be increased (e.g., a mirror for the Tx channel and two or more mirrors for the Rx channel, among other configurations). Such solutions, however, increase the number of moving parts (e.g., mirrors, actuators, etc.), especially where each scanning mirror includes multiple actuators for scanning in more than one dimension. The increases in number of parts leads to more complexity, for example, in coordinating the control of the individual scanning mirrors, developing suitable light projection systems, and developing suitable detector configurations to function with a multi-mirror scanning system. MEMs scanning systems also include volatile materials used in the actuators and require hermetic sealing. The additional parts and complexity can significantly increase system cost—an attribute not desirable in most industries, but especially in the vehicle manufacturing industry where cost sensitivity is acute. The added complexity (and sealing requirements) may also impact reliability—another attribute especially important in many industries.

Other scanning systems may include galvo scanners to rotate a scanning mirror in a LIDAR system. Each galvo scanner includes a galvo motor configured to rotate a shaft or other linkage about a single axis. Therefore, in order to rotate a mirror about two axes to provide a two-dimensional scan of a LIDAR FOV, two galvo motors would be needed. Such systems offer their own challenges. Galvo motors are large, especially in relation to other LIDAR mirror scanning solutions. They require more power than other solutions to provide desired mirror scanning rates and, as a result, generate more heat, which can be difficult to dissipate. Galvo motor scanners may also be unsuitable for multi-laser sources projected on a scanning mirror at different incident angles.

In some embodiments, a LIDAR scanning system may include a mirror rotated with one or more actuators including a magnet and an electrically conductive coil. Such actuators, may include voice coil actuators (magnetic motors) configured to rotate a shaft or linkage about a central axis (rotary voice coil actuator) or move a shaft or linkage back and forth (linear voice coil actuator). Generally, voice coils operate based on an application of the Lorentz force, which is results from point charges moving in coils of wire, for example, in the presence of magnetic flux lines. The cross product of the point charge motion vector, having a direction determined by the current in the coil, and the magnetic field vector results in a force perpendicular to both. The direction of the force can be reversed by reversing the direction of the current in the coil, which is a technique used, e.g., in voice coil actuators including permanent magnets.

The disclosed LIDAR scanning system may include magnet and coil based actuators to rotate a mirror in two axes to enable biaxial scanning. For example, the scanning mirror oscillation may be driven by a conductive coil positioned in a magnetic field. The coil can be directly or indirectly coupled to the mirror. Based on the Lorentz force principle, when a driving signal is applied to the coil, inducing a current, the coil is urged in a direction perpendicular to the magnetic field and the direction of the current flow, generating a torque on the mirror.

The voice coil actuators of the presently disclosed embodiments may offer several potential advantages. They are precise, capable of high acceleration, are very small, and have low noise levels and weight. They have a simple design, are reliable, and have a high motor constant and a linear response.

Figure 6:
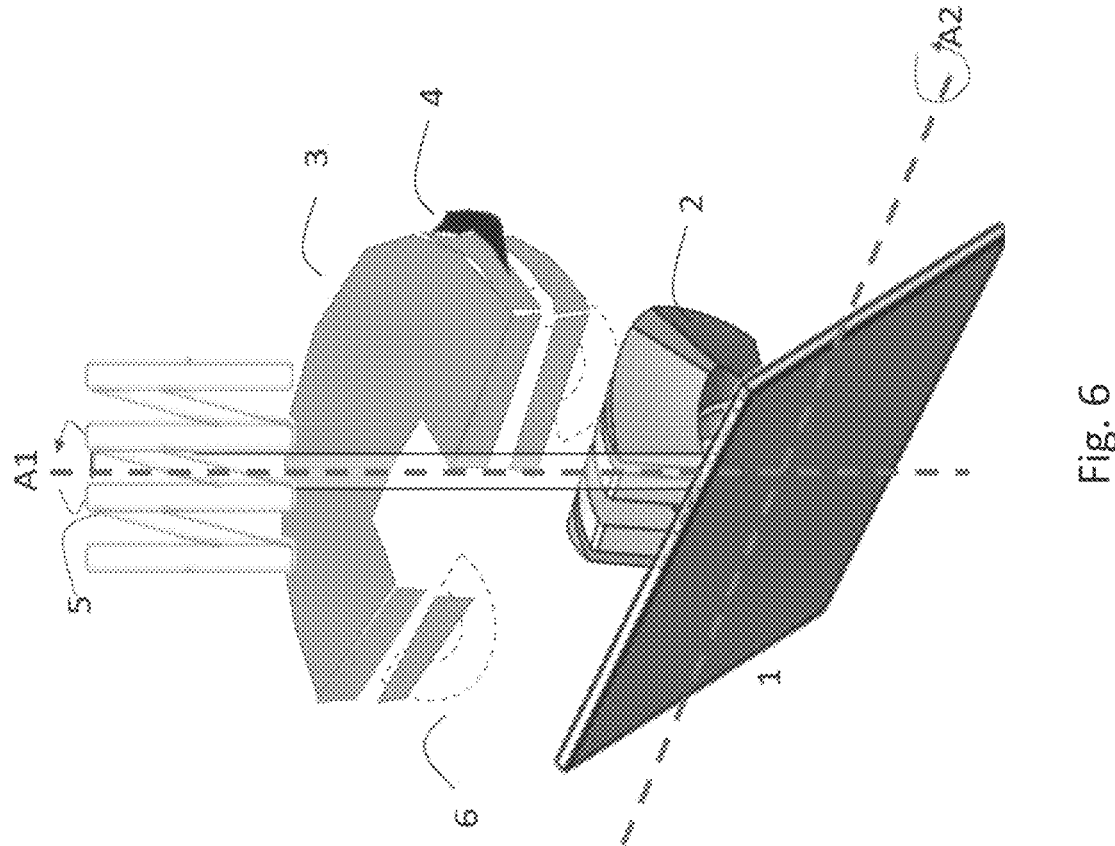
FIG. 6 is a schematic view of a biaxial scanning assembly according to one embodiment of the present invention.

FIG. 6 represents an example of a biaxial scanning system reliant upon a system of coils and magnets to provide a biaxial scanning capability. For example, mirror (1) may be rotated both around axis A1 and also about axis A2 using the actuator system described in more detail below.

Figure 7:
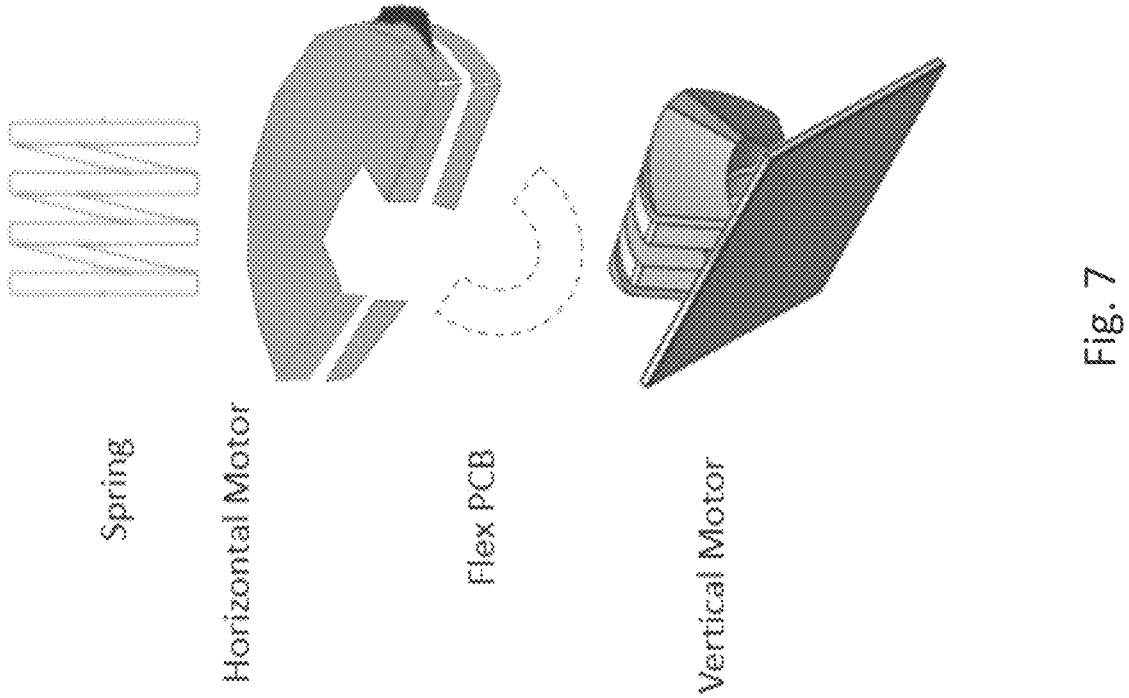
FIG. 7 is an exploded view of a biaxial scanning assembly according to one embodiment of the present invention.

FIG. 7 provides an exploded assembly view of the biaxial scanning system. The system includes a horizontal motor for scanning the mirror 1 about axis A1 and a vertical motor for scanning the mirror about axis A2. Notably, in this example configuration, the horizontal motor rotates the entire assembly, including the vertical motor, the mirror, and the other components of the assembly about axis A1.

Mirror

The scanning mirror system may include various configurations and components for providing a desired set of scanning parameters. The mirror (1) used to steer the emitted light beams may have a substrate layer (e.g., 15 mm fused silica), and a reflective layer (e.g. a nm thickness gold layer, or protected silver), and may include additional layers. The dimensions of the reflective surface may be between 15-22 mm, area 300-450 mm$^2$. The reflective surface may be square, rectangular, rounded rectangular, rectangular with clipped corners, circular, elliptical, etc. Other shapes and configurations of the substrate and/or reflective layer may be used, including single piece mirrors, multi-layer sandwich designs, composite substrates, porous substrates, etc.

Vertical Motor

Figure 8:
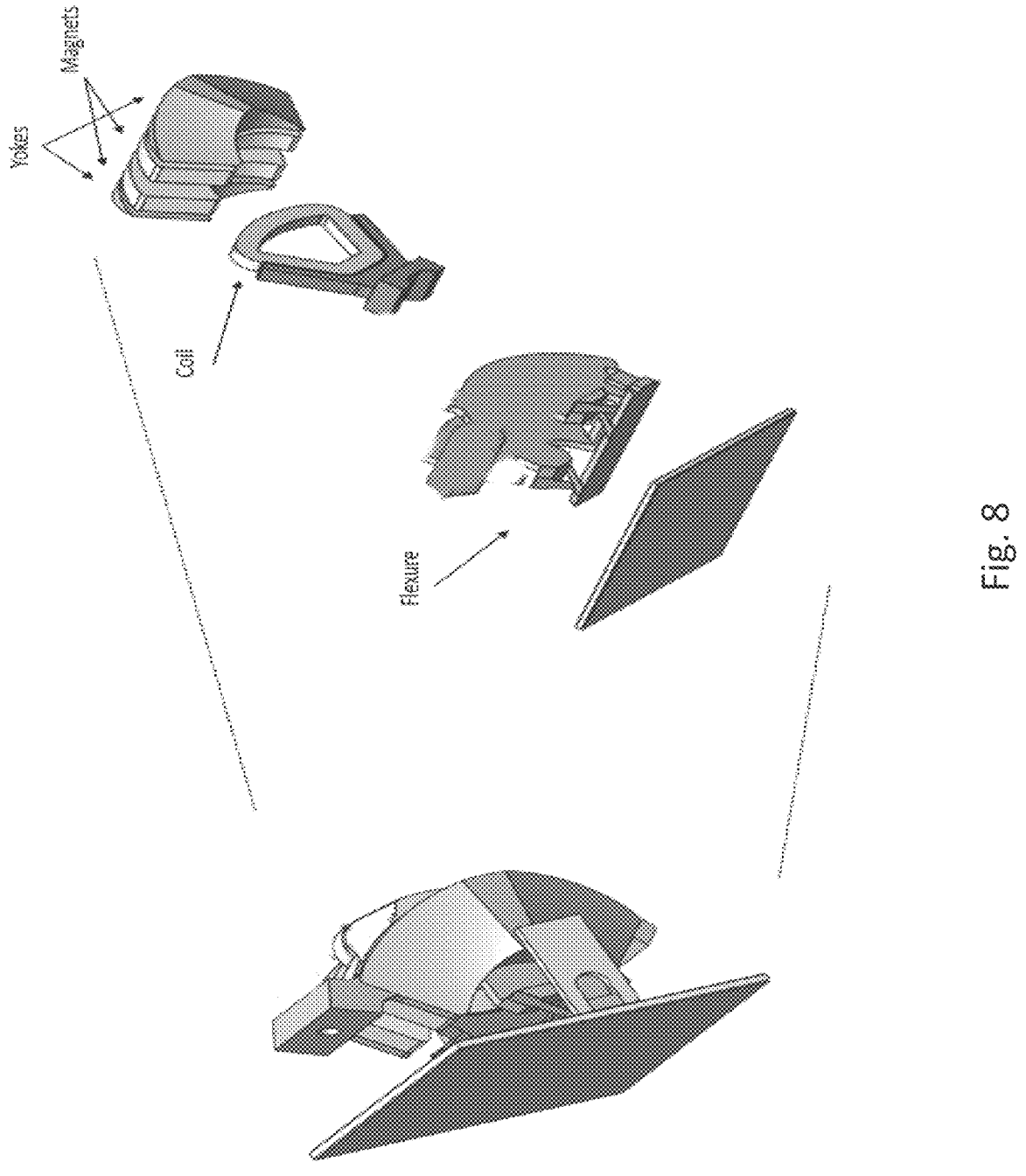
FIG. 8 is an exploded view of a biaxial scanning assembly according to one embodiment of the present invention.

An exploded assembly view of one example of the vertical motor is shown in FIG. 8.

The mirror is rotated about axis A2 (e.g., the vertical scan axis) by motor 2. In some embodiments, motor 2 may provide a capacity for vertical mirror rotation of +/−13 degrees about axis A2. In some cases, motor 2 may provide+/− rotational capacities of between 10 and 20 degrees. Motor 2 may include a coil coupled with the mirror, located between 2 magnets (the inner motor magnets) and two yokes. Alternatively, a single yoke may be used.

Coil

The coil may include any suitable conductor (e.g., copper or aluminum wire (or silver), or another electrically conductive wire). The copper wire may be tin plated. In cases where aluminum wire is used, the aluminum wire may be nickel plated. The wire thickness may be between 0.1-5 mm, for example 1.5 mm to 3 mm. The wire may be wound between 80 and 200 turns, preferably with an orthocyclic pattern. If the coil thickness is increased, the distance between the magnet and the coil decreases, increasing magnetic field and turn force, but decreasing the air gap space available for rotations. The coil may be directly or indirectly coupled to the mirror. The coil may be mounted on a substrate that can be coupled to the mirror. The coil may be coupled to the mirror with a flexure.

The system may include a coil temperature monitoring system that may monitor both voltage and current over the coil. For example, in some cases the resistivity and/or instantaneous power may be deduced. The resistivity of the coil may be monitored to determine corresponding temperature of the coil. In the event that the temperature monitor indicates that the coil has exceeded a predetermined threshold resistivity/temperature value, the system may trigger a response. For example, the response may include generating a warning (e.g., to be sent to one or more control units, etc.) or initiating a cooling system, reduced scanning mode, etc. to reduce the temperature of the coil.

Magnets and Yokes

Motor 2 may include one or more magnets. These magnets may be situated above and/or below the coil. The one or more magnets will create an associated magnetic field arranged to cause a force on the coil (in response to a current in the coil) causing the coil to move. Ferromagnetic yokes may be coupled with the magnets to generate a magnetic circuit, or confine the magnetic field to the designed configuration for generating an appropriate torque on the coil in order to rotate the mirror about axis A2. The yokes may include any magnetic alloy (e.g., steel, etc.).

Horizontal Motor

Figure 9:
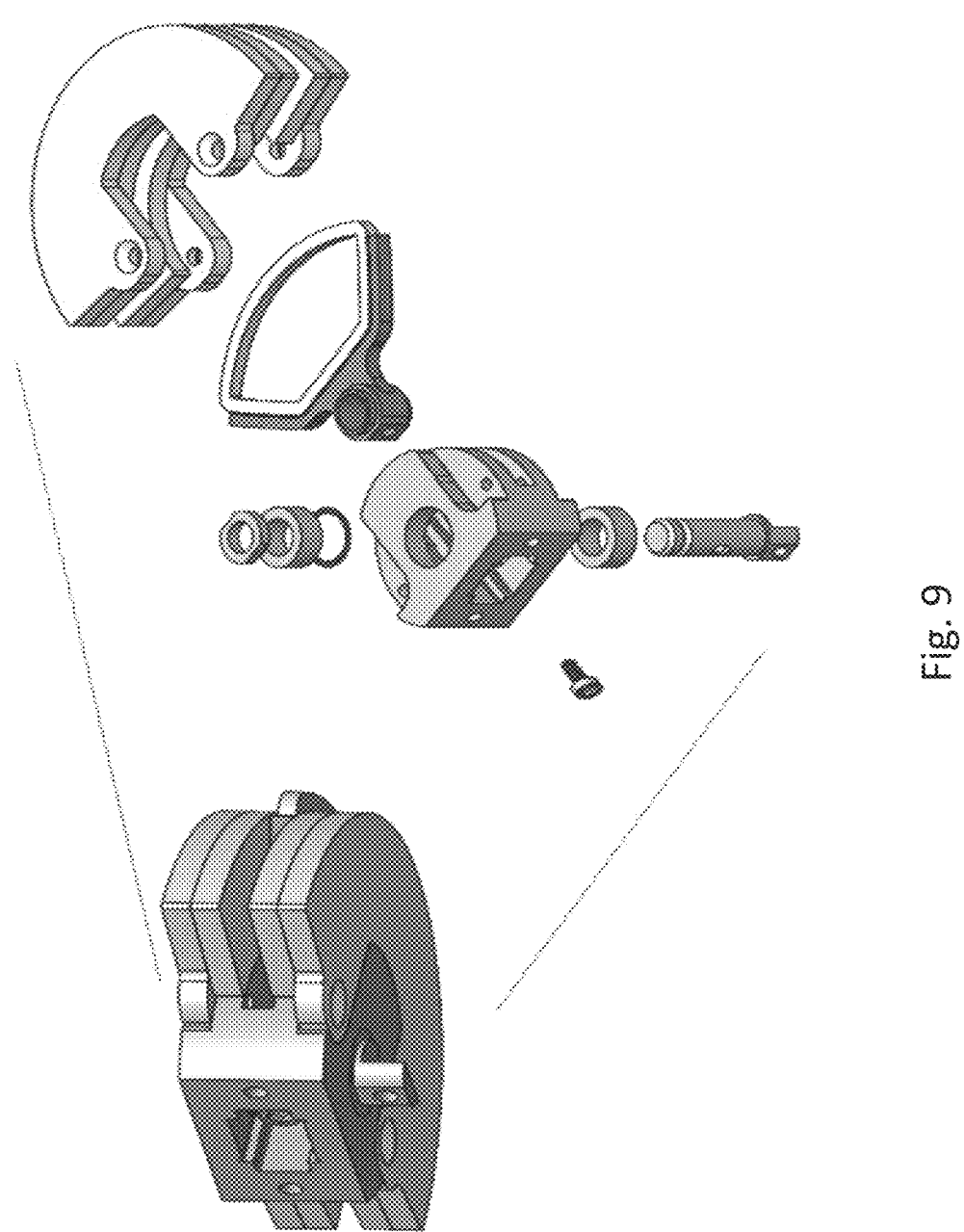
FIG. 9 is an exploded view of a biaxial scanning assembly according to one embodiment of the present invention.

FIG. 9 provides an exploded assembly view of an example of a horizontal motor configured to rotate mirror 1 about axis A1.

Figure 10:
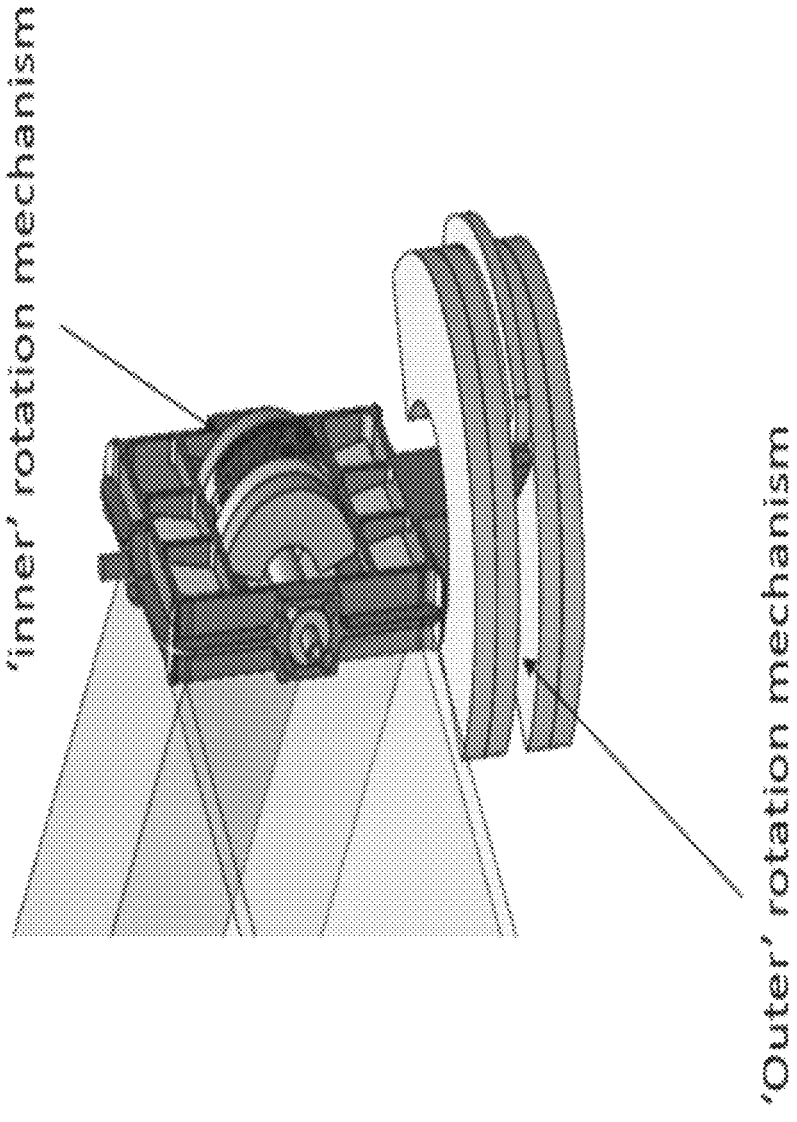
FIG. 10 is a schematic view of a biaxial scanning assembly according to one embodiment of the present invention.

In some cases, the horizontal mirror may rotate the mirror ±35-40 deg about axis A1. As noted, in certain configurations, this motor can rotate the entire inner assembly about Axis A1 with a coil situated between two (or more) magnets and two yokes. Because the horizontal motor rotates the entire inner assembly, the horizontal motor may be configured to produce a larger torque as compared to the vertical motor. Thus, the size of the coil and respective magnets associated with the horizontal may also be larger than corresponding components of the vertical mirror. The horizontal motor parts may be situated above, below, or behind the mirror. Locating the motor above or below the mirror may provide certain advantages, such as helping to maintain a compact magnet configuration. It should be noted that the horizontal motor may be positioned above the mirror or below the mirror, as illustrated in FIG. 10.

Mounting the horizontal motor below the mirror may enable a more compact system, as the yokes associated with the horizontal mirror may have sufficient clearance relative to the mirror to not interfere with the mirror or optics during rotation. In some cases, if rotation of the mirror results in an overlap between the reflecting surface of the mirror and motor parts, such as the yokes of the horizontal scanning mirror, there can be unwanted blockages of light reflected from the mirror surface. To address such an issue, the mirror may be rotated relative to an appropriate motor rotation axis. For example, the mirror may be tilted relative one or more of the motor rotational axes A1 and A2, so that the mirror does not reside in the plane including axes A1 and A2 or such that it is not perpendicular to the plane including axes A1 and A2, depending on the configuration.

Yokes for Suspending the Mirror

In examples of the disclosed embodiments, the bi-axial oscillating mirror rotates about an inner rotation axis A2, actuated by the inner motor (e.g., the vertical scanning motor). The "outer" rotation of the entire inner system about axis A1 is actuated by the outer motor (e.g., the horizontal scanning motor). In an exemplary embodiment, the inner rotation results in vertical scanning, and the outer rotation results in horizontal scanning.

Figure 11:
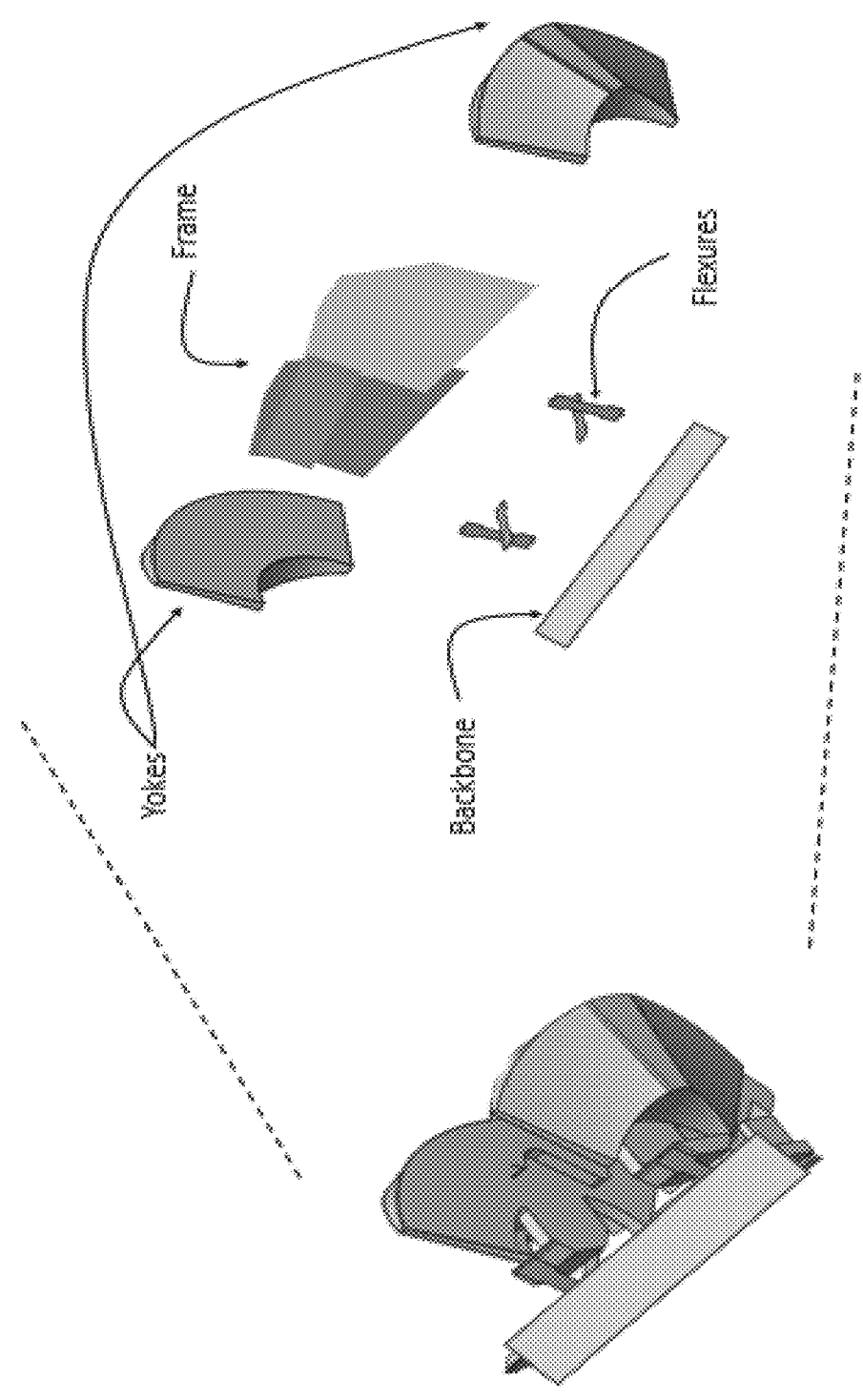
FIG. 11 is an exploded view of a biaxial scanning assembly according to one embodiment of the present invention.

In the exemplary scanning mirror system, the system may include: an outer motor, and an inner motor. The inner motor may be coupled to the mirror via a structure including both a yoke and the suspension for the inner system. Such a configuration is shown in the exploded view in FIG. 11.

Support Structure Incorporating Yoke

The support structure may include a frame, yokes coupled to the frame, a backbone, and a spring coupling mechanism to couple the support with the backbone. The spring coupling mechanism may, for example, include leaf flexures as shown above. The coupling mechanism using flexures enables the mirror to rotate without the use of a pivot rod, shaft, bearings, etc.

The frame may be rigidly coupled with the yokes by welding, adhesive, mechanical coupling means (e.g. screws, etc). The flexures may be welded, brazed, or soldered to the frame and the backbone. Alternatively, the frame and yokes may be one single part, made from the same material. The frame and yokes may be manufactured from ferromagnetic materials, magnetic alloys, etc. For example, the yoke and frame may include steel, stainless steel, ferromagnetic stainless steel, etc. Additionally, the coupling mechanism and backbone may be made of the same material, e.g. steel.

The yoke may be shaped to enable the required magnetic field strength for a particular application while reducing the mass of the magnet and yoke system. One example of a yoke shape is shown in FIGS. 12A, 12B, and 12C.

Figure 12A:
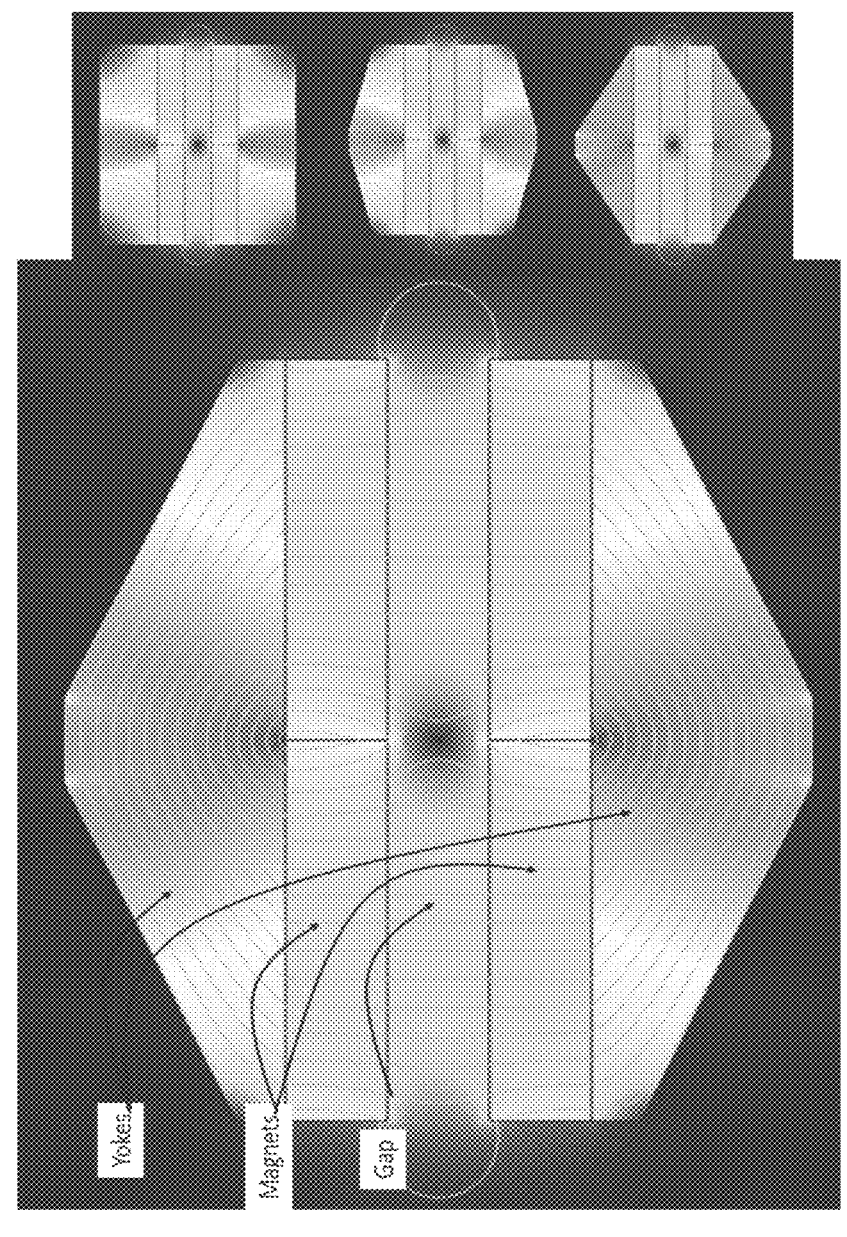
FIG. 12A, FIG. 12B, and FIG. 12C are front, top and side view, respectively, of a yoke that can be employed in example embodiments of the present invention.
Figure 12C:
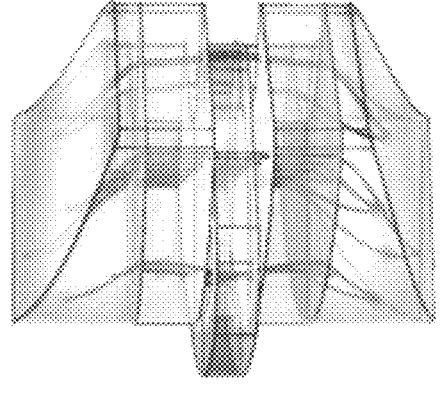
Figure 12B:
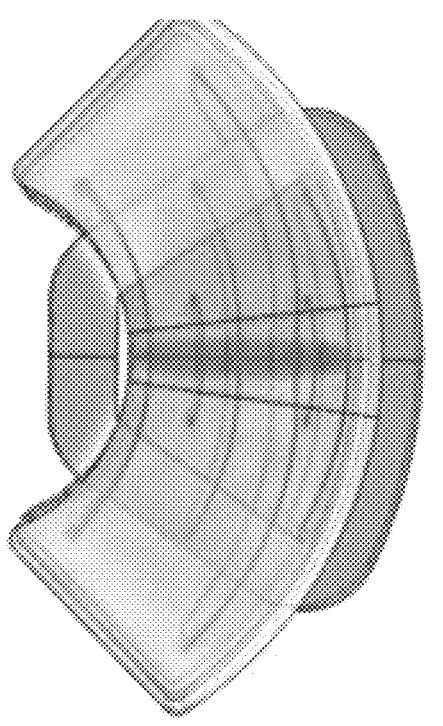

FIG. 12A provides a cross section view of the magnet and yokes showing the magnetic field lines and strength in the yokes, the magnet, and in the gap between the magnets in which the coil is situated. The magnetic field depends on the thickness of the yokes and the magnets. Any superfluous parts of the yoke may be removed in order to reduce the mass of the system. The thickness of the parts (magnets and yokes) may selected to provide a desired magnetic field strength.

In some cases, e.g., where certain parts of the support structure are composed of compatible materials, those parts may be welded together. For example, the yokes may be welded to the frame, the leaves of the flexures may be welded to the frame and the backbone, etc.

If the yokes and frame are fabricated as one part, no welding is required. Such a configuration may have certain advantages. For example, the entire suspension and motor may be located behind the mirror, avoiding optical interference with light beams emitted towards and reflected away from the face of the mirror. The frame and yoke may be lighter and more compact than alternative designs, reducing power requirements of the outer motor. The need for separate fasteners may be eliminated. The yokes may be incorporated as a single part of the frame and rigidly connected. In contrast with other magnetic designs, the yokes may be supported by the frame, or by a static element in the system. The system may have reduced inertia, offering desirable dynamic response and properties.

Resonant and Quasi-Static Drive of a Bi-Axial Mechanical Scanner

The bi-axial scanning mirror system described above may offer several potential advantages, including, for example, a larger mirror/aperture, significant reductions in cost and complexity relative to certain MEMs-based designs, increased reliability, etc. The increase in mirror size, however, and inclusion of motors for bi-axial rotation of the larger mirror also increases the mass and inertia associated with the system components, which can affect the dynamic behavior of the system components. For example, the mass and inertia of the system, coupled with desired scanning rates for LIDAR systems, can present challenges associated with heat dissipation due to the relatively high power/current levels needed to scan the mirror. To address these challenges, it may be desirable to take advantage of system resonance modes in scanning in one or more of the vertical or horizontal directions. Resonant scanning can reduce the current levels needed to oscillate the mirror at the rates/ frequencies of interest.

One potential issue associated with resonant scanning, however, is the non-linear motion experienced by the mirror over the scan range. For example, as the mirror is scanned at resonance in the horizontal (or vertical) direction, its scan speed may vary sinusoidally such that the mirror slows toward the extremes of the scanning range, but speeds to a maximum scan speed at the midpoint of a scan line. In many LIDAR systems, the center of the scan lines generally coincide with areas of high interest (e.g., directly ahead of a vehicle near the horizon, etc.), while areas at the extreme edges of a scan (e.g., coinciding with areas to the left or right of the vehicle) may be of less interest. The higher scan speeds of the mirror near the center of the scan lines, when driven in a resonant mode, can increase the difficulty of achieving desired scan resolutions in the center of the scans. For example, the maximum available laser pulse frequency, in combination with the mirror scanning speed near the center of a scan line at resonance, may result in a sampling frequency less than a desired resolution level for a particular region of interest.

Scanning Dynamics

The amplitude and frequency of the oscillating mirror depends on several factors, including the current induced in the coil, the moment of inertia of the oscillating mirror system, the resonant frequency of the oscillating mirror system, the drag on the rotation of the oscillating mirror system, such as due to friction, etc. The motion can be further tuned to achieve desired parameters by adding resonance features, such as springs to achieve a desired oscillatory resonance response of the mirror. The motion of each axis may be tuned independently, and each rotation axis oscillation may be driven to rotate with a different amplitude and frequency.

One goal in relying upon resonance dynamics is achieving a desired system resolution at acceptable driving power and temperature levels. As noted above, one method for reducing driving power in oscillating systems is to create a resonance condition on the oscillatory motion by adding a spring to the system. The resonance frequency may be tuned by adjusting the spring properties, and the system may be driven with an AC signal having a resonance-inducing frequency.

Figure 13:
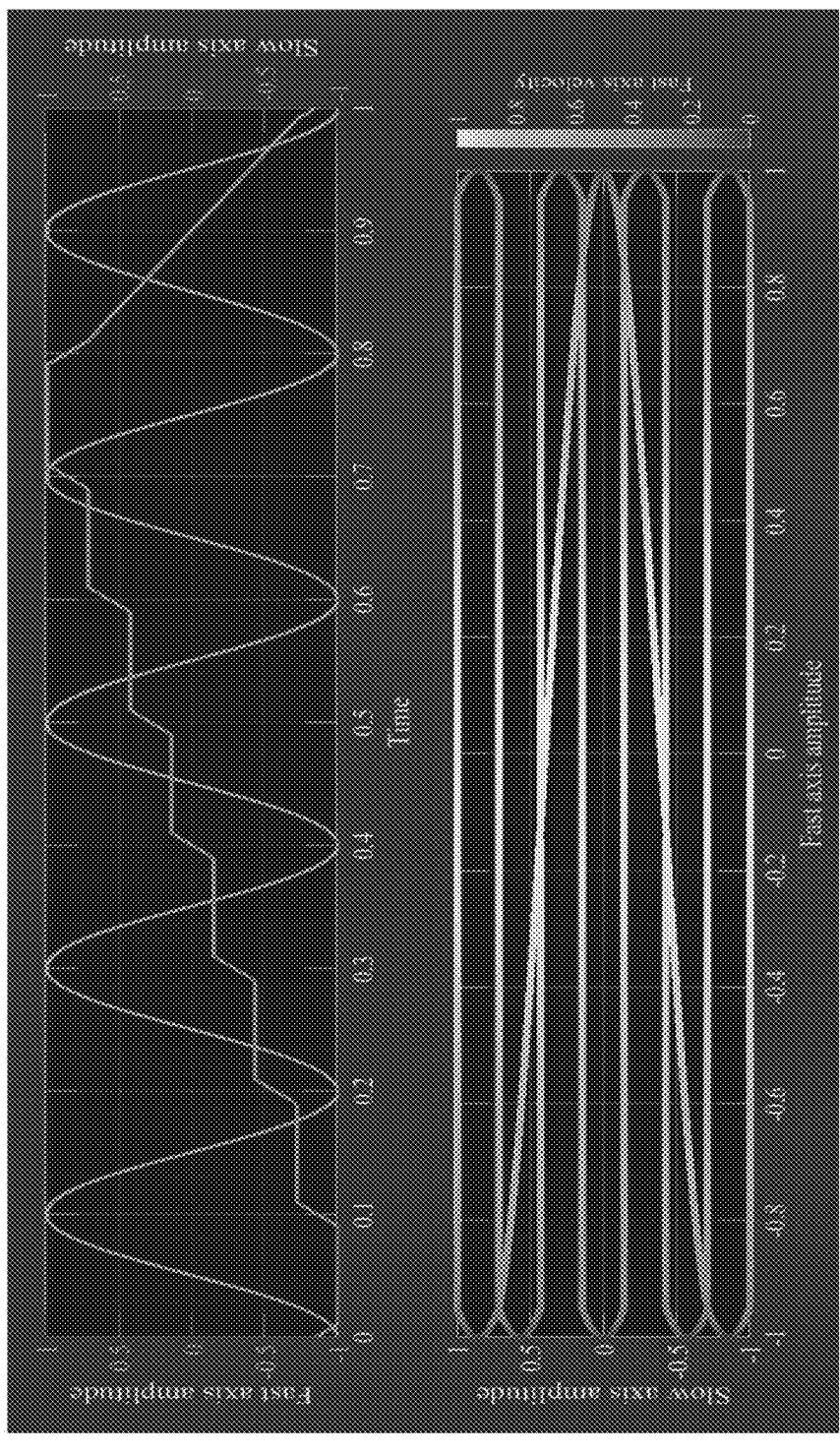
FIG. 13 shows a plot of the two angular positions of a biaxial mirror as a function of time (top) and of the corresponding scan pattern (bottom).

In the disclosed embodiments, either or both of scan directions (i.e., horizontal and vertical) can be accomplished using resonant scanners. Further, as discussed in more detail below, resonant scanners according to example embodiments may be configured to oscillate at resonant frequencies, but with non-sinusoidal waveforms, which can significantly increase the potential for higher sampling resolutions in certain regions of interest (e.g., near the center of a FOV). Generating Non-Sinusoidal Scan Patterns Based on Resonant System Frequencies Although resonant oscillators can reduce driving power requirements for a scanning system, among other benefits, they may have other challenges, as discussed above. Particularly, due to the sinusoidal pattern of a mirror movement with a single torsional natural frequency, the light projection over the scan lines is non-uniform. The resonant oscillation is faster at the center of the rotation, and slower at the edges, as represented in FIG. 13.

Figure 14:
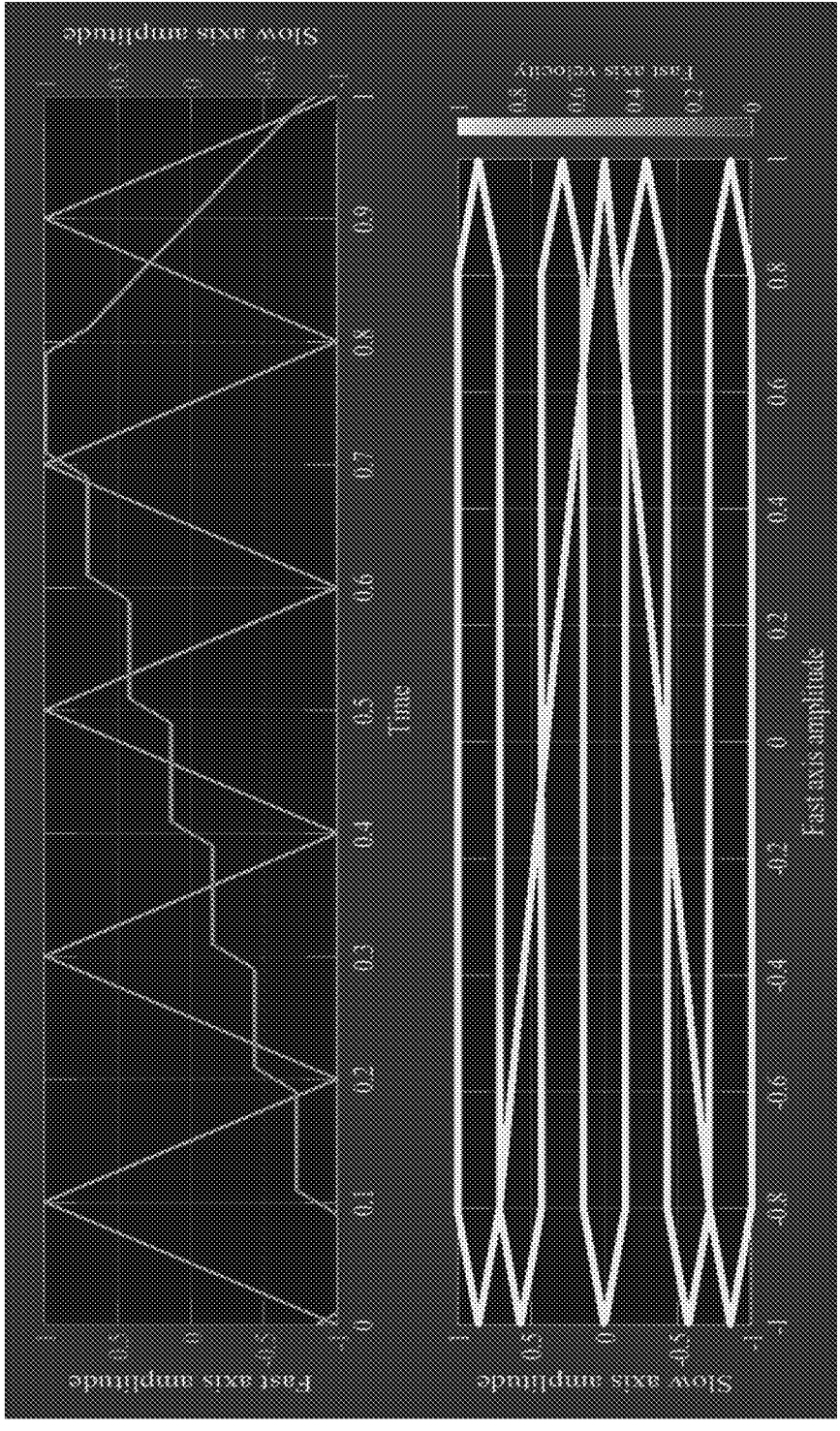
FIG. 14 shows a plot of the two angular positions of a biaxial mirror as a function of time (top) and of the corresponding scan pattern (bottom).

This sinusoidal motion pattern may be undesirable in LIDAR applications, where the resolution desired at the center of a scan may be highest while the resolution at the edges of the scan may be lower (i.e. the opposite of the conditions created by the resonant oscillation). For many applications, a more uniform resolution potential may be desirable. In contrast to a sinusoidal scan pattern, triangle waveforms may provide more uniform scanning speeds over the scan lines and, therefore, may provide the desired uniform resolution capabilities and uniform illumination across the LIDAR FOV. Triangle waveforms may enable higher sampling resolutions in regions near the center of a FOV, as compared to sinusoidal waveforms. Example scanning waveforms are shown in FIG. 14.

In some cases, the scanning frequency may be tuned dynamically and during operation of the scanner. For example, one or more of the masses may be tuned during operation in order to change, e.g., a moment of inertia associated with a particular mass. Such tuning can change the resonant frequency of the scanner to change the scan rate, frame capture rate, etc. Any suitable technique for moving a mass may be employed. In some cases, a motor may be used, e.g., to adjust a position of a weight with respect to a shaft, adjust a nut relative to a threaded rod, etc.

Relative to the described bi-axial scanner embodiments, including a voice coil actuator for rotating a mirror about a vertical scan axis and another voice coil actuator for rotating the mirror about a horizontal scan axis, either or both of the vertical and horizontal scanning systems may be configured to scan at respective resonant frequencies. And, as described, using a combination of masses and springs, the resonant oscillation waveforms of the horizontal and/or vertical scanning systems may constitute triangle waveforms rather than sinusoidal waveforms (although sinusoidal resonant oscillation waveforms may also be used in certain applications).

In some embodiments, the horizontal scanner may be configured to oscillate at resonance, while the vertical scanner may be driven quasi-statically (not at resonance). In certain embodiments, such as the example shown in the figure below where the horizontal scanning system is more massive than the vertical scanning system and is charged with rotating the entire assembly over a wider range than the vertical scanning system, driving the horizontal scanner at resonance while driving the vertical scanning system quasi-statically may be counterintuitive. For example, because the outer motor (horizontal motor) rotates the entire inner assembly, a larger torque is required as the inertia of the system is higher due to the added mass of the inner motor parts and frame. The size of the coil and respective magnets of the horizontal scanner may, therefore, be larger than those of the vertical scanner. The outer motor can be driven to achieve a resonance response within a desired frequency range. Because of the mass rotated by the horizontal motor, operating the horizontal scanner in a non-resonant mode may exceed allowable power limits for the system. The inner motor, however, maybe driven to achieve a quasi-static response. As a result, the inner motor may require higher driving power than the outer motor.

Quasi-static drive of the vertical scanning system may provide several advantages, including greater control over the scanning angle, variable rotation speed, variable resolution capability, and additional degrees of freedom in scanning.

In some cases, the horizontal and vertical scanning systems may be configured to provide FOV scan areas of a desired shape. For example, the scan amplitude of the horizontal scanning system may cover a wider angular range than the vertical scanning system to produce a rectangular FOV that has a horizontal dimension larger than a vertical dimension. In some cases, the amplitude of the outer (horizontal in this case) rotation may be +/−35 to 40 degrees, while the amplitude of the inner (vertical) rotation may be +/−10 to 20 degrees, such that the vertical scan is narrower than the horizontal scan.

In another example, the frequency of a first rotation (e.g., horizontal scanner) may be an induced at a resonant frequency, while the frequency of a second rotation may be non-resonant. In some cases, correction for keystone distortions may be done using the vertical axis scan.

Figure 15B:
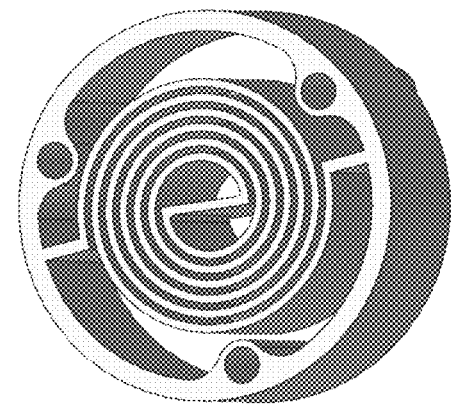
FIG. 15B is a hairspring resonator employed in the embodiment shown in FIG. 15A.
Figure 15A:
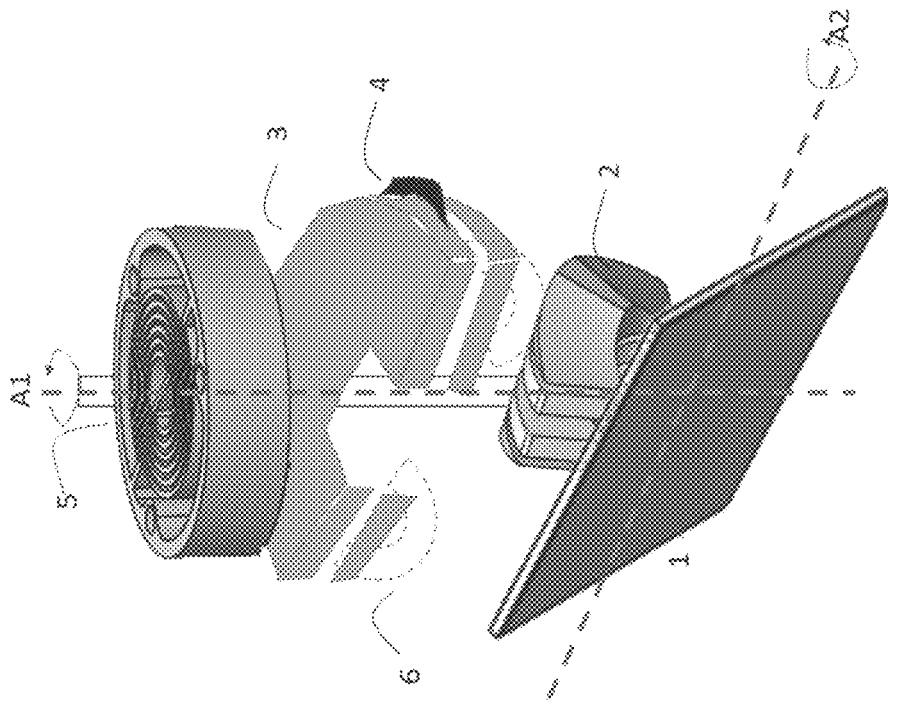
FIG. 15A is a schematic view of a biaxial scanning assembly according to one embodiment of the present invention.

Referring to FIG. 15A and FIG. 15B, a spring resonator 5 may be a hairspring resonator, enabling resonant scanning in the horizontal direction about axis A1 (the horizontal scan axis). The hairspring resonator may be implemented as a double helix and may act as multiple springs (with several modes).

For resonant or semi-resonant rotations/oscillations, a spring may be part of the assembly. The spring may be a steel wire located within the shaft about which the horizontal rotations occur. The spring may be a wire, which is under torsion when the mirror is rotated, without requiring any bearings.

Flexures

Flexures may be used in the system to enable the mirror to pivot about the flexure axis in response to the applied torque from the coil, while the support elements (suspension frame+yokes) remain relatively static. The flexures may offer advantages over bearings, such as cost effective manufacturing, no grease in the system, long lifetime, reliability over wide ranges of stress and temperatures, etc.

Figure 16A:
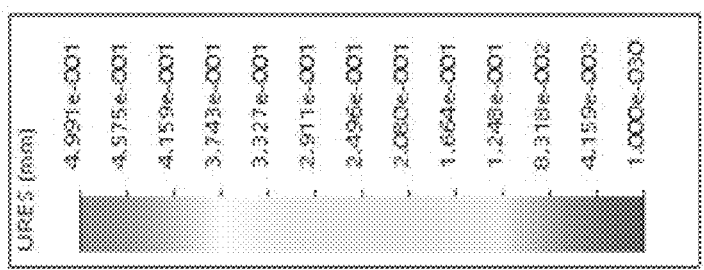
FIG. 16A and FIG. 16B show an embodiment of a yoke employed by an example embodiment of the present invention.
Figure 16B:
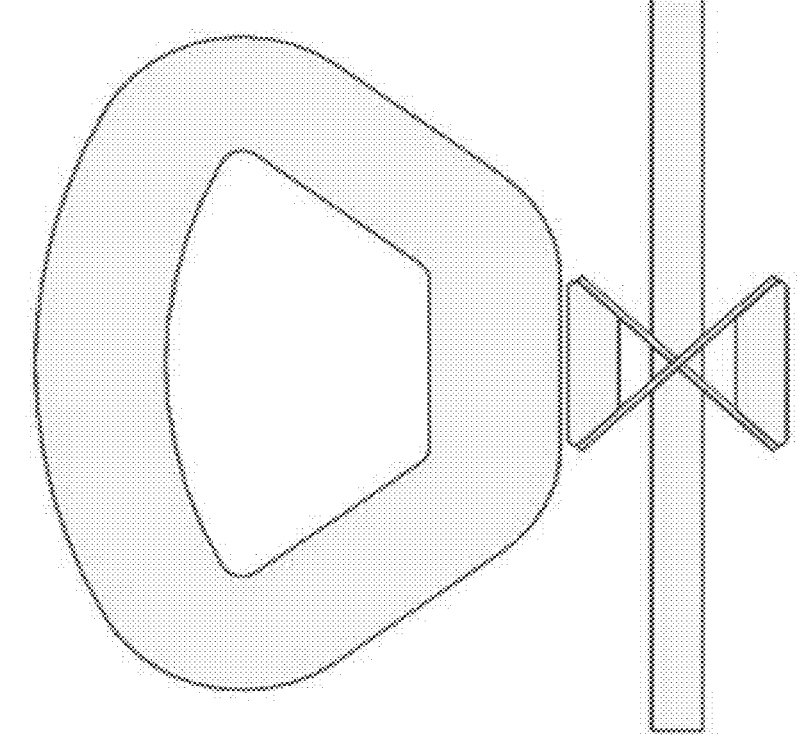
Figure 16B:
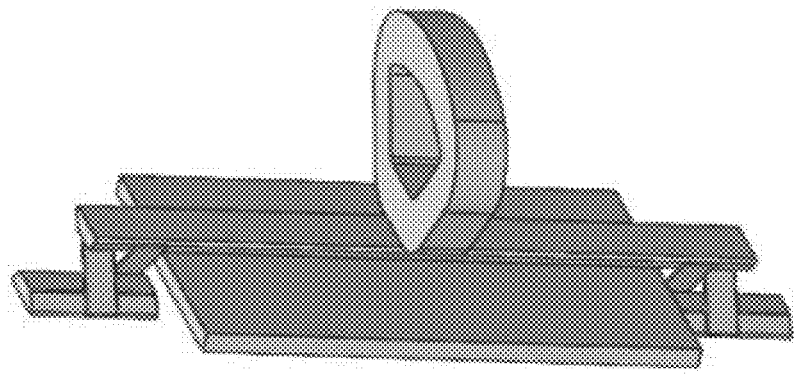

Shown in FIGS. 16A and 16B, an X-flexure is constructed of two crossed leaf springs, perpendicular to each other, to produce a rotational suspension. During operation, each leaf may undergo a cyclic bending stress. To maximize flexure life, this bending stress may be maintained well below the material endurance limit. Flexures in this case may be a less expensive and superior component to bearings.

Heat Dissipation from a Bi-Axial Mechanical Scanner

The disclosed scanning systems may take advantage of resonant oscillation modes (e.g., relative to the horizontal scanning system) to reduce overall power required for moving the scanning mirror at a desired rate/frequency. Nevertheless, even when driven at resonance, the horizontal scanning system may require power levels that generate enough heat to damage components. And, driving the vertical scanning motor quasi-statically (not at resonance) may require even higher power levels, which may generate even more heat.

The disclosed embodiments may include one or more structural features configured to manage heat produced by the scanning systems. For example, support structures may be fabricated from thermally conductive materials to facilitate heat dissipation from the coil. When current flows through the coil (especially the coil associated with the vertical scanner, which is driven at a quasi-static scanning speed (non-resonant)), significant amounts of heat may be generated. Depending on the material used for the coil, there will be a maximum operating temperature for the coil (e.g., 200 degrees C. in some cases) above which damage to the coil may occur. When the support structures are composed of thermally conductive materials, the heat may dissipate from the coil to the coil support, which may be connected to the backbone and the mirror to acts as a heat sink.

In some cases, maintaining the driving power for the scanning system(s) below about 3 Watts, or 1 Watt, may ensure that the temperature of the coil(s) remain below their respective operating temperature threshold levels.

Because the inertial properties of the scanner and power requirements to drive the scanner are important, the scanner may be constructed with a lightweight low density (e.g., a polymer, ceramic) frame. Such a configuration may be well-suited for injection molding and may effectively resist corrosion. These materials, however, generally do not conduct heat well.

In some embodiments, certain components may be made thermally conductive (at least to a sufficient degree) to effectively dissipate heat generated in the coils. The coil supports, linkages, coil holders, mirror, or any other structures in the system may be constructed of thermally conductive material (e.g., magnesium, aluminum, etc.) to facilitate heat transfer away from the coils.

Figure 17A:
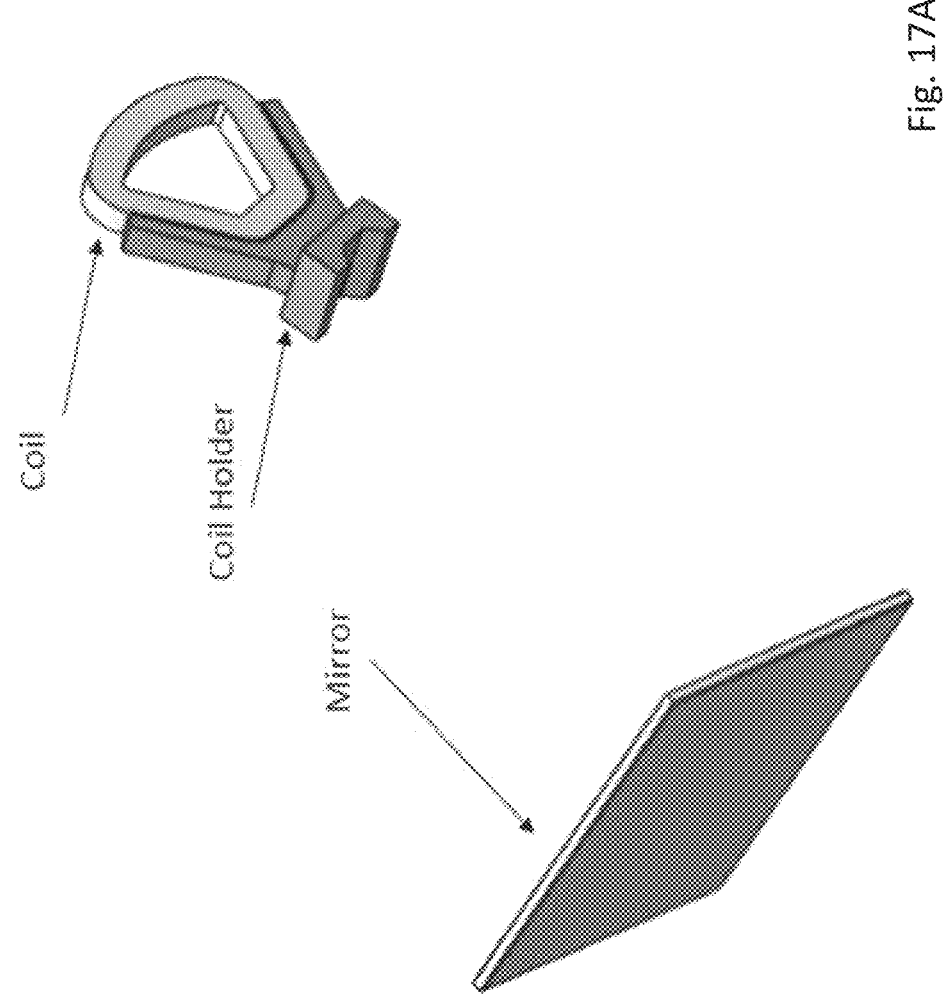
FIG. 17A shows an example embodiment of a yoke employed by an example embodiment of the present invention.
Figure 17B:
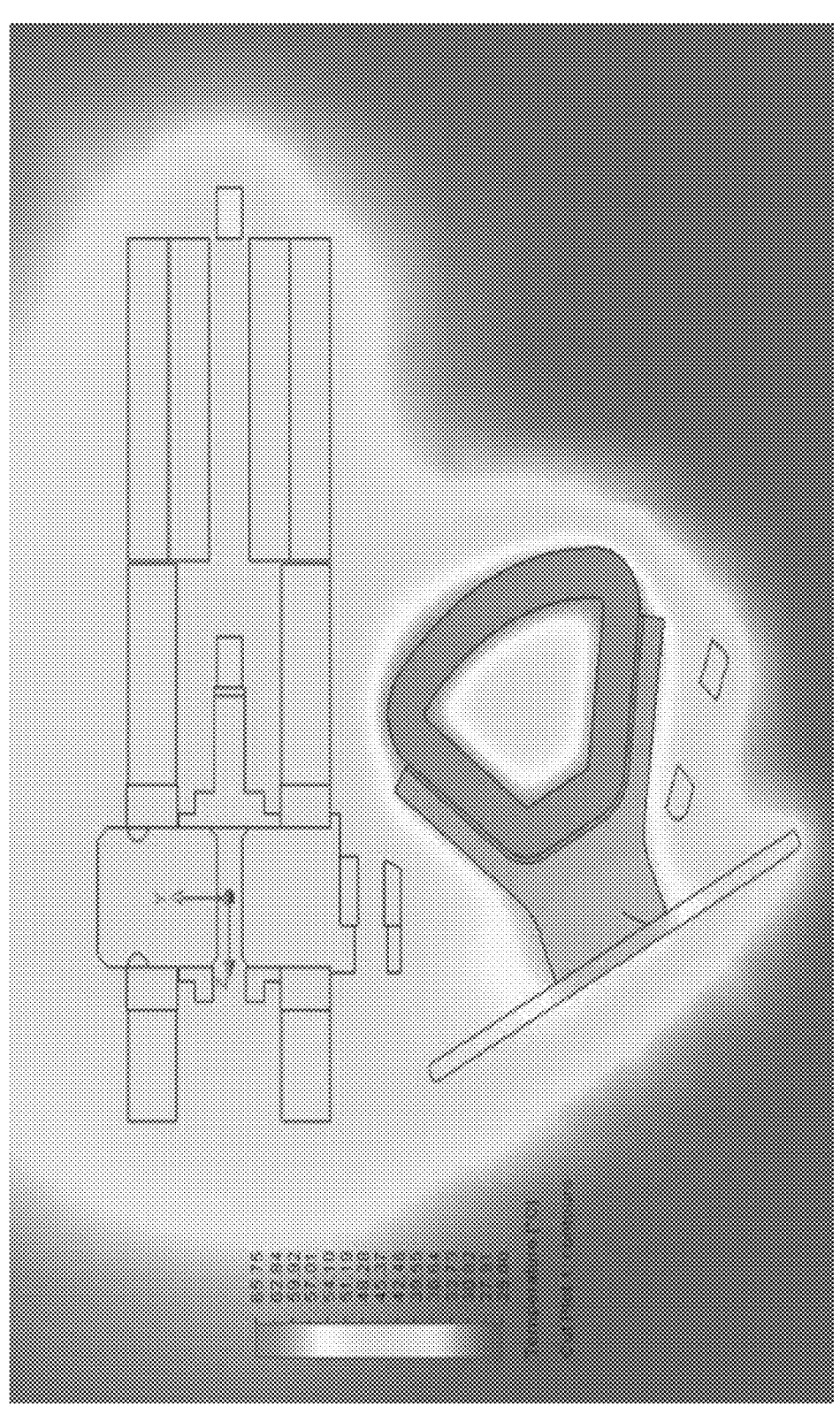
FIG. 17B shows an example heatmap of the temperature profile of the yoke shown in FIG. 17A.

As illustrated in FIGS. 17A and 17B, a coil may be coupled to a coil holder, which secures the coil to the mirror. The coil may be coupled to the coil holder with an adhesive or other type of fastener.

FIG. 17B provides an example heatmap of the temperature profile of the system in motion. In this instance, the inner coil (of the vertical scanning motor) has the highest temperature. In order to enable heat dissipation, the coil may be adhered to the coil holder with a thermally conductive adhesive, and the coil holder itself may be formed of a thermally conductive material (e.g., stainless steel, etc.). Heat may then be conducted to the coil holder and on to the mirror.

Additionally, because the coil is oriented vertically, the natural convection causes air flow in the space between the magnets/yokes where the coil is situated. Heated air rises, and air flows in an upwards direction.

As noted above, the presently disclosed scanning system may include flexures to enable the mirror to pivot about axis A2, for example. The flexures may be made from stainless steel, and, therefore, may serve as reasonable heat conductors. If the flexures were replaced by more common components, such as bearings and a shaft, the thermal conductance and heat dissipation efficiency may be significantly reduced. The flexures may effectively dissipate heat from the coil/mirror.

In addition to thermal conductivity, it may be advantageous for these components to have high emissivity in order to facilitate dissipation of heat in the system.

In addition to material selection, one or more structures may be included to facilitate thermal management. For example, fans or liquid cooling systems may be included to transfer heat away from the motor coils. Fins or other high surface area structures may also be included to help transfer and dissipate heat.

Part II: Magnetic Resonator

Two problems that are frequently contemplated when designing mechanical oscillatory systems include: 1) minimizing the power consumption of the oscillatory system, and 2) maintaining a uniform velocity of the oscillator throughout the range of motion of the oscillator. To reduce (e.g., minimize) power consumption in an oscillatory system, the oscillatory system should be driven at a resonant frequency, such as the fundamental resonant frequency (i.e., the lowest energy resonant frequency) of the system. Driving the oscillatory system at the resonant frequency reduces actuator and/or control requirements and, thus, reduces the power required to drive the system. Resonant frequencies of a system may change, for example, by modifying system geometry, system materials, mass of the oscillator, or by adding or removing components such as springs and/or dampeners, among other things. When resonant frequencies of an oscillatory system change, the system should adjust for this change and continue to drive the oscillator at the resonant frequency to reduce power requirements.

As the oscillator approaches the ends of its range-of-motion and changes oscillation direction, velocity of the oscillator may not be uniform (e.g., may be slower or faster) through this change-of-direction when compared to the velocity of the oscillator in the other parts (e.g., the middle) of the range-of-motion. Springs have been used to facilitate the directional change of a mechanical oscillatory system; however, a spring exerts a linear reaction force, which may not be suitable to reverse motion of an oscillator while maintaining a substantially uniform velocity. Moreover, the position of the spring may be limited to the axis of rotation (in a rotational oscillatory system), which may increase the size of the system (e.g., when the rotation is horizontal, the height of the system increases to accommodate the spring).

In certain applications, maintaining a uniform velocity throughout the entire range of motion of the oscillator provides better results. For example, Laser Detection and Ranging (LIDAR) is one specific example of an application where these problems arise. In LIDAR, one or more mirrors oscillate at high frequencies back and forth across a field of view (FOV). While smaller mirrors may be easier to drive and control for angular velocity, larger mirrors take more energy to drive and control due to increased momentum. Moreover, LIDAR systems collect data points (i.e., reflection of light) during the oscillation of the mirrors and a uniform velocity of the oscillating mirror is required to provide equal measurement time to all pixels (e.g., time of flight, number of repetitions), thereby resulting in a substantially uniform resolution across the FOV.

It has been discovered that these problems may be solved through the use of magnetic bumpers that provide a non-linear force on an oscillator (e.g., a rotor) having one or more magnets attached thereto as the oscillator magnet(s) approach the magnetic bumper at each end of the range-of-motion. As the oscillator approaches the ends of its range of motion, the magnet(s) attached to the oscillator—and therefore the oscillator itself—will experience a non-linearly (e.g., exponentially) increasing magnetic force as the oscillator approaches closer to the ends of its range of motion. Additionally, the magnetic bumpers prevent any potential impact of the oscillator with another part of the system due to the increasing magnetic repulsion at the ends of its range of motion, reducing the likelihood of damage.

Disclosed herein are systems and assemblies for controlling motion of a single-degree-of-freedom mechanical oscillator using one or more magnetic bumpers where the oscillator is configured to oscillate at a resonant frequency of the system. Additionally, disclosed herein are methods of controlling motion of a single degree-of-freedom oscillator using magnetic bumper systems.

In various embodiments, an assembly includes a stator having at least one stator magnet (a "magnetic bumper") where each stator magnet is positioned at a terminal point along a path (e.g., linear or arcuate) of a rotor. In various embodiments, the stator may include a single, continuous part. For example, the stator may include a singular part, such as a block, having at least one stator magnet attached thereto. In another example, the stator may include a horseshoe shape with stator magnets at the ends of the horseshoe shape.

In various embodiments, the stator may include discontinuous parts where each discontinuous part includes a stator magnet. For example, the stator may include two separate parts that each have a stator magnet affixed thereto. In various embodiments, the stator includes a first stator magnet and second stator magnet. In various embodiments, each stator may include two stator magnets. In various embodiments, the stator includes more than two (e.g., three) stator magnets. In various embodiments, the stator may include a housing configured to affix the stator magnet(s) and contain the oscillatory assembly.

In various embodiments, the stator magnets are permanent magnets. In various embodiments, the stator magnets are electromagnets. In various embodiments, the electromagnets are driven by a DC current. In various embodiments, the electromagnets are driven by an AC current.

In various embodiments, the stator magnet(s) are single magnets having a single north pole and a single south pole. In various embodiments, the stator magnet(s) includes more than one magnet in a stacked arrangement and thus include two or more north and south poles. In various embodiments, the stacked magnets are arranged such that the north and south poles are oriented vertically. In various embodiments, the stacked magnets are arranged such that the north and south poles are perpendicular to a path of the rotor (e.g., in a rotational system, the stacked magnets are arranged such that the north and south poles are parallel with a radial axis extending from a rotational axis). In various embodiments, the stacked arrangement of magnets are arranged such that the north and south poles are oriented horizontally. In various embodiments, the stacked magnets are arranged such that the north and south poles are along (e.g., parallel with, tangential to, etc.) a path of the rotor.

In various embodiments, the assembly includes a rotor having at least one rotor magnet thereon. In various embodiments, the rotor is configured to move with a single degree-of-freedom. For example, the rotor may be configured for linear motion. In another example the rotor may be configured for rotational motion. As the rotor oscillates the at least one rotor magnet along a path (e.g., linear or arcuate) between terminal points, the rotor magnet(s) approaches one or more stator magnets at each terminal point that exert an increasing repulsive force on the rotor magnet(s). In various embodiments, the repulsive force between the stator magnet(s) and the rotor magnet(s) is used to control a speed (e.g., linear velocity or angular velocity) of the rotor. In various embodiments, the repulsive force between the stator magnet(s) and the rotor magnet(s) is used to reverse the direction of the oscillating rotor while maintaining a substantially constant velocity between the terminal points.

In various embodiments, the rotor magnets include permanent magnets. In various embodiments, the rotor magnets include electromagnets.

In various embodiments, the rotor magnet(s) are single magnets having a single north pole and a single south pole. In various embodiments, the rotor magnet(s) includes more than one magnet in a stacked arrangement and thus include two or more north and south poles. In various embodiments, the stacked arrangement of magnets are arranged such that the north and south poles are oriented vertically. In various embodiments, the stacked arrangement of magnets are arranged such that the north and south poles are oriented horizontally. In various embodiments, the north and south poles of the stacked magnets alternate within each stack.

In various embodiments, one or more end magnets may be disposed on an end of the stator magnets to improve magnetic force applied to the rotor magnet(s). As used herein, an "end magnet" is an outer-most magnet in a stack of three or more magnets or, where the stacked magnets are two magnets, the end magnet is disposed on a side of the other magnet. In example embodiments, an end magnet extends beyond the surfaces of the stacked stator magnets in the direction of travel of the rotor between the terminal points. End magnets are illustrated in FIGS. 15-19, 20-28, and 32-36. In various embodiments, the end magnet is positioned at an angle with respect to the stacked magnets (e.g., a face of the end magnet is disposed at an angle to an adjacent face of a stacked magnet). In various embodiments, where the stator includes more than two stacked magnets, the end magnet is disposed at an outer-most end of the stacked magnets. In various embodiments, a single magnet or multiple magnets may be disposed between two end magnets. In various embodiments, the end magnet(s) may have a larger cross sectional area perpendicular to the path of the rotor magnets than the cross sectional area of the other stator magnet(s). In various embodiments, one or more surfaces of the end magnet have an area that is larger than an area of a surface of the rotor magnets corresponding to surfaces of the other stator magnets. In various embodiments, the volume of the end magnet(s) may be larger than the volume of the other stator magnet(s).

In various embodiments, a surface of the stator magnet corresponds to a surface of the rotor magnet. In various embodiments, where the stator magnet has stacked magnets, at least one of the stacked stator magnets has a surface that corresponds to a surface of each rotor magnet. As used herein, a surface of a magnet (e.g., a stator magnet) corresponds to a surface of another magnet (e.g., a rotor magnet) when one surface is configured to move towards or away from the other surface along a path and exert increasingly repulsive magnetic forces on one another as the two surfaces become closer. In various embodiments, the stator magnet includes two or more stacked magnets where at least two magnets in the stator magnet correspond to two or more stacked magnets in the rotor magnet. In various embodiments, each corresponding surface the stator magnet(s) has a greater area than each corresponding surface of the rotor magnet(s).

In various embodiments, where the stator magnet and/or the rotor magnet includes stacked magnets, any of the magnets may be separated by a gap. In various embodiments, the gap is a constant width between all adjacent magnets. In various embodiments, the gap is variable between the adjacent magnets. For example, in the stator magnet, the gap between the smaller stacked magnet and the larger end magnet may be larger than the gap between the smaller stacked magnets. In another example, all gaps between the stacked magnets have substantially the same distance.

In various embodiments, one or more flexible connectors (e.g., flexures) couple the first stator magnet and/or the second stator magnet to the stator. In various embodiments the flexible connectors include a ribbon of material (e.g., a polymer, a metal, a composite material, etc.). In various embodiments, the flexible connector is a flex pivot.

In various embodiments, a system includes a magnetic bumper assembly, an actuator configured to move the rotor of the assembly where the rotor is configured to be coupled to a payload. In various embodiments, the actuator includes an electric motor. In various embodiments, the actuator includes at least one booster electromagnet positioned external to a path travelled by each rotor magnet where the booster electromagnet is electromagnetically coupled to the rotor magnet and is configured to, upon energizing, generate a magnetic field that causes the rotor to move. In various embodiments, the at least one booster electromagnet is disposed within a housing of the stator. In various embodiments, the actuator is coupled externally to the housing. In various embodiments, the actuator is a voice coil actuator. In various embodiments, the payload is coupled to an axle of the externally-mounted actuator. In various embodiments, the actuator is configured to move the payload between the first terminal point and the second terminal point. In various embodiments, the actuator is configured to rotationally move the payload and an angle of rotation of the rotor from the first terminal point to the second terminal point is equal to an angle of rotation of the payload. In various embodiments, an angle of rotation of the rotor from the first terminal point to the second terminal point is not equal to an angle of rotation of the payload. In various embodiments, the payload includes a mirror (e.g., a light deflector used in a LIDAR application).

In various embodiments, the system includes a controller configured to receive feedback from the actuator and/or an encoder and provide a control signal to the actuator to thereby control a velocity of the rotor. In various embodiments, the controller receives motion data of the payload (e.g., through a sensing device) and/or voltage data of the electromagnets and provides a control signal to thereby control a velocity of the payload. In various embodiments, the sensing device includes a linear encoder. In various embodiments, the sensing device includes a rotational encoder. In various embodiments, the sensing device includes an optical encoder. In various embodiments, the sensing device includes a magnetic encoder. In various embodiments, the sensing device includes a capacitive encoder. In various embodiments, the control signal is provided to an actuator. In various embodiments, the control signal is provided to a driver circuit configured to energize one or more electromagnets in the stator magnets, rotor magnets, and/or the booster electromagnets. In various embodiments, the controller includes proportional control. In various embodiments, the controller includes integral control. In various embodiments, the controller includes derivative control.

In various embodiments, a method of oscillating a rotor at a resonant frequency includes providing an oscillatory system. A rotor assembly of the system (including rotor magnets and bumper magnets) is an oscillator and has a resonant frequency. An actuator of the system is configured to drive (e.g., oscillate) the rotor at the resonant frequency. The method further includes energizing the actuator thereby causing the rotor to oscillate between the first and second terminal points at the resonant frequency. In various embodiments, the system further includes a controller, and the controller is configured to receive a feedback signal and provide a control signal to the actuator to thereby control a velocity of the rotor. In various embodiments, the feedback signal is received from the actuator. In various embodiments, the feedback signal is received from an encoder (e.g., linear or rotational encoder). In various embodiments, the method includes determining whether the rotor is oscillating at the resonant frequency and, when the rotor is not oscillating at the resonant frequency, providing the control signal to the actuator to thereby reduce or increase the velocity of the rotor such that rotor oscillates at the resonant frequency.

Figure 18:
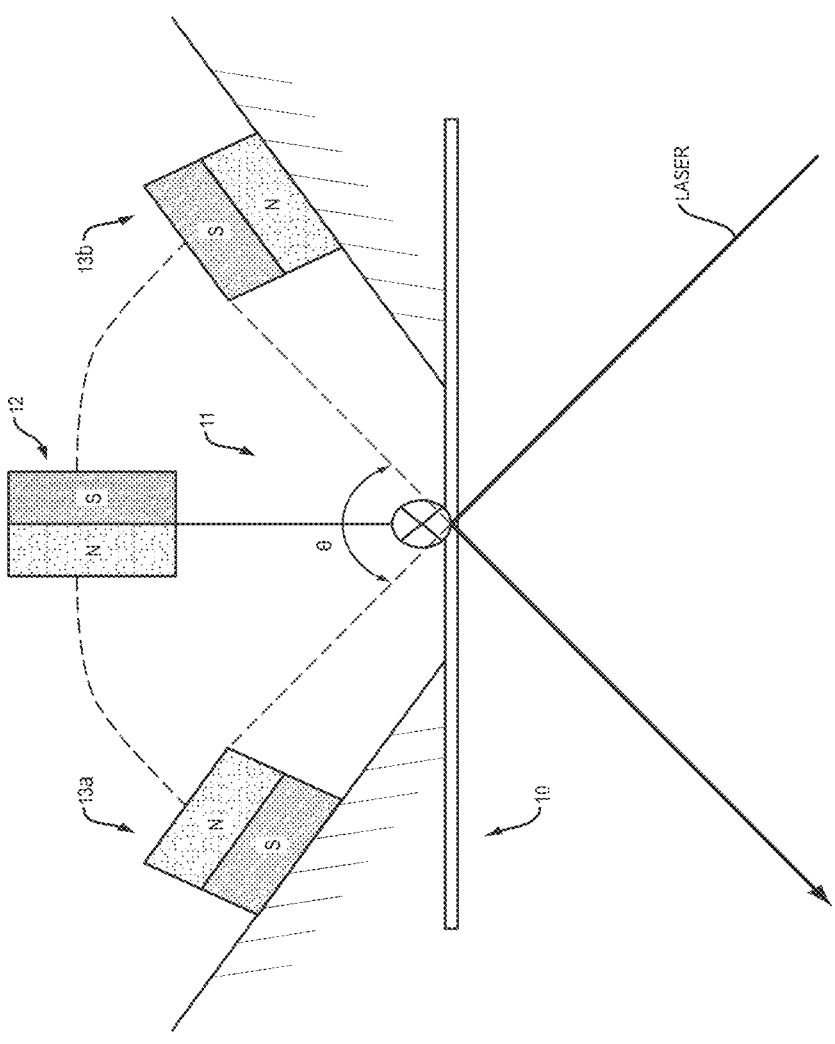
FIG. 18 illustrates a payload attached to a single magnet configured to rotate about an axis in accordance with an embodiment of the present disclosure.

FIG. 18 illustrates a payload (e.g., a light deflector) 10 attached to a single magnet configured to rotate about an axis. In particular, FIG. 18 illustrates a light deflector 10 configured to rotate about an axis (X). The light deflector (e.g., a mirror) rotates to steer at least one beam emitter by a light source (e.g., a laser) in order to scan a FOV. The deflector 10 is coupled to a rotor 11 having a magnet 12 mounted thereon. FIG. 18 further includes stator magnets 13*a*, 13*b* mounted on the side-walls, located at the extremities of the rotation span (e) of the deflector 10 and defining first and second terminal points. The stator magnets 13*a*, 13*b* are mounted with the repelling pole facing the rotor magnet 12, such that when the magnet 12 approaches close to the stator magnet 13*a*, the repulsive force on the magnet 12 facilitates the change in rotation direction of the rotor magnet 12, and in turn, the deflector 10. The repulsive force on the rotor magnet 12 generates a torque on the mirror. The repulsive force between the rotor magnet 12 and stator magnets 13*a*, 13*b* is applied with no impact between the rotor magnet 12 and the stator magnets 13*a*, 13*b* as the rotor magnet 12 oscillates between the terminal points. Because no impact occurs between the magnets, noise, aging effects and probability of damage to the magnets due to impact are reduced, if not eliminated.

Figure 19:
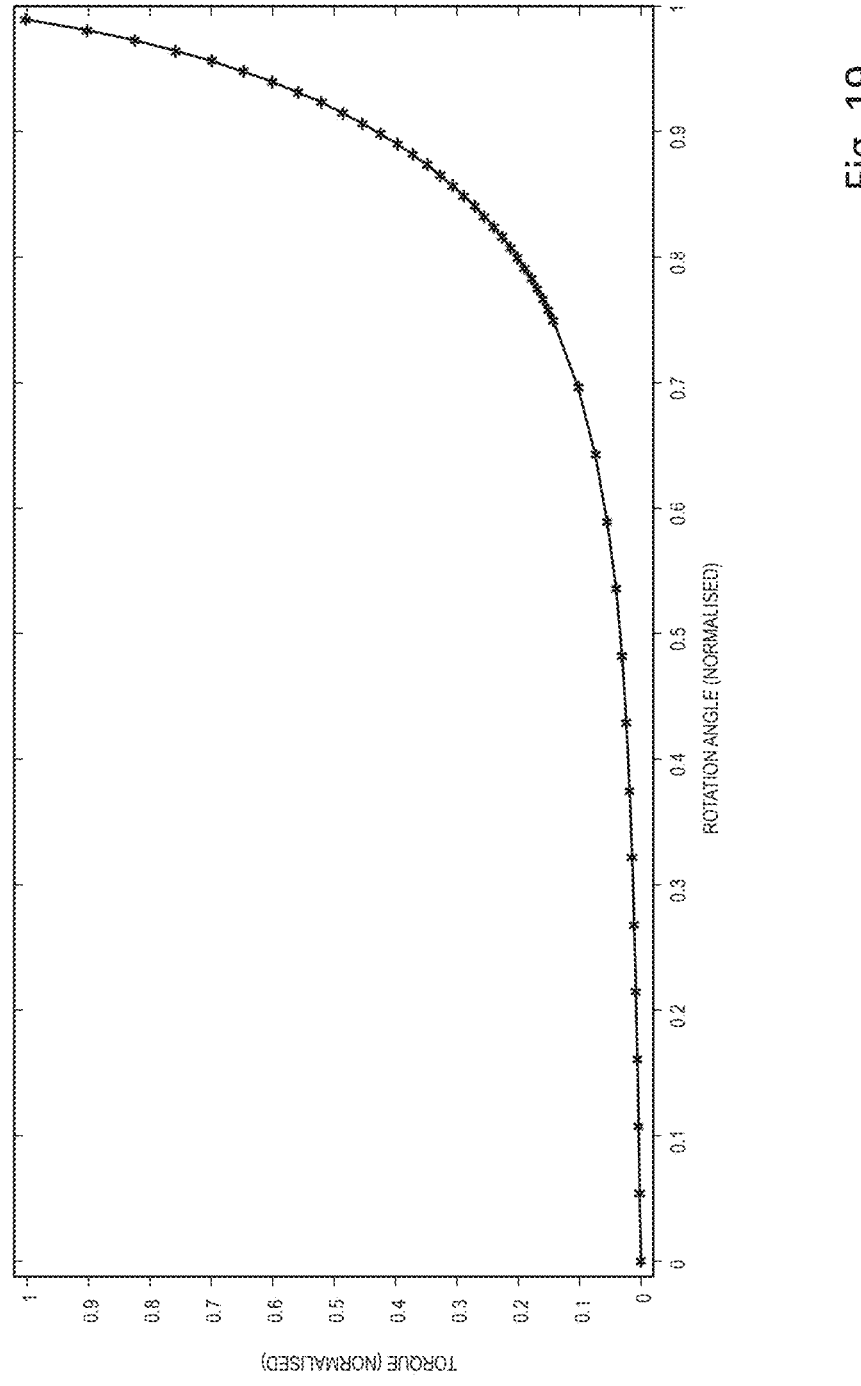
FIG. 19 illustrates a graph of torque vs. rotation angle in accordance with an embodiment of the present disclosure.

FIG. 19 illustrates a graph of torque vs. rotation angle. As shown in FIG. 19, the torque increases exponentially as the rotor magnet approaches a stator magnet, thereby facilitating a rapid change in direction while maintaining a substantially constant magnitude of velocity throughout the oscillating motion of the payload.

Figure 20:
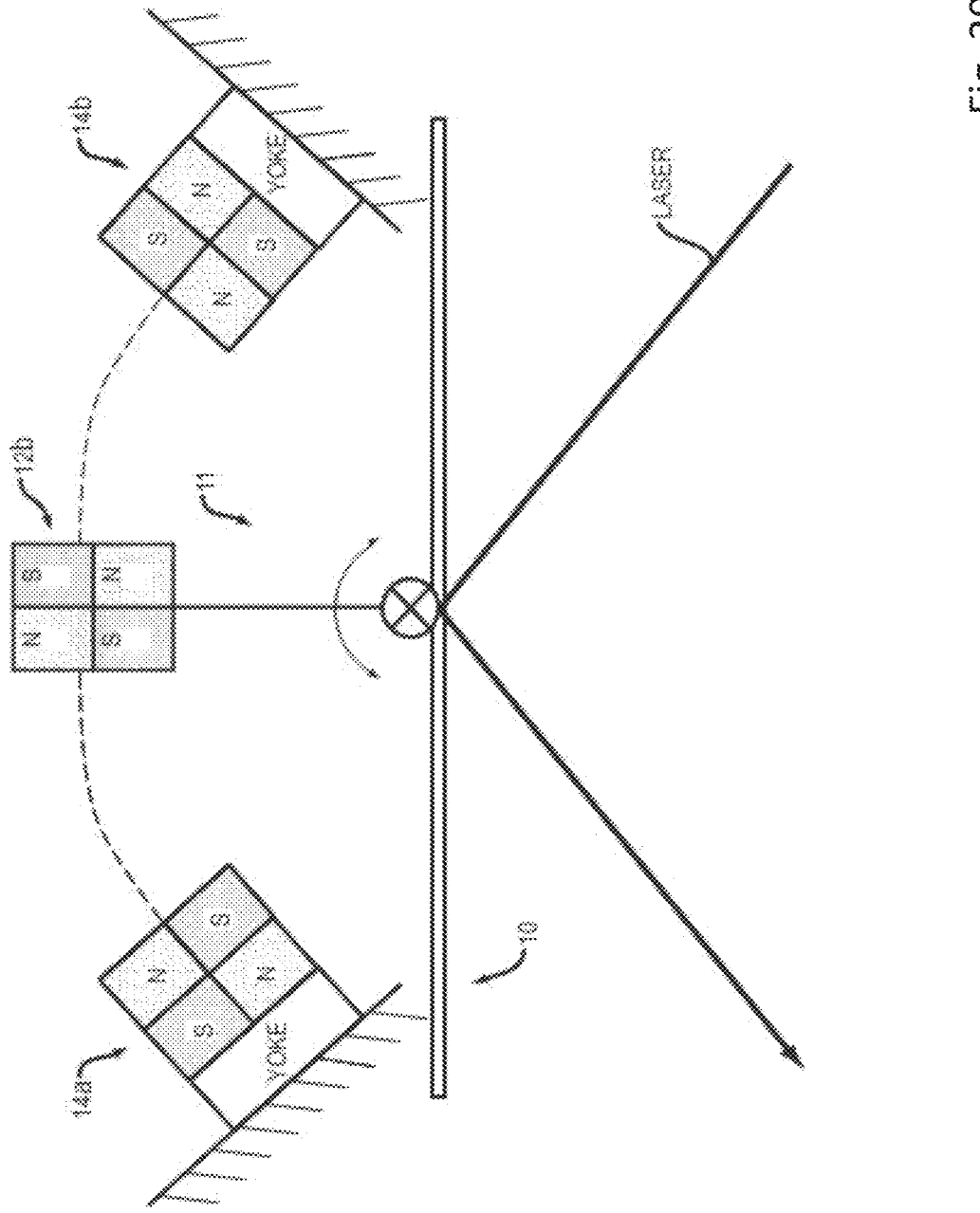
FIG. 20 illustrates a payload attached to two stacked magnets configured to rotate about an axis in accordance with an embodiment of the present disclosure.

FIG. 20 illustrates a payload (e.g., a light deflector) 10 attached to two stacked magnets configured to rotate about an axis and oscillate between two terminal points. In this configuration, the rotor magnet 12*b* and stator magnets 14*a*, 14*b* are oriented such that, when the rotor magnet 12*b* approaches one of the stator magnets 14*a*, 14*b*, both the north and south poles of the rotor magnet 12*b* are repelled by the respective north and south poles of the stator magnets 14*a*, 14*b*. As the rotor magnet 12*b* gets closer to the stator magnets 14*a*, 14*b* the repulsive force on the rotor magnet 12*b* increases, thereby increasing the torque on the rotor 11 at angles close to the terminal points of the oscillating motion. This increased torque closer to the terminal points facilitates direction switching of the rotor 11 at a faster speed, without increasing the radius of rotation (i.e., the length of the arm 11). In various embodiments, one or more yokes may be positioned adjacent to the stator magnets 13*a*, 13*b*, 14*a*, 14*b* to close magnetic lines and provide an optimal magnetic field. In various embodiments, a configuration with stacked magnets is advantageous since the length of the rotor 11 may impact the overall size of the system and systems are designed to be compact. In various embodiments, a stacked arrangement of magnets allows for balancing against other components (e.g., components located closer to the center of mass of the system).

Figure 21:
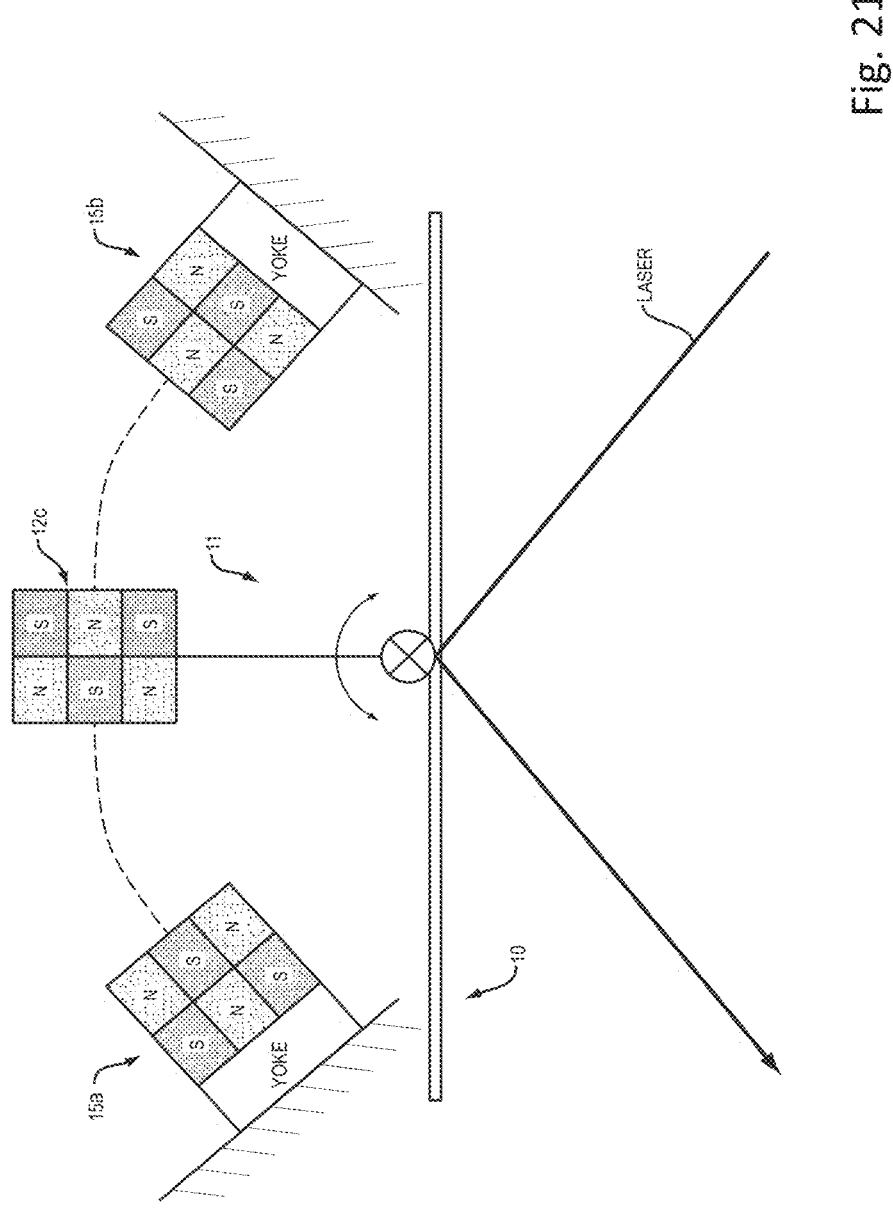
FIG. 21 illustrates a payload attached to three stacked magnets configured to rotate about an axis in accordance with an embodiment of the present disclosure.

FIG. 21 illustrates a payload (e.g., light deflector) 10 attached to three stacked magnets configured to rotate about an axis. In various embodiments, the rotor magnet 12*b* includes two or more magnets, e.g., 2, 3, 4, 5, 6 or more. As shown in FIG. 21, the rotor magnet 12*c* and the stator magnets 15*a*, 15*b* each include three stacked magnets having alternating poles in the stacked arrangement. In various embodiments, each stacked magnet in the stator magnet(s) is oriented to repel a corresponding magnet in the rotor magnet 12*c*. As shown in FIG. 21, the magnets of the rotor magnet 12*c* and stator magnets 15*a*, 15*b* that are radially furthest away from the rotation axis are configured to repel each other as the rotor magnet 12*c* approaches either stator magnet 15*a*, 15*b*. Similarly, the middle magnets of the rotor magnet 12*c* and stator magnets 15*a*, 15*b* are configured to repel each other as the rotor magnet 12*c* approaches either stator magnet 15*a*, 15*b*. Similarly, and the magnets closest to the rotation axis are configured to repel each other as the rotor magnet 12*c* approaches either stator magnet 15*a*, 15*b*. In various embodiments, because size of the system may be a constraint, the stator magnets 15*a*, 15*b* and/or the rotor magnet 12*c* may be replaced with two or more thinner magnets if a stacked magnet arrangement is desired.

In various embodiments, the system further includes a yoke configured to close magnetic lines generated by the rotor magnet(s) and/or the stator magnet(s). In various embodiments, the yoke is a single, integral part. In various embodiments, the yoke is two or more separate parts. In various embodiments, the yoke is attached to at least one of the stator magnets, as shown in FIGS. 3 and 4.

Figure 22A:
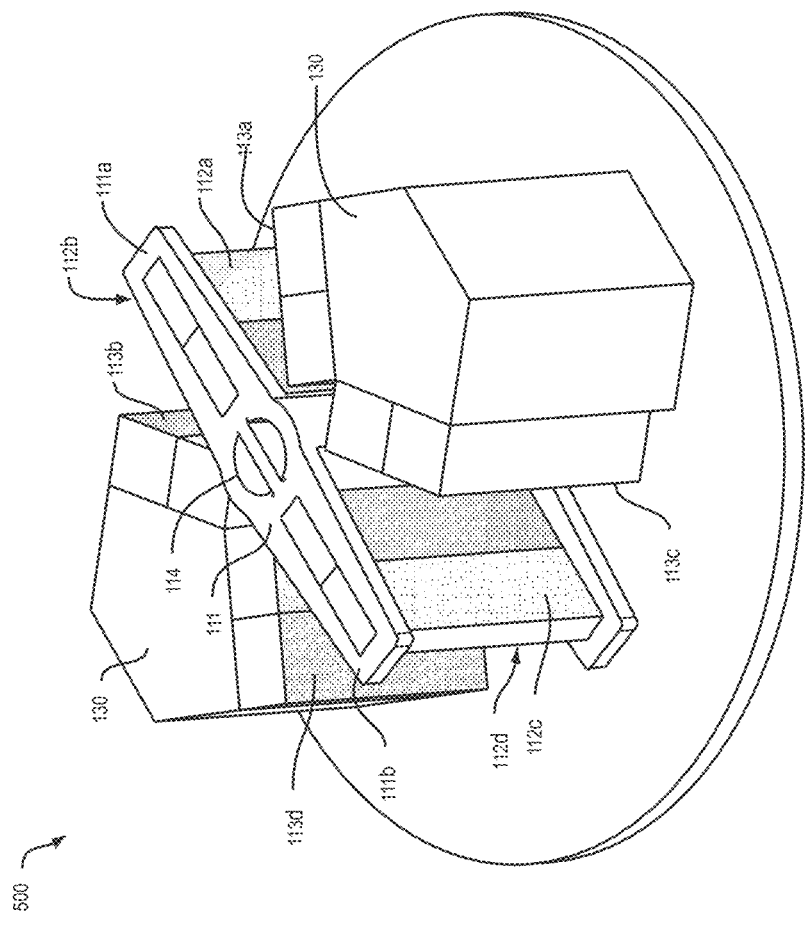
FIGS. 22A-22B illustrate an oscillatory system having a rotor with two arms configured to oscillate between stator magnets in accordance with an embodiment of the present disclosure.

FIG. 22A illustrates an oscillatory system 500 having a rotor 111 with two arms 111*a*, 111*b* configured to oscillate between stator magnets 113*a*-113*d*. In FIG. 22A, the two arms 111*a*, 111*b* are mounted on the rotor 111 and are configured to rotate about the axis 114. In various embodiments, the axis 114 is the same axis of rotation of the payload (e.g., a mirror). In various embodiments, the axis 114 of rotation of the rotor 111 is a different axis of rotation of the payload. The first rotor magnet on the first arm 111*a* includes sides 112*a*, 112*b* and the second rotor magnet on the second arm 111*b* similarly includes sides 112*c*, 112*d*. The stator magnets 113*a*-113*d* are mounted on a stator 130 and the stator 130 includes two vertical supports extending therefrom where each support includes two faces. Each face may be substantially perpendicular to a path traveled by the one or more rotor magnet. As shown in FIG. 22A, a stator magnet 113*a*-113*d* is mounted on each face.

As the rotor 111 rotates clockwise (from top view) during oscillating motion, thereby rotating arms 111*a*, 111*b*, the side 112*a* of the first rotor magnet approaches stator magnet 113*a* and side 112*d* of the second rotor magnet approaches stator magnet 113*d*. The stator magnets 113*a*, 113*d* each exert a repulsive force on the respective rotor magnet 112*a*, 112*d* that increases as the distance between the rotor magnet 112*a*, 112*d* and the stator magnet 113*a*, 113*d* decreases.

Similarly, as the rotor 111 rotates counter-clockwise (from top view) during oscillating motion, thereby rotating arms 111*a*, 111*b*, the side 112*b* of the first rotor magnet approaches stator magnet 113*b* and side 112*c* of the second rotor magnet approaches stator magnet 113*c*. The stator magnets 113*b*, 113*c* each exert a repulsive force on the respective rotor magnet 112*b*, 112*c* that increases as the distance between the rotor magnet 112*b*, 112*c* and the stator magnet 113*b*, 113*c* decreases.

In this way, the repulsive force from the stator magnets 113*a*-113*d* facilitates a change in rotational direction (e.g., clockwise to counter-clockwise) of the arms 111*a*, 111*b* while maintaining a substantially constant magnitude of velocity (e.g., angular velocity) of the rotor. In various embodiments, a payload (e.g., a mirror) is coupled to the rotor 111. In various embodiments, the payload is coupled to an axle of the rotor 111. In various embodiments, the payload may share the same rotational axis as the rotor 111. In various embodiments, the rotational axis of the payload may be different than the rotational axis of the rotor 111. In various embodiments, the rotor 111 is positioned above the payload. In various embodiments, the rotor 111 is positioned below the payload. In various embodiments, the rotor 111 rotates about an axis 114 of the deflector rotation.

Figure 22B:
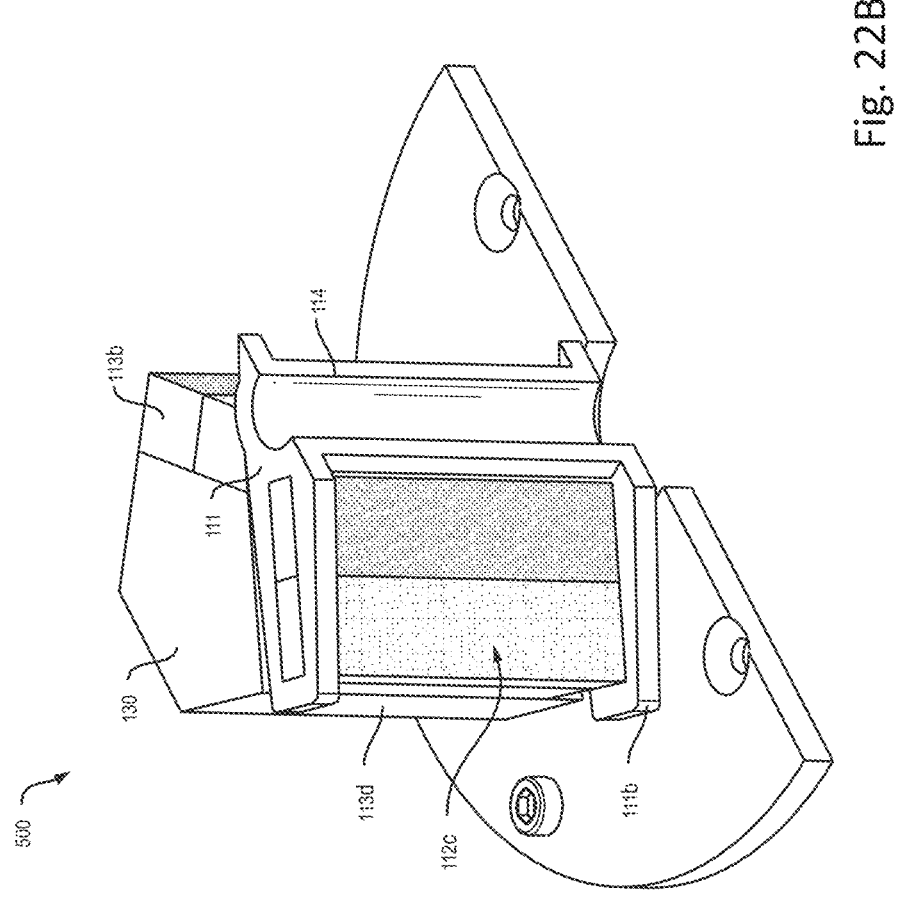

FIG. 22B illustrates a cross section of the system 500 showing one arm 111*b* of the rotor 111 having a rotor magnet (side 112*c* is showing), and a stator 130 having two stator magnets 113*b*, 113*d*. In various embodiments, the rotor magnets are mounted in a horizontally stacked arrangement (where the poles of each magnet are vertical). When the arms of the rotor are equally spaced about the axis 114 and the stator magnets are positioned symmetrically around the axis of the rotation 114, the system may be advantageously balanced. In various embodiments, the system is balanced mechanically.

Figure 23A:
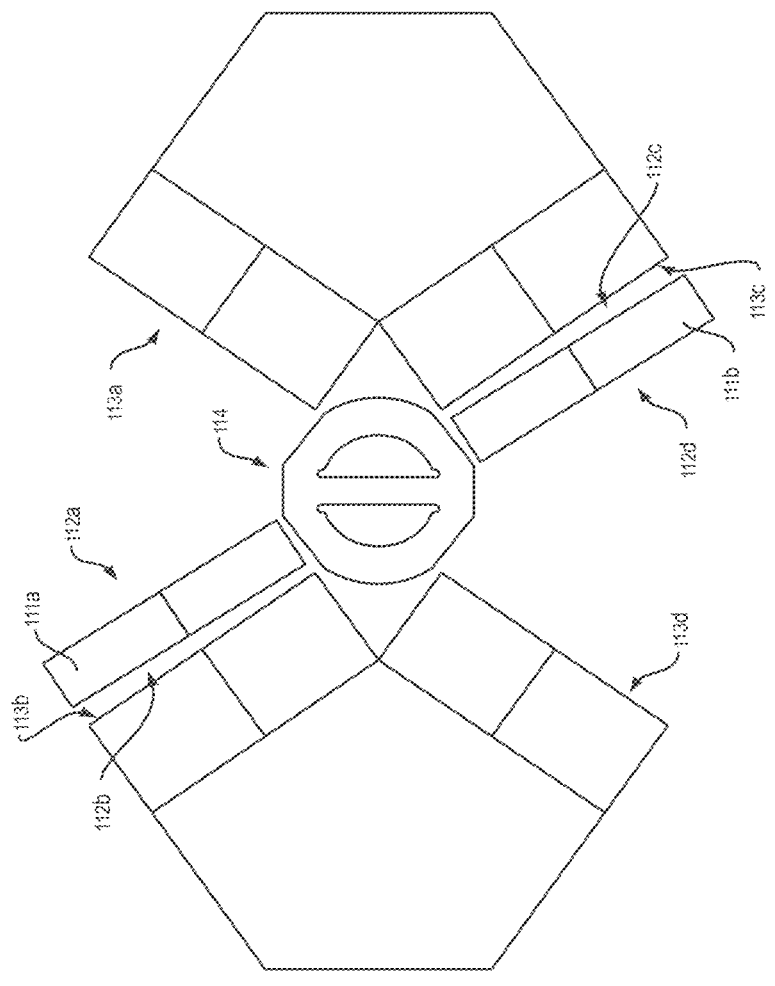
FIGS. 23A-23B illustrate a top view of a rotor having two arms configured to oscillate between stator magnets in accordance with an embodiment of the present disclosure.
Figure 23B:
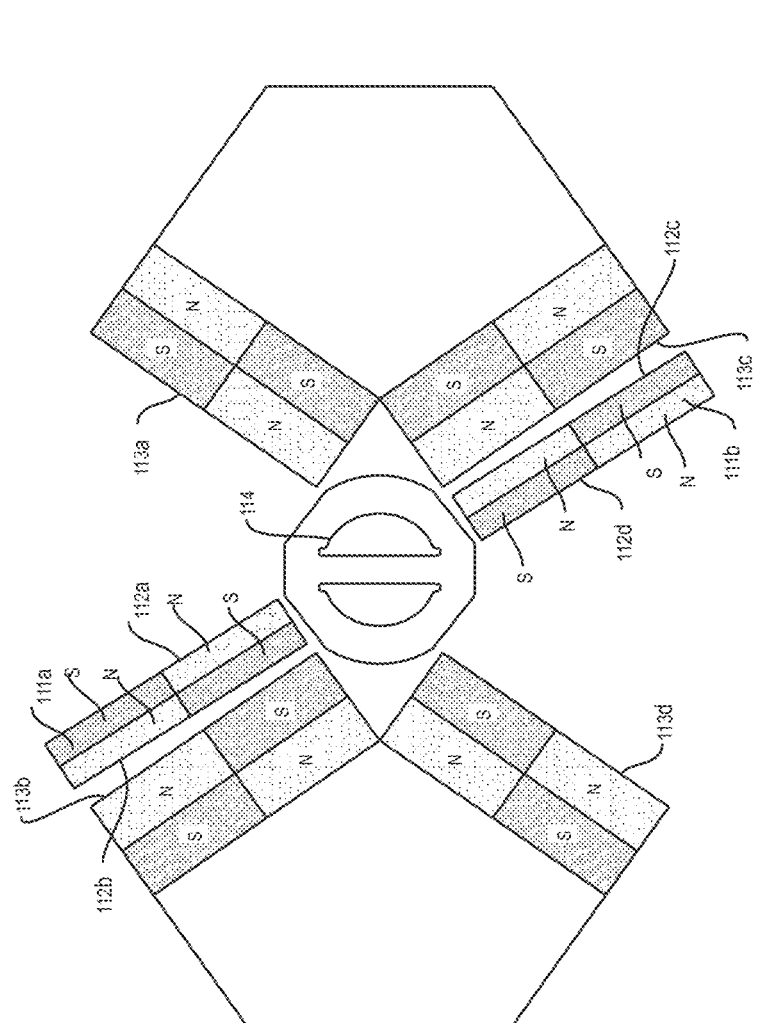

FIG. 23A illustrates a top view of the assembly of FIG. 22A. FIG. 23B illustrates a top view of an assembly having two arms configured to oscillate between magnetic bumpers, where the stator magnets include stacked magnets. In various embodiments, the force on the system due to the magnets is balanced, where each arm 111*a*, 111*b* may experience an equal magnetic field in the direction facilitating the rotation. Due to the symmetry of the system, although the magnetic repulsion is normal to the magnet face (i.e., a straight path) and the motion of the rotor magnet is in an arc, the force on the axle is balanced with that applied on the opposite side, keeping the entire system balanced.

In various embodiments, one or more assemblies may be included, at distinct positions (e.g., positioned above/below other system components) in order to facilitate a more balanced overall system, increase the total repelling force, etc. For example, a first assembly may rotate clockwise while a second assembly rotates with the same angular velocity but in the opposite rotational direction (i.e., counterclockwise). In various embodiments, additional arms (e.g., 4 arms, 6 arms, etc.) may be included used to increase the repelling force. In various embodiments, as described in more detail in FIG. 29, a single arm may be used. In various embodiments, the use of two or more arms (as shown in FIGS. 13 and 14A-14B) may reduce the magnet size required to generate the desired torque on the rotor, and reduce the overall size of the system (e.g., a height of the system).

Figure 24:
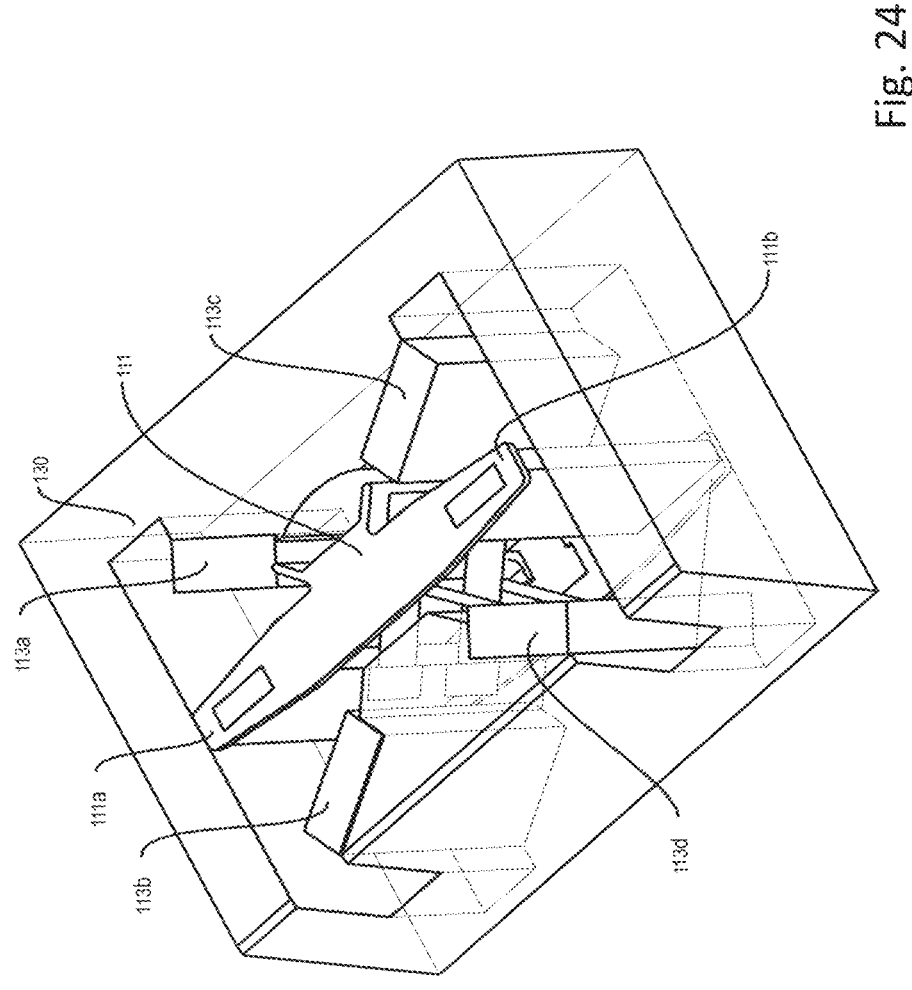
FIG. 24 illustrates an oscillatory system having two arms configured to oscillate between stator magnets in accordance with an embodiment of the present disclosure.

FIG. 24 illustrates an oscillatory system having two arms configured to oscillate between magnetic bumpers. Similar to FIGS. 5A and 6A, the rotor 111 includes arms 111*a*, 111*b* having rotor magnets. In FIG. 24, the stator 130 may further include a housing that contains the full assembly. In various embodiments, the stator 130 includes an open top portion for access to the components of the assembly. In various embodiments, one or more flexures affix the stator to the rotor. In various embodiments, the one or more flexures exert a linear spring force on the rotor proportional to the displacement and elastic modulus of the flexure. In various embodiments, the flexures do not contribute to resonance of the system. In various embodiments, the rotor is rotationally coupled to the stator via a bearing and a shaft (as an alternative to the flexures).

Figure 25A:
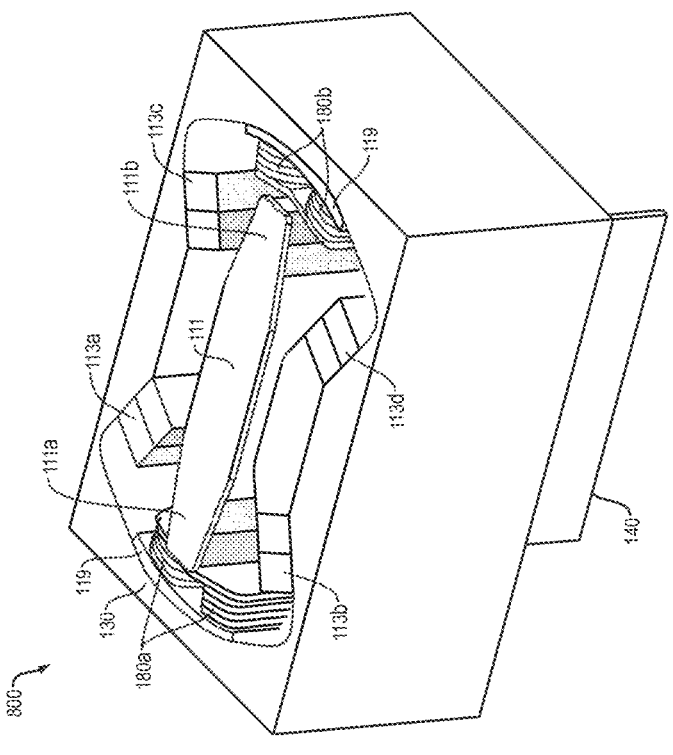
FIG. 25A illustrates an oscillatory system in which the electric motor includes booster electromagnets in accordance with an embodiment of the present disclosure.
Figure 25B:
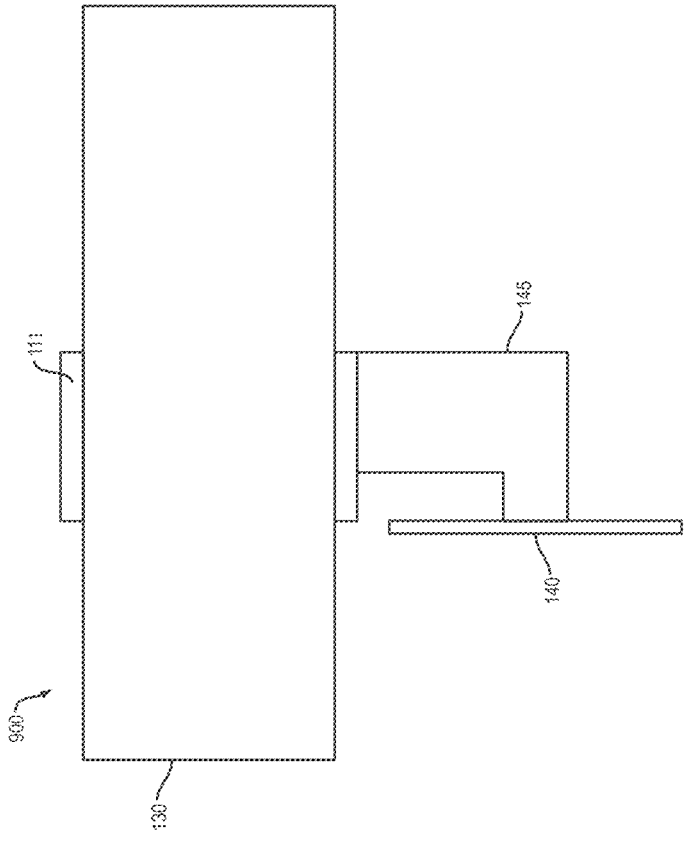
FIG. 25B illustrates a side profile of the oscillatory system of FIG. 25A in accordance with an embodiment of the present disclosure.

FIG. 25A illustrates an oscillatory system 800 having a stator 130 that houses the bumper magnet assembly and a payload 140 rotatably coupled to the rotor 111 of the assembly. FIG. 25B illustrates a side view of the oscillatory system 800. Similar to the above figures, the oscillatory system 800 includes a rotor 111 having two arms 111*a*, 111*b* and rotor magnets at the ends of each arm 111*a*, 111*b*. The oscillatory system 800 further includes a stator 130 having stator magnets 113*a*-113*d*. As shown in FIG. 25A, the oscillatory system 800 further includes booster electromagnets 180*a*, 180*b* disposed within the stator 130 housing. In various embodiments, the booster electromagnets 180*a*, 180*b* are disposed within a recess in the housing such that the booster electromagnets are flush with an interior surface of the housing. In various embodiments, the booster electromagnets 180*a*, 180*b* include a plurality of coils. In various embodiments, when energized, the resulting magnetic field from the booster electromagnets 180*a*, 180*b* causes a magnetic force on the rotor magnets of the rotor arms 111*a*, 111*b*. In various embodiments, the magnetic force causes the rotor arms 111*a*, 111*b* to move (e.g., translate, rotate, and/or oscillate). In various embodiments, the booster electromagnets 180*a*, 180*b* are positioned externally to a path travelled by the rotor magnets such that the rotor magnets and rotor arms 111*a*, 111*b* do not contact the booster electromagnets 180*a*, 180*b* as the rotor arms 111*a*, 111*b* oscillate. In various embodiments, the system 800 includes two or more sets of booster electromagnet coils positioned within the housing for each rotor arm, as shown in FIG. 31B.

In various embodiments, the booster electromagnets 180*a*, 180*b* include a plurality of coils through which a voltage is applied to generate a magnetic field. In various embodiments, each booster electromagnet 180*a*, 180*b* includes two or more adjacent sets of coils. In various embodiments, a voltage is applied to the booster electromagnets 180*a*, 180*b* to generate a magnetic field that drives oscillation of the rotor 111, and thereby drives oscillation of the mirror 140. In various embodiments, a voltage is applied to the booster electromagnets 180*a*, 180*b* to generate a magnetic field that is used to control oscillation of the mirror 140 when the mirror is driven by an external motor (e.g., a voice coil actuator). In various embodiments, the applied voltage is oscillated to generate an alternating magnetic field and exert magnetic force on the rotor magnets on the rotor arms 111*a*, 111*b*. In various embodiments, the alternating magnetic field generated by the booster electromagnets 180*a*, 180*b* causes the rotor 111 to oscillate at the resonant frequency of the oscillatory system 800.

Figure 26:
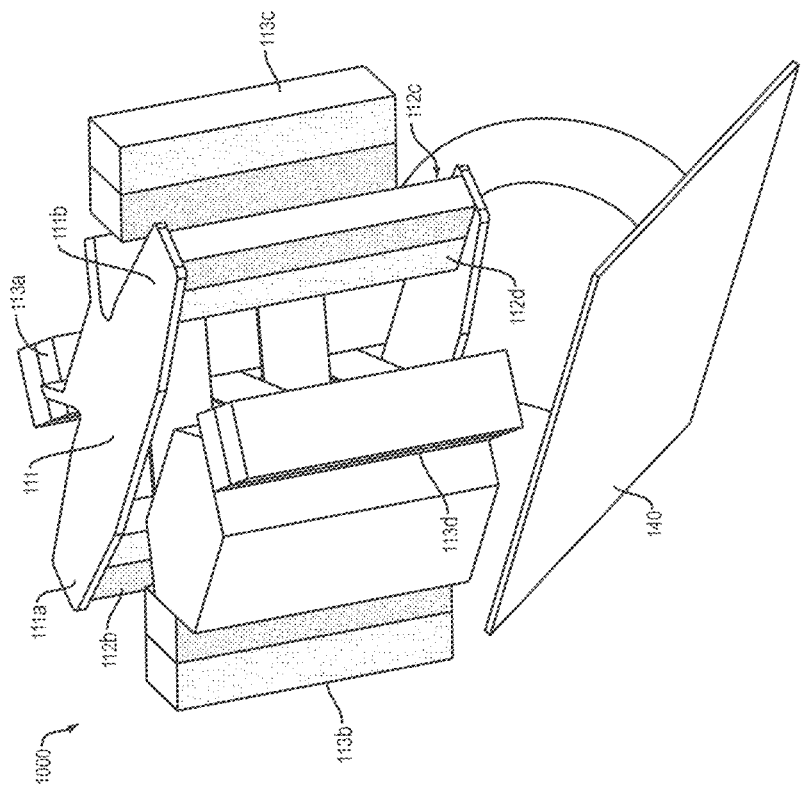
FIG. 26 illustrates an oscillatory system having a payload in accordance with an embodiment of the present disclosure.

FIG. 26 illustrates a front view of an oscillatory system 900 including a mirror 140 and a magnetic bumper assembly as described above. The magnetic bumper assembly is substantially similar to the assemblies described above and includes a rotor 111 having two arms 111*a*, 111*b* and rotor magnets at the ends of each arm 111*a*, 111*b*. The system 900 further includes a stator 130 having stator magnets 113*a*-113*d* attached thereto.

Figure 27:
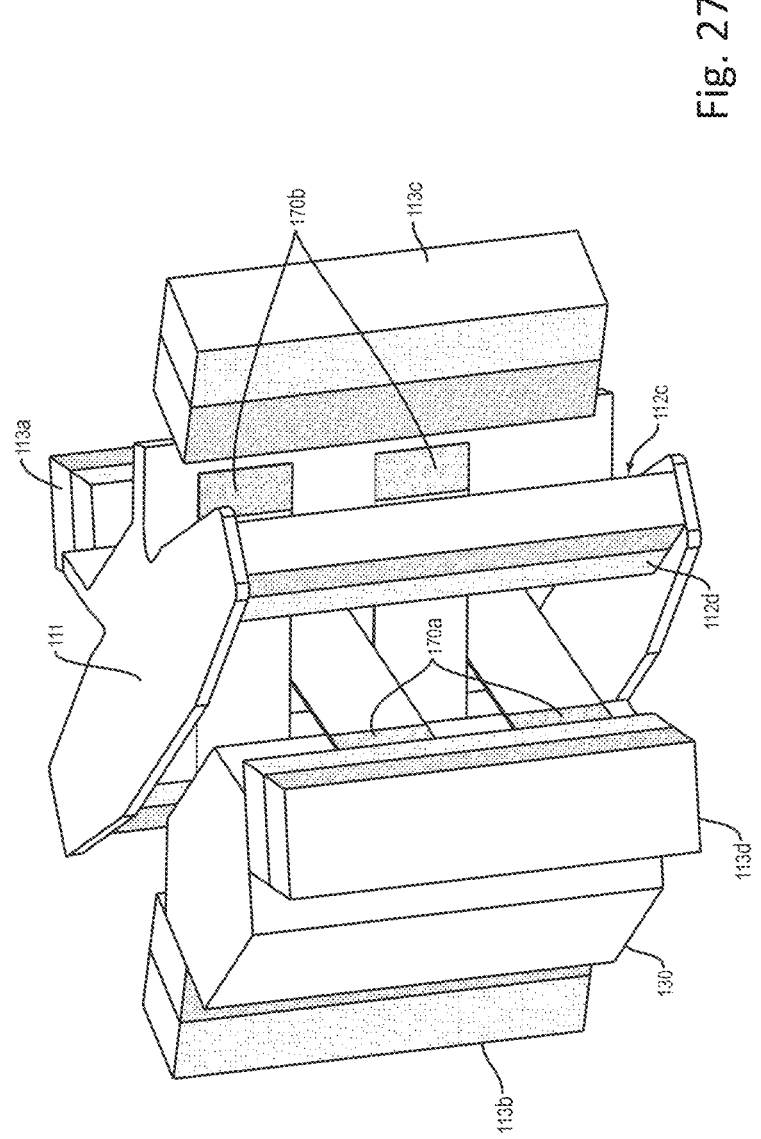
FIG. 27 illustrates stator magnets affixed to a stator and a rotor coupled to the stator in accordance with an embodiment of the present disclosure.

FIG. 27 illustrates stator magnets 113*a*, 113*c* affixed to a stator and a rotor coupled to the stator 130 via flexures 170*a*, 170*b*. In various embodiments, the flexures 170*a*, 170*b* are made of a metal (e.g., spring steel, stainless steel, titanium, grades of bronze, etc.). In various embodiments, the flexures 170*a*, 170*b* are made of a polymer. In various embodiments, a material for the flexures 170*a*, 170*b* has an elastic modulus in the range of 100 GPA to 310 GPa to thereby provide a coupling that allows the rotor to rotate about an axis and/or provide additional control of rotor oscillation. In various embodiments, a material for the flexures 170*a*, 170*b* has an elastic modulus in the range of 200 GPA to 210 GPa. In various embodiments, the flexibility of the flexures may be adjusted by swapping out one flexure material for another material to thereby adjust control parameters of the rotor during oscillation. In various embodiments, the flexures are rigid such that rotation of the rotor is permitted up to a required angle. In various embodiments, as an alternative to flexures, the rotor 111 may be rotatably coupled to the stator via a bearing (e.g., ball bearing).

Figure 28:
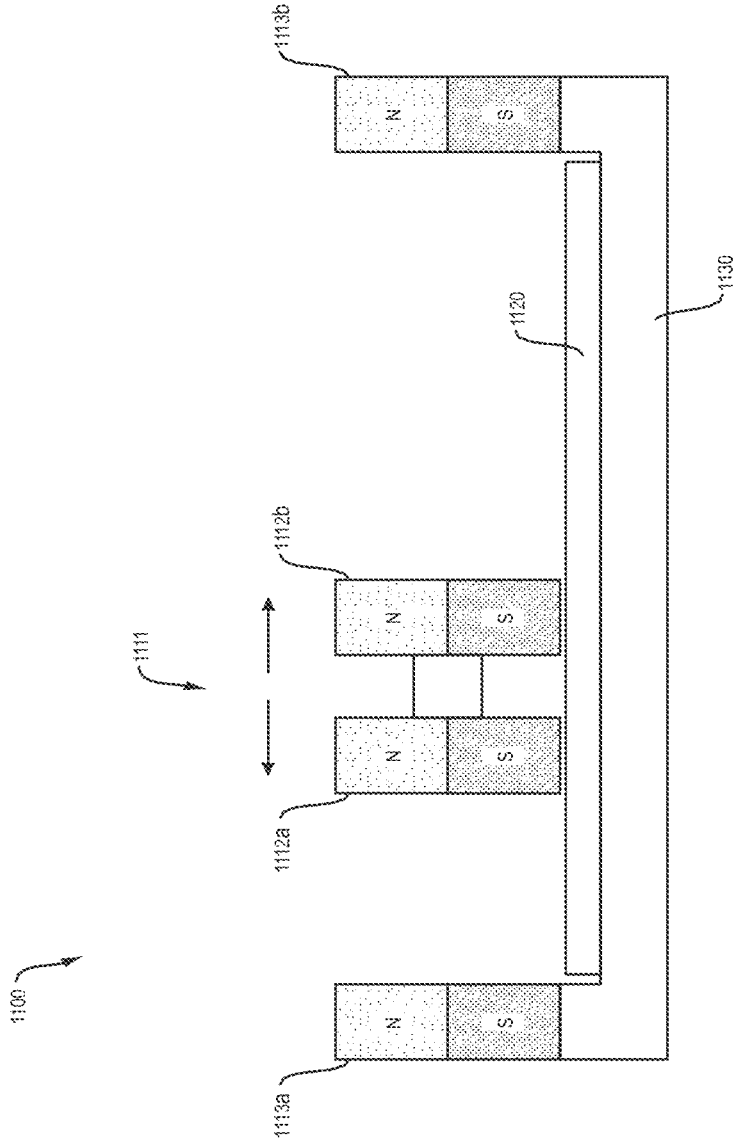
FIG. 28 illustrates a linear oscillatory system in accordance with an embodiment of the present disclosure.

FIG. 28 illustrates a linear oscillatory system 1100. The oscillatory system 1100 includes a rotor 1111 connecting two rotor magnets 1112*a*, 1112*b* that translate along a track 1120. At each terminal point along the linear path are stator magnets 1113*a*, 1113*b* coupled to a stator 1130. In some embodiments, the rotor 1111 is driven by a motor, such as a rotational motor. In some embodiments, the rotor 1111 is driven by electromagnets. In some embodiments, the rotor magnets 1112*a*, 1112*b* are electromagnets. In some embodiments, the stator magnets 1113*a*, 1113*b* are electromagnets. When driven, the rotor 1111 oscillates between the two terminal points with a substantially constant linear velocity. In various embodiments, the motor includes one or more booster electromagnets positioned external to (e.g., in close proximity to) the path of the rotor 1111. In various embodiments, the motor includes a linear voice coil motor.

Figure 29:
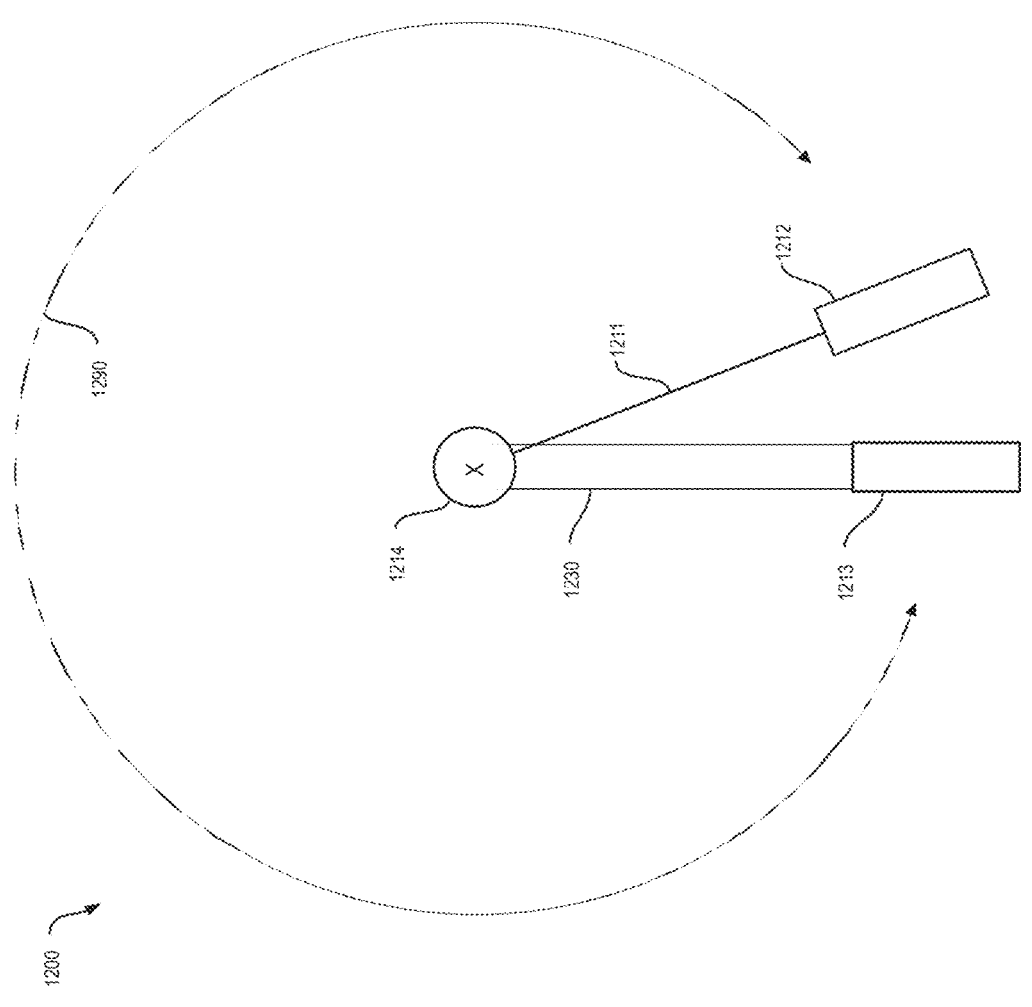
FIG. 29 illustrates a rotational oscillatory system having a single rotor arm in accordance with an embodiment of the present disclosure.

FIG. 29 illustrates a rotational oscillatory system 1200 with a single rotor arm 1211 having a rotor magnet 1212 disposed at an end thereof. In various embodiments, the rotor magnet 1212 includes stacked magnets. The rotational oscillatory system 1200 further includes a stator 1230 with a stator magnet 1213 attached thereto. In various embodiments, the stator magnet 1213 includes stacked magnets and/or end magnet(s). The stator magnet 1213 is positioned in the path 1290 of the rotor magnet 1212 such that, as the rotor magnet 1212 approaches the stator magnet 1213, a repulsive force will be exerted on the rotor arm 1211. As the rotor magnet 1212 rotates (e.g., is driven) about rotational axis 1214, the rotor magnet 1212 will approach the stator magnet 1213 after about 340 to about 360 degrees of rotation (depending on the width of the rotor and stator magnet) and the stator magnet 1213 will cause a repulsive force on the rotor arm 1211 to thereby reverse the rotational direction of the rotor arm 1211.

Figure 30:
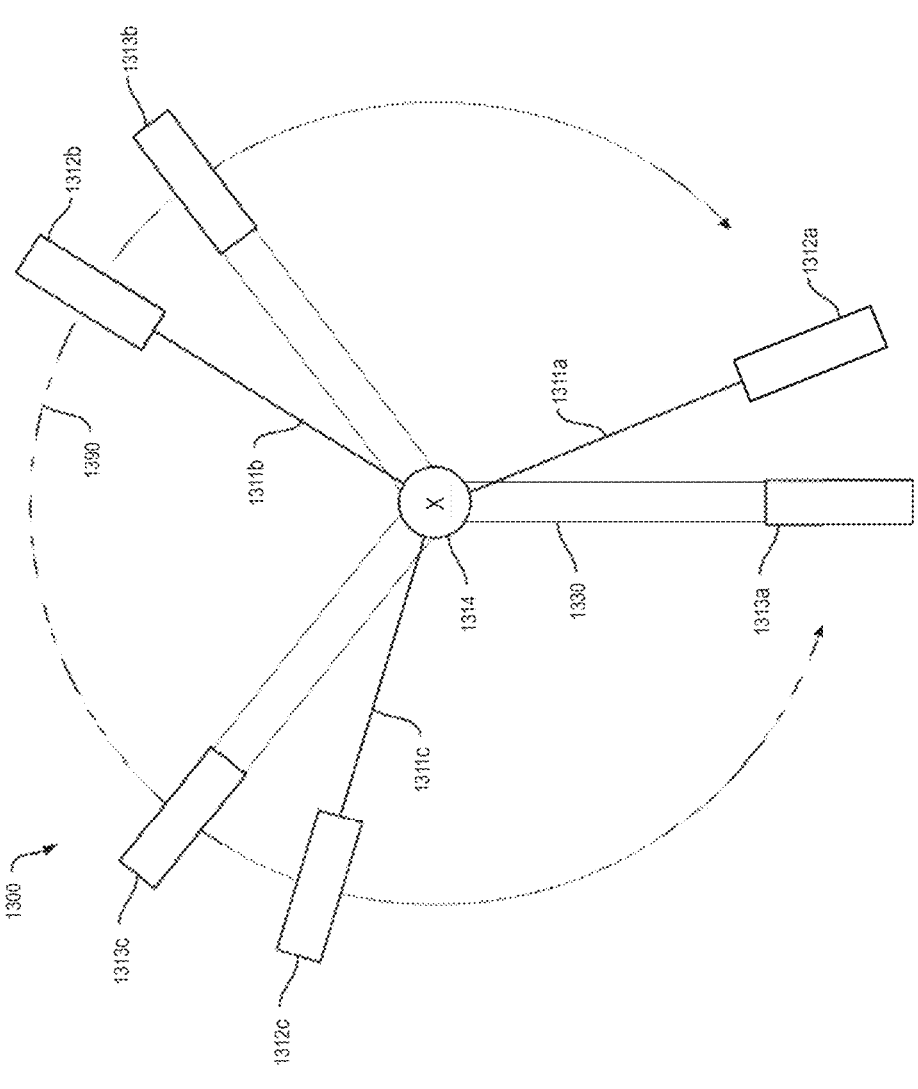
FIG. 30 illustrates a rotational oscillatory system having three rotor arms in accordance with an embodiment of the present disclosure.

FIG. 30 illustrates a rotational oscillatory system 1300 with three rotor arms 1311*a*-1311*c* where each rotor arm has a rotor magnet 1312*a*-1312*c* disposed at an end thereof. In various embodiments, the rotor magnets 1312*a*-1312*c* include stacked magnets. The rotational oscillatory system 1300 further includes a stator 1330 with three stator magnets 1313*a*-1313*c* attached thereto. In various embodiments, the stator magnets 1313*a*-1313*c* include stacked magnets and/or end magnet(s). The stator magnets 1313*a*-1313*c* are positioned in the path 1390 of the rotor magnets 1312*a*-1312*c* such that, as the rotor magnets 1312*a*-1312*c* approach the stator magnets 1313*a*-1313*c*, a repulsive force will be exerted on the rotor arms 1311*a*-1311*c*. As the rotor magnets 1312*a*-1312*c* rotate (e.g., are driven) about rotational axis 1314, the rotor magnets 1312*a*-1312*c* will approach the stator magnets 1313*a*-1313*c* after about 100 to about 120 degrees of rotation (depending on the width of the rotor and stator magnets) and the stator magnet 1313 will cause a repulsive force on the rotor arm 1311 to thereby reverse the rotational direction of the rotor arm 1311.

Figure 31A:
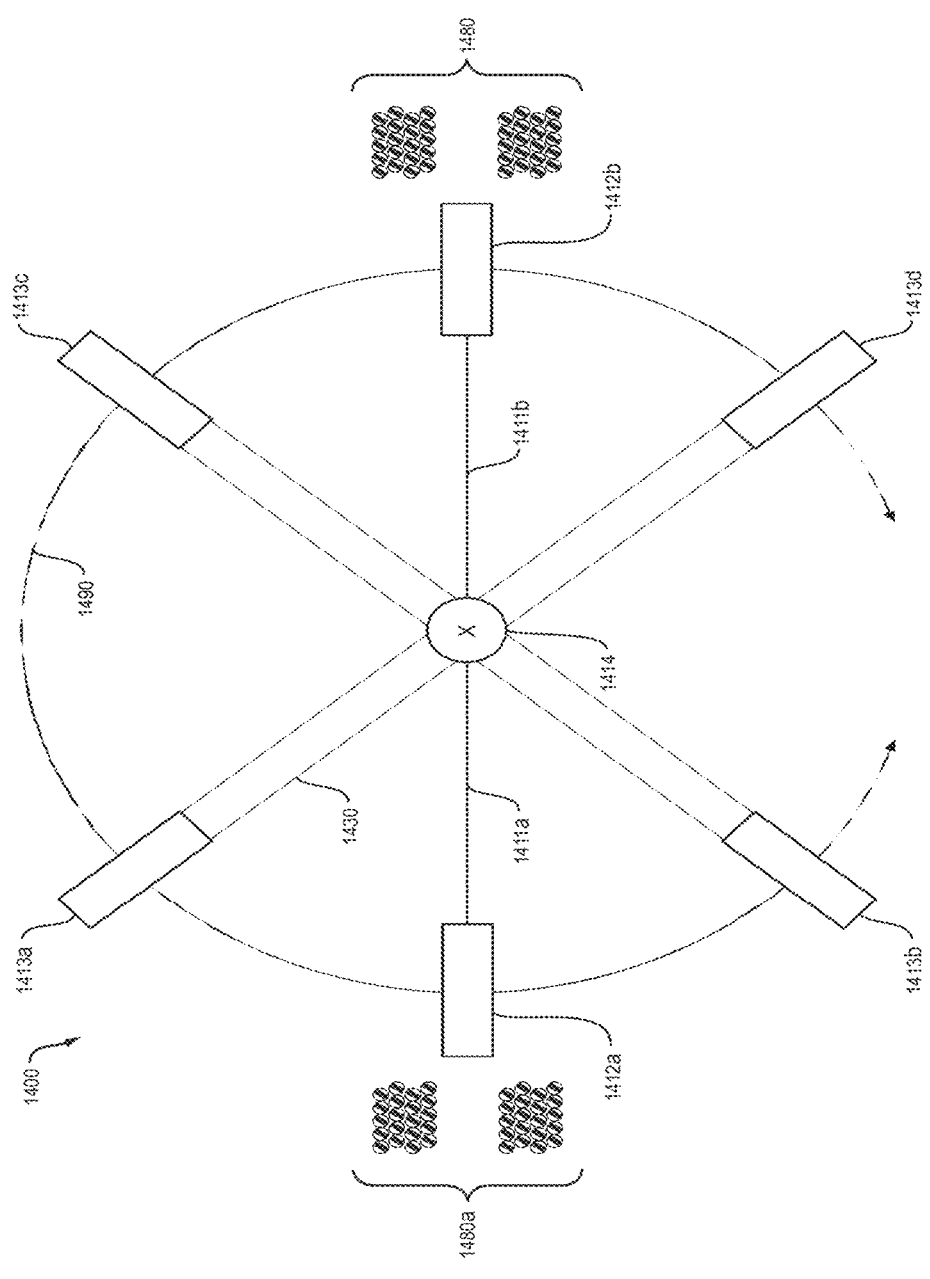
FIGS. 31A-31B illustrate a rotational oscillatory system having two rotor arms and booster electromagnets in accordance with an embodiment of the present disclosure.
Figure 31B:
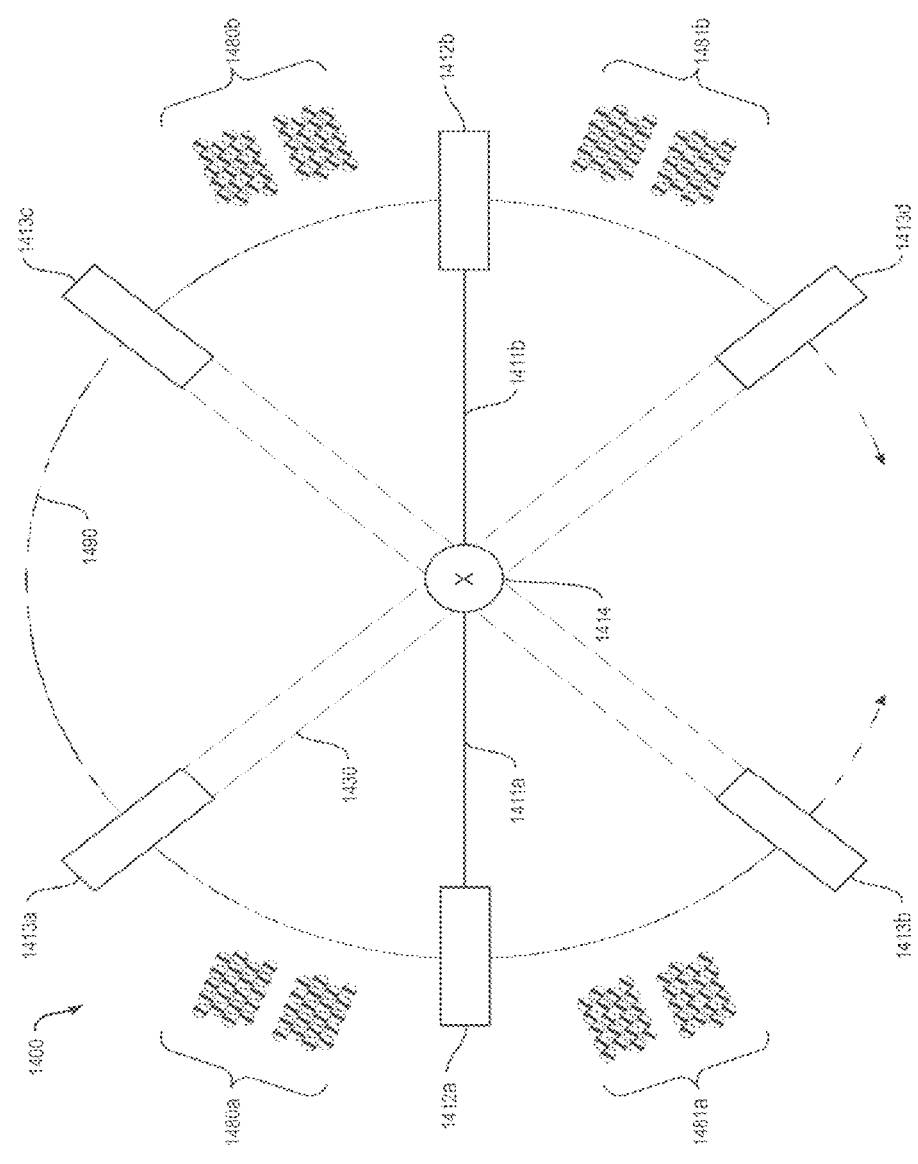

FIGS. 31A-31B illustrate a rotational oscillatory system 1400 with two rotor arms 1411*a*-1411*b* where each rotor arm has a rotor magnet 1412*a*-1412*b* disposed at an end thereof. In various embodiments, the rotor magnets 1412*a*-1412*b* include stacked magnets. In FIG. 31A, the rotational oscillatory system 1400 further includes booster electromagnets 1480*a*-1480*b* positioned external to the path 1490 of the rotor magnets 1412*a*-1412*b* (e.g., radially further away from the rotational axis 1414 than the rotor magnets 1412*a*-1412*b*). The rotational oscillatory system 1400 further includes a stator 1430 with four stator magnets 1413*a*-1413*d* attached thereto. In various embodiments, the stator magnets 1413*a*-1413*d* include stacked magnets and/or end magnet(s). The stator magnets 1413*a*-1413*d* are positioned in the path of the rotor magnets 1412*a*-1412*b* such that, as the rotor magnets 1412*a*-1412*b* approach the stator magnets 1413*a*-1413*d*, a non-linearly-increasing, repulsive magnetic force will be exerted on the rotor arms 1411*a*-1411*b*. As the rotor magnets 1412*a*-1412*b* rotate (e.g., are driven) about rotational axis 1414, the rotor magnets 1412*a*-1412*b* will approach the stator magnets 1413*a*-1413*d* after about 80 to about 180 degrees of rotation (depending on the width of the rotor magnets 1412*a*-1412*b* and stator magnets 1413*a*-1413*d*, and the angles between the stator magnets 1413*a*-1413*d*) and the stator magnets 1413*a*-1413*d* will cause a repulsive force on the rotor arms 1411*a*-1411*b* to thereby reverse the rotational direction of the rotor arm 1411.

FIG. 31B illustrates a rotational oscillatory system 1450 that includes two or more sets of booster electromagnets. In particular, FIG. 31B illustrates a first pair of booster electromagnets 1480*a*-1480*b* and a second pair of booster electromagnets 1481*a*-1481*b* positioned external to the path 1490 of the rotor magnets 1412*a*-1412*b* (e.g., radially further away from the rotational axis 1414 than the rotor magnets 1412*a*-1412*b*). As shown in FIG. 31B, booster electromagnets 1480*a*-1480*b* and booster electromagnets 1481*a*-1481*b* are positioned at a substantially same radial distance away from the rotational axis of the rotor.

In various embodiments, the booster electromagnets 1480*a*-1480*b* and 1481*a*-1481*b* include a plurality of coils. In various embodiments, the booster electromagnets 1480*a*-1480*b* and 1481*a*-1481*b* may be positioned to optimize (e.g., maximize) the magnetic force applied to the rotor magnets 1412*a*-1412*b* by the booster electromagnets given the type of motion of the rotor arms 1411*a*-1411*b* (e.g., whether rotational or linear). For example, the plurality of coils may be positioned such that a longitudinal axis of the coils is substantially directed towards the rotational axis 1414. In various embodiments, the booster electromagnets 1480*a*-1480*b* and 1481*a*-1481*b* provide a magnetic field to control motion of the rotor arms 1411*a*-1411*b*. In various embodiments, the booster electromagnets 1480*a*-1480*b* and 1481*a*-1481*b* provide a constant magnetic field, for example, by providing a constant voltage to the booster electromagnets 1480*a*-1480*b* and 1481*a*-1481*b*. In various embodiments, the booster electromagnets 1480*a*-1480*b* and 1481*a*-1481*b* provide a variable magnetic field by adjusting a voltage supplied to the booster electromagnets 1480*a*-1480*b* and 1481*a*-1481*b*.

The oscillatory system may further include a controller for controlling motion (e.g., a velocity) of the rotor. In various embodiments, the controller includes proportional control. In various embodiments, the controller includes integral control. In various embodiments, the controller includes derivative control. In various embodiments, the controller receives as input motion data of the rotor (e.g., from a linear or rotational encoder). In various embodiments, the controller receives, as input, voltage data supplied to a motor. In various embodiments, the controller receives, as input, voltage data supplied to one or more electromagnets (e.g., rotor magnets, stator magnets, and/or booster electromagnets). In various embodiments, the controller adjusts the speed of a motor and/or the voltages supplied to electromagnets (e.g., rotor electromagnets, stator electromagnets, and/or booster electromagnets) based on the resonant frequency of the system, for example, if the resonant frequency of the system changes as the rotor oscillates. In various embodiments, the controller is configured to maintain the rotor oscillating at the inherent resonant frequency of the oscillatory system. In various embodiments, the booster electromagnets include an air core. In various embodiments, the booster electromagnets include a magnetic core. In various embodiments, the magnetic core tunes the magnetic field (e.g., magnetic lines pass through the magnetic core and increase the magnetic strength).

In various embodiments, each electromagnet is controlled with an H-bridge. In various embodiments, booster electromagnets opposite (i.e., 180 degrees) one another operate in pairs. In various embodiments, booster electromagnets opposite (i.e., 180 degrees) one another are controlled with the same H-bridge. In various embodiments, booster electromagnets opposite (i.e., 180 degrees) one another are controlled with separate and synchronized H-bridges. For example, booster electromagnets 1480a-1480b may be controlled with one H-bridge and booster electromagnets 1481a-1481b may be controlled with a different H-bridge. In various embodiments, booster electromagnets opposite one another are equidistant from an axis (e.g., a rotational axis).

In various embodiments, the booster electromagnets are controlled through the duty cycle. In various embodiments, the H-bridge has a free-running configuration, a positive voltage (+V) configuration, a negative voltage −V configuration, and a brake operation configuration. In various embodiments, the +V configuration generates a magnetic field that accelerates the rotor magnet in a first direction (e.g., clockwise). In various embodiments, the −V configuration generates a magnetic field that accelerates the rotor magnet in a second direction (e.g., counterclockwise). In various embodiments, in the free-running configuration, the booster electromagnet has no current passing through the coils and, thus, does not generate a magnetic field. In various embodiments, the brake operation configuration slows the rotor magnet. In the free-running configuration, all switches in the H-bridge are open (i.e., disconnected). In the brake operation configuration, the booster electromagnet is coupled to ground from both ends of the coil. In the +V configuration, a first end of the coil is coupled to a voltage at the common collector Vcc and a second end of the coil is coupled to ground. In the −V configuration, the first end of the coil is coupled to ground and the second end of the coil is coupled to the voltage at the common collector Vcc.

In various embodiments, the duty cycle switches between a positive voltage and negative voltage. In various embodiments, the duty cycle includes a square wave alternating between a positive voltage (+V) and a negative voltage (−V). In various embodiments, the duty cycle is adjusted by increasing or decreasing the amount of time that the positive and/or negative voltage is applied to the booster electromagnet. In various embodiments, the duty cycle is adjusted by allowing the booster electromagnets to assume the free-running configuration. In various embodiments, the duty cycle is adjusted by allowing the booster electromagnets to assume the brake operation configuration. In various embodiments, the positive and negative voltages may each be applied during windows of time that the rotor magnet is within an effective range (e.g., an effective range of angles) that is suitable to drive the rotor magnet with the magnetic field generated by the booster electromagnets. In various embodiments, the magnitude of voltage in the +V and/or −V configurations may be increased or decreased to adjust the duty cycle of the booster electromagnets. In various embodiments, the square wave may be continuous. In various embodiments, the square wave is an interrupted square wave (e.g., the booster electromagnets assume a free-running configuration between each positive voltage and/or negative voltage component of the interrupted square wave). In various embodiments, the positive and/or negative voltage is applied for any suitable amount of time to thereby drive the rotor magnets (e.g., at the resonant frequency of the system). For example, the positive voltage and negative voltage may each be applied for an amount of time $dt_1$ in a continuous square wave. In various embodiments, $dt_1$ is any suitable amount of time such that the rotor magnets oscillate at the resonant frequency of the system. In another example, the positive voltage and negative voltage may each be applied for an amount of time $dt_2$ in an interrupted square wave where the booster electromagnets are in the free-running configuration during the time dtf in between the positive and negative voltages. In various embodiments, $dt_2$ is less than $dt_1$. In various embodiments, $dt_2$ is greater than $dt_1$. In various embodiments, $dt_2$ is about equal to $dt_1$. In various embodiments, $dt_2$ is any suitable amount of time such that the rotor magnets oscillate at the resonant frequency of the system. In various embodiments, dtf is any suitable amount of time such that the rotor magnets oscillate at the resonant frequency of the system.

In various embodiments, where two or more sets of booster electromagnets are included near the path of each rotor magnet (e.g., as shown in FIG. 31B), the duty cycles of each pair of booster electromagnets opposite one another are time-lagged by a predetermined amount of time (e.g., the amount of time for the rotor magnet(s) to exit the effective range of the first pair of booster electromagnets and enter the effective range of the second pair of booster electromagnets). In various embodiments, a middle of each square wave peak or valley corresponds to the time when the rotor magnet is closest in proximity to the respective booster electromagnet being driven.

Figure 32:
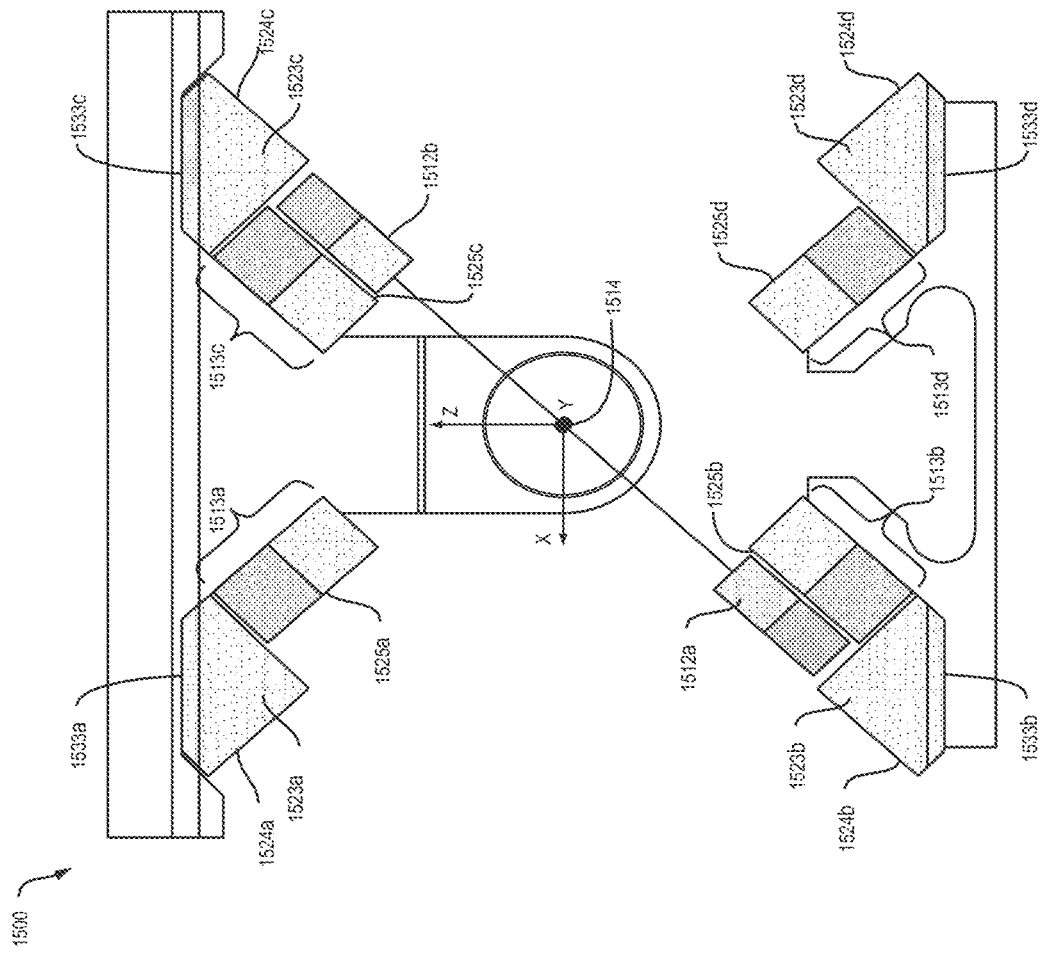
FIG. 32 illustrates a rotational oscillatory system with both stator and rotor magnets having stacked magnets and the stator magnets having an end magnet in accordance with an embodiment of the present disclosure.

FIG. 32 illustrates a rotational oscillatory system 1500 with both stator and rotor magnets having stacked magnets and the stator magnets having an end magnet. Similar to the above, the system 1500 includes two rotor arms (not shown) having rotor magnets 1512a-1512b disposed at the ends thereof and configured to rotate about a rotational axis 1514. The system 1500 further includes four stator magnets 1533a-1533d, where each stator magnet includes two stacked magnets 1513a-1513d and an end magnet 1523a-1523d. The end magnets 1523a-1523d are larger (e.g., have a greater volume) than the stacked magnets 1513a-1513d and each include a surface 1524a-1524d that extends beyond the surfaces 1525a-1525d of the stacked magnets 1513a-1513d along the path of the rotor magnets 1512a-1512b. In various embodiments, an area of the surface 1524a-1524d of each end magnet 1523a-1523d is greater than an area of the surface 1525a-1525d of each stacked magnet 1513a-1513d and/or an area of the surface of each rotor magnet 1512a-1512b. The first rotor arm magnet 1512a oscillates between stator magnet 1513a and stator magnet 1513b and the second rotor arm magnet 1512b oscillates between stator magnet 1513c and stator magnet 1513d.

Figure 33:
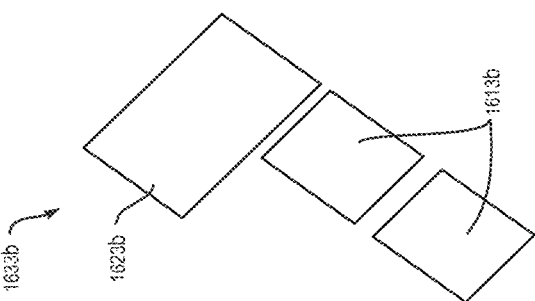
FIG. 33 illustrates a rotational oscillatory system with both stator and rotor magnets having stacked magnets and the stator magnets having an end magnet in accordance with an embodiment of the present disclosure.
Figure 33:
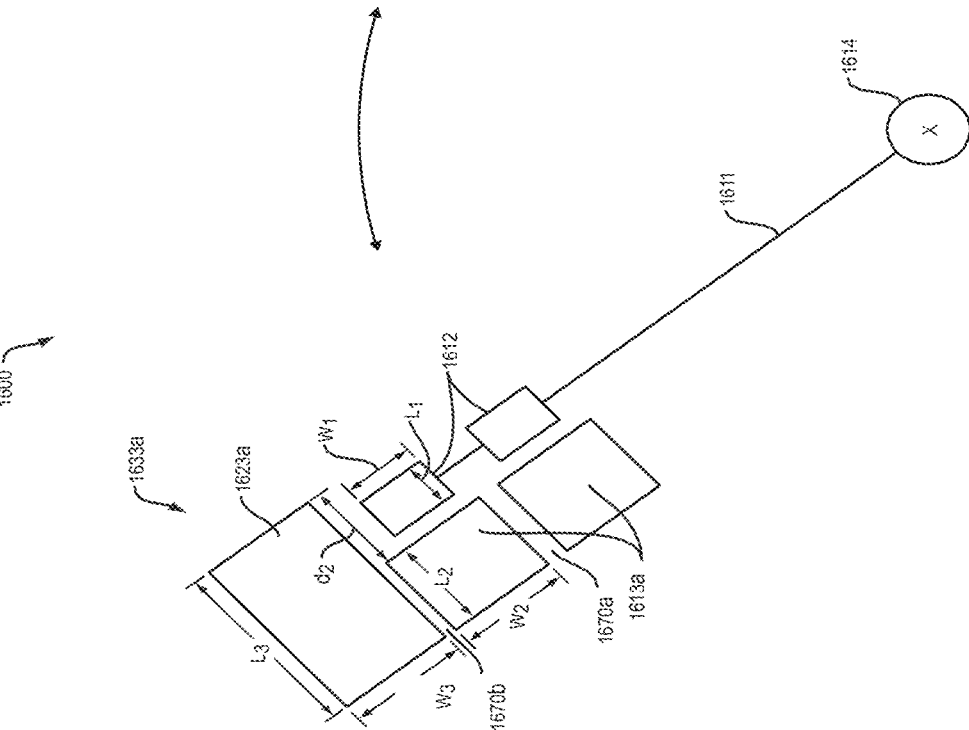

FIG. 33 illustrates a rotational oscillatory system 1600 with both stator and rotor magnets having stacked magnets and the stator magnets having an end magnet on each stator magnet. The end magnets 1623a-1623b have an alternating polarization with the stacked magnets 1613a-1613b. Similar to the above, the system 1600 includes a rotor arm 1611 having a rotor magnet 1612 disposed at the end and is configured to rotate about a rotational axis 1614. In various embodiments, the rotor magnet 1612 includes stacked magnets. The rotor magnet 1612 oscillates between stacked magnets 1613a of the first stator magnet 1633a and stacked magnets 1613b of the second stator magnet 1633b. Each stator magnet 1633a-1633b includes two stacked magnets 1613a-1613d and an end magnet 1623a-1623d that is larger than the stacked magnets and includes a surface that extends beyond the surfaces of the stacked magnets 1613a-1613d.

As shown in FIG. 33, the rotor magnet 1612 includes stacked magnets where each stacked magnet has a length $L_1$ and a width $W_1$. The stacked magnets of the stator magnets each have a length $L_2$ and a width $W_2$ and the end magnet 1623 has a length $L_3$ and a width $W_3$. As shown in FIG. 33, the width $W_2$ of each stacked magnet 1613a-1613b is greater than the width $W_1$ of each corresponding stacked magnet in the rotor magnet 1612, thereby providing a greater static overlap area (i.e., the area of stator magnet facing the rotor magnet is larger than the area of the rotor magnet). In various embodiments, the size (length and/or width) of each stator magnet may be increased such that there is no inertial impact on the system, but so that there is a benefit in the resonance frequency (e.g., a higher resonance frequency is obtainable). Increasing the size of the stator magnet also allows for a higher assembly tolerance. In various embodiments, providing end magnets 1623 may induce a greater torque on the rotor magnet by utilizing the potential magnetic energy more effectively. In various embodiments, where weaker magnetic materials are used, greater torque may be required to adequately repel the rotor magnets during oscillation.

As shown in FIG. 33, the system 1600 further includes gaps 1670a-1670b between the stacked magnets 1613a-1613b and the end magnets 1623a-1623b. In various embodiments, the gaps 1670a-1670b increase the magnetic field efficiency, participating magnetic field, and/or active magnetic field. In various embodiments, the gaps 1670a-1670b may reduce inertia since the size of the rotor magnets can be reduced.

In various embodiments, $L_3$ is greater than $L_2$. In various embodiments, $L_3$ is about 1 mm to about 100 mm. In various embodiments, $L_3$ is about 5.54 mm. In various embodiments, $L_2$ is about 1 mm to about 100 mm. In various embodiments, $L_2$ is about 3.04 mm. In various embodiments, $L_1$ is about 1 mm to about 100 mm. In various embodiments, $L_1$ is about 2 mm. In various embodiments, $d_2$ is about equal to $L_1$. In various embodiments, $d_2$ is greater than or equal to $L_1/2$.

FIG. 17 illustrates a rotational oscillatory system 1700 with both stator and rotor magnets having stacked magnets and the stator magnets having two end magnets on each stator magnet. The end magnets 1723a-1723b have an alternating polarization with the stacked magnets 1713a-1713b. Similar to the above, the system 1700 includes a rotor arm 1711 having a rotor magnet 1712 disposed at the end and is configured to rotate about a rotational axis 1714. The rotor magnet 1712 oscillates between stacked magnets 1713a of the first stator magnet and stacked magnets 1713b of the second stator magnet. Each stator magnet 1733a-1733b includes two stacked magnets 1713a-1713d and an end magnet 1723a-1723d that is larger than the stacked magnets and includes a surface that extends beyond the surfaces of the stacked magnets 1713a-1713d.

As shown in FIG. 17, the rotor magnet 1712 includes stacked magnets where each stacked magnet has a length $L_1$ and a width $W_1$. The stacked magnets of the stator magnets each have a length $L_2$ and a width $W_2$ and each end magnet 1723 has a length $L_3$ and a width $W_3$. As shown in FIG. 17, the width $W_2$ of each stacked magnet 1713a-1713b is greater than the width $W_1$ of each corresponding stacked magnet in the rotor magnet 1712, thereby providing a greater static overlap area (i.e., the area of stator magnet facing the rotor magnet is larger than the area of the rotor magnet). In various embodiments, the size (length and/or width) of each stator magnet may be increased such that there is no inertial impact on the system, but so that there is a benefit in the resonance frequency (e.g., a higher resonance frequency is obtainable). Increasing the size of the stator magnet also allows for a higher assembly tolerance. In various embodiments, providing end magnets 1723 may induce a greater torque on the rotor magnet by utilizing the potential magnetic energy more effectively. In various embodiments, where weaker magnetic materials are used, greater torque may be required to adequately repel the rotor magnets during oscillation.

Figure 34:
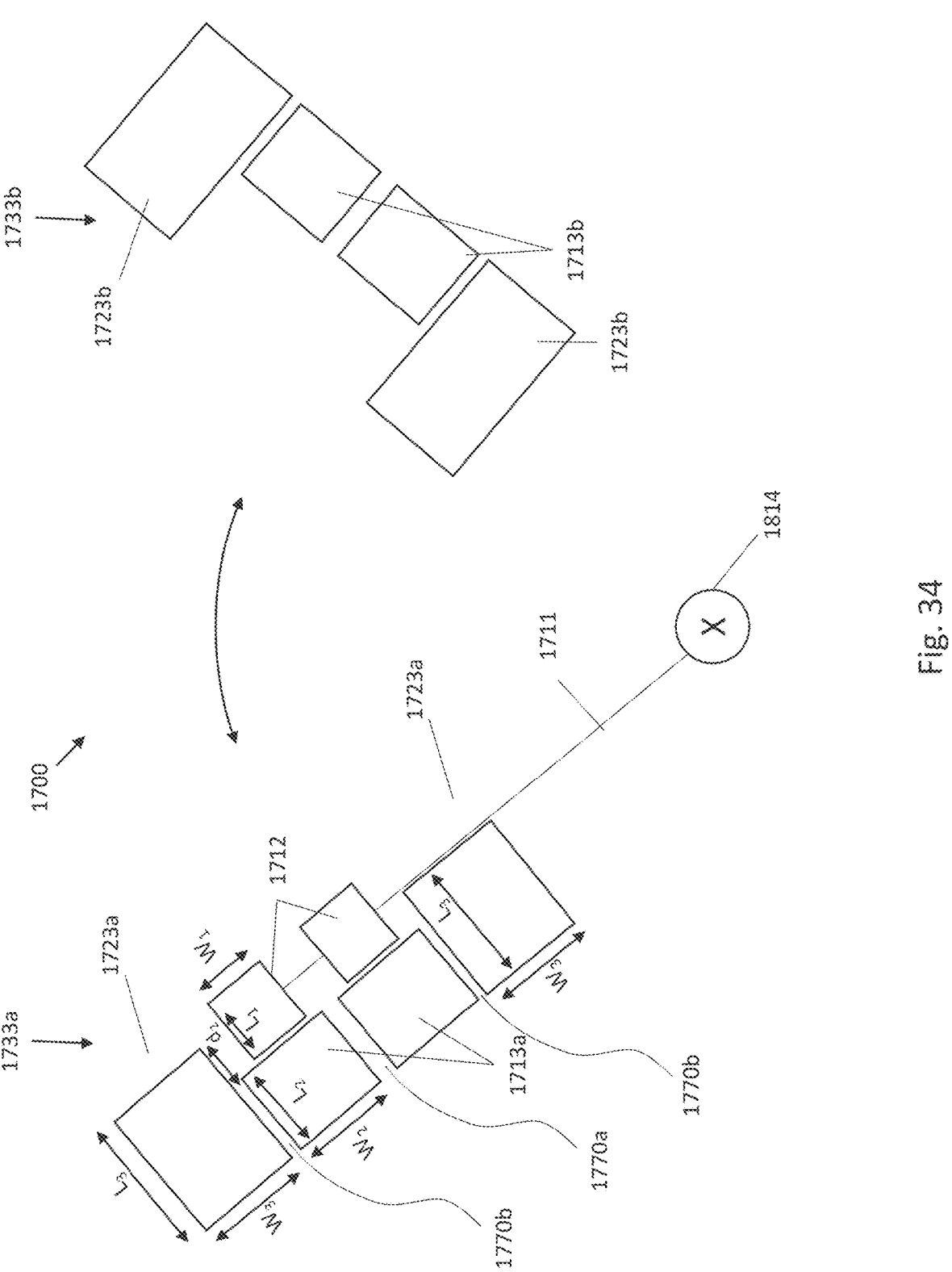
FIG. 34 illustrates a rotational oscillatory system with both stator and rotor magnets having stacked magnets and the stator magnets having two end magnets in accordance with an embodiment of the present disclosure.

As shown in FIG. 34, the system 1700 further includes gaps 1770a-1770b between the stacked magnets 1713a-1713b and the end magnets 1723a-1723b. In various embodiments, the gaps 1770a-1770b increase the magnetic field efficiency, participating magnetic field, and/or active magnetic field. In various embodiments, the gaps 1770a-1770b may reduce inertia since the size of the rotor magnets can be reduced.

Figure 35:
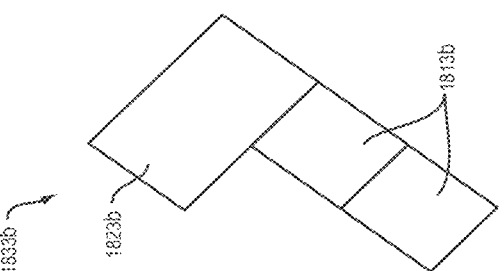
FIG. 35 illustrates a rotational oscillatory system with both stator and rotor magnets having stacked magnets and the stator magnets having an end magnet in accordance with an embodiment of the present disclosure.
Figure 35:
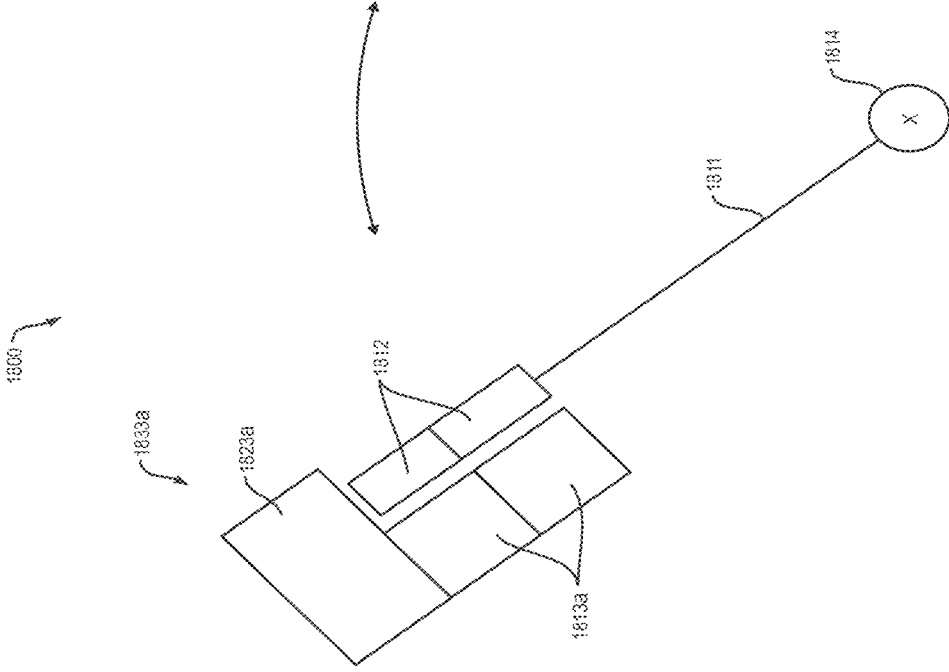

FIG. 35 illustrates a rotational oscillatory system 1800 with both stator and rotor magnets having stacked magnets and the stator magnets having an end magnet on each stator magnet. The end magnets 1823a-1823b have an alternating polarization with the stacked magnets 1813a-1813b. Similar to the above, the system 1800 includes a rotor arm 1811 having a rotor magnet 1812 disposed at the end and is configured to rotate about a rotational axis 1814. In various embodiments, the rotor magnet 1812 includes stacked magnets. The rotor magnet 1812 oscillates between stacked magnets 1813a of the first stator magnet 1833a and stacked magnets 1813b of the second stator magnet 1833b. Each stator magnet 1833a-1833b includes two stacked magnets 1813a-1813d and an end magnet 1823a-1823d that is larger than the stacked magnets and includes a surface that extends beyond the surfaces of the stacked magnets 1813a-1813d. As shown in FIG. 35, the stacked magnets 1813a-1813b and end magnet 1823a-1823b are contacting one another (i.e., minimal to no gap between magnets).

Figure 36:
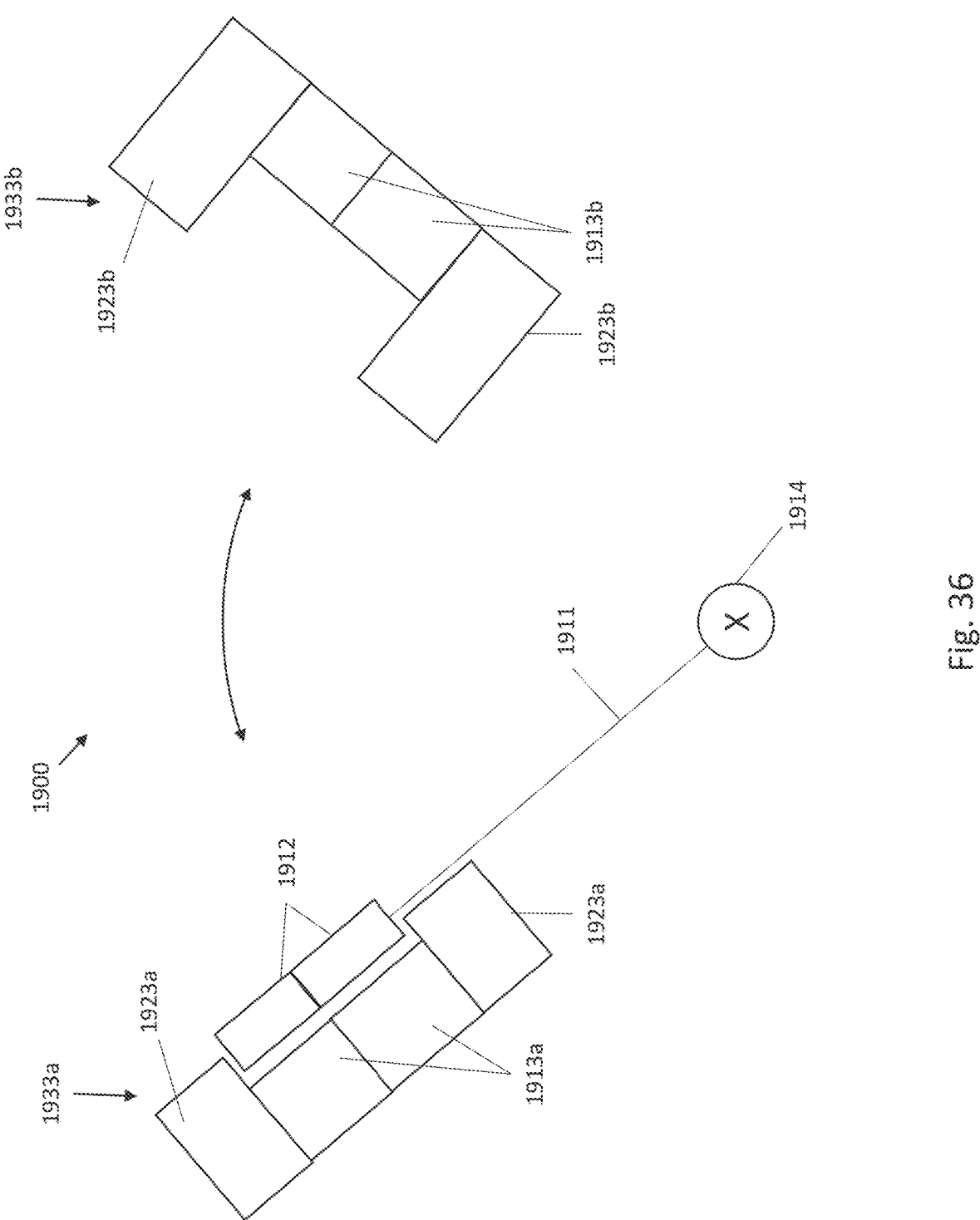
FIG. 36 illustrates a rotational oscillatory system with both stator and rotor magnets having stacked magnets and the stator magnets having two end magnets in accordance with an embodiment of the present disclosure.

FIG. 36 illustrates a rotational oscillatory system 1950 with both stator and rotor magnets having stacked magnets and the stator magnets having two end magnets on each stator magnet. The end magnets 1923a-1923b have an alternating polarization with the stacked magnets 1913a-1913b. Similar to the above, the system 1950 includes a rotor arm 1911 having a rotor magnet 1912 disposed at the end and is configured to rotate about a rotational axis 1914. The rotor magnet 1912 oscillates between stacked magnets 1913a of the first stator magnet and stacked magnets 1913b of the second stator magnet. Each stator magnet 1933a-1933b includes two stacked magnets 1913a-1913d and an end magnet 1923a-1923d that is larger than the stacked magnets and includes a surface that extends beyond the surfaces of the stacked magnets 1913a-1913d. As shown in FIG. 36, the stacked magnets 1913a-1913b and end magnets 1923a-1923b are contacting one another (i.e., minimal to no gap between magnets).

In various embodiments, any of the magnets described herein may be neodymium-iron-boron (NdFeB) magnets. In various embodiments, any of the magnets described herein may be samarium-cobalt (SmCo) magnets.

A skilled person would appreciate that any of the embodiments described hereinabove in Part II can be combined with any of the embodiment described hereinabove in Part I.

Part III: Biaxial Scanner

Figure 37:
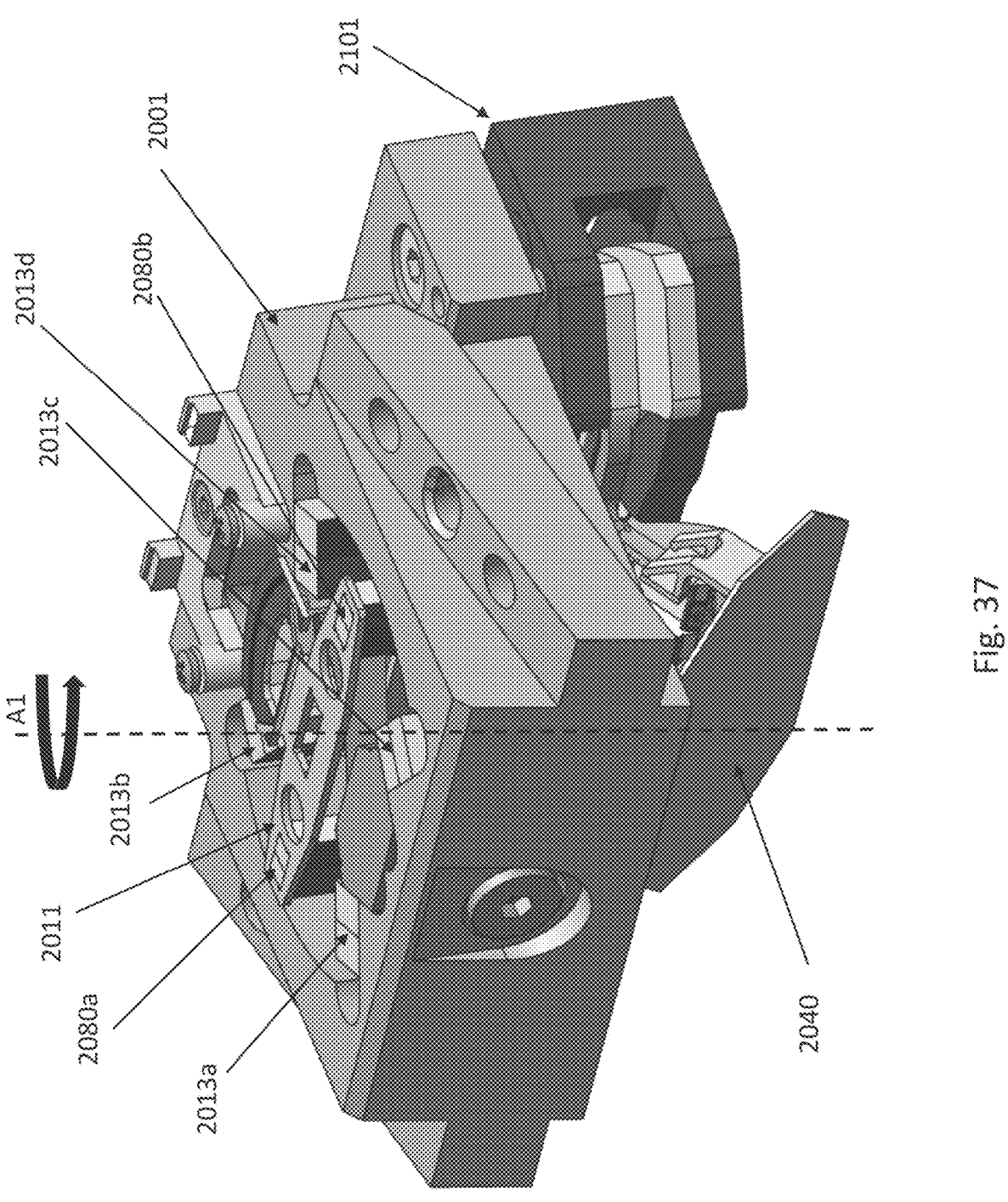
FIG. 37 depicts an exemplary oscillatory system with bi-axial rotation of a light deflector (e.g. mirror) for use in a LIDAR system, as disclosed herein.

In accordance with another aspect of the disclosure, FIG. 37 depicts another exemplary oscillatory system with biaxial rotation of a light deflector (e.g. mirror) for use in a LIDAR system. A housing 2001 is provided which includes rotor 2011 and stator 2013 for rotating the mirror about the A1 axis, the housing can include mechanical fasteners for affixing the oscillatory system to a vehicle or other structure depending on the intended application of the oscillatory system. A number of system components can be located inside the housing, e.g. the stator magnets, the bearing(s) and shaft about which the rotor rotates (if present, as in the embodiment of FIG. 52), the stationary portion of the encoder, and the booster coils (if present, as in the embodiment of FIG. 44). In operation, the housing remains stationary while the oscillatory system can actuate or rotate the mirror 2040 about two axes, as described herein, with rotation about axis A1 being performed at a resonant frequency, so that the LIDAR system can scan the field of view with a substantially uniform (constant) angular velocity in a first direction, turn around, and scan the field in the opposite direction with a substantially uniform (constant) angular velocity. This provides high acceleration at the edges or boundaries of the mirror's range of motion, while minimizing energy loss. For purpose of illustration and not limitation, some exemplary ranges of this system are approximately 50~200 Hz about axis A1, and approximately 50~150 Hz about axis A2. This is advantageous in that it provides equal measurement time to all pixels (time of flight, number of repetitions), and the resonant frequency minimizes the power required. The amplitude of the rotation about axis A1 being performed at a resonant frequency may be up to +/−45 to 60 degrees, while the amplitude of the rotation about axis A2 (at a non-resonant frequency) may be up to +/−25 to 30 degrees, enabling scanning of a wide FOV with a single scanning mirror. One advantage of the disclosed oscillatory system embodiments with bi-axial rotation, is that the oscillator has no sealing requirement, in contrast with other bi-axial oscillators, such as MEMs oscillators.

Rotation about Axis "A1"

The rotor 2011 can include magnet(s) 2080 disposed therein, with the housing 2001 circumscribing this (i.e. A1 axis) oscillatory system (while, in this exemplary embodiment of FIG. 37, the housing 2001 is disposed above the oscillatory system for rotating the payload/mirror about the A2 axis). In the exemplary embodiment shown, a pair of elongated rotor magnets 2080 are included on each end of the rotor and span the gap between the top and bottom plates forming the rotor (as described in further detail below). In example embodiments, the top and bottom plates may be a single connected part, or two separate plates. Although exemplary stator and rotor magnets depicted in the accompanying illustrations are generally symmetrical (e.g. rectangular with planar surfaces), alternative geometries (e.g. arcuate surfaces) can be employed if so desired. The exemplary rotor depicted is a unitary structure with the terminal ends of the rotor 2011 (and the magnets 2080 disposed therein) configured to rotate within the housing 2001 (which has an internal wall with a radius of curvature corresponding to the size of the rotor) between terminus points defined by the stator magnet(s) 2013. For example, rotor magnet(s) 2080a can travel between a first terminal point (adjacent stator magnet(s) 2013a) and a second terminal point (adjacent stator magnet(s) 2013b; while rotor magnet(s) 2080b simultaneously travels between a third terminal point (adjacent stator magnet(s) 2013c) and a fourth terminal point (adjacent stator magnet(s) 2013d). As described throughout this disclosure, the magnets referred to herein can be configured as permanent magnets, semi-permanent magnets, electromagnets, or combinations thereof.

In some embodiments, the radial edge of the rotor 2011 is disposed immediately adjacent to the inner sidewall of the housing 2001 (e.g. there are no intervening components). Notches or grooves can be formed in the housing 2001 proximate the locations of the stator magnets 2013, and the housing can be formed from a variety of materials which exhibit a high coefficient of thermal conductivity to rapidly dissipate heat generated during operation.

As the rotor 2011 rotates to bring the rotor magnets 2080 within the vicinity of the stator magnets 2013, or "bumpers", the repelling force between rotor/stator magnets facilitates the change in rotation direction of the rotor arms 2011 to provide the resonant frequency of oscillation about axis A1. Also, the magnets can have equivalent magnetic properties, size, and can be symmetrically positioned to generate a balanced force, such that each side of the rotor 2011 experiences an equivalent magnetic field in the direction facilitating the rotation. Furthermore, the oscillating assembly may be balanced by adding or removing weights or material in certain positions of the assembly. Furthermore, the stator magnets 2013 can be retained within the housing in a variety of ways, e.g. adhesive and/or mechanical bond, and repel the rotor magnets 2080 as described herein. In example embodiments, the stator magnets may polymer-matrix magnets, and may be molded into a part that is both the magnet and part of the rotor. Magnet may be insert molded into a polymer formed rotor/frame. The relative sizes and number of stator 2013, and/or rotor 2080, magnets can be varied as described above.

Figure 38:
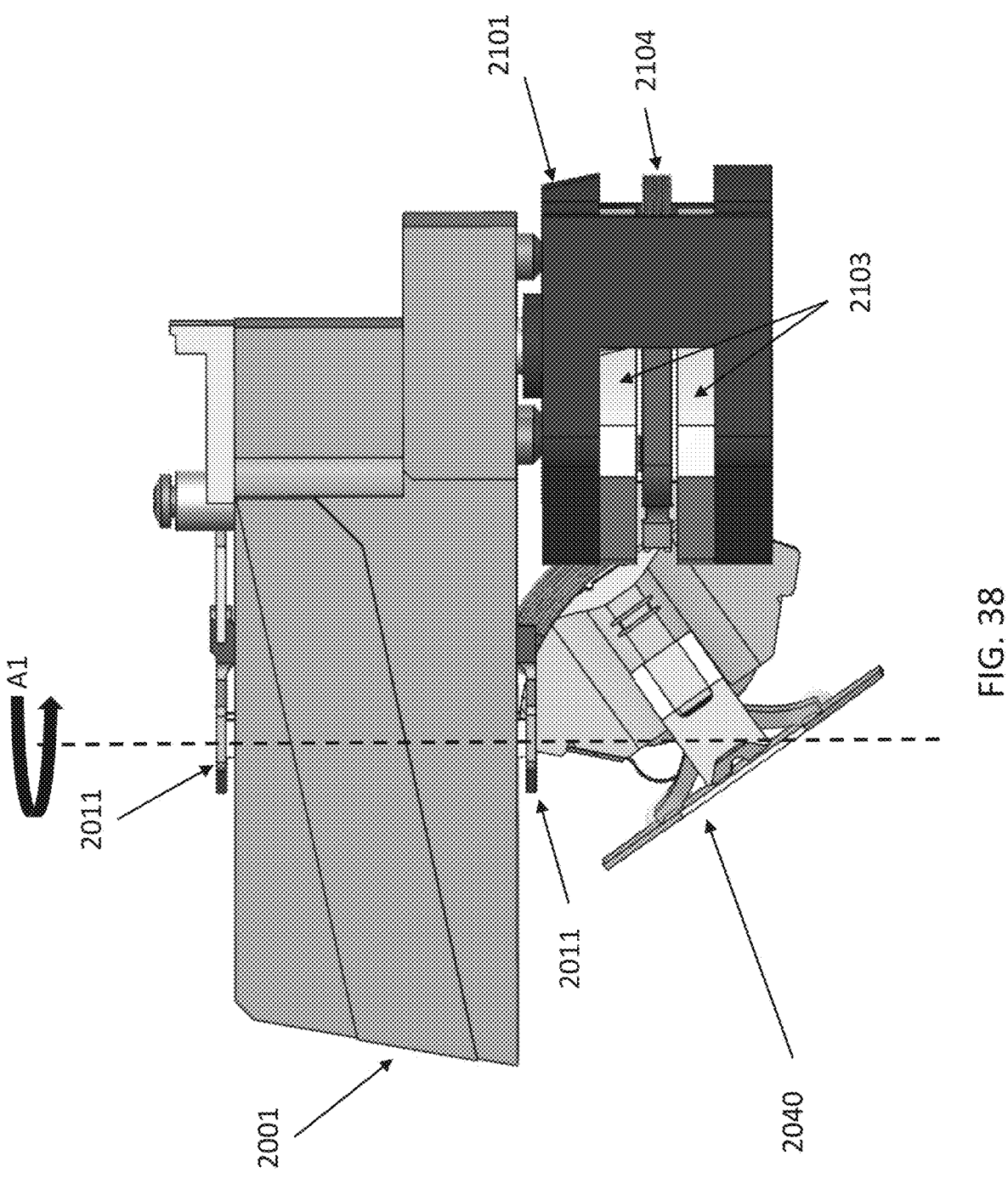
FIG. 38 depicts an example embodiment of biaxial scanning assembly disclosed herein.

In the exemplary embodiment illustrated, the mirror (and subassembly of yokes, magnets and coils which generate rotation of the mirror about axis A2) are disposed below the housing 2001, and coupled thereto by a yoke 2101; however alternative configurations are within the scope of the present disclosure. As shown in FIG. 38, the yoke 2101 is coupled, e.g. via mechanical fasteners, to the bottom and rear of the housing 2001 such that the mirror 2040 is positioned underneath the housing throughout its entire range of motion about the A1 axis as well as the A2 axis. The lower yoke 2101 includes magnets 2103 which can be spaced apart with a voice coil 2104 disposed therebetween. The magnets 2103 can be attached to upper and lower internal faces of the yoke 2101 (e.g. via adhesive or mechanical bond), and operate in conjunction with a drive signal (e.g., current or voltage) applied to the voice coil 2014 to actuate/rotate the mirror 2040 about vertical axis A1, by rotating the rotor 2011, as shown. The rear portion of yoke 2101 (shown on right of figure) and sides of the yoke can remain open or unobstructed to facilitate heat dissipation (e.g. by venting) away from the coil 2104.

Figure 39:
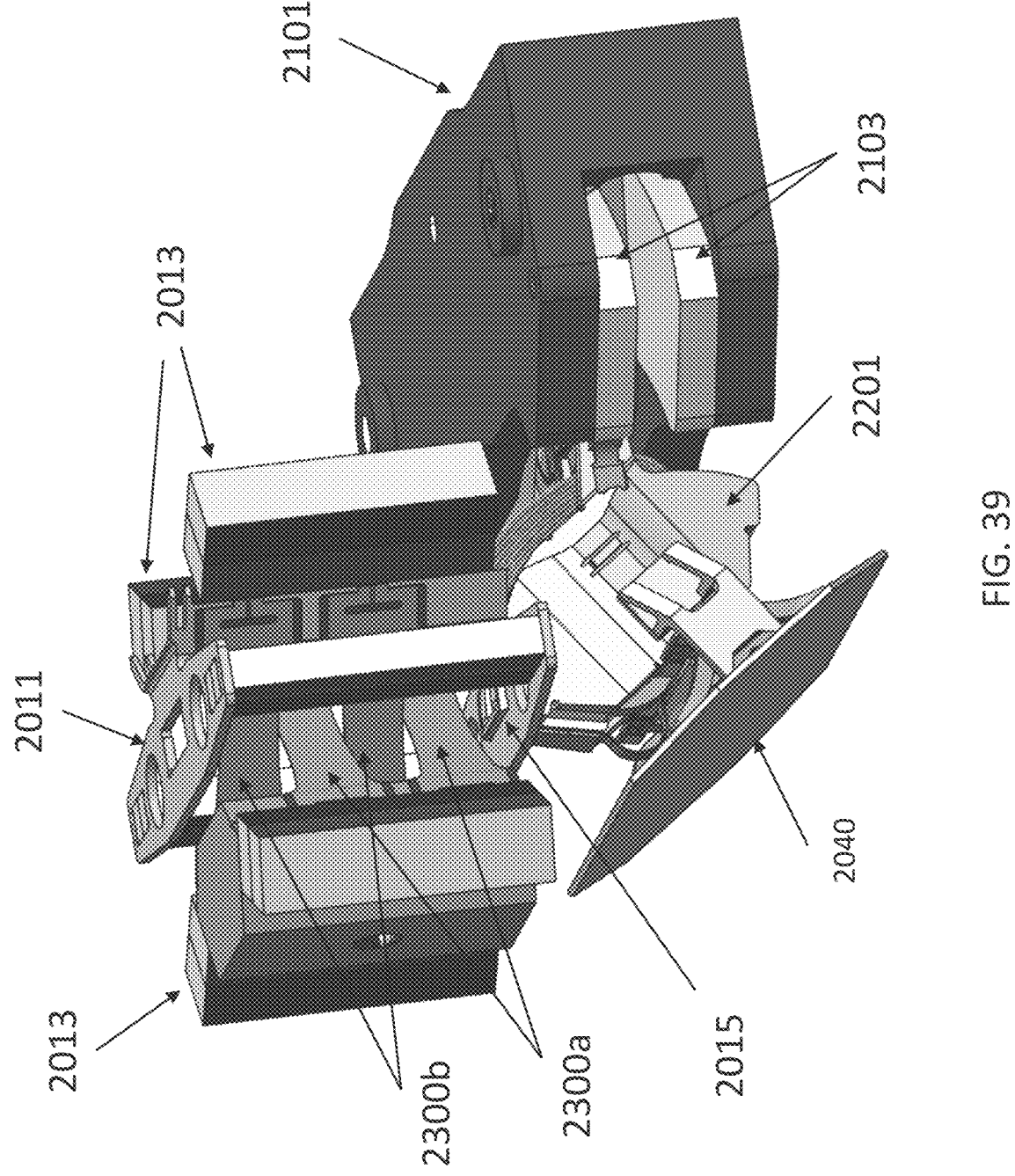
FIG. 39 depicts an example embodiment of the oscillating system disclosed herein.

FIG. 39 depicts the oscillating system with the housing 2001 removed for clarity to depict the rotor 2011 connection to mirror 2040 to illustrate how operation of the horizontally oriented voice coil actuator within yoke 2101 causes rotor 2011 to rotate the mirror 2040 about the vertical axis A1. As shown, the bottom plate of the rotor 2011 can be coupled (with an adhesive or mechanical coupling, e.g. interlocking tongue/groove) at midpoint 2015 to a lower yoke 2201 which is in turn coupled to the mirror 2040. The coupling 2015 between rotor 2011 and yoke 2201 is rigid so as to impart the rotational force generated by the voice coil actuator, and the "bumping" repelling force of the stator magnets 2013 (when rotor magnets 2080 are within the vicinity) directly to the yoke 2201 (and thus mirror) without any significant loss of energy from, e.g., vibration. Additionally or alternatively, in some embodiments the rotor 2011 and the yoke 2201 can be integrally formed as a single component with a bridge portion extending between these two structures instead of a mechanical/adhesive coupling 2015. As the voice coil within yoke 2101 is activated, i.e. a current is provided through its wiring, the rotor 2011 rotates between stator magnets 2013, as described above, and due to the coupling at 2015, also rotates yoke 2201 and mirror in unison, e.g. at a resonant frequency.

In the exemplary embodiment shown in FIG. 39, a plurality of flexures 2300 can be employed to couple the stator magnets 2013 to the stator. In some embodiments two pairs of flexures 2300*a,b* can be employed, and oriented to crisscross between the terminal points of rotation. For example, a first pair of flexures 2300*a* can connect the second (2013*b*) and third (2013*c*) terminal points of rotor movement, and a second pair of flexures 2300*b* connecting the first (2013*a*) and fourth (2013*d*) terminal points of rotor movement, as described above. The flexure 2300 can be affixed (e.g., mounted, glued, etc.) to the stator/magnets and can be a thin piece of metal (e.g., spring steel) and designed to resist fracturing or fatigue when the mirror rotates over multiple cycles. Additionally or alternatively, in some embodiments the rotor 2011 is rotatably coupled to the stator via one or more flexures.

As noted above, the rotor 2011 can be formed from upper and lower plates that are connected via magnets 2080 extending therebetween. The magnets 2080 can be received within apertures in the rotor plates. In the exemplary embodiment shown, the rotor magnets 2080 are flush, or coplanar, with the upper and lower plates of the rotor, although alternative designs can be employed. Also, referring back to the exemplary embodiment of FIG. 38, the upper and lower plates of the rotor 2011 are positioned outside (i.e. above and below, respectively) of the housing 2001. The bottom plate of the rotor includes an attachment feature, e.g. aperture, to receive a male portion of the yoke 2201 at connection point 2015. Although a single connection location 2015 is shown in the exemplary embodiment, which is positioned at a midpoint of the bottom rotor plate, additional connection locations can be employed. Likewise, the exemplary embodiment shown depicts a male/female mechanical coupling, however alternative coupling means can be employed as desired. This "open" rotor design allows for the flexures 2300 to pass through the rotor, and the rotor to pivot/rotate about its full range of motion (between the terminal points defined by the bumper stator magnets 2013) with the flexures 2300 disposed in crisscross fashion within the boundaries of the rotor (i.e. top/bottom rotor plates, and rotor magnets 2080).

Figure 40:
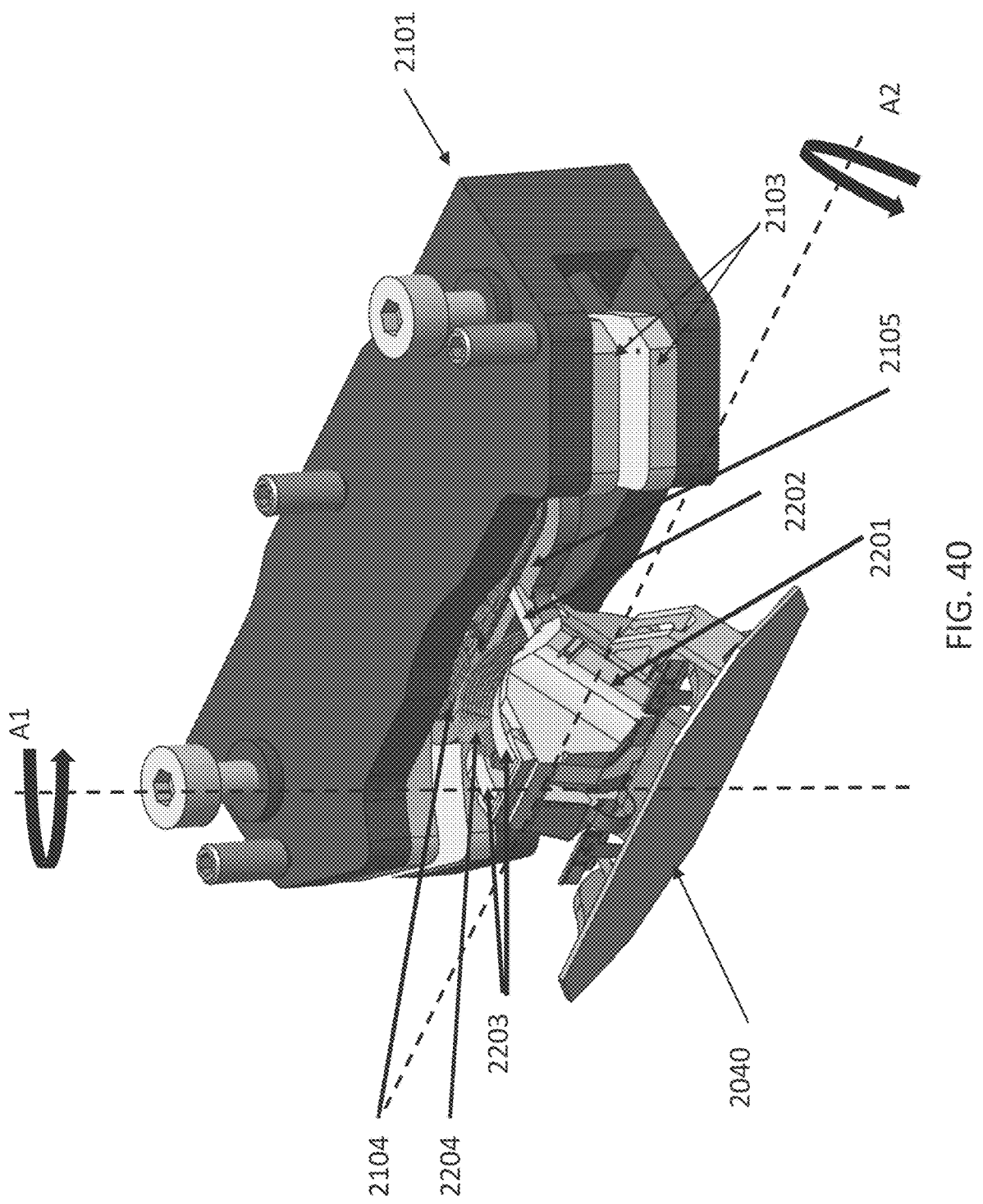
FIG. 40 depicts an example embodiment of the bi-axial oscillatory system of the present invention having a housing.
Figure 41:
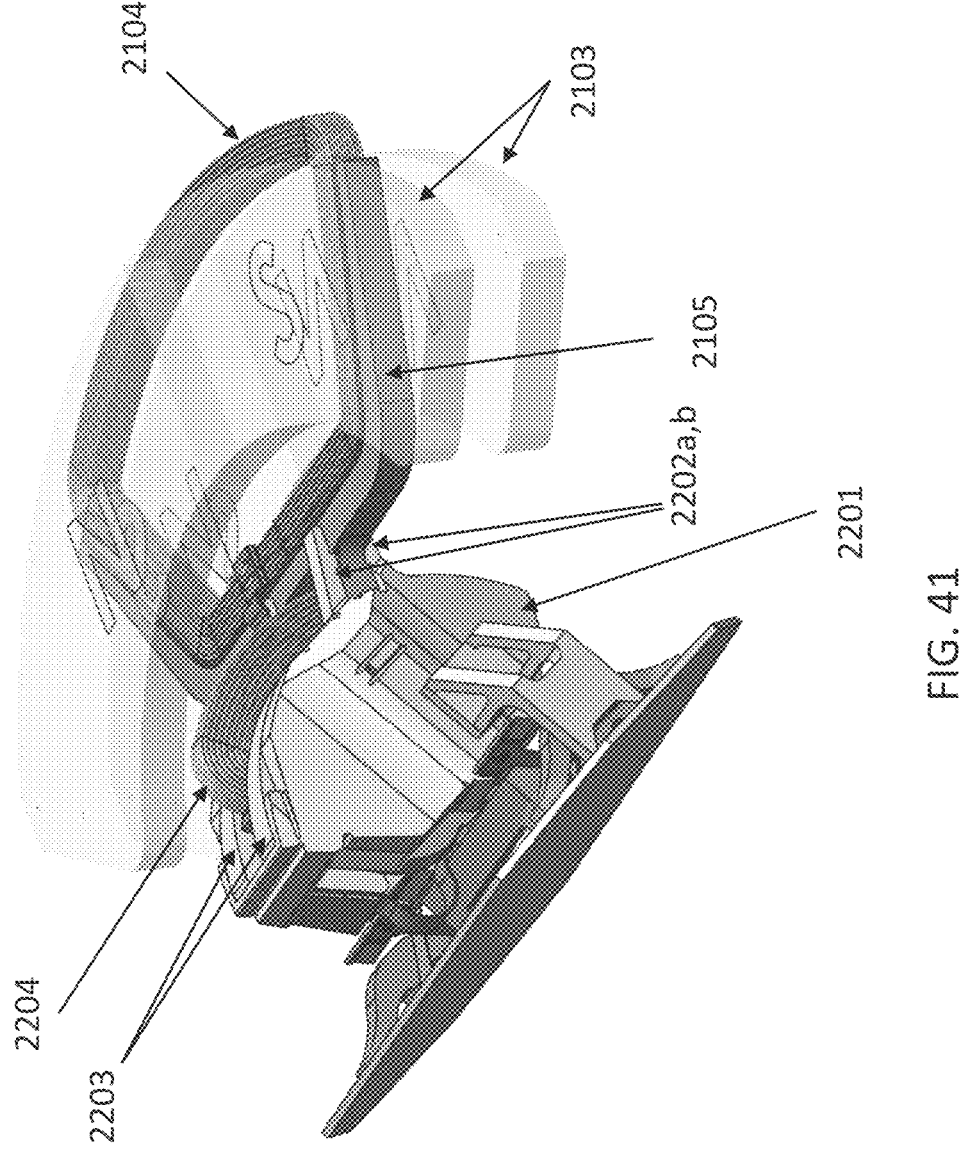
FIG. 41 illustrates an example of coupling of two voice coil actuators.

FIG. 40 depicts another view of the bi-axial oscillatory system with the housing 2001 removed to reveal an exemplary configuration of the yokes 2101, 2201 of each voice coil actuator. As noted above, the yoke 2101 contains the voice coil 2104 and magnets 2103 which generates rotation of the mirror about vertical axis A1. (The present disclosure refers to a "yoke" as a singular component, however the yoke(s) disclosed herein can be formed from a plurality of components; and/or the yoke(s) can be coupled together with various other components, e.g. magnets, coils, etc., to form an assembly). The coil 2104 can be coupled to an arm, or coil holder 2105, which retains the coil in position relative to the magnets 2103 (which can be coupled, e.g. glued, to the interior faces of the yoke 2101), as shown in FIG. 41. In some embodiments, the coil holder/arm 2105 extends along a plurality (e.g. three) sides of the coil and is formed of sufficiently rigid material to serve as an attachment point for coupling with yoke 2201.

Rotation about Axis "A2"

This yoke 2201 can be coupled to the mirror 2040, and also contain a voice coil 2204 (and magnets 2203) for rotating the mirror 2040 about a horizontal axis A2. The yoke 2201 includes an attachment mechanism 2202, e.g. mechanical clamp, at its rear for coupling to coil holder 2105 of the other yoke. Thus, the biaxial oscillating system can be comprised of two subassemblies: a first subassembly (for rotation of the mirror about a horizontal axis A2) with a yoke 2201 oriented in a generally vertical fashion, coupled to the mirror 2040 and containing a voice coil 2204 sandwiched between magnets 2203; and a second subassembly (for rotation about vertical axis A1) with a yoke 2101 having a generally horizontal layout and containing a voice coil 2104 sandwiched between magnets 2103 to induce rotation of the entire first subassembly. In the exemplary embodiment shown, a single attachment mechanism 2202 is employed to couple the two yokes/subassemblies, and at respective midpoints thereof; however additional/alternative attachment mechanisms can be employed.

FIG. 41 depicts another view of the bi-axial oscillatory system with the housing 2001, and yoke 2101 removed to reveal the relative orientation of the voice coils 2104 and 2204, as well as the attachment mechanism 2202 to the coil holder 2105. In this exemplary embodiment, voice coil 2104 exhibits a generally trapezoidal shape, with the coil holder 2105 extending along the front and sides of the coil. The coil holder 2105 can be sized to have a similar thickness as the voice coil, such that the upper/lower surfaces of the two components are coplanar. Also, the attachment mechanism 2202 can include a first arm 2202*a* that engages the upper surface of the coil holder 2105, and a second arm 2202*b* which engages the lower surface of the coil holder 2105. While the coils 2104, 2204 (and the corresponding magnets 2103, 2203 and yokes 2101, 2201 of the two respective subassemblies) are arranged generally perpendicular to each other with the connection location 2202 at a midpoint of each of the coils in the exemplary embodiment, other configurations are within the scope of the present disclosure.

Figure 42:
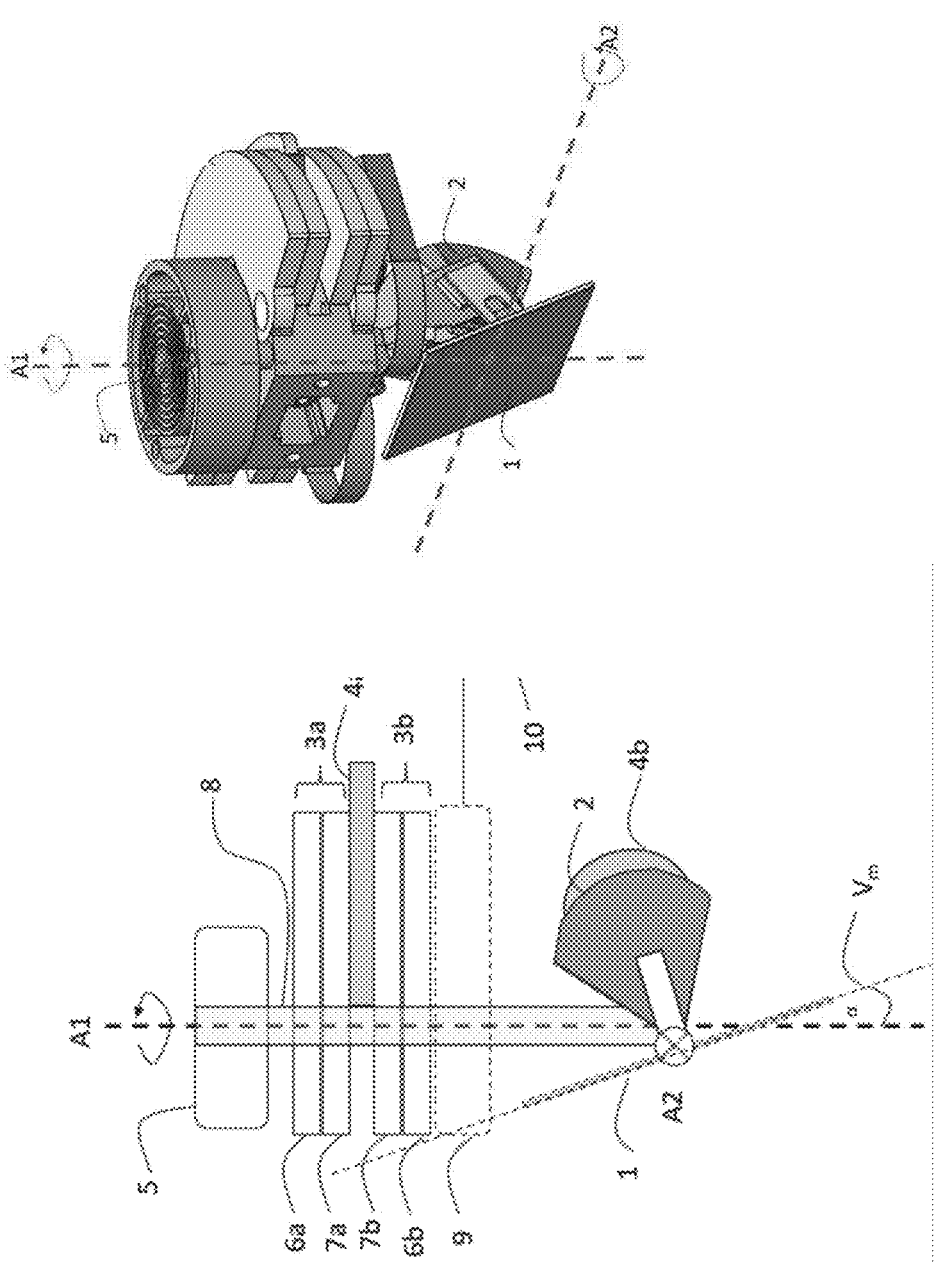
FIG. 42 depicts an exemplary oscillating scanning system disclosed herein.
Figure 43A:
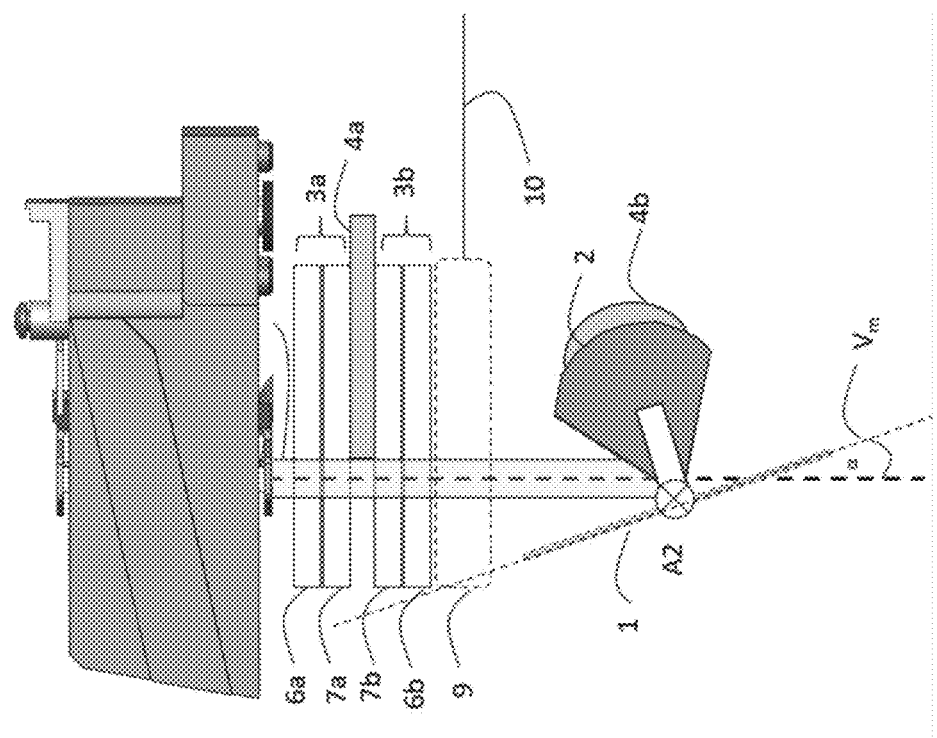
FIG. 43A depicts an embodiment of a magnetic bumper disclosed herein.
Figure 43B:
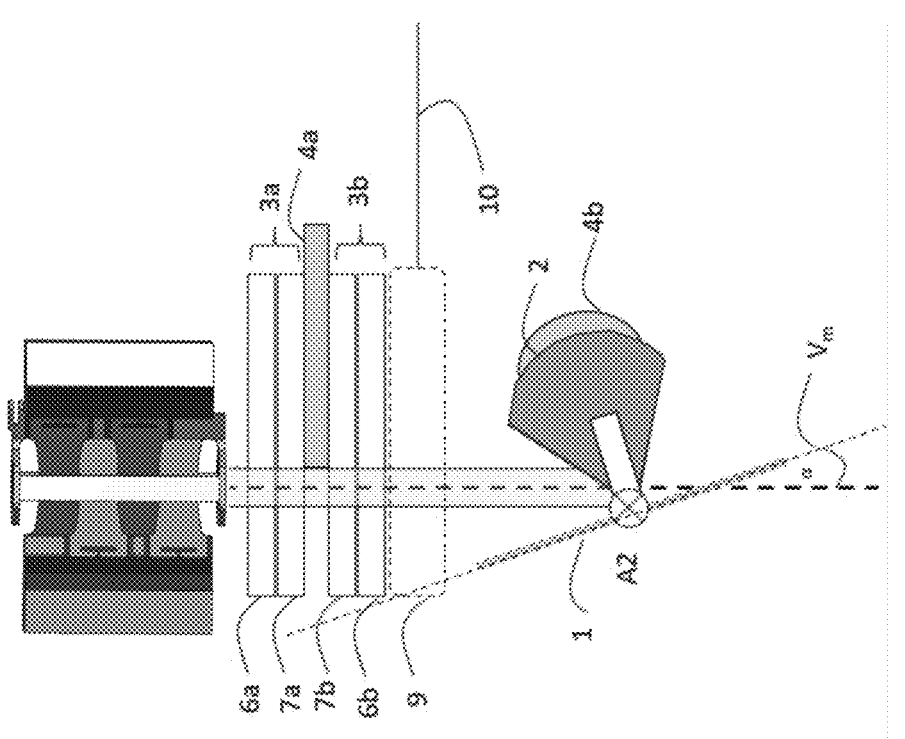
FIG. 43B depicts a cross sectional view of the embodiment shown in FIG. 43A.

FIG. 42 depicts another view of the exemplary oscillating scanning system which employs a hairspring resonator 5 to provide the resonant scanning about axis A1, as described in further detail above. Accordingly, FIG. 43A depicts a corresponding view of the "bumper" magnet system disclosed herein to provide the resonant scanning about axis A1 (with the common reference numbers referring to similar components across the two embodiments); wherein the housing and rotor/stator bumper magnets of FIG. 37 are shown as replacing the hairspring resonator 5. FIG. 43B depicts a cross sectional view of the "bumper" magnet system.

"Booster" Magnet System

Figure 44:
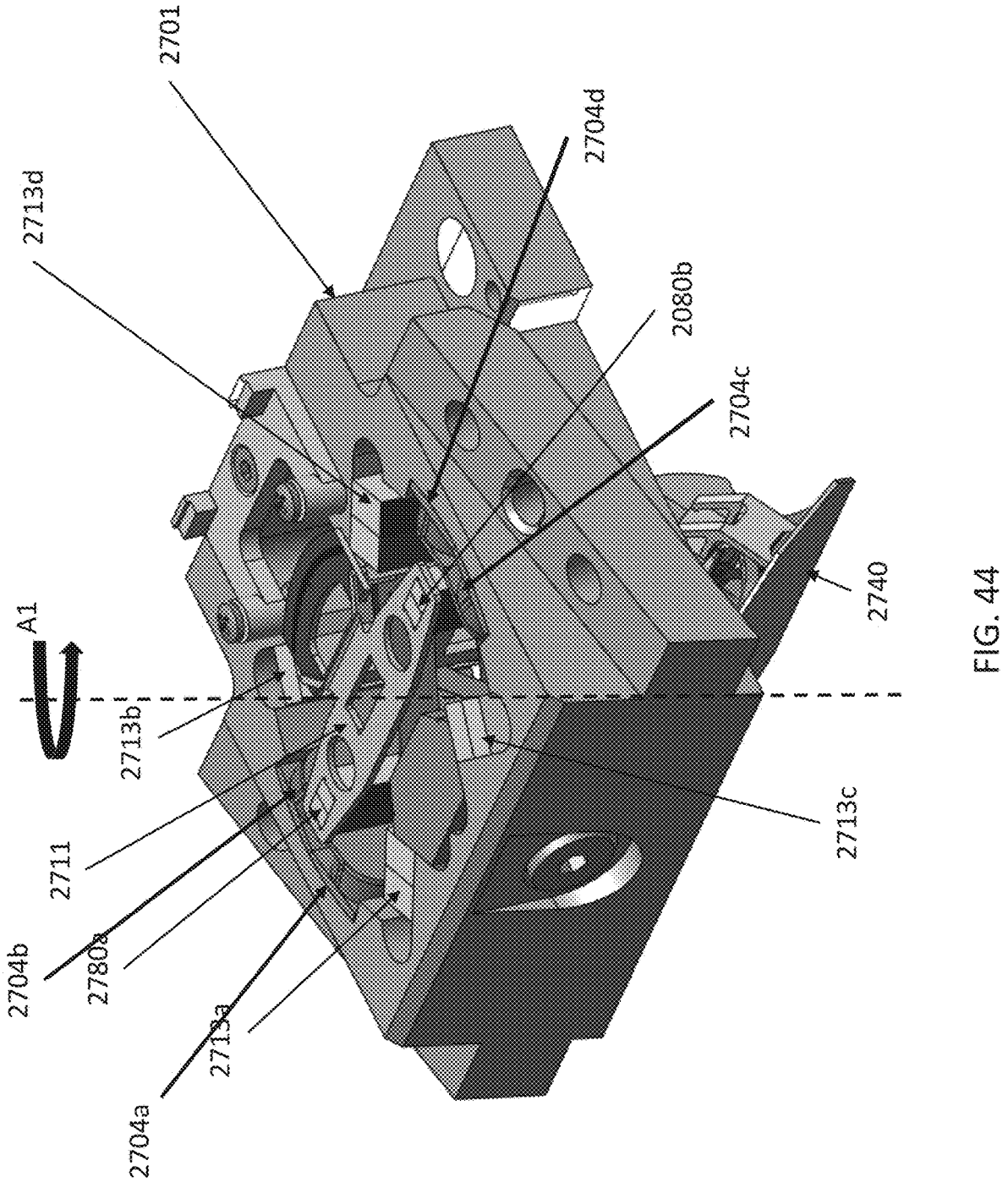
FIG. 44 depicts an embodiment of a boosted magnetic resonator.

In accordance with another aspect of the disclosure, the actuator for driving rotation about axis A1 can be configured as magnets, or "boosters", disposed proximate the rotor. An exemplary embodiment of this design is illustrated in FIG. 44 (with the trailing reference numbers referring to common components described in connection with the "booster" magnet embodiment of FIG. 37).

In this embodiment, the rotor 2711 is driven to rotate between the terminal points 2713*a*-2713*d* defined by the "bumper" stator magnets (as described above) by the magnets 2704. A first pair of booster magnets can be disposed approximately at the 3 O'clock position, and a second pair of magnets can be disposed at approximately the 9 O'clock position to induce rotation of the rotor 2711 (see FIG. 46). An advantage of this configuration is that it does not require a voice coil (e.g. component 2104 of FIG. 38) to generate rotation about axis A1, thereby providing a more compact design (e.g. enhanced heat dissipation, noise reduction) and improved performance. Thus, the embodiment of FIG. 44 only requires a single voice coil 2204 (best seen in FIG. 45), which operates as described above with the embodiment of FIG. 37, to generate rotation about the horizontal axis A2. An additional advantage of this configuration is a static coil configuration in contrast with a dynamic coil configuration.

Figure 45:
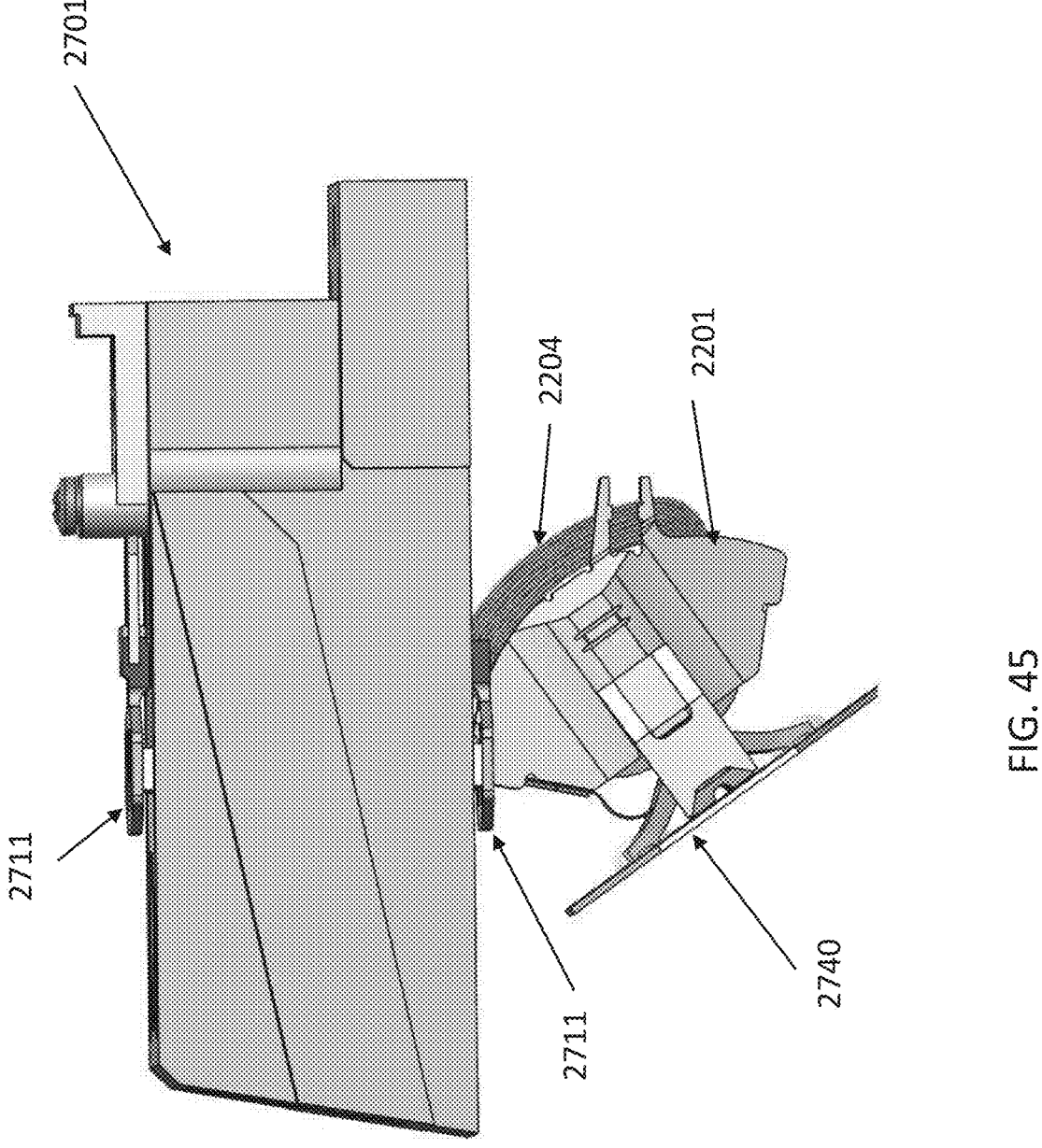
FIG. 45 depicts an embodiment of a scanning assembly of the present invention.
Figure 46:
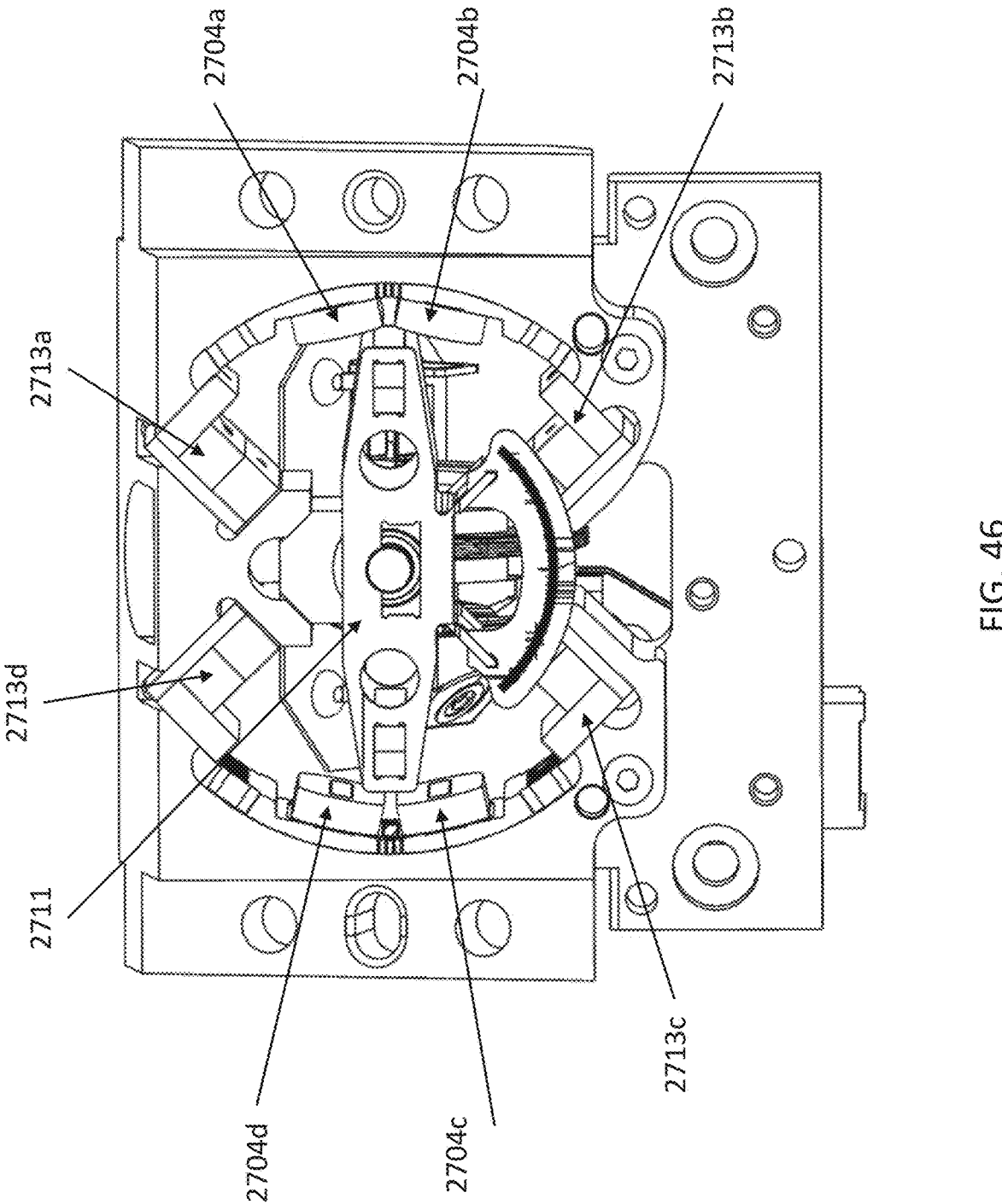
FIG. 46 shows an embodiment of a magnetic bumper of the present invention.

As shown upon comparison of the side views of FIG. 38 (dual voice coil) and FIG. 45 (single voice coil), since there is no voice coil 2104 present under the housing 2701, there is likewise no need for the corresponding yoke 2101, magnets 2103—as shown in the (dual voice coil) embodiment of FIG. 38, which provides greater flexibility in implementation, reduced inertia (since coil was spaced from the center), reduced size/footprint, as well as improved ease of assembly.

Figure 47:
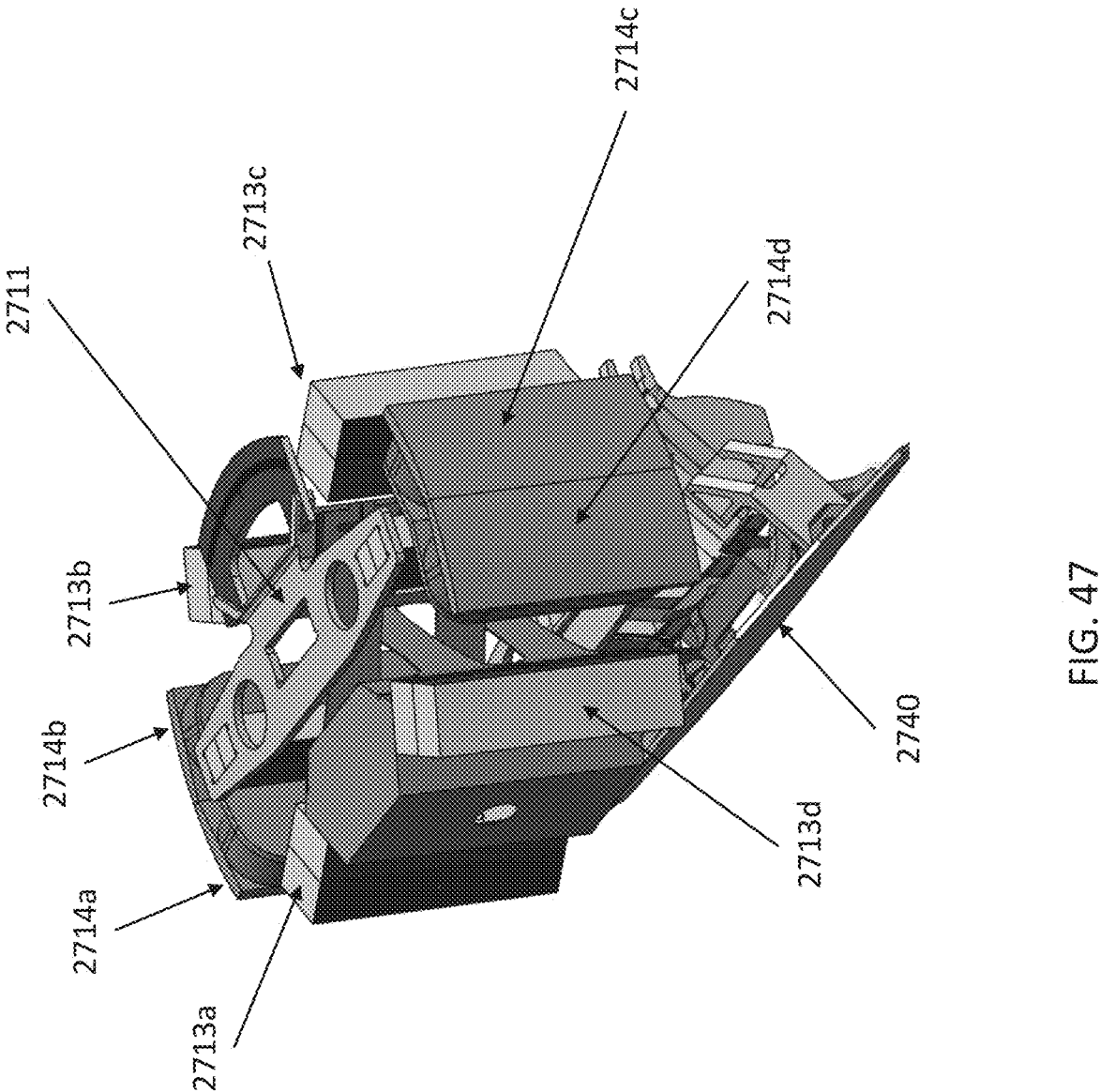
FIG. 47 depicts an isolated view of an embodiment of the booster magnets.

The structural features of the rotor 2711 and stator 2713 (and the magnets disposed therein) can be configured as described in connection with the "bumper" embodiment of FIG. 37. Likewise, flexures can be employed to couple the stator and rotor, as described above. FIG. 47 depicts an isolated view of the booster magnets 2704*a-d* with the housing removed for clarity. Each booster magnet includes an elongated panel 2714 on radially interior and radially exterior side of the booster magnets. These panels can extend the entire vertical height of the magnets 2704*a-d*, and have a radius of curvature complimentary to the arc of the rotor 2711 (and interior wall of the housing). Also, the panels can be formed of a material with a high coefficient of thermal conductivity to facilitate heat transfer/dissipation from the coils of the magnets 2704.

In some embodiments, the outer panel can be retained within the housing 2701, e.g. glued against the interior wall of the housing. Additionally, the housing can include a notch or recess in its sidewall to receive the booster magnets such that the radially inner side of the booster magnet is adjacent the rotor (i.e. there are no intervening components). Furthermore, the booster magnets, including the panels, can be positioned within the housing 2701 such that the upper and lower surfaces of the magnets are coplanar with the housing.

Figure 48:
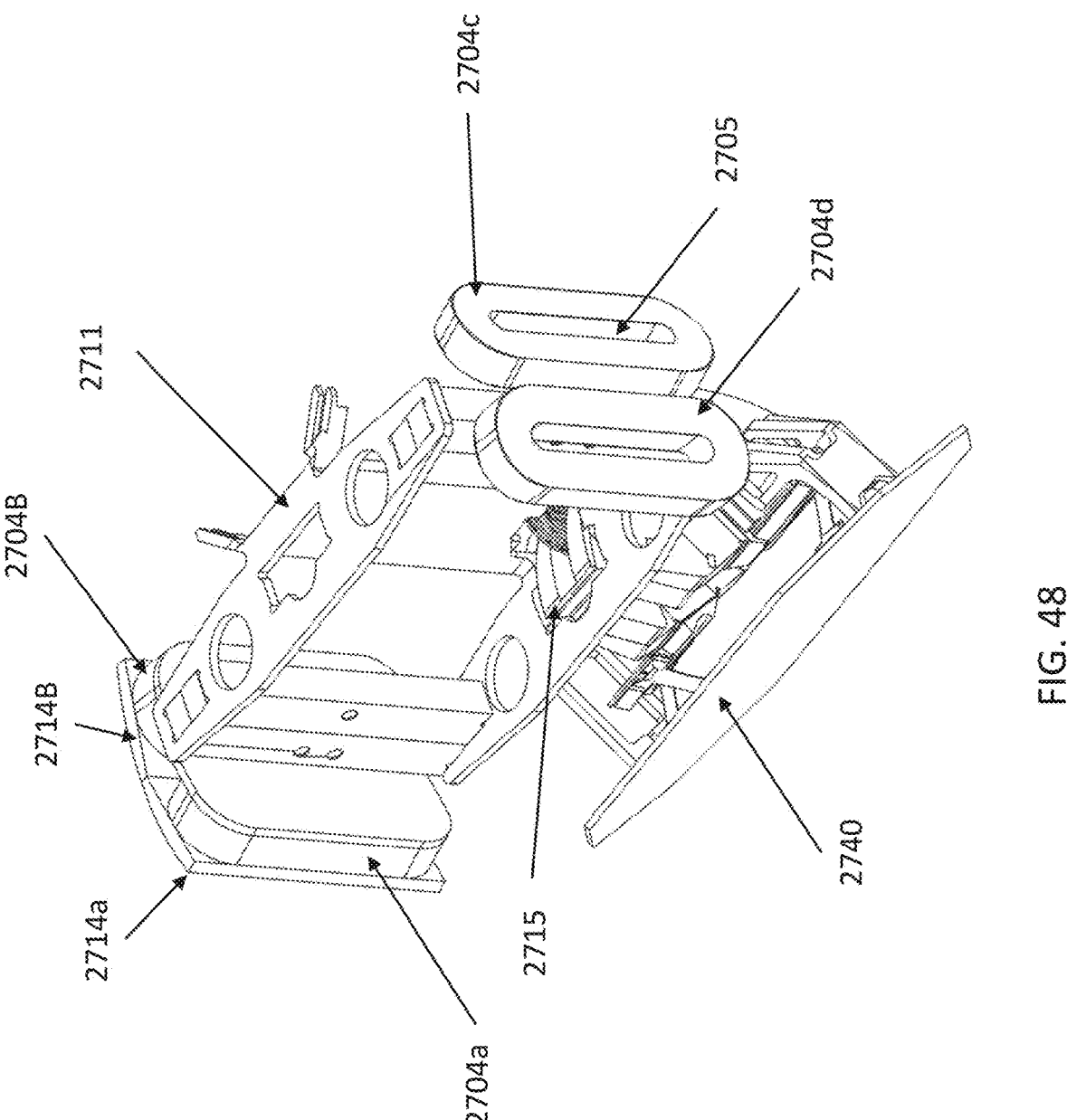
FIGS. 48-50 depict embodiments of the booster magnets of the present invention.
Figure 49:
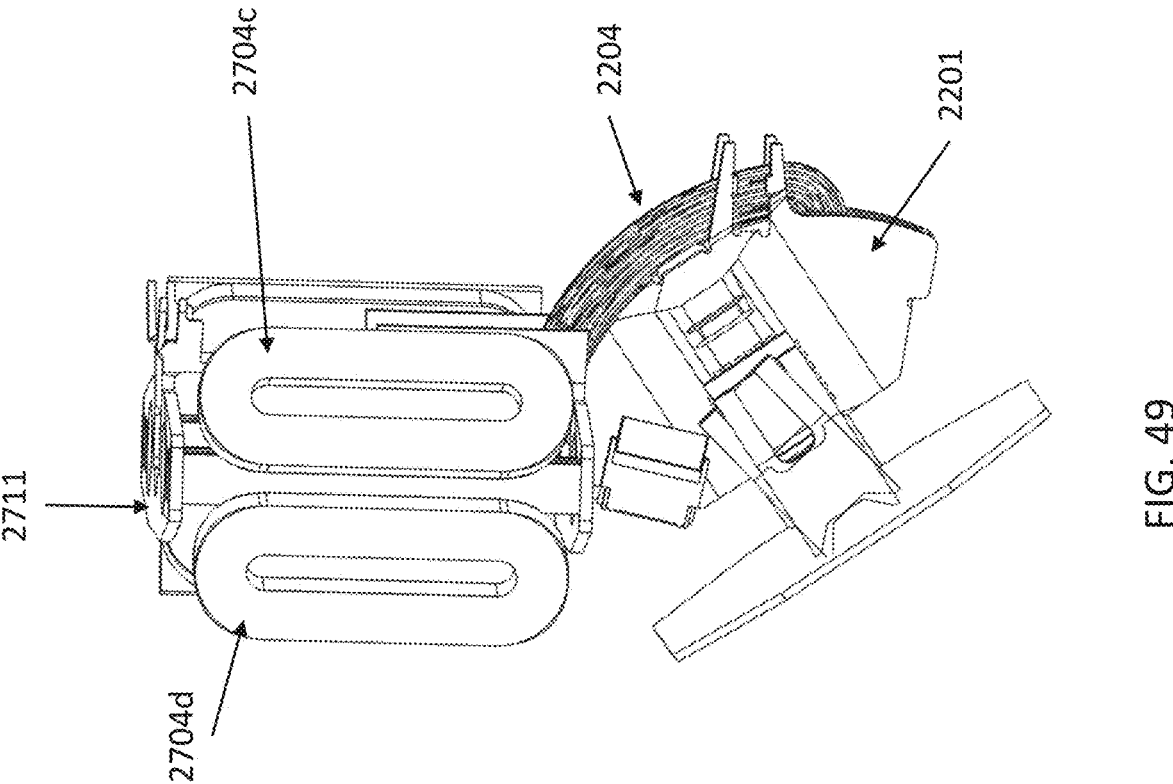
Figure 50:
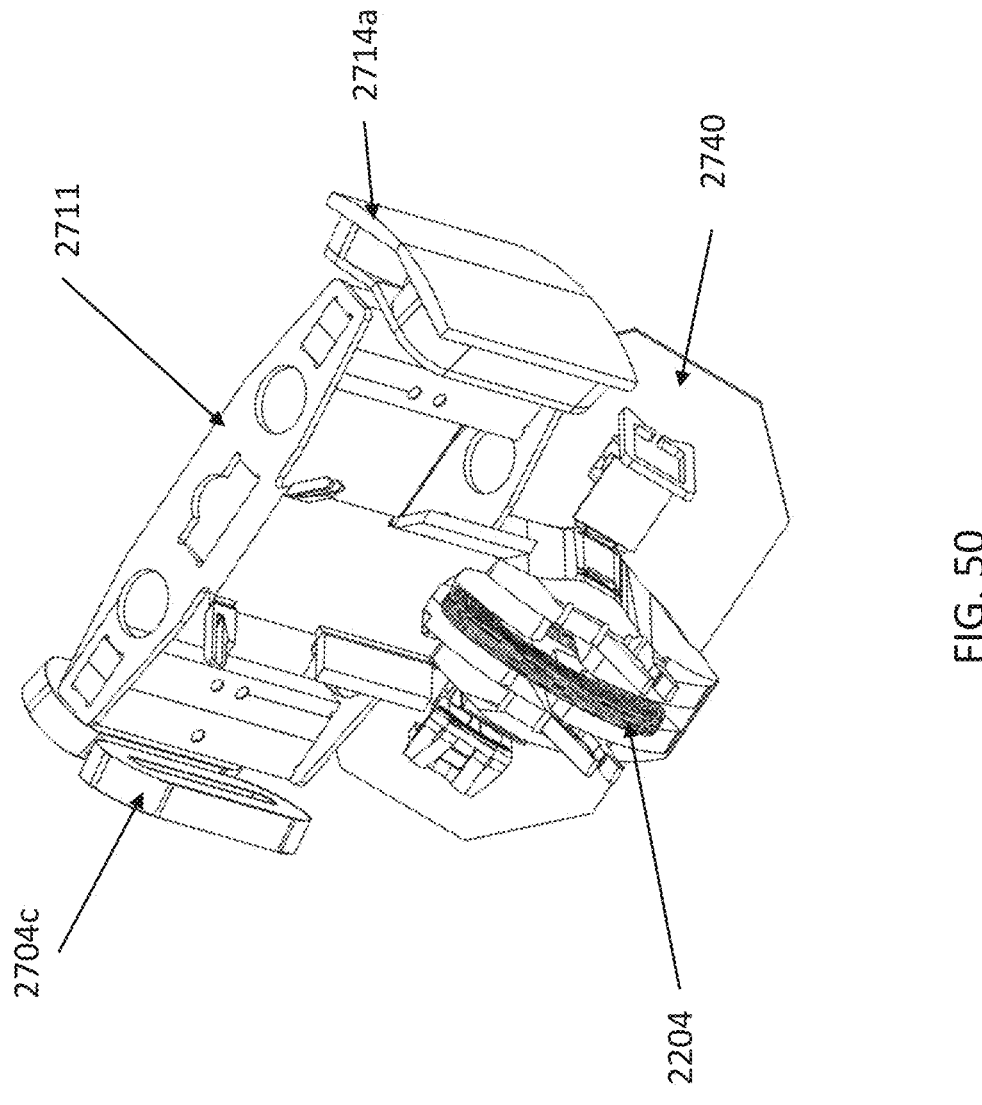
Figure 51:
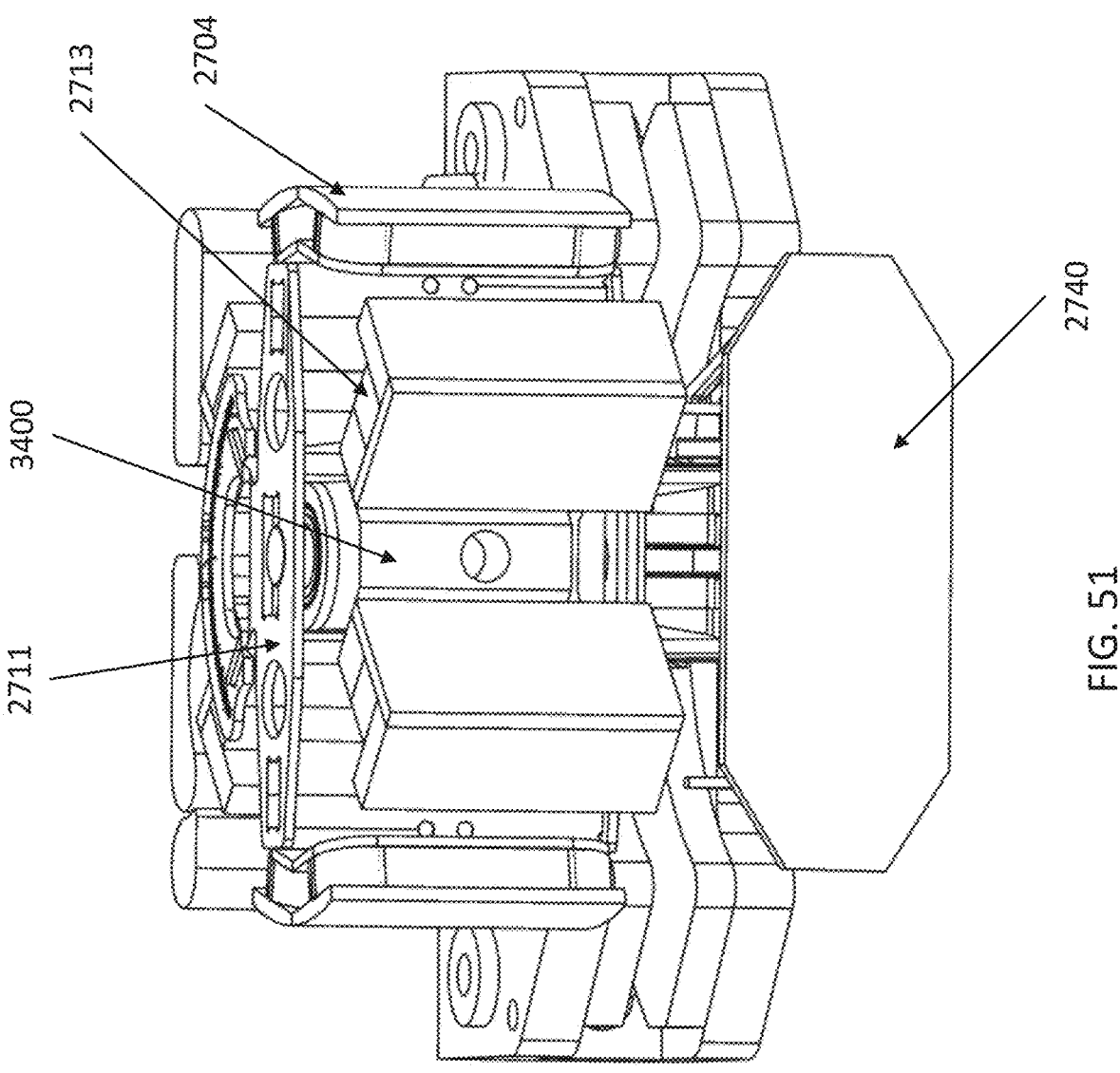
FIG. 51 depicts an example embodiment of the present invention.

These magnets 2704*a-d* can include a bundle of wires wound to form an electromagnet with an air core 2705 (e.g. interior gap between the turns of the coil). FIGS. 48-50 depicts the booster magnets with select panels (e.g. 2714*c,d*) omitted for clarity to expose the air coil magnets sandwiched between the panels. In operation, current is supplied through the wires forming the air coil/core of booster magnets 2704*a-d* which actuates the rotor 2711 to rotate about axis A1, with the "bumpers" of stator magnets operating to provide the resonant frequency, as described above. Similar to the embodiment of FIG. 37, the rotor 2711 can be coupled to the yoke 2201 of the lower voice coil actuator assembly at a midpoint 2715 of the lower rotor plate, to thereby rotate the mirror 2740 about the A1 axis.

Figure 52:
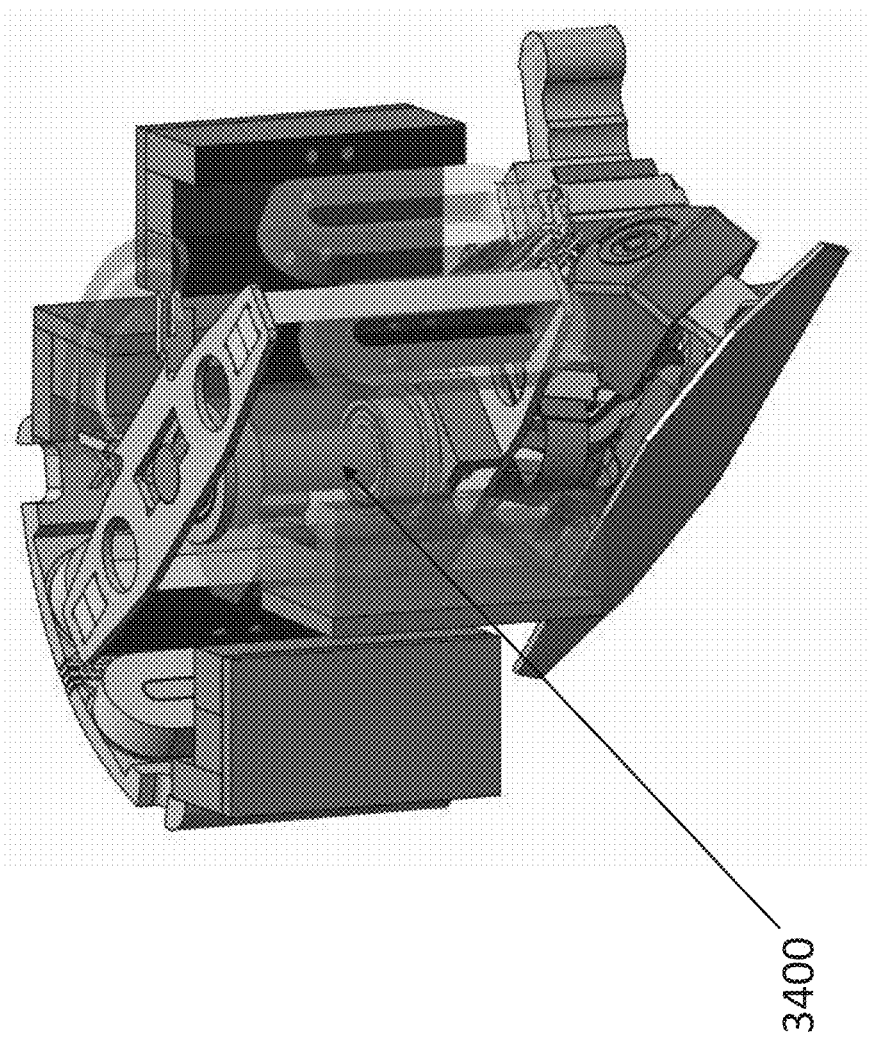
FIG. 52 illustrates an embodiment in which the shaft is coupled directly to the of the smaller voice coil actuator.

Additionally or alternatively to the flexure coupling described above, the rotor 2711 can also be coupled via a rotatable shaft and bearing assembly. In the exemplary embodiment of FIGS. 51-52, a shaft 3400 can be positioned at the center of the rotor 2711 and extend between upper and lower rotor plates. As shown in FIG. 52, which has the booster and bumper magnet assemblies in the foreground shown in transparent for clarity to reveal the inner shaft 3400, the shaft can be coupled directly to the underlying yoke 2201 of the voice coil actuator which provides rotation of the payload/mirror about axis A2.

Figure 53:
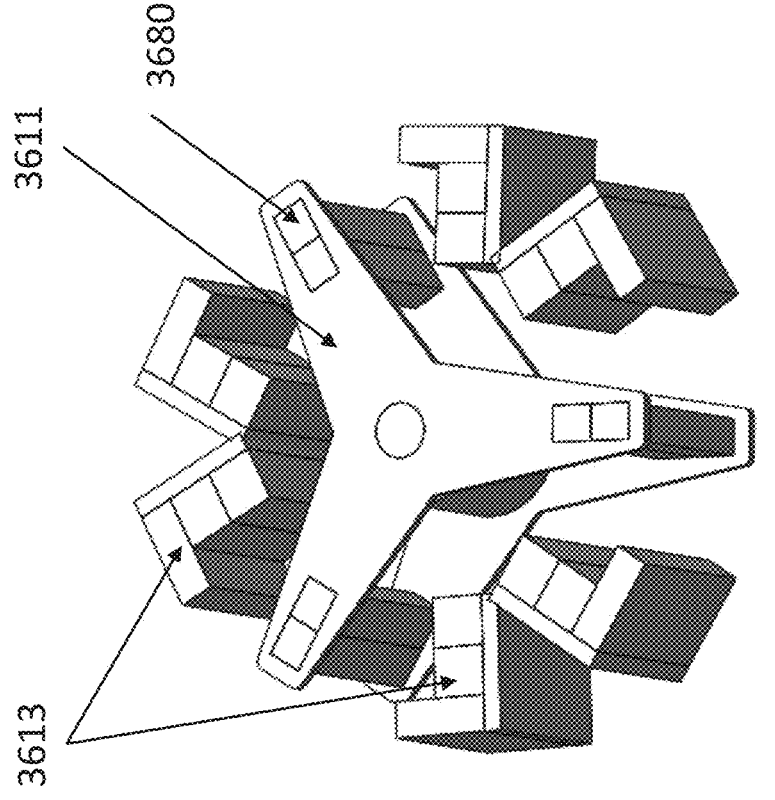
FIG. 53 depicts a rotor having three arms can be employed.
Figure 54:
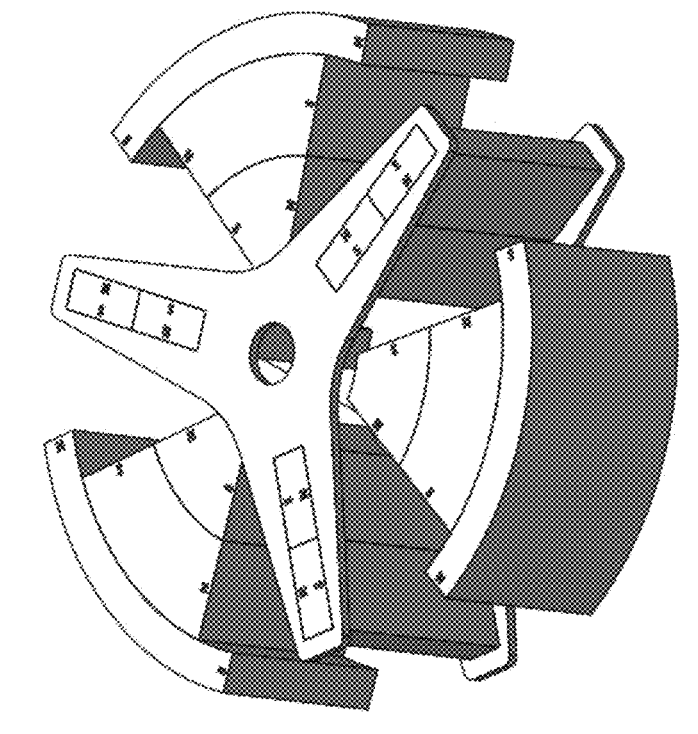
FIG. 54 depicts a rotor having three arms.
Figure 54:
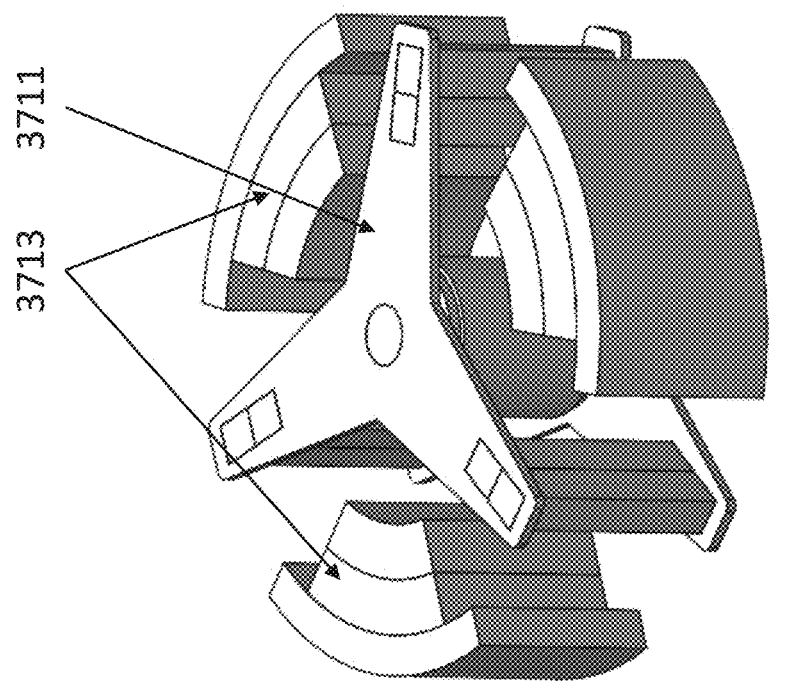
Figure 55:
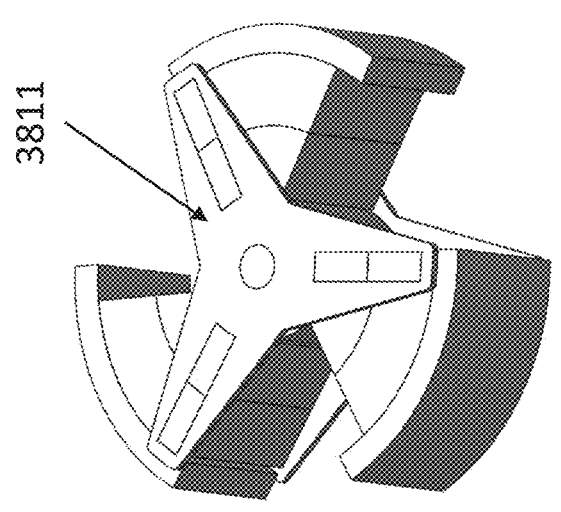
FIG. 55 depicts another embodiment of a three-arm rotor.
Figure 55:
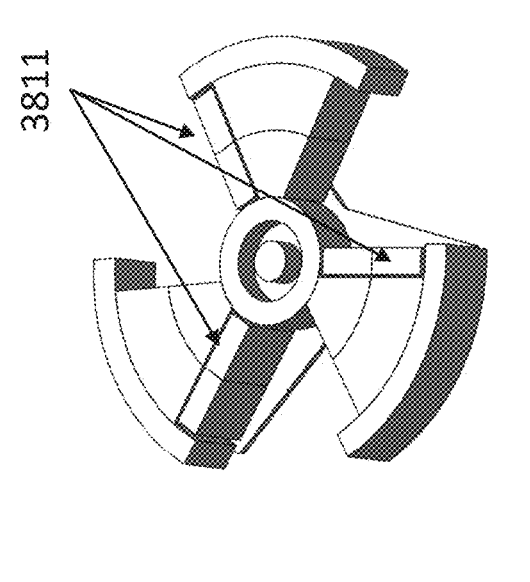
Figure 55:
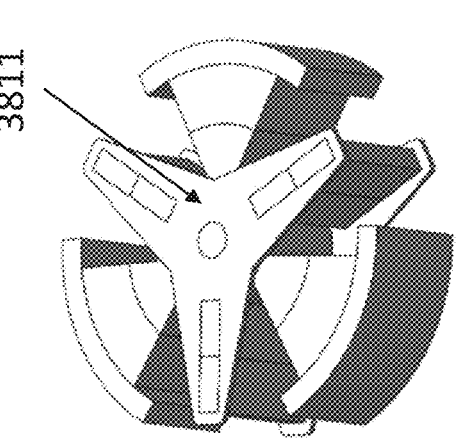
Figure 55:
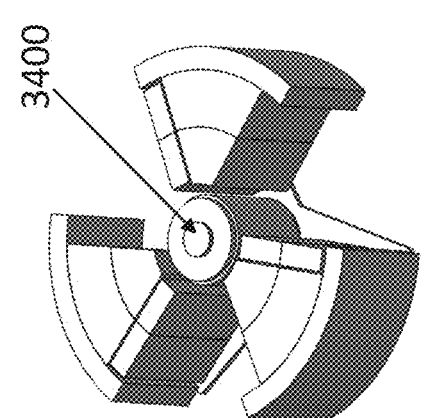
Figure 56:
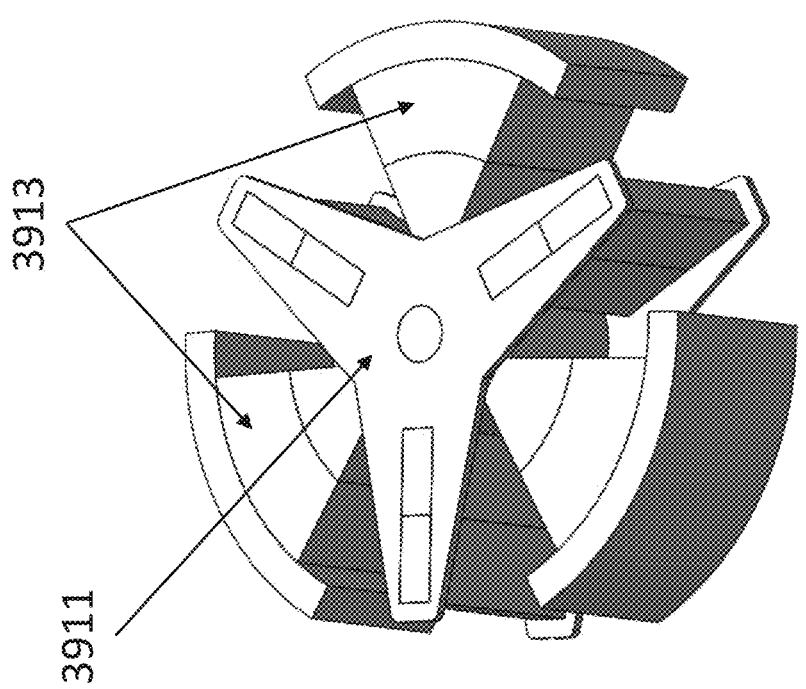
FIG. 56 depicts additional exemplary embodiments demonstrating alternative magnet and yoke designs.
Figure 56:
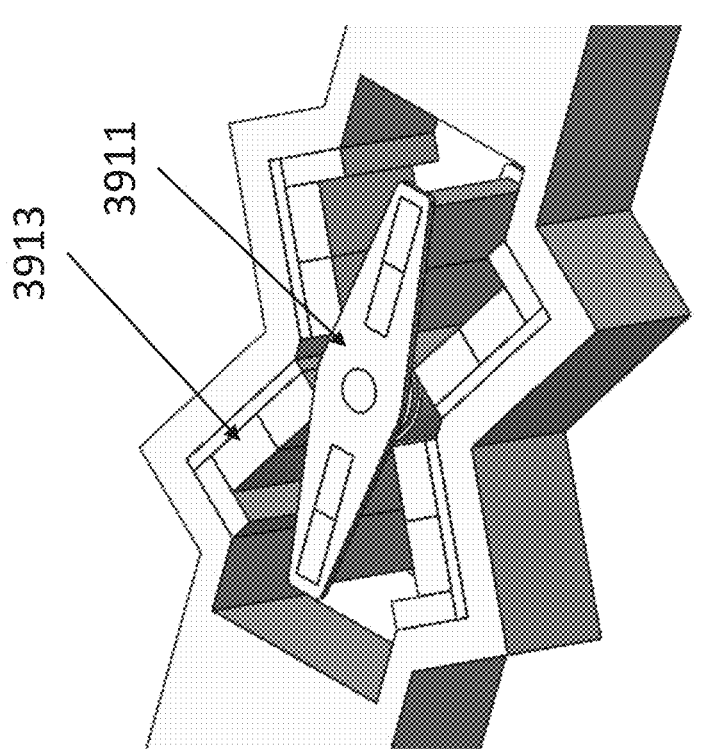
Figure 57:
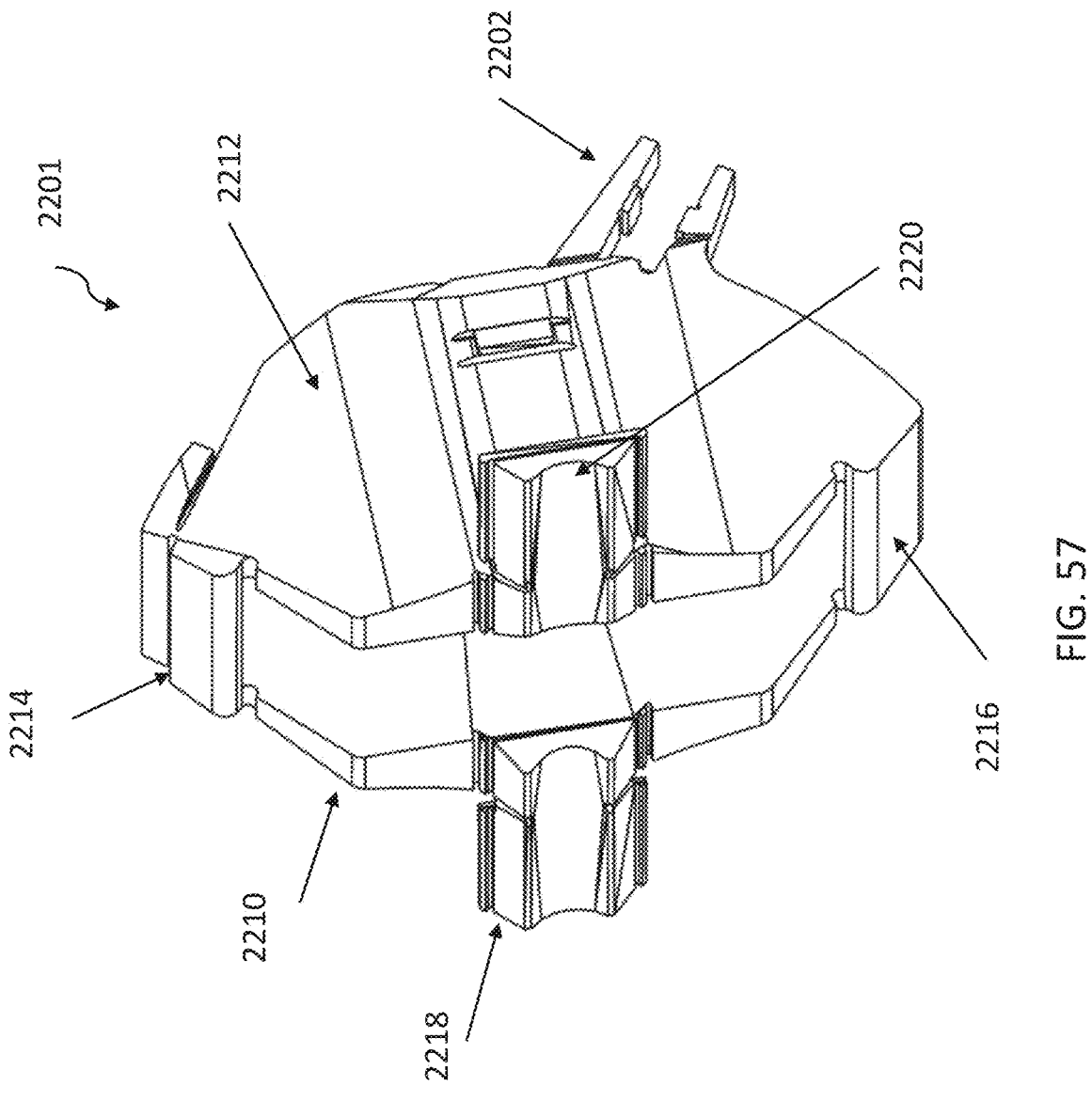
FIGS. 57-59 illustrate an exemplary yoke employed by the present invention.
Figure 58:
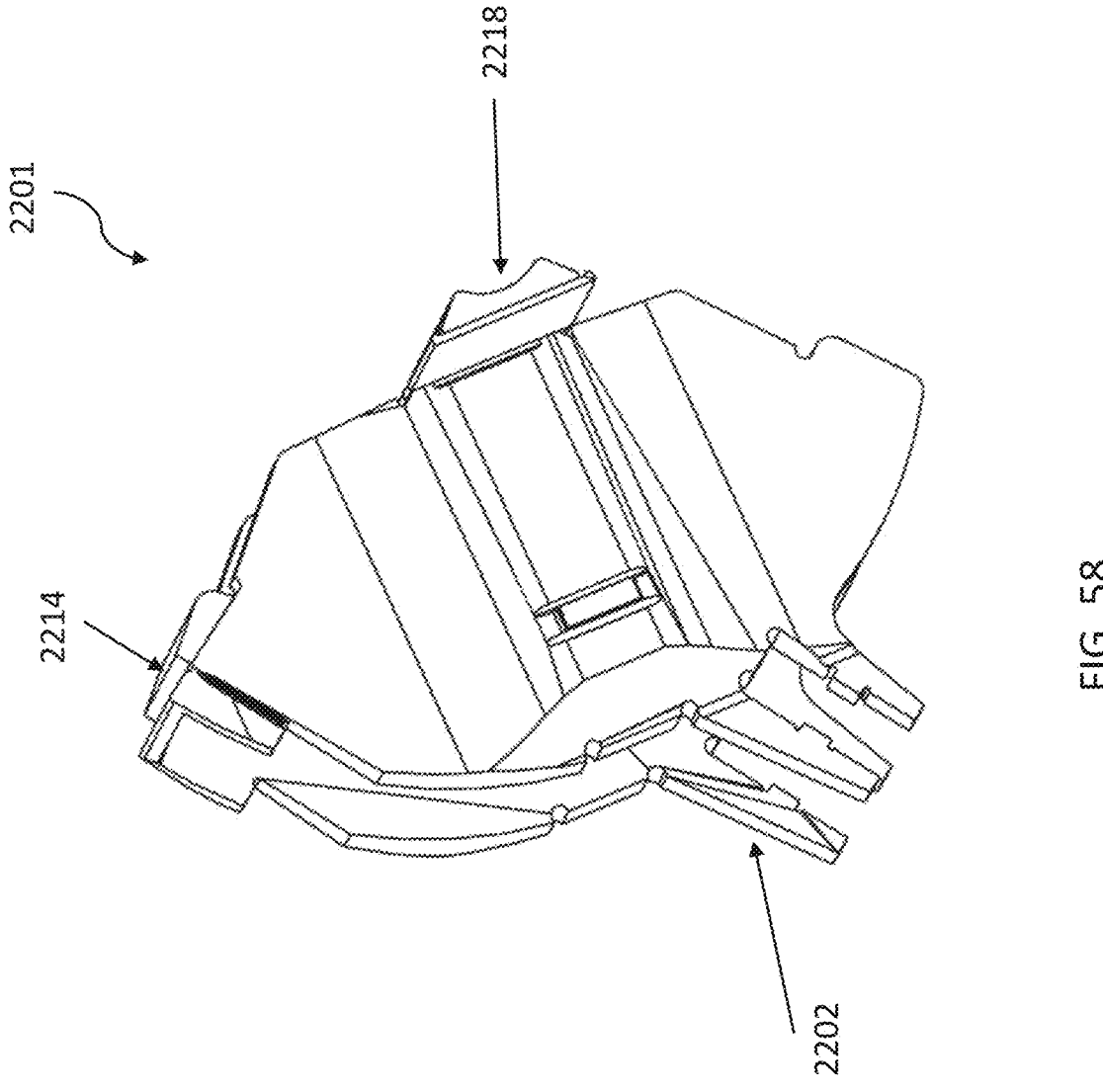
Figure 59:
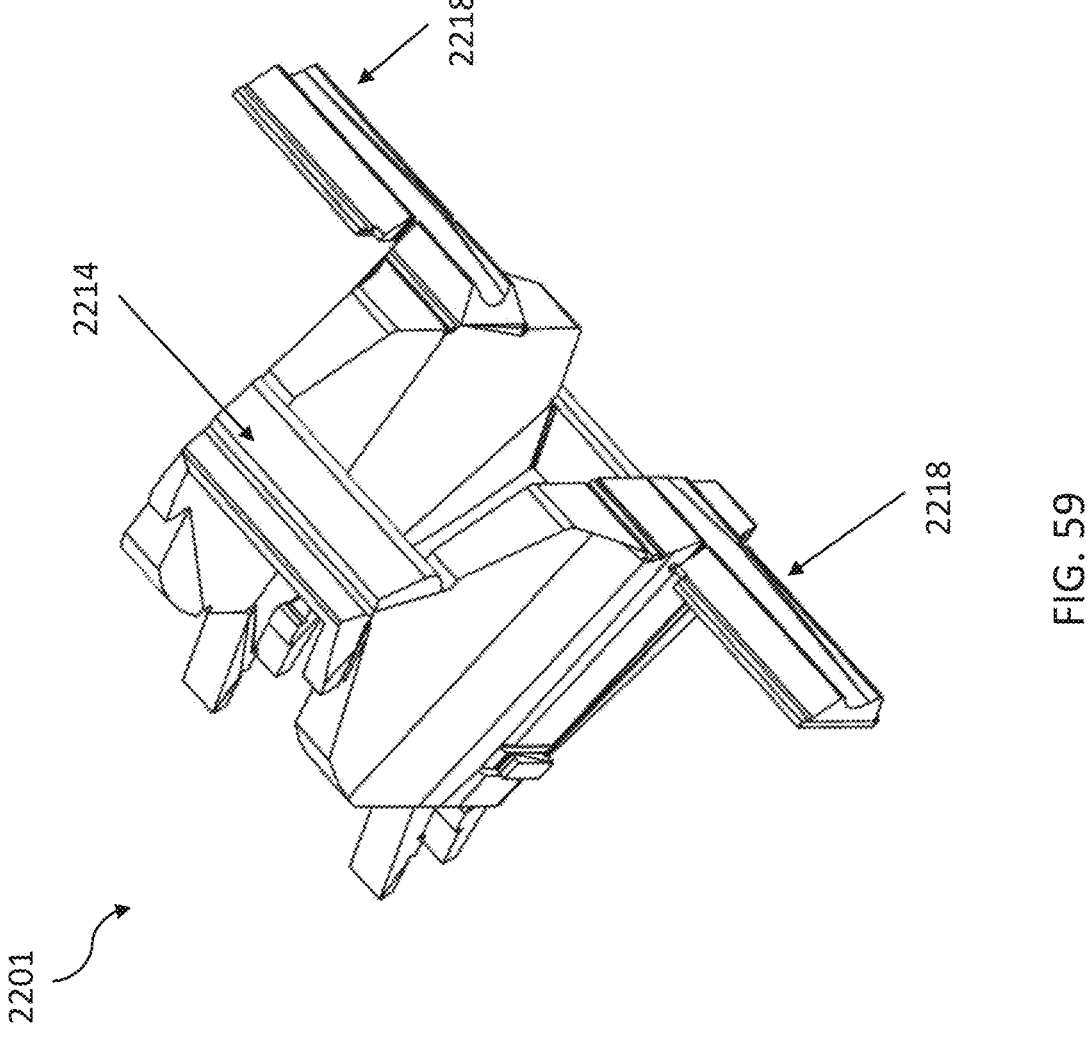

While the exemplary embodiments disclosed above depict a rotor having two arms (aligned and extending outward from a central pivot point coinciding with axis A1), additional or alterative rotor designs can be employed within the scope of the present disclosure. For example, a rotor having three arms can be employed, as shown in FIG. 53, wherein each arm of the rotor 3611 includes a plurality of magnets at their respective terminal ends. Each arm interacting with a pair of stator magnets 3613 which cause the rotor to oscillate over a shorter range of motion than the two arm rotor design. The embodiment of FIG. 54 provides arcuate stator magnets 3713 (each arranged in opposing polarity between north "N" and south "S" as shown). An advantage to the three arm rotor design is that it allows for a shorter resonator, which in turn allows for greater flexibility in implementation. FIG. 55 depicts another embodiment of a three-arm rotor 3811, where the magnets are coupled (e.g. adhered) directly to the bearing shaft 3400. FIG. 56 depicts additional exemplary embodiments demonstrating alternative magnet and yoke designs, including a three-arm rotor 3911 embodiment with sixteen magnets and four yokes (left view), and an embodiment with fifteen magnets and zero yokes (right view).

It should be noted that although the exemplary resonant scanning systems for rotation about axis A1 disclosed herein (whether employing the "bumper" stator magnets of FIG. 37, or the "booster" magnetic coils of FIG. 44) are depicted with a mirror as the payload to be rotated, the resonant scanning systems disclosed herein can be implemented with any payload and is not limited to light deflector for LIDAR applications.

Mirror Attachment

In accordance with another aspect of the present disclosure, yoke 2201 (whether in the "bumper" magnet embodiment of FIG. 37 or the "booster" magnet embodiment of FIG. 44, or any other configuration described (e.g. hairspring spring embodiment in FIG. 42)), utilized in connection with rotation about the axis A2 (which may be horizontal, but can also be alternative angles), can include structural features which facilitate coupling of the other components in the assembly, e.g. flexures, coil. Also, the yoke 2201 can act as a bearing for the mirror holder which can be fixedly attached to the mirror. FIGS. 57-64 illustrate an exemplary yoke 2201, which can be formed as a single/unitary structure or component, having spaced sidewalls 2210, 2212 defining a gap between (for receipt of the coil 2204 and magnets 2203), a top 2214 and bottom 2216 portion extending between the sidewalls, and a pair of flanges 2218, 2220 extending laterally outward from the sidewall—with all structures integrally formed. Accordingly, this single structure can be formed from a ferromagnetic material, to conduct flux from the magnets inserted therein, and thereby serve as both a yoke and stator during operation. Additionally, the yoke 2201 can be formed from a variety of materials that provide sufficiently high toughness, yield strength, and can be welded to other components of the assembly. This integral formation is advantageous in that it provides a simpler assembly, reduces manufacturing costs, and extends the life cycle of the yoke and allows for greater precision in manufacturing. Also, the single component yoke design avoids the need for coatings and adhesives to otherwise bond multiple components, thereby reducing cost and complexity.

Additionally, the attachment mechanism 2202 at the rear of the yoke, configured to couple to the coil holder of the second actuator subassembly for rotation about the vertical axis A1, as described above, can also be integrally formed with the yoke. In the exemplary embodiment shown, attachment mechanism 2202 includes a pair of arms extending outwardly and downwardly at an angle, e.g. approximately 45 degrees, from each sidewall on the rear of the yoke; however alternative configurations can be employed. Additionally or alternatively, in some embodiments, select components of the yoke 2201 can be formed separately and attached (e.g. welded, glued) to assemble the yoke. That is, the yoke 2201 can also be non-unitary, and a plurality of discrete structures assembled together.

Figure 60:
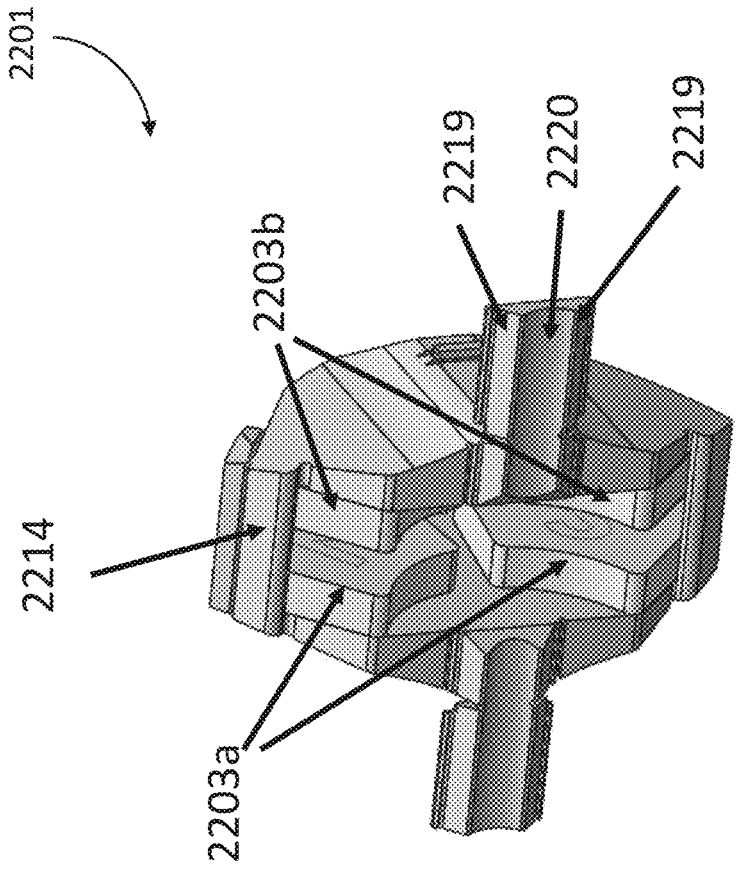
FIG. 60 shows an embodiment of a magnet employed by certain embodiments of the present invention.

The top 2214 and bottom 2216 bridge portions can extend about only a portion of the yoke such that the yoke has an opening on the front and rear sides. This allows the magnets 2203 to be inserted into the yoke with a first pair of magnets 2203a disposed against sidewall 2210 and a second pair of magnets 2203b disposed against sidewall 2212, with a portion of the internal gap remaining between the these magnets, as shown in FIG. 60. The voice coil 2204 can be positioned, e.g. sandwiched between, these magnets and have a portion of the coil extending outwardly beyond the front, and/or rear, surfaces of the yoke.

Figure 61:
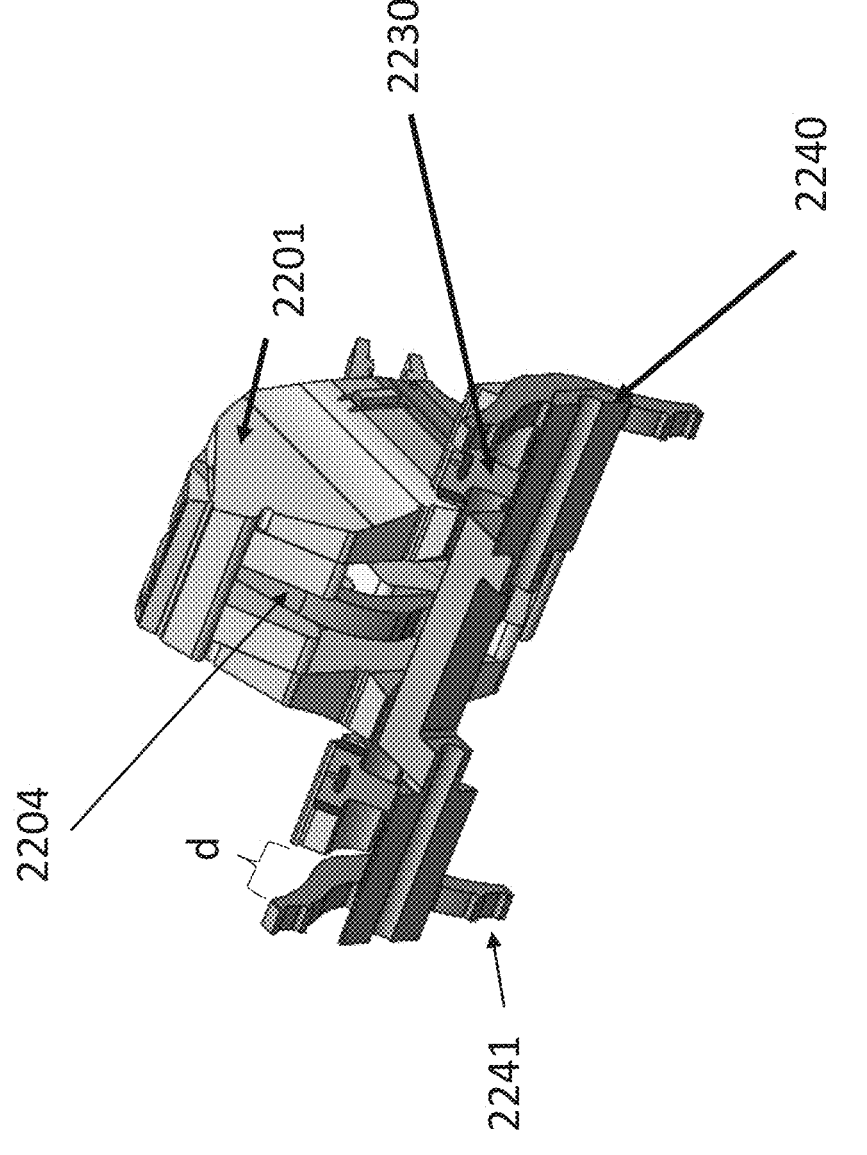
FIG. 61 shows an embodiment of a mirror holder of the present invention.
Figure 62:
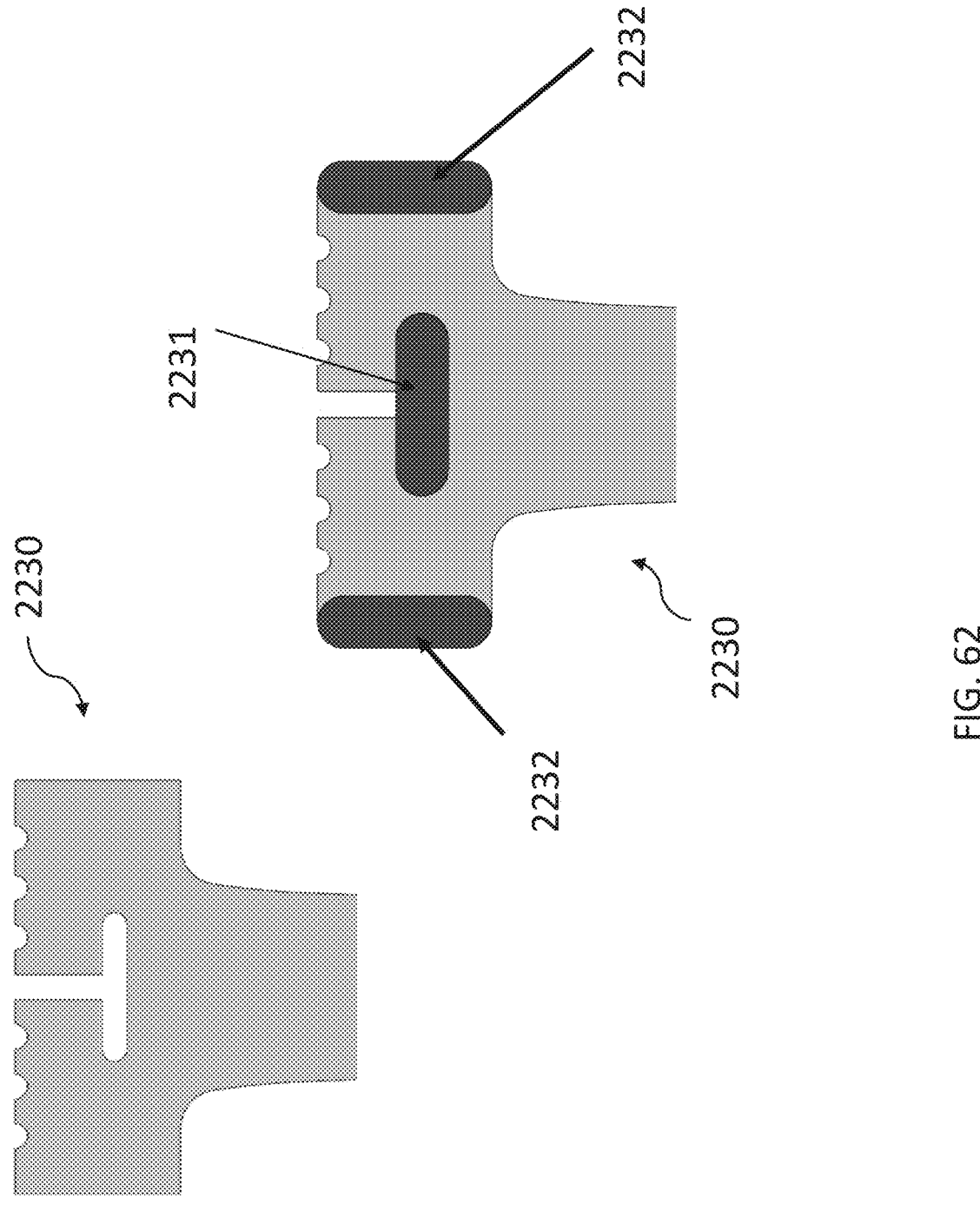
FIG. 62 shows an example of an overlapping welding spot used in manufacturing of certain embodiments of the present invention.

The flanges 2218 can be disposed at a midpoints of the respective sidewalls, with the second flange aligned horizontally with the first flange. Each flange can include surface features to facilitate coupling with a mirror, and/or coil, holder. For example, each flange can include a plurality of generally planar facets 2219 which can serve as an interfaces for coupling to flexures, and a concave portion 2220 disposed between the facets to receive a mirror holder, as shown in FIG. 61. The planar facets 2219 allow for the flexures 2230 to be coupled by, e.g., welding, brazing, soldering or adhering of the flexure edge(s) to the facet 2219. Once coupled, any forces exerted on the flexures can be transferred to the yoke. Alternatively, the flexures 2230 may be coupled to the yoke by a connecting portion extending between the sidewalls. The connecting portion may be a single flange, or a curved element with a generally planar surface which can serve as an interface for coupling to flexures. The flexures 2230 can be formed of a material with high yield strength to provide an extended lifetime of the assembly, and can also be welded to the holder 2240. Flexures may be formed of materials such as AISI 420, PH 15-7, stainless 301, Inconel X-750, or AISI 631 CH 900 (17-7 PH). In some embodiments, a plurality of welding spots/locations are utilized to strengthen the bond between the flexure and yoke. In the exemplary embodiment shown in FIG. 62, overlapping welding spots are utilized with a first weld location(s) 2231 oriented laterally and a second weld location(s) 2232 oriented vertically. The first and second weld locations can be spaced from each other, with the first weld location 2231 located at a center of the flexure, and the second weld location 2232 located at the edges of the flexure. Additional welding locations and geometries can be utilized as desired to accommodate mirrors of varying size. Also, although the exemplary embodiment illustrates two flexures 2230 equidistantly spaced from the center of the yoke, additional flexures can be utilized, with a non-uniform spacing if desired.

Thus, while the yoke 2201 can be configured as a single/integral component (of ferromagnetic material, with sufficient stiffness/hardness to withstand the forces generated by the resonant frequency scanning operation such as AISI 630 H 900 (17-4 PH)), the flexures 2230 and mirror/coil holder 2240 can be separate components, each can be formed from a variety of (preferably non-corrosive and non-ferromagnetic) materials, e.g., non-ferromagnetic stainless steel such as 304L grade stainless steel. The mirror/coil holder 2240 can be formed of materials such as AISI 304L or AISI 316L grade stainless steel that can be welded to the flexures. As shown in FIG. 61, the flexures 2230, have a first end attached (e.g. welded) to the yoke flanges as described above, and a second end attached to a mirror holder 2240 (the mirror is omitted for clarity). In some embodiments, the mirror holder 2240 can also be configured to engage the voice coil 2204 on an opposite side of the structure (thus a single structure can serve as both a mirror holder and a voice coil holder). In some embodiments the mirror/coil holder 2240 may be two separate parts, a mirror holder, and a coil holder, which can be coupled to each other along their adjacent sides. The mirror holder and coil holder may be formed of a non-ferromagnetic material. The mirror holder may be formed of a material weldable to the flexures (e.g. 304L grade stainless steel), and the coil holder may be formed of a material optimized for heat dissipation from the coil (e.g. aluminum), and coupled with the mirror holder (adhesive or mechanical coupling means).

Figure 63:
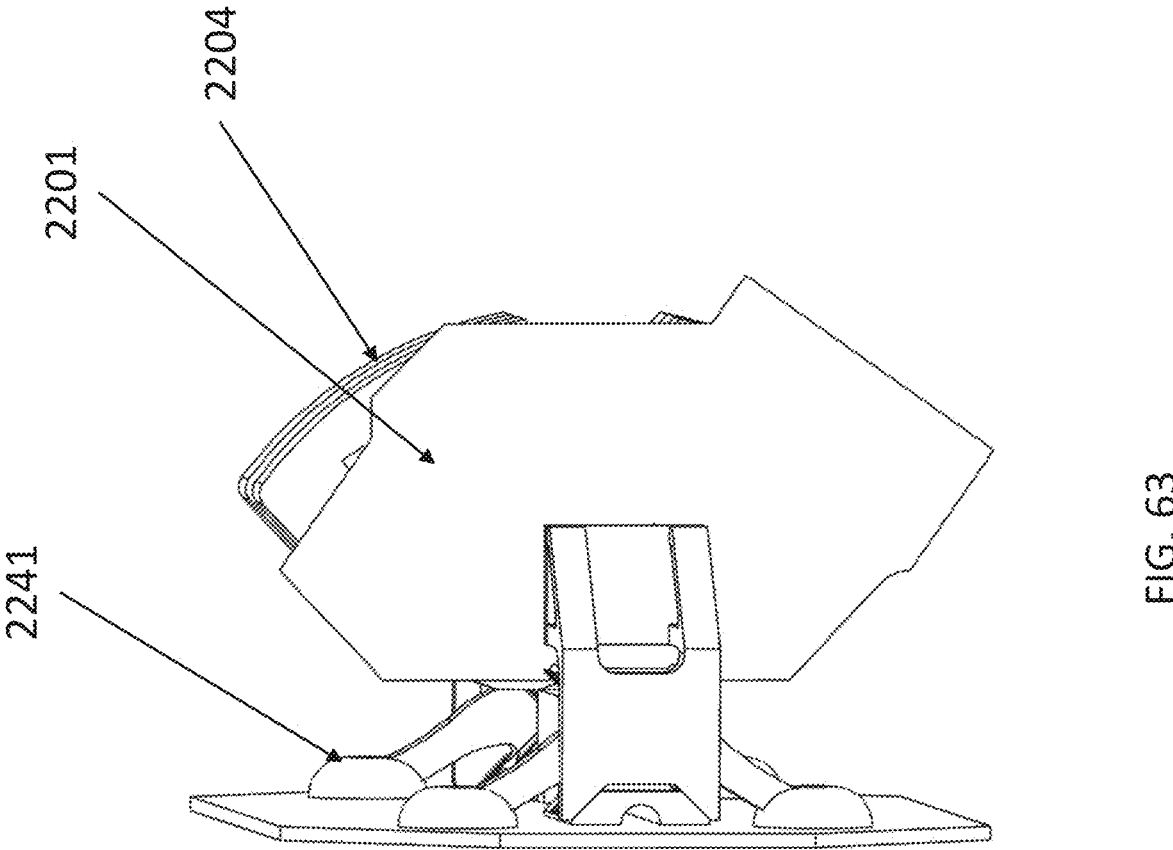
FIGS. 63-64 show an embodiment of a mirror holder of present invention.
Figure 64:
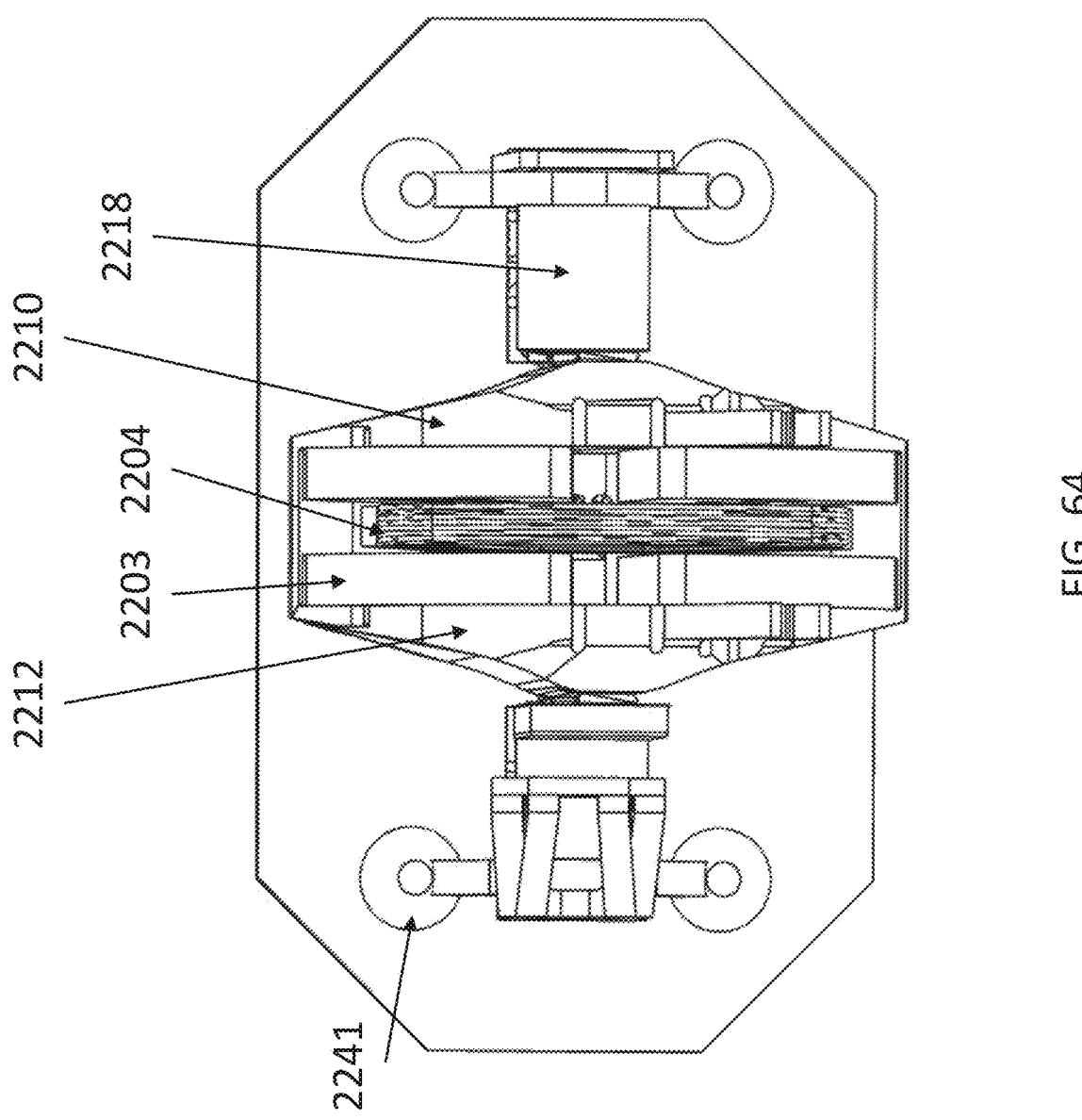

On the mirror side, the holder 2240 includes an elongated concave recess, and extends a distance greater than the edges of yoke flanges 2218. As shown in FIGS. 63-64, the mirror holder can include a plurality of feet 2241 for coupling to the mirror, with the feet spaced a distance "d" from the end of the yoke flange 2218. In the exemplary embodiment shown, four feet are connected to the mirror, with the spacing between feet 2241 provides for greater stability and minimization of dynamic deformation of the mirror, during operation. The number and locations of the feet can be adjusted so as to provide a coupling that maintains the mirror in a flat orientation while exposed to acceleration during use. The holder 2240 has sufficient rigidity to support the weight of the payload (e.g. mirror) and also acts as a rotor for the flexure bearings 2230. The opposing side of the holder 2240 engages the coil (e.g. extends or wraps around three sides) to provide stability and support during the range of motion and prevent undesired displacement of the coil(s).

A skilled person would appreciate that any of the embodiments described hereinabove in Part III can be combined with any of the embodiment described hereinabove in Parts I and II.

Part IV: Distortion Correction

Figure 65:
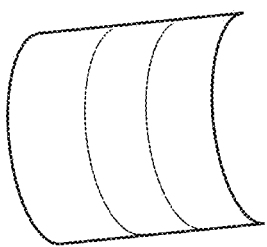
FIG. 65 is a schematic illustration of a distorted scan pattern.
Figure 65:
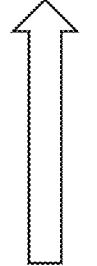
Figure 65:
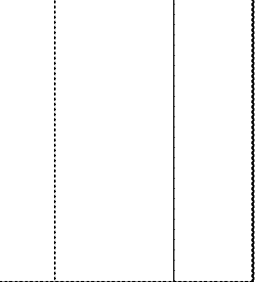

In a LIDAR scan system, certain distortions may result due to the angular deflection of projected light. Such distortions can result from axis coupling of a biaxial scanning systems such as those described above. Specifically, axis coupling results in a rotation of the mirror around both rotation axes (e.g. $V_1$, $V_2$) even when only one of the two actuators is moving, while the other actuator is fixed at a predetermined position. Distortions can be a result of rotation of an array of laser beams generated by a laser array due to the variable angle of incidence of each beam on the light deflector. Distortions can also be a result of the tilt of the projecting plane (mirror surface) with respect to the image plane. Such distortions result in an undesirable point cloud with a non-uniform resolution, shaped irregularly as opposed to a desired shape. FIG. 65, is an illustration of an undesirable distortion of the scan lines (i.e. the projections of the scanning light beam onto an image plane). In this example, a desirable rectangular projection is distorted into a curved surface.

In order to correct for this effect, one or both of the following approaches can be used.

Axis Tilt

In one embodiment, any of the biaxial scanning assemblies described hereinabove can be further modified by tilting one of the axes of rotation.

Any biaxial scanning system described herein may scan a field of view (FOV) defined as a solid angle formed by beams deflected from a mirror at the extreme angles of the mirror's rotation around both first (e.g., horizontal, controlling the elevation angle) and second (e.g., vertical, controlling the azimuthal angle) axes. Planes are defined by any two beams deflected at opposite extreme angles of the mirror's rotation about a given axis (i.e., at opposite extreme angles of the FOV), while the other angle of rotation of the mirror is fixed. A "horizontal" bisecting plane exists that bisects the full range of angles of rotation about the first (e.g., horizontal) axis; similarly, a "vertical" bisecting plane exists that bisects the full range of angles of rotation about the second (e.g., vertical) axis. (It should be understood that, when due to axis coupling, even where an angle of rotation of one of the actuators is fixed (e.g., the vertical or elevation angle), the beam may not follow the horizontal bisecting plane during a horizontal (azimuthal) sweep.) As used herein, a "tilted" axis of rotation refers to a rotational axis of the mirror that is not perpendicular to a bisecting plane that it intersects (e.g., the "vertical" axis of rotation may be "tilted" if it is not perpendicular to the "horizontal" bisecting plane).

Figure 66A:
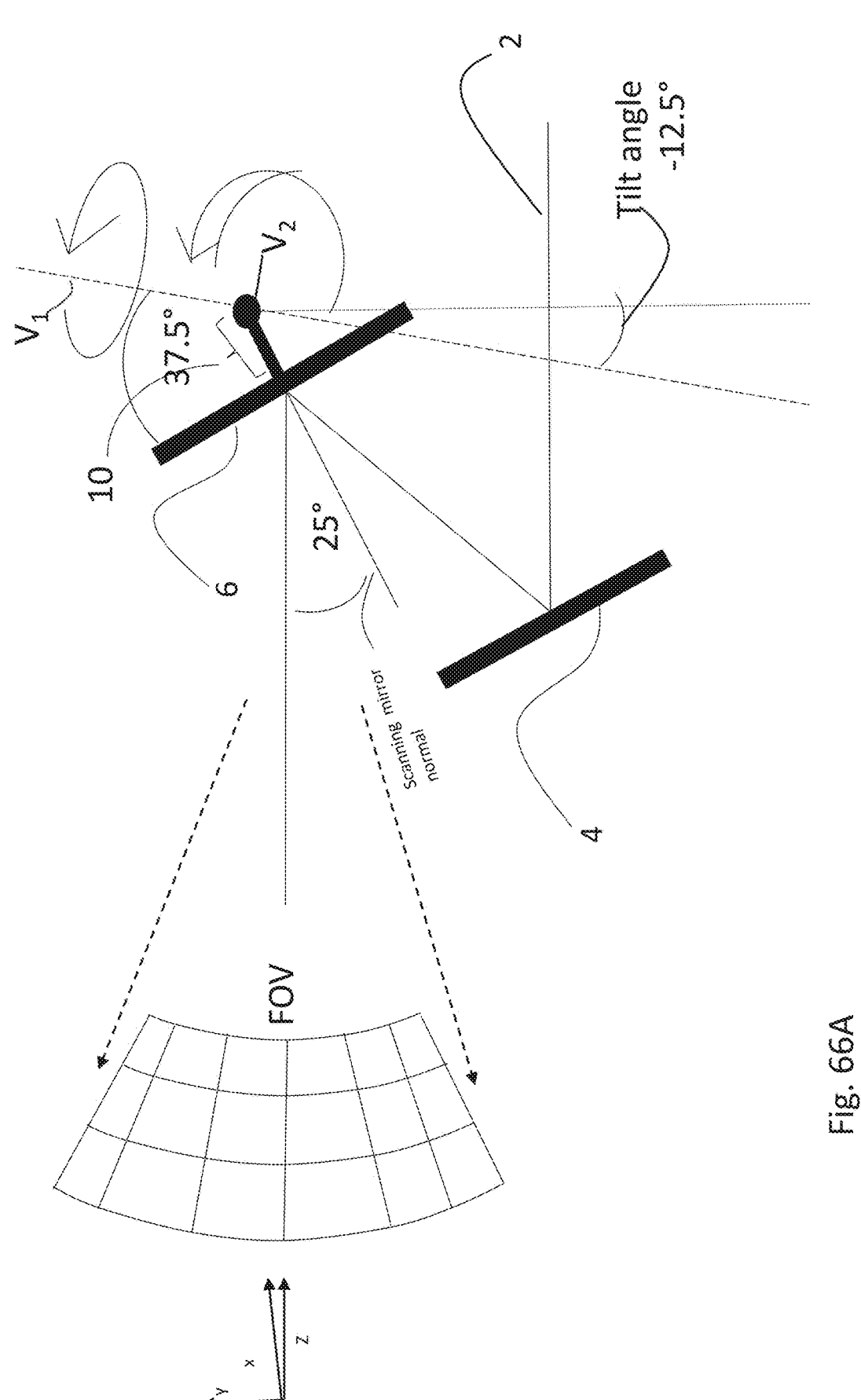
FIG. 66A is a schematic diagram of an example embodiment of a biaxial scanning assembly of the present invention having an axis tilt.

One embodiment of a tiled axis arrangement is illustrated in FIG. 66A. In FIG. 66A, a laser beam 2 is reflected from a stationary mirror 4, and is redirected to a scanning (movable) mirror 6, and then deflected towards the field of view (FOV). Mirror 6 can be rotated around a "vertical" (azimuthal) axis $V_1$, and around a "horizontal" (elevation) axis $V_2$. As can be seen, axis $V_1$ is not perpendicular to the horizontal bisecting plane of the FOV (an xz-plane that bisects the y axis), but is tilted, in the example, shown in FIG. 66A, by 12.5 degrees (measured with respect to the y-axis, perpendicular to the xz-plane).

In certain example embodiments, such as the one shown in FIG. 66A, mirror 6 can be offset from the "horizontal" (elevation) axis $V_2$ by certain distance 10. In designing a compensating scan patter, the value of the offset 10 is taken into consideration.

Figure 66B:
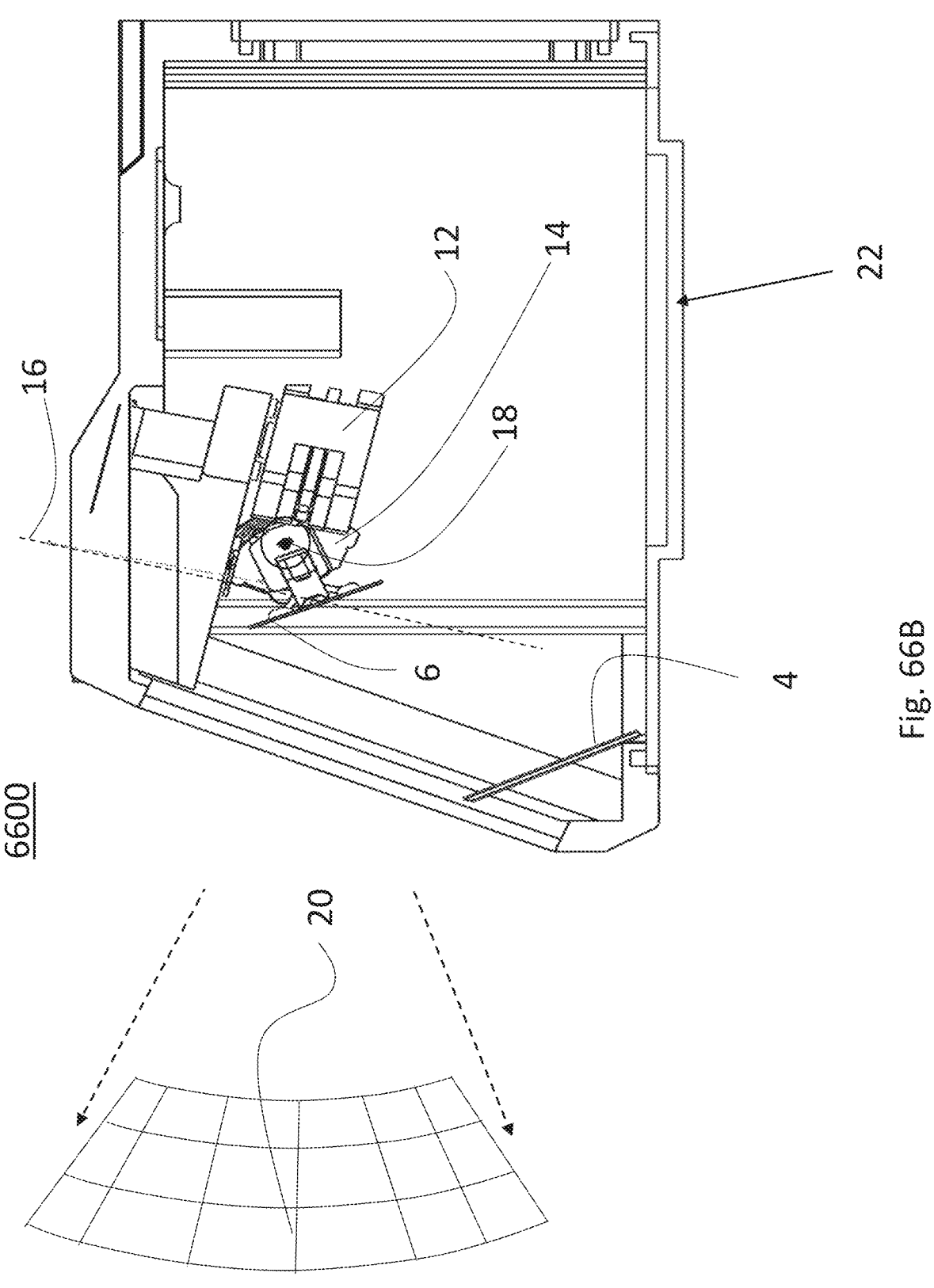
FIG. 66B is a schematic illustration of an example embodiments of a biaxial scanning assembly of the present invention having a tilted axis.

FIG. 66B is a schematic diagram of an example embodiment of a biaxial scanner 6600 of the present invention comprises actuator 12, providing rotation about a vertical (azimuthal) axis of rotation 16, and actuator 14, providing rotation about a horizontal (elevation) axis of rotation 18. As can be seen, axis 16 is tilted with respect to bisecting plane 20. Scanner 6600 comprises housing 22, stationary mirror 4, and scanning (movable) mirror 6.

Pre-Distortion of Scan Pattern

In another embodiment, the scanning pattern can be pre-distorted in order to compensate for distortions, and a corrected point cloud may be obtained. For example, rather than completing the horizontal line scans each at a fixed vertical angle of the scanning mirror, the scanning mirror may be rotated non-monotonously about its horizontal scan axis, and at the same time as it rotates about its vertical scan axis to complete each horizontal line scan. It should be understood that the choice of the axis is arbitrary: the same pre-distortion scheme can be applied to a mirror that completes a vertical line scan by oscillating (rotating) about the horizontal scan axis (controlling the elevation angle), while the mirror's angle of rotation about the horizontal scan axis (controlling the azimuthal angle) is changed non-monotonously.

Figure 68:
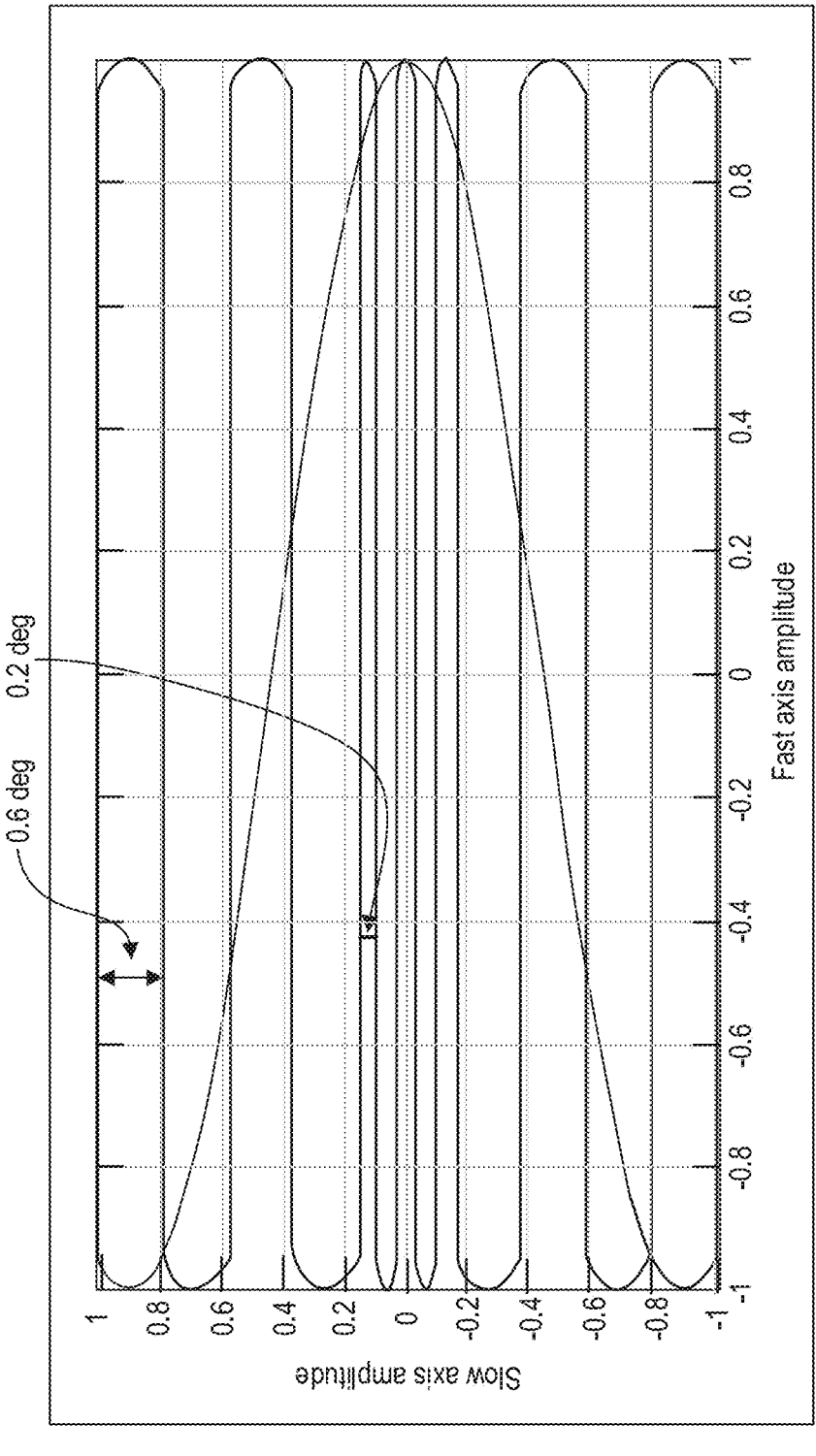
FIG. 68 shows an exemplary raster scan patter.

FIG. 68 shows a scan pattern of the scanner that has not been pre-distorted. The mechanical scan pattern is the angle of the normal to the surface of the reflector as it scans the FOV, where (0,0) is the center of the field of view. Each horizontal scan line is completed at a fixed position of the scanning mirror relative to its vertical scan axis. For clarity, it should be noted that the values on the axes are normalized to the maximum amplitude of the scan, such that the maximum amplitude is 1. For example, by sequentially rotating a scanning mirror 6 about an axis (e.g. $V_1$), laser light beams may be directed along a plurality of points in a left-right direction as represented by horizontal scan lines. Further by sequentially rotating scanning mirror 6 about a second axis (e.g. $V_2$) in a top-bottom direction, laser light beams may be directed along a plurality of points in an up-down direction. The combined 2D movements of the scanning mirror 6 may generate the scanning pattern of FIG. 68, and the vertical progression of the scan in this example is top-bottom.

Figure 69A:
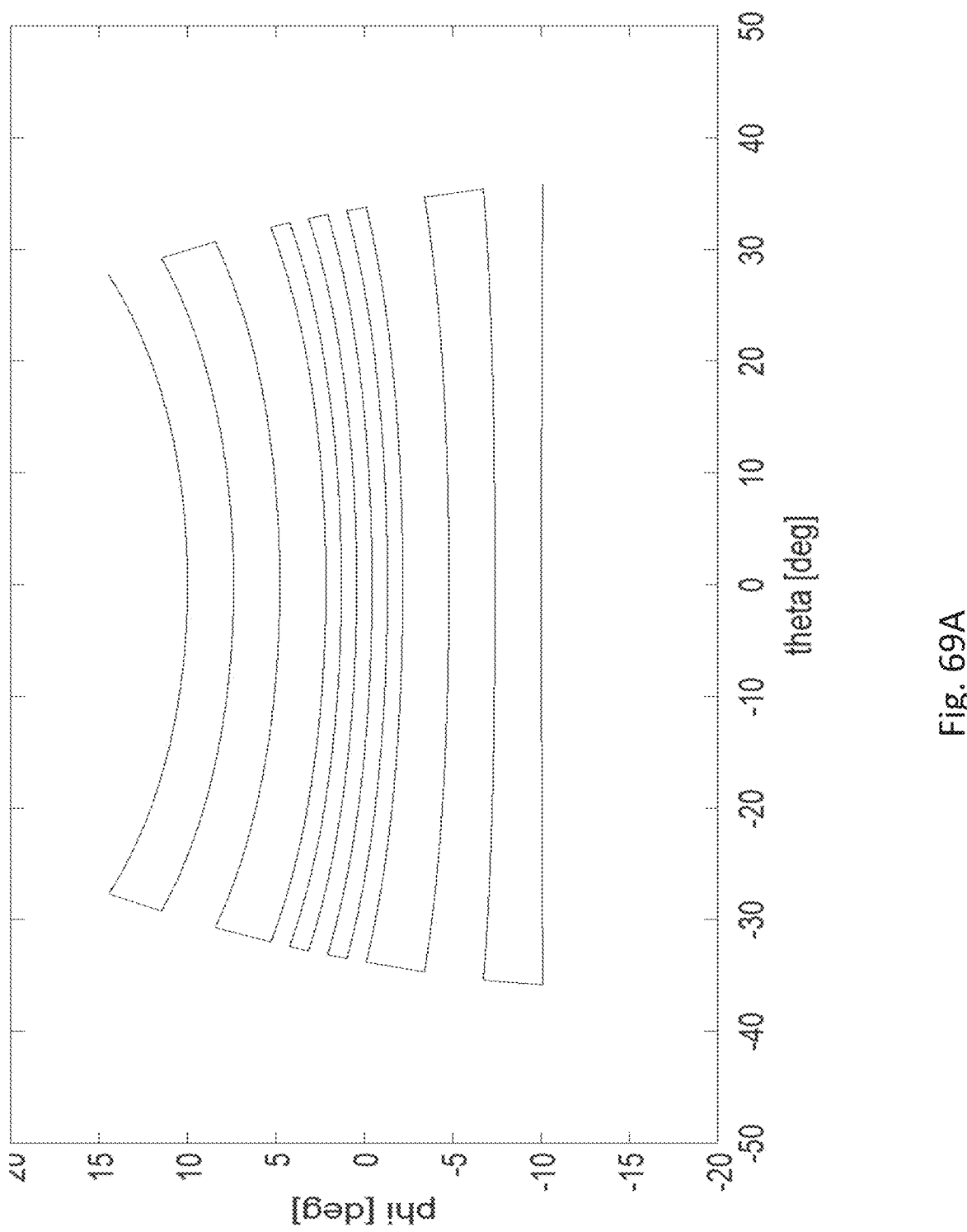
FIG. 69A, FIG. 69B, and FIG. 69C show exemplary compensated scan patterns in accordance to the present invention.

In contrast, FIG. 69A shows the scanning angles of a scan pattern that has been pre-distorted to compensate for the distortions. In this scan pattern, the scanning mirror rotates along both its vertical scan axis and its horizontal scan axis simultaneously. In this example, it can be seen that there is an upshift at the edges of each scan line. The pattern shown is useful when the angle of incidence of the light beam onto the deflector (e.g., a mirror) is smallest at the center of the angular range of rotation about one of the scan axes and largest at the extremes of the angular range. In this example, the vertical motion causes the scanner to create scan lines that are separated by an angular displacement (which can be variable for variable resolution). However, in a pre-distorted scan, the vertical displacement may be in the direction opposite to the progression of the scan along a single horizontal line, for example.

It is understood that the choice of a labels "vertical" or "horizontal" with respect to axes is arbitrary and a similar pre-distortion scheme can be applied to either one of the axes of a biaxial scanner.

Figure 69B:
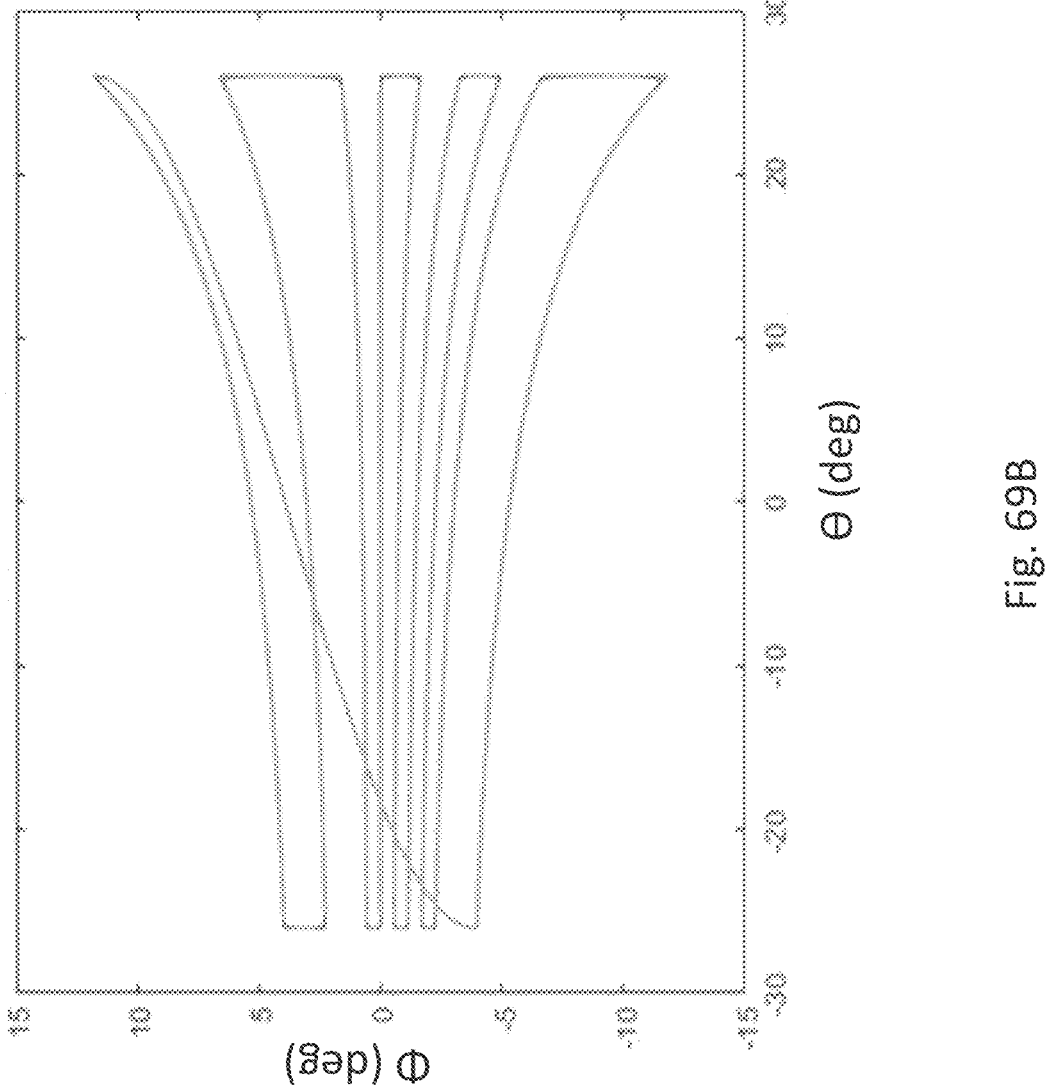

Another example of a pre-distorted scan pattern is shown in FIG. 69B. The pre-distorted pattern shown is an example of mechanical scanning angles that compensate for scenarios in which the angle of incidence of the light beam onto the deflector (e.g., a mirror) is smallest at one extreme of the angular range of rotation about one of the scan axes and largest at the other extreme of the same angular range. As a result, the distortion is smallest at one extreme and largest at the other extreme, requiring the compensating scan pattern shown in FIG. 69B.

Figure 69C:
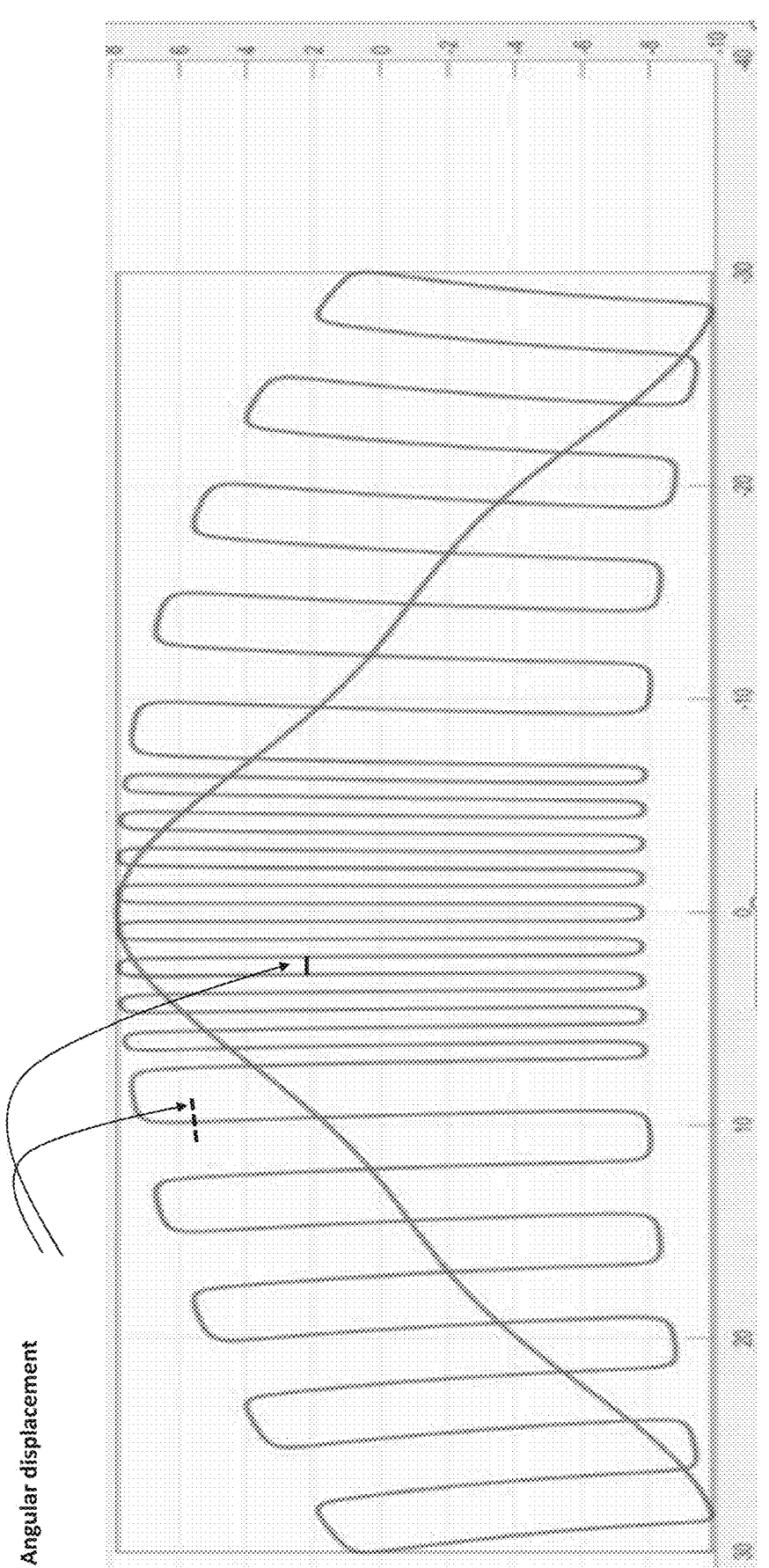

Another example of a pre-distorted scan pattern is shown in FIG. 69C, which shows an example of a vertical scan pattern.

Figure 67A:
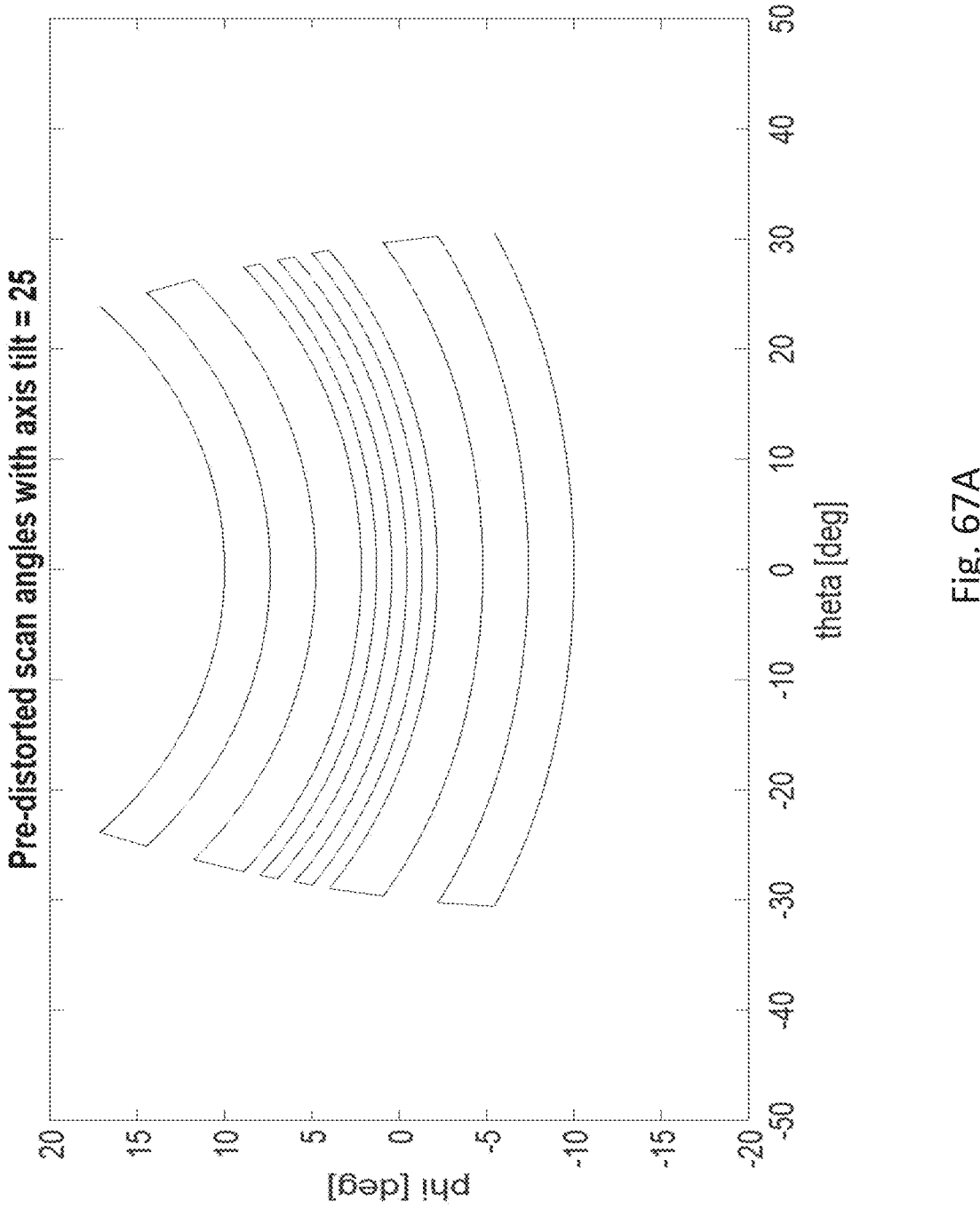
FIGS. 67A, 67B, and 67C illustrate exemplary compensated scan patterns described herein, optionally combined with an axis tilt.
Figure 67B:
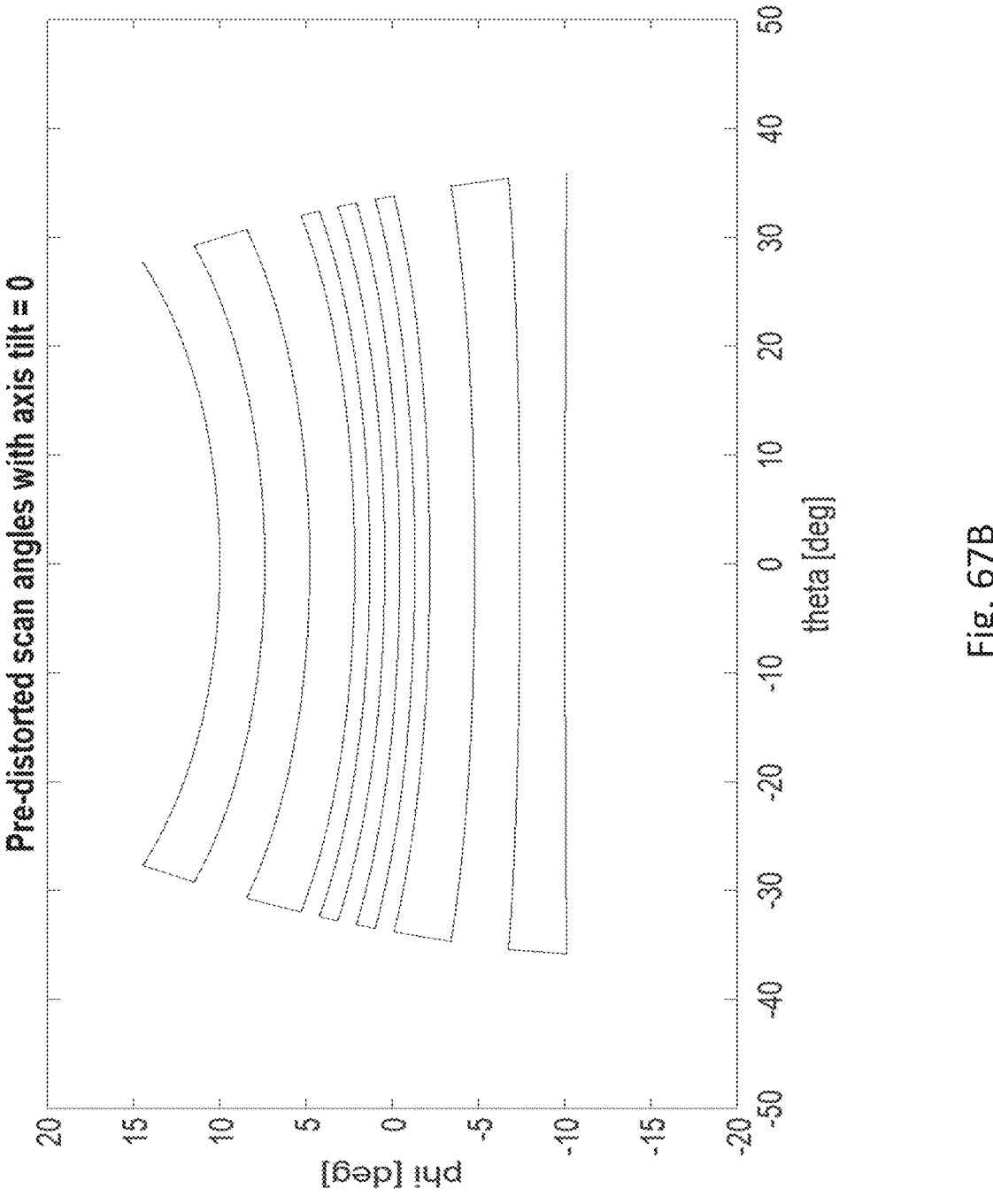
Figure 67C:
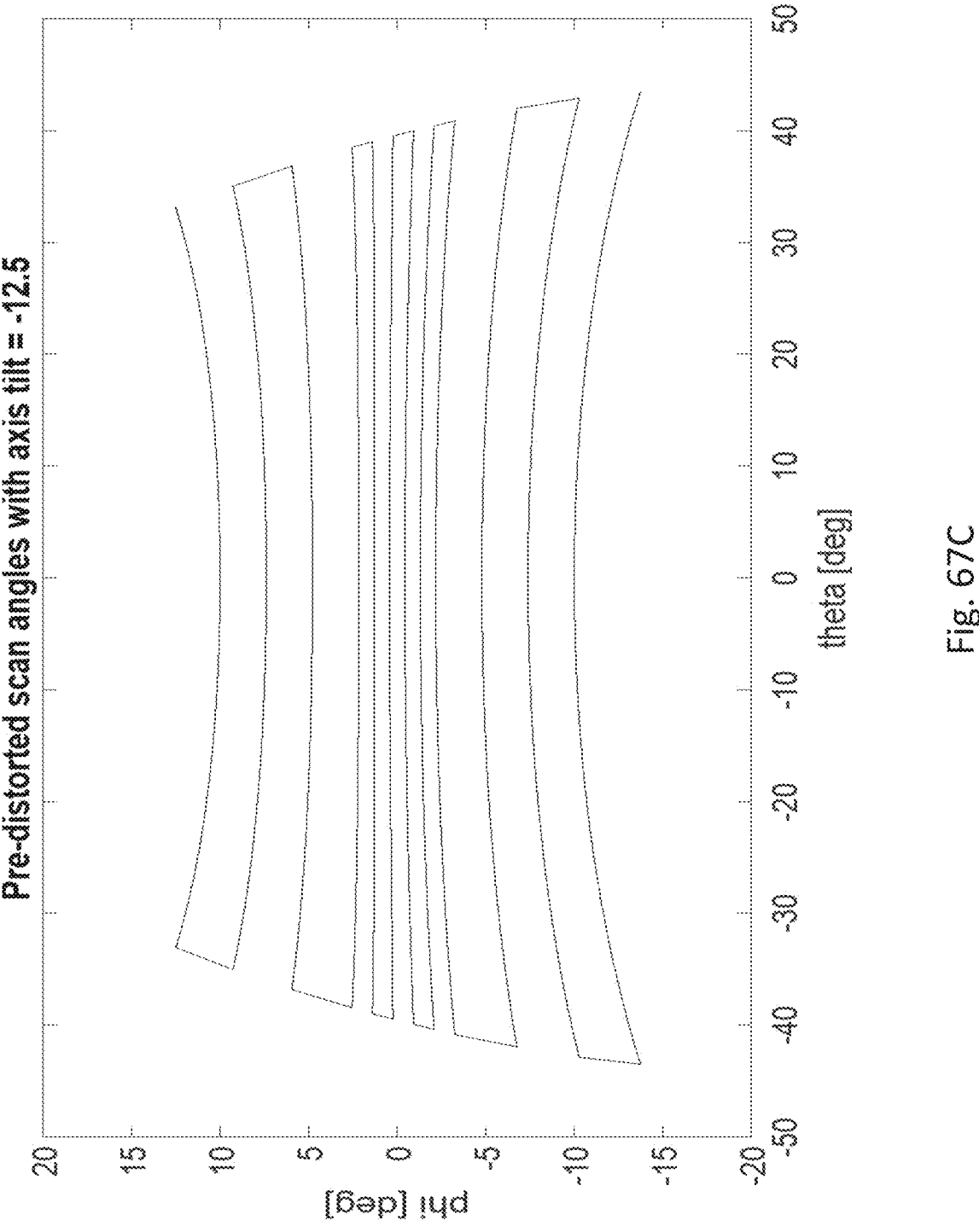

As stated above, the tilted axis design illustrated in FIG. 66A and FIG. 66B be combined with the pre-distorted scan pattern approach to resolve distortion in the scan. This is illustrated in FIG. 67A through FIG. 67C. These figures depict a pre-distorted scan patterns generated to compensate for a distortion due to axis coupling at various tilt angles.

FIG. 67A shows the pre-distorted scan pattern required to compensate for the distortion when the tilt angle is +25 degrees. FIG. 67B shows the pre-distorted scan pattern required to compensate for a distortion at the tilt angle of zero degrees. FIG. 67C shows the pre-distorted scan pattern required to compensate for a distortion at the tilt angle of −12.5 degrees, such as shown in FIG. 66. Each scan pattern comprises scan lines.

It can be seen that by varying the axis tilt, it is possible to reduce the required compensatory pre-distortion. This is beneficial, because implementing the pre-distorted scan pattern may result in high energy consumption (e.g. high peak power, high average power, or increased actuator size requirements). While resonant scanning is very energy efficient, driving the quasi-static actuator to implement a scanning pattern with pre-distortion can be energy consuming. Reducing the required compensatory pre-distortion by tilting the axis may bring the power requirements to a feasible range. Thus, reducing the pre-distortion is valuable in many LIDAR applications. This benefit is especially valuable in resonant scanning designs such as those described hereinabove. In certain example embodiments, the power requirement for the driving the biaxial scanner can be less than or equal to 4 W.

Additionally, FIG. 67C shows scan lines in the center of the FOV (i.e. (0,0) and near it) are nearly flat, i.e. require a smaller predistortion than that required for scan lines near the edges of the FOV, which are more curved. In contrast, FIG. 67B, shows flat scan lines at the bottom of the FOV (i.e. phi between −7 and −10), and more curved as the scan angle increases. The tilt angle may be selected to minimize the required power to implement the scan (i.e. minimize the required pre-distortion), for a particular system. Alternatively, the tilt pattern may be selected to minimize the required pre-distortion in a particular region of the FOV (e.g. a region of interest (ROI), such as the central portion of the FOV).

In various embodiments, the axis tilt can be selected to be any value from −1 to −40 degrees. For example, the tilt can be −12.5, −15, −25, or −37.5 degrees.

In order to generate pre-distorted raster scans, in certain embodiments the scanning actuation is quasi-static (i.e. can be moved by an arbitrary angle) such that the position of the scanner can be controlled precisely. In certain implementations, quasi-static scanning requires high driving power. This is in contrast with resonant scanning, described hereinabove, which has low power requirements. However, scanner position along the resonant axis cannot be set arbitrarily.

The mirror can rotate at different angular velocities relative to its horizontal and vertical scan axes. For example, the scanning mirror may rotate more slowly about its vertical scan axis than about its horizontal scan axis. The resulting mirror rotations produce, for example, a horizontal scan pattern such as those shown in FIGS. 67-69. It should be noted that the converse may be true in certain embodiments. For example, a scanning mirror may rotate more slowly about its horizontal scan axis relative to rotations about its vertical scan axis. Such operation can be used to produce a vertical scan pattern, such as the one shown in FIG. 69C. The distance between the rows in, e.g., the horizontal scan can be referred to as the vertical offset, or a pitch, or vertical angular displacement, between scan line. In one example, the distance between scan lines, or angular displacement (e.g. vertical shown in FIG. 69A, horizontal shown in FIG. 69C may vary to provide regions of higher potential point cloud resolution (e.g., in a region including the horizon or in any other region of interest).

Figure 70:
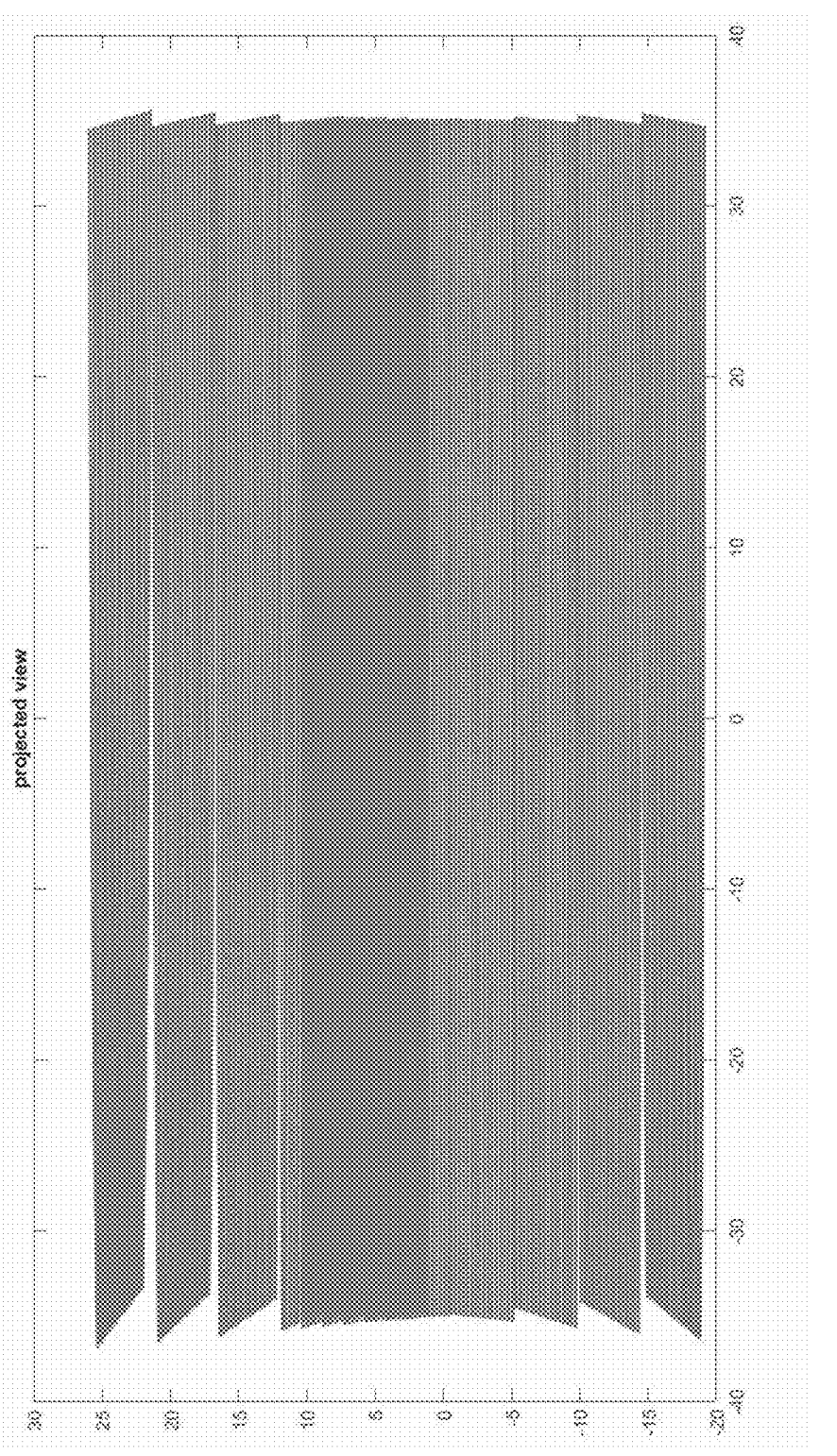
FIG. 70 depicts a scan pattern generated by a linear array of lasers.

Each scan line may be scanned with a plurality of laser beams (e.g., generated using a laser array as described above and below). With this type of multi-beam scanning, as the mirror follows the lines of the scan pattern in the figure above, the areas between the lines in the scan pattern are filled in (or scanned) with individual scan lines each associated with one of the multiple laser beams being simultaneously projected toward the FOV by the scanning mirror, as shown in FIG. 70. In some examples, the distance between each line (angular displacement) in the scan pattern may be equal to or larger than the total angular coverage provided by the multiple beam spots of the laser source array. In other cases, the distance between at least some lines in the scan pattern may be less than the total angular coverage provided by the multiple beam spots of the laser source array.

It will be appreciated that the horizontal scan lines need not be evenly spaced. For example, to scan certain regions of the LIDAR FOV, such as the areas above and below the horizon region, an increment of the vertical tilt (elevation angle) of the mirror can be selected that is greater than a minimum available tilt increment. For example, the regions above and below the center of the scan can be scanned with a vertical tilt increment different to that of the center of the scan. The center of the scan may, for example, be directed at the horizon. For example, the regions above and below the center of the scan can be scanned using a vertical angular increment (about the horizontal scan axis) of 0.6° which may correspond, for example, to the entire angular size of the light source (e.g., a laser array), thus generating coarse sampling resolution equal to the laser pitch in the array. The laser pitch refers to the center-to-center distance between active laser light emitting regions of the laser array. In the region including the center of the scan, however, a minimum vertical tilt angle can be used to provide more closely spaced scan lines in that region and, in turn, higher sampling/point cloud resolution in that region. Assuming that a ratio of laser active area to non-active ratio is 1:N-1, the line spacing may be up N times more packed. In this example, the point cloud vertical resolution may depend on the line spacing while the horizontal resolution may depend on the frequency at which the single laser source is pulsed as the 2-D scanning mirror scans along each horizontal scan line. The higher the pulse frequency, the higher the potential horizontal resolution of the generated point cloud from the LIDAR system.

In some embodiments, rotation of the biaxial scanning mirror about one of the two axes may cause displacement of the plurality of laser beams from a first set of locations associated with a first plurality of scan lines to a second set of locations associated with a second plurality of scan lines. It is contemplated that in some embodiments of LIDAR system described herein, rather than relying on a single laser light source, multiple laser light sources can be used. It is also contemplated that light beams from one or more laser sources may be split to provide multiple laser beams available for scanning. As also discussed above, a laser array (e.g., a 1-D laser array as described in the examples in the sections above) may be used to provide multiple laser beams for scanning a LIDAR FOV. When a plurality of laser light beams from laser array are directed to the mirror, rotation of the mirror about the vertical scan axis (the azimuthal angle of rotation) may produce a plurality of horizontal scan lines traversing a first set of locations. Further, rotation of the mirror about the horizontal axis (the elevation angle of rotation) may shift the plurality of horizontal scan lines vertically, thereby generating a second set of scan lines traversing a second set of locations vertically spaced apart from the first set of locations. In some embodiments, a rate of rotation about the scan axis may be faster than a rate of rotation about the horizontal (elevation angle) axis.

Figure 71:
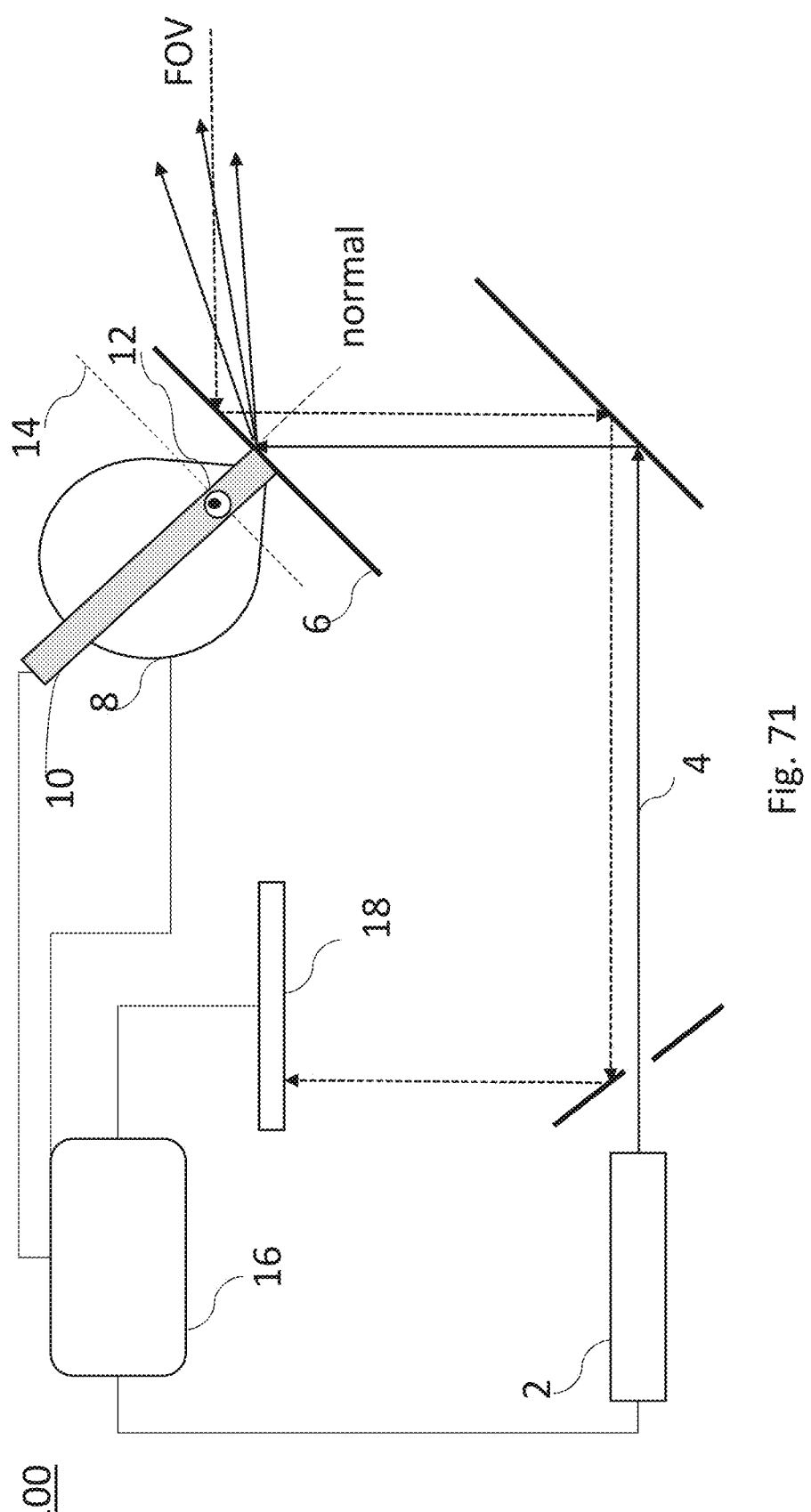
FIG. 71 is a schematic diagram of a scan system disclosed herein.

In view of the above, in one example embodiment, illustrated in FIG. 71, the present invention is a scanning system 100, comprising a light source 2 configured to generate at least one light beam 4; at least one deflector 6; a first actuator 8 configured to rotate the at least one deflector 6 about a first scan axis 14 and a second actuator 10 configured to rotate the at least one deflector about a second scan axis 12, the at least one deflector configured to deflect the at least one light beam to a field of view; and at least one processor 16 configured to control the light source 2, the first actuator 8 and the second actuator 10 to cause the at least one deflector 6 to scan the field of view, wherein during scanning of at least a portion of the field of view, the at least one processor 16 causes the first actuator 8 and the second actuator 10 to simultaneously rotate the at least one deflector 6 about the first scanning axis 12 and the second scanning axis 14 according to a compensated scan pattern, wherein the compensated scan pattern at least partially compensates for one or more distortions associated with a varying incidence angle of the at least one light beam onto the at least one deflector 8. As used herein, "an incidence angle" is measured with respect to the normal to the surface of the reflector and is zero when the beam is perpendicular to the surface.

In any example embodiment, the scanning system can further comprise at least one sensor 18 configured to detect the at least one light beam reflected from an object located in the field of view, and wherein the at least one processor 16 is configured to: receive, from the at least one sensor 18, a reflection signal indicative of the at least one light beam reflected from the object; and based on the reflection signal, generate a point-cloud representation of an environment of the system within the at least a portion of the field of view.

In any example embodiment, the point-cloud representation can comprise a plurality of points associated with the at least one beam reflected from the object, wherein each of the plurality of points is associated with a range value.

Figure 72:
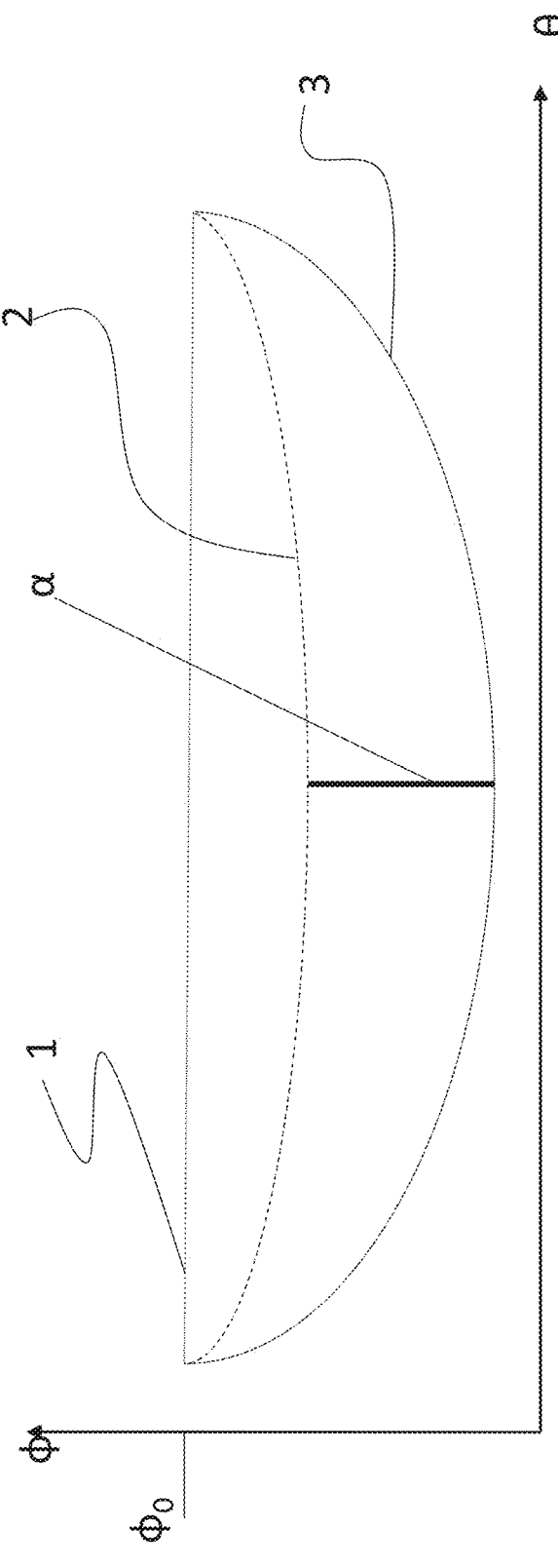
FIG. 72 is a schematic diagram illustrating an angular span that can be implemented during the operation of a scan system disclosed herein.

In any example embodiment, the compensated scan pattern can comprise a variable angular span about the first scan axis, wherein the variable angular span about the first scan axis increases with an increase in the incidence angle of the at least one light beam with respect to the at least one deflector.

Where the scan pattern is a raster, the rotation about the first axis is slower than the rotation about the second axis. If the angle of rotation of the deflector by the first actuator about the first axis is fixed at a predetermined value, and the second actuator causes the deflector to oscillate (i.e. rotate) about the second axis, the deflected light beam would generate a line in the scan pattern. In certain embodiments, both the first and the second actuators are simultaneously rotating the deflector. An "angular span" about a first axis is a maximum absolute value of the deviation from a predetermined fixed value of the angle of rotation of the deflector by the first actuator about the first axis during the oscillation (i.e. rotation) of the deflector about the second axis. For example, an angular span of zero about the first axis would generate a line in the scan pattern. A non-zero angular span about the first axis would generate a line that is curved with respect to (or, generally, deviates from) the zero angular span line. Referring to FIG. 72, three exemplary scan lines corresponding to a fixed angle $\phi_0$ of rotation about the first axis (for example, horizontal axis of rotation corresponding to an elevation angle of the mirror) are shown. Scan line 1 is a line that would be produced in the absence of axis coupling, scan line 2 is generated by a biaxial mirror due to axis coupling, and scan line 3 illustrates an example scan line having angular span a.

In any example embodiment, the variable angular span about the first scanning axis can increase non-linearly with an increase of the incidence angle of the at least one light beam with respect to the at least one deflector.

In any example embodiment, the compensated scan pattern can comprise a variable compensatory pitch with respect to the first scanning axis, and the variable compensatory pitch can decrease with an increase of the incidence angle of the at least one light beam with respect to the at least one deflector.

As used herein, a "pitch" refers to an angular distance between two adjacent scan lines of a raster scan pattern. In various embodiments, a total pitch is a sum of two types of the "pitch": an "instrumental pitch," which is determined by the setup of the scanner (by its mechanical, electrical, or controller/processor setup that results in a desired scan pattern provided the positioning of the scanner), and a "compensatory pitch," which is controlled via the controller/processor. In various embodiments, the compensatory pitch can be chosen to compensate for the optical distortions of the incident beam due to the variation of the incidence angle.

For example, where the scan pattern is a raster, the first axis is slow, and the second axis is fast, a scan line in the scan patter is generated when an actuator causes the deflector to oscillate about the second axis while the angle of rotation with respect to the first axis is fixed (or adjusted by an angular span, defined above). Two adjacent lines are separated by a total pitch. If the incident beam comprises a plurality of beams generated by a linear array of light sources (e.g., laser diodes), the reflected beam will generate an array of scan lines corresponding to one oscillation about the second axis. The arrays of scan lines will be distorted due to a difference in incidence angle of each beam of the plurality of beams, rotating of the array of laser beams resulting in gaps in scanned areas proportional to the incidence angle. For example, beams are rotated to be non-perpendicular with the scan axis (azimuth), as described in the first paragraph in this section. This effect is illustrated in FIG. 70, which depicts a scan patter generated by a linear array of lasers. As can be see, at the extremes of the horizontal extent of the FOV, there are gap between the arrays of scan lines generated by a linear array of light sources. Thus, in certain embodiments, a compensatory pitch may be chosen so that the array of scan lines are separated by a smaller angular distance at high incidence angles, and by a larger angular distance at small incidence angles.

In certain embodiments, the instrumental pitch is set up to reduce the pitch at small incidence angles (i.e., at the center of the field of view) in order to sample with a higher resolution.

In any example embodiment, the first scanning axis and the second scanning axis can be perpendicular to each other.

In any example embodiment, the angular rate of rotation of the at least one deflector about the first scanning axis can be greater than the angular rate of rotation of the at least one deflector about the second scanning axis, wherein rotation of the at least one deflector about the first scanning axis can cause the light beam to be deflected along first scan lines in the field of view, and rotation of the at least one deflector about the second scanning axis can provide angular separation between first scan lines.

In any example embodiment, the light source can comprise a plurality of light sources configured to generate a plurality of light beams. The light source can emit a beam having an elongated cross section (e.g., the beam cross section may be elliptical).

In any example embodiment, the light source can comprise a linear array of light sources configured to generate a plurality of light beams. As used here, a "linear array" refers to an arrangement of light sources disposed along a single line.

In certain aspects, the at least one deflector can be configured to deflect each light beam to a corresponding portion of the field of view.

In certain aspects, the at least one deflector comprises a reflective surface. In other aspects, the at least one deflector comprises a diffractive element.

In various embodiments, where the light beam comprises a plurality of light beams, the plurality of light beams occupy an angular envelope bounded by at least two divergent bounding light beams, and wherein the angle between the at least two bounding light beams is fifteen degrees or less. In some aspects, the angle between the at least two bounding light beams can be five degrees or less.

In any example embodiment, the at least one processor is configured to cause the first actuator to rotate the at least one deflector about the first scanning axis by an arbitrary angle. In certain aspects, the second actuator can be configured to rotate the at least one deflector in resonance about the second scanning axis.

In an example embodiment, the present invention is a method of scanning a field of view, comprising: generating at least one light beam; directing the at least one light beam to at least one deflector configured to rotate about a first scanning axis and to rotate about a second scanning axis and to deflect the at least one light beam towards the field of view; causing at least one processor configured to control the light source, a first actuator, and a second actuator to rotate the at least one deflector to scan the field of view, wherein during scanning of at least a portion of the field of view, the first and the second actuators simultaneously rotate the at least one deflector to about the first scanning axis and the second scanning axis according to a compensated scan pattern, wherein the compensated scan pattern at least partially compensates for one or more optical distortions associated with varying angle of incidence of the at least one light beam onto the at least one deflector.

A skilled person would understand that a pre-distorted scan is of particular benefit in biaxial scanning systems described herein due to a wide angular span of rotation of the motor, which creates large angles of incidence and significant distortion.

A skilled artisan would understand that an example embodiment of a biaxial scanner that employs the pre-distorted (compensating) scanning patter is the system implemented with the voice coil actuators, such as the embodiment shown in FIG. 41 and described hereinabove with references thereto.

A skilled person would appreciate that any of the embodiments described hereinabove in Part IV can be combined with any of the embodiment described hereinabove in Parts I, II, and III.

Part V: LIDAR System

In LIDAR systems and other optical systems employing one or more laser light sources and scanning mirrors, the complexity of the system can be high. Furthermore, meeting eye safety requirements may involve the use of a wide field of view. Thus, LIDAR systems may include a large number of components to obtain and collect data over a wide field of view (FOV), while providing high reliability of the system.

Existing systems typically include a laser emitter, scanning mirrors, and a detector (referred to as a Laser Range Finder [LRF]) for each beam emitted from the laser. However, existing systems may have high complexity, a large number of components (e.g., require multiple LRF's), and may be expensive. Thus, there is a need to reduce the system complexity, the number of parts, and cost, while providing LIDAR and other optical systems capable of providing desired levels of detection range, sensitivity, and field of view size requirements. In particular, there is a need for a single scanning assembly capable of scanning a wide FOV, and to avoid the complexity and cost involved in existing systems with multiple scanners. The presently disclosed embodiments are aimed at addressing this need.

Figure 73:
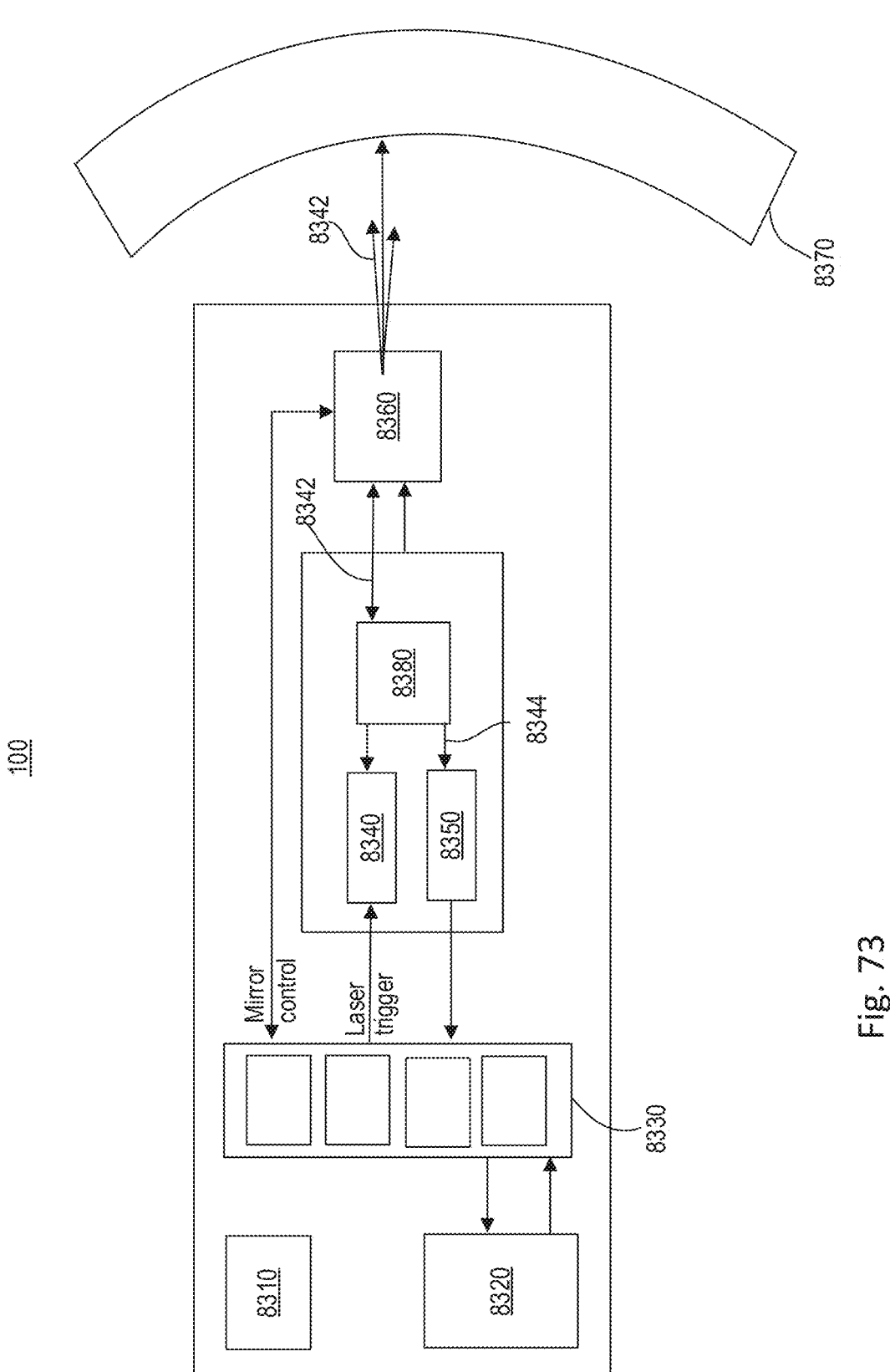
FIG. 73 is a block diagram illustrating an exemplary architecture for LIDAR system of the present invention.

FIG. 73 illustrates a high-level block diagram of an exemplary architecture for LIDAR system 100. As illustrated in FIG. 73, LIDAR system 100 may include power supply 8310, controller 8320, optical module 8330, laser array 8340, sensor array 8350, and scanner 8360. As also illustrated in FIG. 73, light beams 8342 from laser array 8340 may be incident upon 2-D scanner 8360 that may direct the light to FOV 8370. Reflected light beams 8344 returning from the FOV 8370 may be received at 2-D scanner 8360 (also referred to as BiAxial scanner, or common scanning unit), which may direct reflected light beams 8344 to sensor array 8350, which may be configured to detect reflected light beams 8344. Controller 8320 may perform time of flight calculations to determine distances to various objects in the FOV 8370, and a point cloud of distance values may be generated for each scan of FOV 8370. In some embodiments, a common optical components 8380 may be used both to transmit laser light 8342 emitted from laser array 8340 to 2-D scanner 8360 and toward FOV 8370 and to direct reflected light 8342 received at 2-D scanner 8360 from FOV 8370 to sensor array 8350. Such an arrangement may provide significant advantages in terms of reduced complexity, lower cost, reliability, and performance. This arrangement may allow wide FOV scanning if the 2D scanner 8360 has a wide angular rotation span. This arrangement may additionally reduce blooming artifacts compared to a continuous detector array and laser array scheme, since the laser beams are optically separated, and the active areas on the detector are separated.

2D scanner 8360 may comprise any of the disclosed example embodiments of a scanning assembly, such as, for example, those disclosed herein and discussed hereinabove with respect to FIG. 6 through FIG. 72.

In some embodiments, the laser emission unit may include a plurality of laser emitters. For example, as illustrated in FIGS. 2B, 2C, 2E, laser emission unit 102 may include a plurality of laser emitters 112A-112F that may be configured to project two or more beams of laser light. In some embodiments, the laser emission unit may include a single, monolithic laser array including a plurality of laser emitters. By way of example, laser emission unit 102 may include a plurality of laser emitters (e.g., 112A-112F) fabricated on a single silicon wafer. Thus, laser emission unit may be in the form of a monolithic laser array. The term monolithic laser array refers to an array of laser light sources fabricated on a single (e.g., monolithic) silicon wafer. Because the laser light sources are fabricated on a single silicon wafer, the laser light sources on the monolithic laser array may be well aligned with each other.

Figures 74A, 74B:
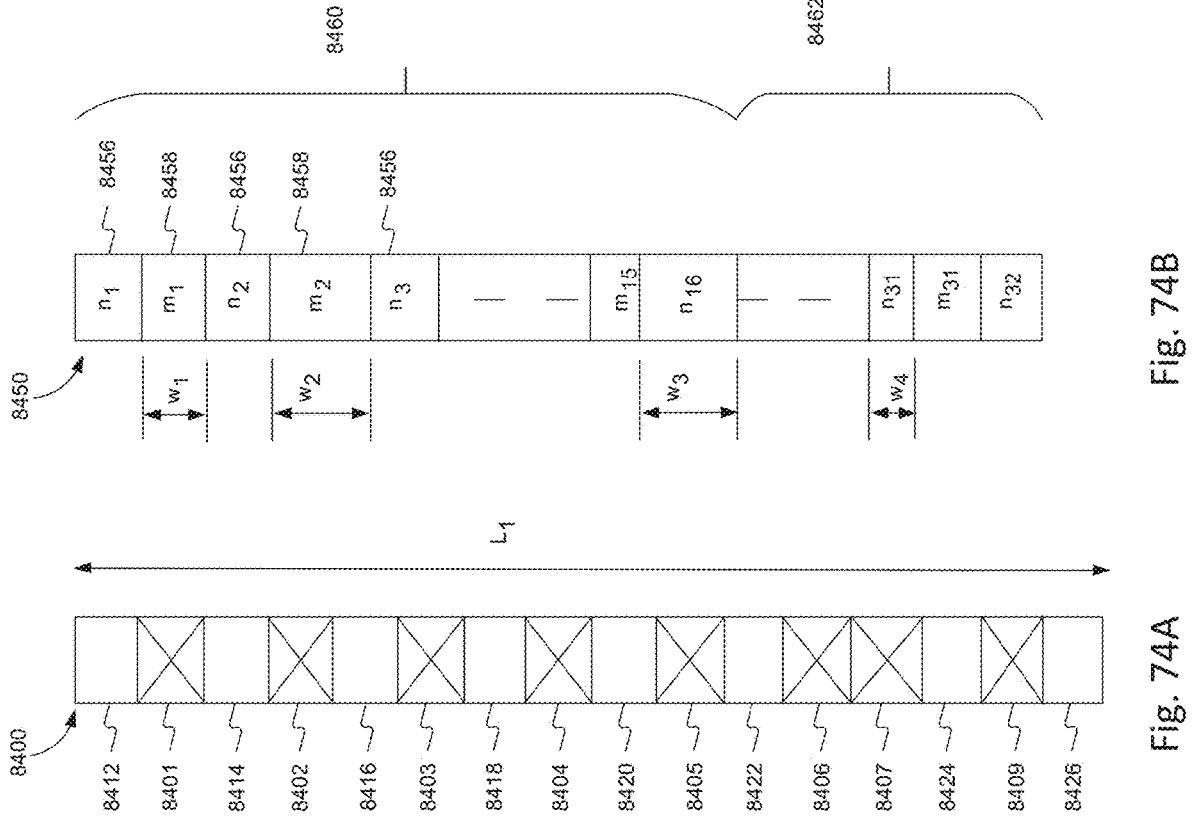
FIG. 74A and FIG. 74B illustrate an example embodiment of a monolithic laser array that can be used by the present invention.

FIG. 74A illustrates an example of a monolithic laser array 8400 including a plurality of laser emitters (e.g., 8412, 8414, 8416, etc.). In some embodiments, the monolithic laser array comprises a one-dimensional laser array. By way of example, as illustrated in FIG. 74A, laser array 8400 may be a one-dimensional laser array including active regions 8412, 8414, 8416, etc. (e.g., laser emitters), arranged in a single column. It is contemplated, however, that in some embodiments, laser array 8400 may be a two-dimensional laser array, including active regions separated from each other and arranged in a two-dimensional matrix. In some embodiments, the plurality of laser emitters may be edge emitters. For example, one or more of laser emitters 8412, 8414, 8416, etc., in laser array 8400 may include edge emitter lasers. It is contemplated, however, that one or more of laser emitters 8412, 8414, 8416, etc., may include other types of laser emitters (e.g., vertical-cavity surface-emitting laser (VCSEL)). In some embodiments, each of the plurality of laser beams may be a pulsed laser beam with a wavelength between 860 nm and 950 nm. For example, as discussed above one or more of laser emitters 8412, 8414, 8416, etc., may be a pulsed laser emitter configured to emit a pulsed laser having a wavelength of between 860 nm-950 nm. It is also contemplated that in some embodiments, the one or more laser emitters 8412, 8414, 8416, etc., may be configured to emit laser light having a wavelength of between 1300 nm-1600 nm.

In some embodiments, the monolithic laser array may include a plurality of active regions corresponding to the plurality of laser emitters and a plurality of inactive regions, wherein the plurality of laser emitters are spaced apart from one another by one or more of the plurality of inactive regions. A monolithic laser array may include a plurality of active regions (e.g., laser light emitting regions or laser emitters) separated from each other by inactive regions (e.g., non-laser emitting inactive regions). As illustrated in FIG. 74A, for example, laser array 8400 may include a plurality of (e.g., 8) laser light emitting regions or laser emitters 8412, 8414, 8416, 8418, 8420, 8422, 8424, and 8426. Laser array 8400 may also include a plurality of inactive regions (e.g., non-laser emitting regions) 8401-8409. It is contemplated that adjacent active regions may be separated by one or more inactive regions. For example, as illustrated in FIG. 74A, active regions 8414 and 8416 may be separated by inactive region 8402. Likewise, active regions 8420 and 8422 may be separated by inactive region 8405. It is contemplated that more than one inactive region may be disposed between the active regions. For example, as illustrated in FIG. 74A, active regions 8422 and 8424 may be separated by inactive regions 8406, 8407. Each active region may correspond to a channel. Thus, for example, FIG. 74A illustrates a laser array 8400 having 8 channels. It is contemplated that laser array 8400 may have any number of channels.

In some embodiments, the monolithic laser array may include 4 active laser channels. In some embodiments, the monolithic laser array may include 8 active laser channels. In some embodiments, the monolithic laser array may include 16 active laser channels. In some embodiments, the monolithic laser array may include 32 active laser channels. For example, a laser array may include 16 laser sources arranged in a 1-D array, each laser source having a wavelength of about 905 nm. The light emitted from the laser sources may travel through various optical components associated with the optical path, including, e.g., lenses, collimators, etc. FIG. 74B illustrates an exemplary monolithic laser array 8450 that may include 16 or 32 active regions 8456. For example, as illustrated in FIG. 74B, monolithic laser array 8450 may include active laser emitting regions 8456 (e.g., n1-n32) with adjacent pair of active laser emitting regions 8456 spaced apart by one or more non-laser emitting inactive regions 8458 (e.g., m1-m31).

The example of FIG. 74B includes 16 laser channels (or 16 laser light sources in the array). Other numbers of laser sources may be used. For example, some embodiments may include 4, 8, 32, 64 laser sources, or any other desired number of laser sources.

In some embodiments, the plurality of laser emitters may include multiple monolithic laser arrays. By way of example, instead of fabricating a single laser array having 32 active regions, it may be possible to fabricate two monolithic laser arrays each having 16 active regions. For example, as illustrated in FIG. 74B, laser array 8450 may include monolithic laser arrays 8460 and 8462. Laser array 8460 may include active regions (e.g., laser emitters) 8456 (e.g., n1-n16) spaced apart by inactive regions 8458 (e.g., m1-m15). Similarly, laser array 8462 may include active regions (e.g., laser emitters) 8456 (e.g., n17-n32) spaced apart by inactive regions 8458 (e.g., m16-m31). As also illustrated in FIG. 74B, monolithic laser arrays 8460 and 8462 may both be fabricated on the same wafer. Alternatively, monolithic laser arrays 8460 and 8462 may be fabricated on different wafers or on different portions of the same wafer. Laser arrays 8460 and 8462 may be diced from the wafers and then assembled adjacent to each other to form a single 1D laser array 8450. Laser arrays 8460 and 8462 may be assembled via a suitable manufacturing or assembly process (e.g., bonding) to precisely align laser arrays 8460 and 8462.

Figures 75A, 75B, 75C:
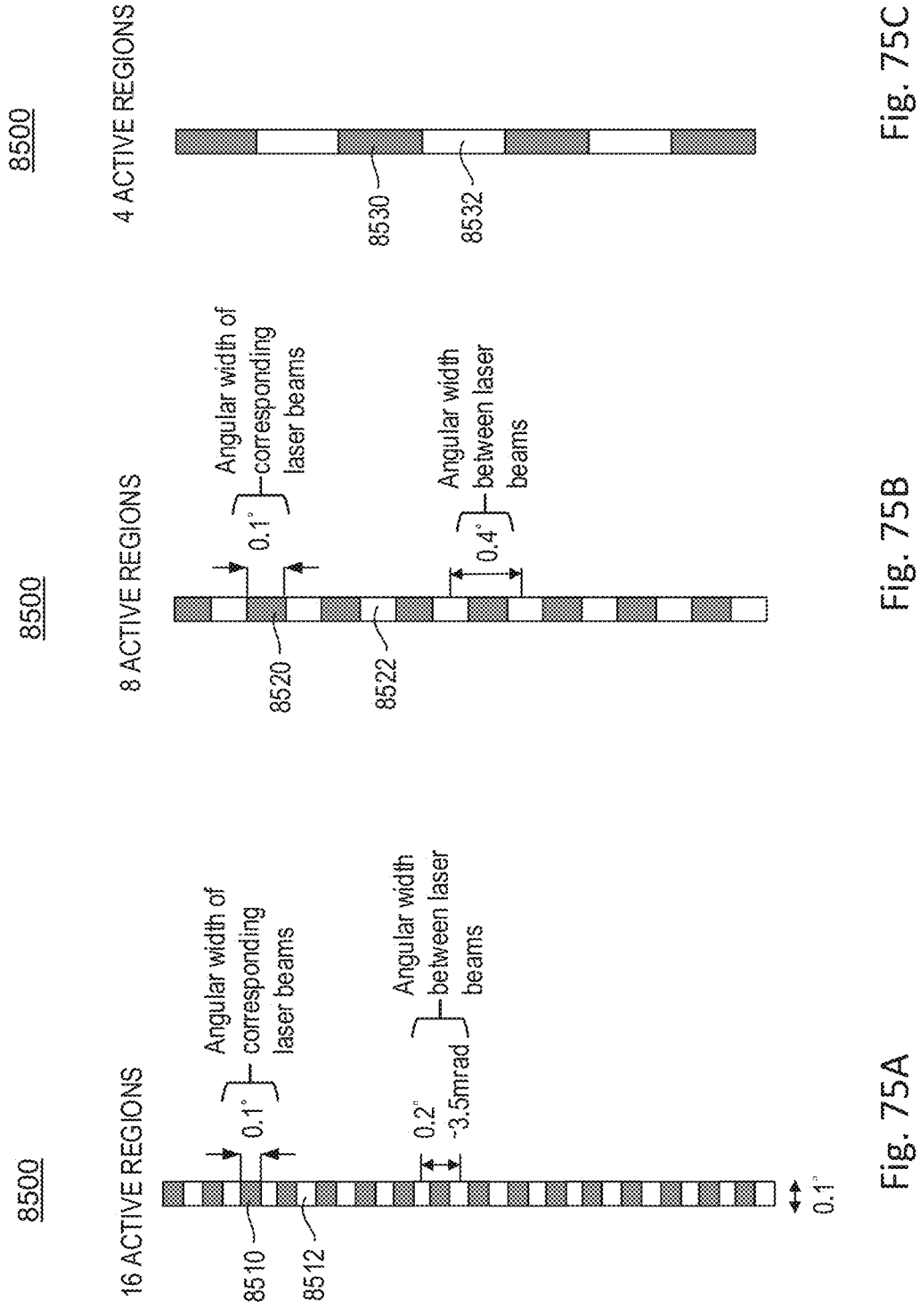
FIGS. 75A-75G are schematic diagrams of laser arrays that can be used in various embodiment of the present invention.

The laser light sources may also be arranged in various configurations within the 1-D array. In some embodiments, a ratio of active regions to inactive regions in the monolithic laser array may be 1:1. For example, in some embodiments, a 1-D laser array may be configured to operate with a 1:1 ratio of active laser channels to inactive interstitial space between the laser channels. This may be accomplished in several ways. For example, 16 laser channels may be arranged in a 1-D array 8500 such that each pair of adjacent laser sources may be separated by an interstitial inactive space of equal size as each laser source. As a result, as illustrated in FIG. 75A, the 1-D array may include an alternating and repeating sequence of one laser source 8510 adjacent to one interstitial inactive space 8520 in the array. As illustrated in FIG. 75A, the laser source 8510 and interstitial inactive region 8512 may be similarly sized (e.g., approximately 0.01 mm×0.1 mm, or 0.001 mm×0.1 mm). After the laser beam is emitted, each beam may be collimated by one or more collimators. Once the beam is collimated, its size spot size in far field may be expressed as an angular size. Thus, for example, as illustrated in FIG. 87A, beams emitted from laser array 8500 of FIG. 75A may have an angular width of 0.1° after being collimated and a spacing between adjacent collimated beams may be 0.2°. Non-limiting examples of angular beam spot sizes are e.g., 0.07 degrees×0.11 degrees, 0.1×0.05, or 0.1×0.1 degrees, or 0.1×0.2 degrees, or 0.1×0.4 degrees. Although laser array 8500 includes 16 such units, other 1:1 ratio array configurations may also be used. For example, as illustrated in FIG. 85B, eight active laser channels 8520 may be interleaved by eight similarly or differently sized inactive spaces 8522. As illustrated in FIG. 85B, the laser source 8520 and interstitial inactive region 8522 may be similarly sized (e.g., 0.01 mm×0.2 mm). By way of another example, as illustrated in FIG. 85C, four active laser channels 8530 may be interleaved by four similarly or differently sized inactive spaces 8532. As illustrated in FIG. 85C, the laser source 8530 and interstitial inactive region 8532 may be similarly sized (e.g., 0.01 mm×0.4 mm). In each case, the power of the laser sources may be selected to provide a desired total power. In one example, the sixteen-channel array may include sixteen 30 W laser sources, the eight-channel array may include eight 60 W laser sources, and the four-laser source array may include four 120 W laser sources, all yielding a total maximum power of 480 W. The emitters may have any suitable power level (e.g., between 20 W to 200 W).

The laser light sources may also be arranged in various configurations within the 1-D array. In some embodiments, a ratio of active regions to inactive regions in the monolithic laser array may be 1:1. For example, in some embodiments, a 1-D laser array may be configured to operate with a 1:1 ratio of active laser channels to inactive interstitial space between the laser channels. This may be accomplished in several ways. For example, 16 laser channels may be arranged in a 1-D array such that each pair of adjacent laser sources may be separated by an interstitial inactive space of equal size as each laser source. As a result, the 1-D array may include an alternating and repeating sequence of one laser source adjacent to one interstitial inactive space 8520 in the array. As illustrated in FIG. 75A, the laser source 8510 and interstitial inactive region 8512 may be similarly sized (e.g., approximately 0.01 mm×0.1 mm, or 0.001 mm×0.1 mm). After the laser beam is emitted, each beam may be collimated by one or more collimators 1112. Once the beam is collimated, its size spot size in far field may be expressed as an angular size. Thus, for example, as illustrated in FIG. 75A, beams emitted from laser array 8500 of FIG. 75A may have an angular width of 0.1° after being collimated and a spacing between adjacent collimated beams may be 0.2°. Non-limiting examples of angular beam spot sizes are e.g., 0.07 degrees×0.11 degrees, 0.1×0.05, or 0.1×0.1 degrees, or 0.1×0.2 degrees, or 0.1×0.4 degrees. Although laser array 8500 includes 16 such units, other 1:1 ratio array configurations may also be used. For example, as illustrated in FIG. 75B, eight active laser channels 8520 may be interleaved by eight similarly or differently sized inactive spaces 8522. As illustrated in FIG. 75B, the laser source 8520 and interstitial inactive region 8522 may be similarly sized (e.g., 0.01 mm×0.2 mm). By way of another example, as illustrated in FIG. 75C, four active laser channels 8530 may be interleaved by four similarly or differently sized inactive spaces 8532. As illustrated in FIG. 75C, the laser source 8530 and interstitial inactive region 8532 may be similarly sized (e.g., 0.01 mm×0.4 mm). In each case, the power of the laser sources may be selected to provide a desired total power. In one example, the sixteen-channel array may include sixteen 30 W laser sources, the eight-channel array may include eight 60 W laser sources, and the four-laser source array may include four 120 W laser sources, all yielding a total maximum power of 480 W. The emitters may have any suitable power level (e.g., between 20 W to 200 W).

Figures 75D, 75E, 75F:
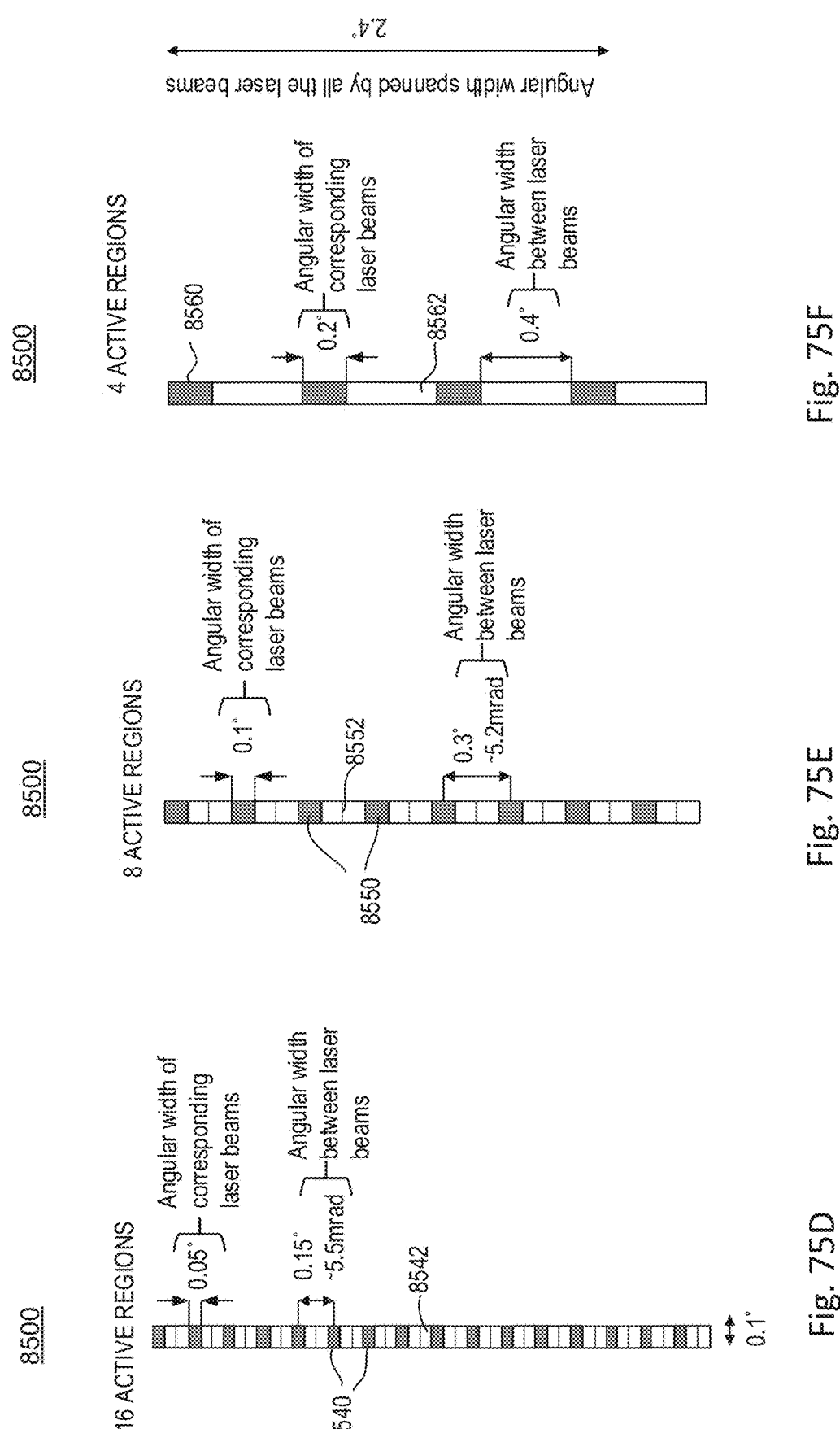

In some embodiments, a ratio of active region width to inactive region width in the monolithic laser array may be 1:2. In addition to a 1:1 array, as represented by FIGS. 75A-75C, a 1:2 ratio array may also be used. For example, as represented in FIGS. 75D-75F, each of the example arrays described above may include interstitial inactive spaces of two times the width of each laser source. Thus, in each of the 16-channel, 8-channel, and 4-channel array examples, each pair of laser sources may be separated by an inactive space with twice the width of one of the laser sources. Thus, for example, as illustrated in FIG. 75D, each laser source 8540 may have a width of 0.05 mm whereas each inactive space 8542 may have a width of about 0.1 mm (e.g. 110 microns). By way of another example, as illustrated in FIG. 75E, each laser source 8550 may have a width of 0.1 mm whereas each inactive space 8552 may have a width of about 0.2 mm.

Figure 75H:
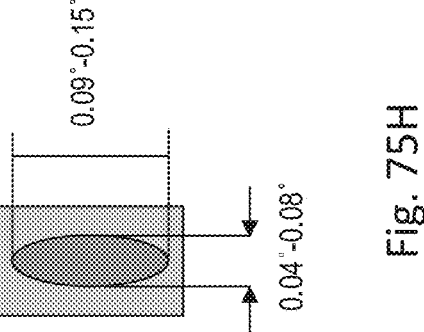
FIG. 75H illustrates an exemplary magnified image of a spot generated by a laser beam emitted from a laser array that can be used by the present invention.
Figure 75G:
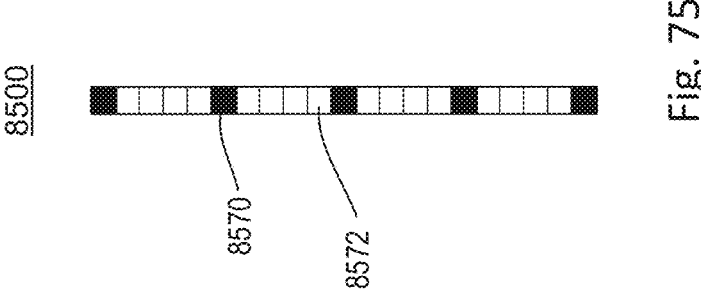

Likewise, as illustrated in FIG. 75F, each laser source 8560 may have a width of 0.2 mm whereas each inactive space 8562 may have a width of about 0.4 mm. Other ratios of the laser source and inactive space are also contemplated. In some embodiments, a ratio of active regions to inactive regions in the monolithic laser array may be 1:3. In some embodiments, a ratio of active regions to inactive regions in the monolithic laser array may be 1:5. In some embodiments, a ratio of active regions to inactive regions in the monolithic laser array may be within a range of 1:1 to 1:10. FIG. 75G illustrates an example where the ratio of the active to inactive regions is 1:5. In this example, each active laser source is separated by an inactive space having a width equal to five times the width of one of the laser sources. For example, as illustrated in FIG. 75G, each laser source 8570 may have a width of about 0.1 mm whereas each inactive space 8572 may have a width of about 0.5 mm.

In some embodiments, an overall length (L1) of the monolithic laser array may be between 0.5 mm to 20 mm. In another exemplary embodiment, an overall length of monolithic laser array 8400 may range from 1 mm to 6 mm, although other lengths are also contemplated.

In some embodiments, each of the plurality of laser beams produces an elongated spot having an angular width of between 0.002 degrees and 0.2 degrees and having an angular length of between 0.02 degrees and 0.2 degrees. For example, when a laser beam emitted from a laser array is incident on an object in the field of view, the beam may produce a spot of laser light on the object. A shape of the emitted beam (spot) may be symmetrical, or elongated in one axis. Elongation may enhance eye safety in some cases. FIG. 75H illustrates an exemplary magnified image of a spot generated by a laser beam emitted from, for example, laser array 8500. As illustrated in FIG. 75H, the spot may have an angular width of between 0.04 degrees and 0.08 degrees and an angular length of between 0.09 degrees and 0.15 degrees. To further promote eye safety, the ratio of active to inactive spacing in the laser array (e.g., 950, 1000) may be selected to preserve a minimum angular spacing between active laser beams. The minimum spacing may be determined by a government or safety standards organization, for example. In some cases, the minimum angular spacing between beams may be 5 mrad, or about 0.29 degrees.

Figure 76C:
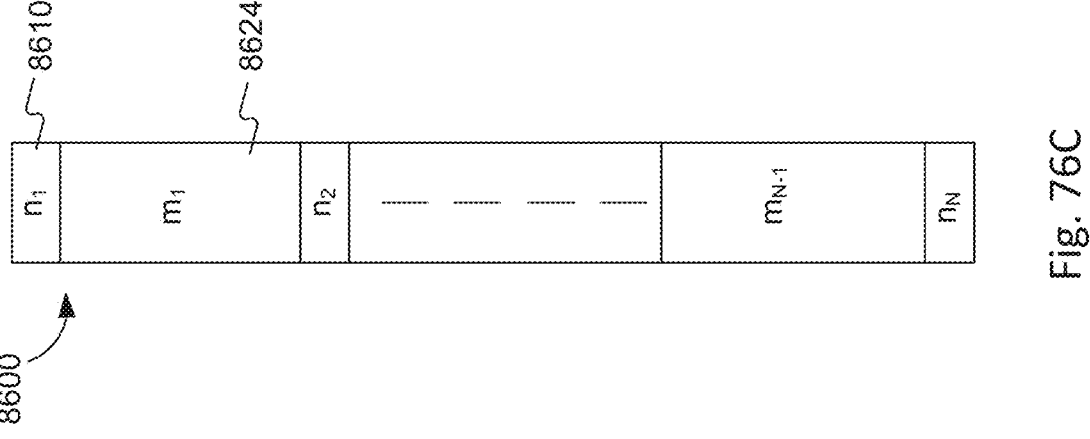
FIG. 76A, FIG. 76B and FIG. 76C are schematic diagrams of detector (sensor) arrays.
Figure 76B:
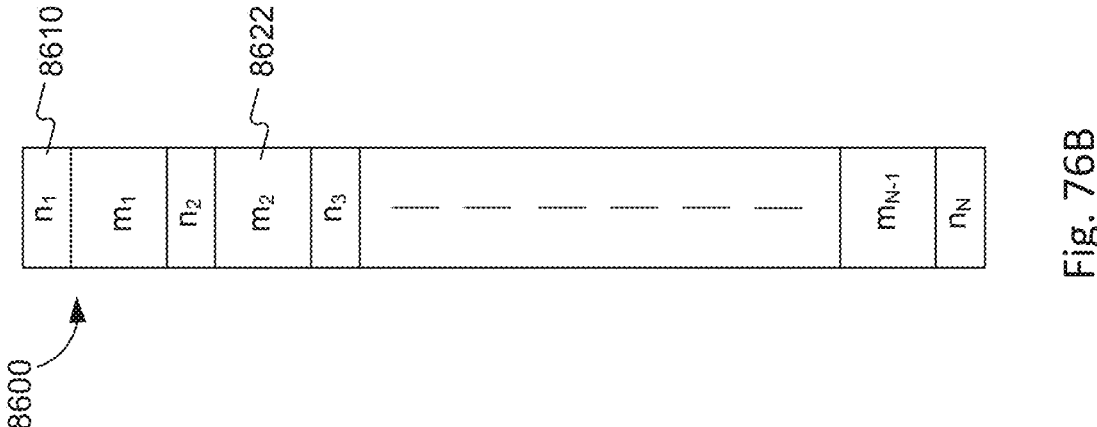

Any number of active and inactive regions may be present on monolithic detector 8600. For example, N for detector array 8610 in FIGS. 76A-76C, may range from 1 to any desired number. Thus for example, N may be 4, 8, 16, 32, 64, etc. In some embodiments, the detector may include 4 light sensitive active regions (e.g., N=4). In some embodiments, the detector may include 8 light sensitive active regions (e.g., N=8). In some embodiments, the detector may include 16 light sensitive active regions (e.g., N=16). In some embodiments, the detector may include 32 light sensitive active regions (e.g., N=32).

Figure 76A:
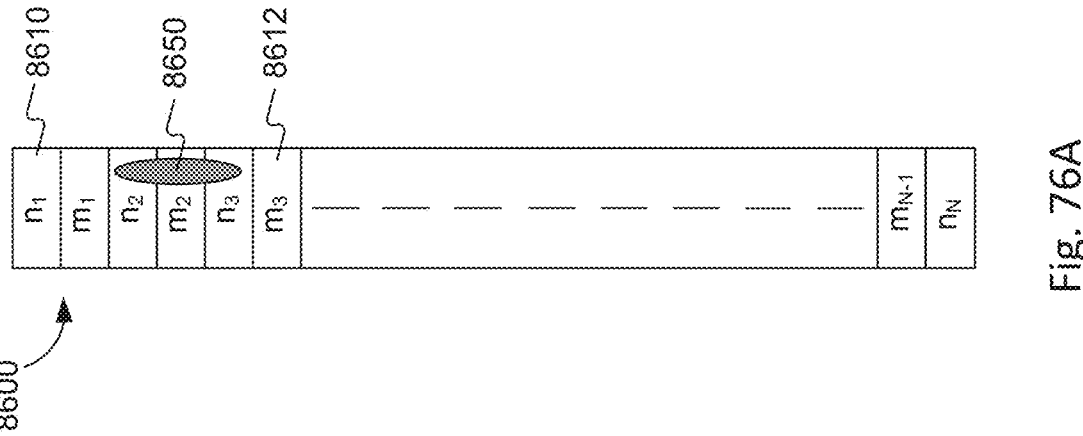

In some embodiments, two or more of the plurality of laser beams may have a divergence different from one another. Although each of laser beams (e.g., 8342, etc.) have been illustrated as a single line, each laser beam is expected to diverge once it emerges from laser illumination system 102. Thus, each laser beam may be represented by a plurality of rays diverging from each other with increasing distance towards the field of view. It is also contemplated that an amount or angle of divergence of different laser beams may be equal or unequal. In some embodiments, each of the reflected beams may produce a beam spot incident upon two or more of the light sensitive active regions. The plurality of rays representing each laser beam may be reflected from the field of view. The plurality of reflected rays may form a spot on the detector (e.g., 8600). It is contemplated that in some embodiments the spot of reflected laser light beam rays may be incident on only one active region 8610 of, for example, detector 8630 or on more than one active region of detector 1130. FIG. 76A illustrates an exemplary spot 8650 that may be incident on more than one active region 8610 (e.g., n2, n3) of detector 1130. By ensuring that spot 8650 is incident on more than one active region 8610, it may be possible to ensure that more than one active region generates a signal corresponding to a detected object from which laser beams were reflected. The separate signals corresponding to a region on a detected object enables increased resolution for that region, i.e. each active region is a distinct pixel of a subregion within the region on the detected object.

In some embodiments, the LIDAR system may include at least one processor configured to control an orientation of one or more components of the common scanning unit to cause scanning of the field of view of the LIDAR system with the plurality of laser beams along a series of scan lines. For example, as discussed elsewhere in this disclosure, scanning unit 8360 may be individually controlled by a processor (e.g., 118), such that scanning unit 8360 may rotate towards a specific angle along each of one or two separate axes. By controlling scanning units 8360, processor 118 may be able to direct one or more of laser light beams toward different portions of the field of view, thereby allowing LIDAR system 100 to scan the field of view using one or more laser light beams as discussed above.

In some embodiments, the field of view of the LIDAR system may have a vertical angular dimension of between 6 degrees and 90 degrees, and the field of view of the LIDAR system may have a horizontal angular dimension of between 20 degrees and 140 degrees. As discussed above scanning units 8360 may rotate about a scan axis and/or a tilt axis to project laser light over a desired field of view. Reflected laser light beams from the field of view may be detected to detect the presence of one or more objects in the field of view. The extent of the field of view may depend on many factors including the maximum rotation span of scanning unit 8360 about their respective scan and tilt axes, divergence angle of the laser beams, and the angle between the plurality of laser beams projected from scanning unit 8360. It is contemplated that in some exemplary embodiments, the field of view may extend over a horizontal (azimuthal) angle ranging between 20 degrees and 140 degrees and a tilt or vertical (elevation) angle ranging between 6 degrees and 90 degrees. It is to be understood that the extent of the FOV is described in terms of world coordinates. For example, scanning unit 8360 may include a 20×20 mm biaxial rotating mirror capable of providing a 140 degrees×44 degrees FOV.

In view of the above, in an example embodiment, the present invention can be defined by the following numbered embodiment:

1. A LIDAR system, comprising:
   a laser emission unit configured to generate a plurality of laser beams;
   an optical system configured to simultaneously transmit the plurality of laser beams from the laser emission unit to a common scanning unit configured to deflect the plurality of laser beams toward a field of view of the LIDAR system and thereby to scan the field of view along a plurality of scan lines traversing the field of view and to generate reflected beams indicative of objects in the field of view; and
   a detector configured to detect the reflected beams and to generate electrical signals in response to the reflected beams, wherein the common scanning unit comprises any of the disclosed example embodiments of a scanning assembly, such as, for example, those disclosed herein and discussed hereinabove with respect to FIG. 6 through FIG. 72.

1. The LIDAR system of the $1^{st}$ embodiment, wherein the laser emission unit comprises a single, monolithic laser array including a plurality of laser emitters, and wherein the detector comprises a single, monolithic array of light sensitive active regions corresponding to the plurality of laser emitters.

2. The LIDAR system of the $2^{nd}$ embodiment, wherein: the single, monolithic laser array includes a plurality of laser active regions corresponding to the plurality of laser emitters, and a plurality of laser inactive regions, wherein the plurality of laser emitters are spaced apart from one another by one or more of the plurality of laser inactive regions, and wherein the light sensitive active regions are separated from one another by one or more detector inactive regions.

3. The LIDAR system of the $3^{rd}$ embodiment, wherein the single, monolithic laser array includes between 4 to 32 laser emitters and wherein the detector includes between 4 to 32 light sensitive active regions.

4. The LIDAR system of the $3^{rd}$ embodiment, wherein a ratio of an angular width of the laser active regions to an angular width of the laser inactive regions is from 1:1 to 1:10, and a ratio of an angular width of the light sensitive active regions to an angular width of the detector inactive regions in the detector is in between 1:1 and 1:10.

5. The LIDAR system of any of the $1^{st}$ through $5^{th}$, wherein the field of view of the LIDAR system has a horizontal angular dimension of from 60 degrees to 140 degrees.

6. The LIDAR system of any of the $1^{st}$ through $6^{th}$ embodiment, wherein each of the plurality of laser beams produces an elongated spot having an angular width of from 0.002 degrees to 0.2 degrees and having an angular length of from 0.02 degrees to 0.2 degrees.

7. The LIDAR system of any of the $1^{st}$ through $7^{th}$ embodiments, wherein the plurality of laser beams comprises at least a first laser beam having a first divergence, and a second laser beam having a second divergence different from the first divergence.

8. The LIDAR system of any of the $1^{st}$ through $8^{th}$ embodiments, wherein the LIDAR system further comprises at least one processor configured to cause the common scanning unit to scan the field of view of the LIDAR system with the plurality of laser beams along a series of scan lines.

A skilled person would appreciate that any of the embodiments described hereinabove in Part V can be combined with any of the embodiment described hereinabove in Parts I, II, III, and IV.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A yoke assembly of an oscillatory system, the yoke assembly comprising:
  a yoke structure, the yoke structure comprising:
    a first sidewall;
    a second sidewall, the second sidewall spaced apart from the first sidewall, the first and second sidewalls having a gap therebetween;
    at least one member extending between the first and second sidewalls;
    a first flange extending laterally from the first sidewall;
    a second flange extending laterally from the second sidewall;
    wherein the yoke structure is a unitary structure having the first and second sidewalls and the first and second flanges integrally connected.

2. The yoke assembly of claim 1, further comprising at least a first magnet disposed within the gap between the first and second sidewalls.

3. The yoke assembly of claim 2, wherein the yoke structure further comprises a second magnet, wherein the first magnet is disposed against the first sidewall and the second magnet is disposed against the second sidewall, the first and the second magnets having the gap therebetween.

4. The yoke assembly of claim 3, further comprising a voice coil at least partially disposed within the gap between the first and second magnets.

5. The yoke assembly of claim 4, further comprising a holder configured to receive a mirror, the holder coupled to at least one of the first and second flanges.

6. The yoke assembly of claim 5, wherein the holder is coupled to the first flange and the second flange via at least one flexure.

7. The yoke assembly of claim 6, wherein the holder is coupled to the first flange via a first flexure and to the second flange via a second flexure, the first flexure attached to the first flange at a first plurality of attachment areas, and the second flexure is attached to the second flange at a second plurality of attachment areas.

8. The yoke assembly of claim 7, wherein the first plurality of attachment areas comprises a first attachment area having a first orientation and a second attachment area having a second orientation, different from the first orientation, and wherein the second plurality of attachment areas comprises a third attachment area having a third orientation and a fourth attachment area having a fourth orientation, different from the third orientation.

9. The yoke assembly of claim 8, wherein the first flexure is welded to the first flange at the first plurality of attachment areas and the second flexure is welded to the second flange at the second plurality of attachment areas.

10. The yoke assembly of claim 6, wherein the flexure is formed from AISI 420 stainless steel, PH 15-7 stainless steel, Type 301 stainless steel, Inconel® X-750 or AISI 631 CH 900 (17-7 PH) stainless steel.

11. The yoke assembly of claim 6, wherein the first flexure is attached to the holder at a third plurality of attachment areas, and the second flexure is attached to the holder at a fourth plurality of attachment areas.

12. The yoke assembly of claim 11, wherein the third plurality of attachment areas comprises a fifth attachment area having a fifth orientation and a sixth attachment area having a sixth orientation, different from the fifth orientation, and wherein the fourth plurality of attachment areas comprises a seventh attachment area having a seventh orientation and an eighth attachment area having an eighth orientation, different from the seventh orientation.

13. The yoke assembly of claim 11, wherein the first flexure is welded to the holder at the third plurality of attachment areas and the second flexure is welded to the holder at the fourth plurality of attachment areas.

14. The yoke assembly of claim 5, wherein the voice coil is coupled to the holder.

15. The yoke assembly of claim 5, wherein the holder is non-ferromagnetic.

16. The yoke assembly of claim 5, wherein the holder is formed from AISI 304L stainless steel or AISI 316L stainless steel.

17. The yoke assembly of claim 1, wherein the first flange is disposed at a midpoint of the first sidewall.

18. The yoke assembly of claim 1, wherein the second flange is aligned longitudinally with respect to the first flange.

19. The yoke assembly of claim 1, wherein the at least one member extending between the first and second sidewalls is a top portion extending between the first and second sidewalls, the yoke assembly further comprising a bottom portion extending between the first and second sidewalls.

20. The yoke assembly of claim 1, wherein at least one of the first flange or second flange is a flexure bearing stator.

21. The yoke assembly of claim 1, wherein the yoke structure is ferromagnetic.

22. The yoke assembly of claim 1, wherein the yoke structure is formed from AISI 630 H 900 (17-4 PH) stainless steel.

* * * * *